United States Patent
Maas et al.

(10) Patent No.: US 12,023,695 B2
(45) Date of Patent: Jul. 2, 2024

(54) SYSTEMS AND METHODS TO PRECISELY CONTROL OUTPUT PRESSURE IN BUFFERED SPRAYERS (DUO1)

(71) Applicant: Dispensing Technologies B.V., Helmond (NL)

(72) Inventors: Wilhelmus Johannes Joseph Maas, Someren (NL); Dominicus Jan van Wijk, Helmond (NL); Paulo Nervo, Duizel (NL); Petrus Lambertus Wilhelmus Hurkmans, Someren (NL); Aaron Haleva, Oakhurst, NJ (US)

(73) Assignee: Dispensing Technologies B.V., Helmond (NL)

( * ) Notice: Subject to any disclaimer, the term of this patent is extended or adjusted under 35 U.S.C. 154(b) by 0 days.

(21) Appl. No.: 17/314,730

(22) Filed: May 7, 2021

(65) Prior Publication Data
US 2022/0203392 A1    Jun. 30, 2022

Related U.S. Application Data

(63) Continuation of application No. 14/073,835, filed on Nov. 6, 2013, now Pat. No. 11,027,298.
(Continued)

(51) Int. Cl.
*B05B 11/00* (2023.01)
*A47L 11/40* (2006.01)
(Continued)

(52) U.S. Cl.
CPC ....... *B05B 11/0075* (2013.01); *A47L 11/4088* (2013.01); *A47L 13/22* (2013.01);
(Continued)

(58) Field of Classification Search
CPC .............. B05B 11/0075; B05B 11/032; B05B 11/3038; B05B 11/3073; B05B 11/3076;
(Continued)

(56) References Cited

U.S. PATENT DOCUMENTS 4,174,052 A * 11/1979 Capra ................. B05B 11/0041
                                                      222/335
4,191,313 A *  3/1980 Blake .................. B05B 11/1011
                                                      222/335
(Continued)

FOREIGN PATENT DOCUMENTS

JP           05-104040 A       4/1993

*Primary Examiner* — Cody J Lieuwen

(57) ABSTRACT

In exemplary embodiments of the present invention, various novel dispensing devices can be provided. Such devices can involve a range of sprayer heads and sprayer/foamer systems incorporating such heads. Novel sprayer/foamer heads can include buffers of various types. By using a buffer, a user need not continually be pumping the device in order for the device to be spraying or foaming. In exemplary embodiments of the present invention, such a buffer can be spring loaded, spring loaded combination, elastomeric or gas. In exemplary embodiments of the present invention, the buffer can be in line or adjacent to a piston chamber. If adjacent, it can be connected to the piston chamber with a one way valve, to provide for spray after a downstroke of the piston has been completed, or without, to allow spraying to cease once a user releases the trigger or other actuator. In exemplary embodiments of the present invention, such novel sprayers and foamers can be mounted upside down, in various "Flairomop" devices, used to clean floors or the like. When using a buffer, a piston chamber can be designed to deliver greater amount of liquid per unit time than can be possibly dispensed through the nozzle or nozzles. The fraction of liquid that cannot be sent through the nozzle(s), due to their inherent restriction, can thus be sent to the buffer
(Continued)

for dispensing after the piston downstroke has been completed. A volume of the piston chamber, a volume of the buffer, a pressure response of the buffer, the throughput of the nozzle, and the minimum opening pressure of the outlet valve can be arranged to restrict the outlet pressures of liquid droplets exiting the nozzle within a defined range.

20 Claims, 120 Drawing Sheets

Related U.S. Application Data

(60) Provisional application No. 61/810,697, filed on Apr. 10, 2013, provisional application No. 61/805,044, filed on Mar. 25, 2013, provisional application No. 61/723,045, filed on Nov. 6, 2012.

(51) Int. Cl.

| | |
|---|---|
| *A47L 13/22* | (2006.01) |
| *B05B 9/08* | (2006.01) |
| *B05B 11/10* | (2023.01) |
| *B05B 15/62* | (2018.01) |
| *B29C 65/00* | (2006.01) |
| *B29C 65/18* | (2006.01) |
| *B29C 65/74* | (2006.01) |
| *B29C 65/78* | (2006.01) |
| *B29C 65/08* | (2006.01) |
| *B29C 65/16* | (2006.01) |
| *B29C 65/48* | (2006.01) |

(52) U.S. Cl.

CPC ........ *B05B 9/0883* (2013.01); *B05B 11/0032* (2013.01); *B05B 11/1011* (2023.01); *B05B 11/1038* (2023.01); *B05B 11/1073* (2023.01); *B05B 11/1074* (2023.01); *B05B 11/1076* (2023.01); *B05B 11/1077* (2023.01); *B05B 11/1098* (2023.01); *B05B 15/62* (2018.02); *B29C 65/18* (2013.01); *B29C 65/743* (2013.01); *B29C 65/7802* (2013.01); *B29C 65/7841* (2013.01); *B29C 66/0014* (2013.01); *B29C 66/0342* (2013.01); *B29C 66/1122* (2013.01); *B29C 66/4312* (2013.01); *B29C 66/43121* (2013.01); *B29C 66/439* (2013.01); *B29C 66/53262* (2013.01); *B29C 66/72341* (2013.01); *B29C 66/81419* (2013.01); *B29C 66/81465* (2013.01); *B29C 66/81815* (2013.01); *B29C 66/8322* (2013.01); *B29C 66/83221* (2013.01); *B29C 66/849* (2013.01); *B29C 65/08* (2013.01); *B29C 65/16* (2013.01); *B29C 65/48* (2013.01); *B29C 66/71* (2013.01)

(58) Field of Classification Search

CPC ............. B05B 11/3077; B05B 11/3092; B05B 11/3098; B05B 9/085; B05B 9/0883; B05B 15/061; A47L 11/4088; A47L 13/22; B29C 65/18; B29C 65/743; B29C 65/7802; B29C 65/7841; B29C 65/08; B29C 65/16; B29C 66/0014; B29C 66/0342; B29C 66/1122; B29C 66/4312; B29C 66/43121; B29C 66/439; B29C 66/72341; B29C 66/81419; B29C 66/81465; B29C 66/81815; B29C 66/8322; B29C 66/83221; B29C 66/849

USPC ...................................... 239/333, 340, 383.1

See application file for complete search history.

(56) References Cited

U.S. PATENT DOCUMENTS

| | | | | | |
|---|---|---|---|---|---|
| 4,241,853 | A * | 12/1980 | Pauls | B05B 11/1064 | 222/335 |
| 4,872,595 | A * | 10/1989 | Hammett | B05B 9/0883 | 417/540 |
| 5,183,185 | A * | 2/1993 | Hutcheson | B65D 83/0061 | 417/540 |
| 5,435,452 | A * | 7/1995 | Nishigami | B65D 1/0215 | 220/495.05 |
| 2002/0008164 | A1* | 1/2002 | Yanagida | B05B 12/0026 | 239/525 |

* cited by examiner

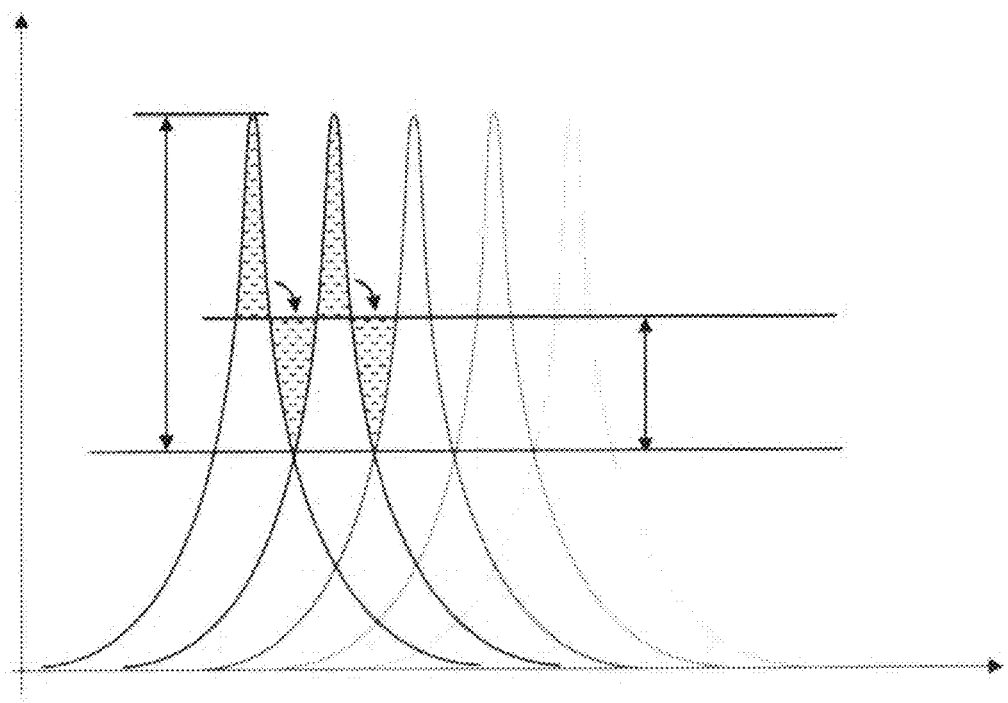
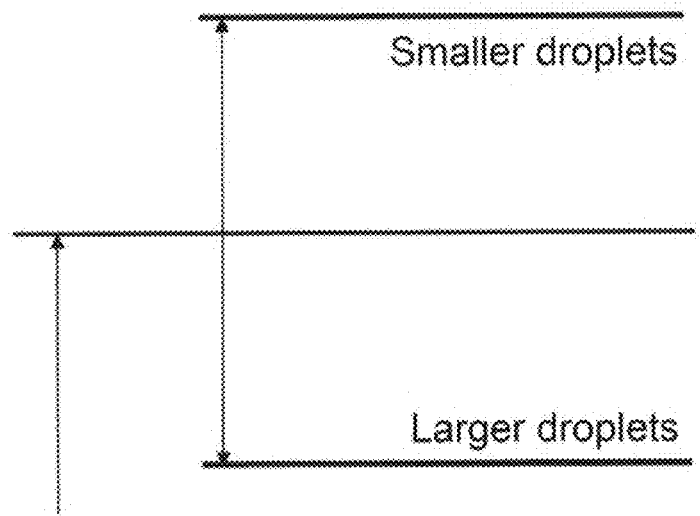
FIG. 5

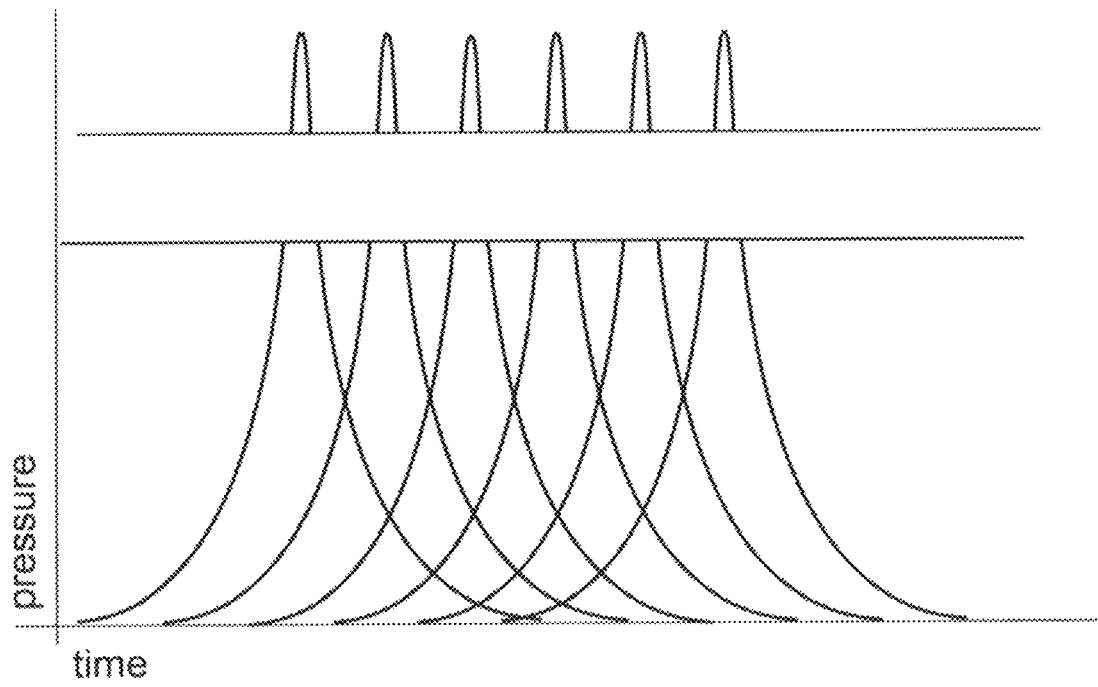
FIG. 7

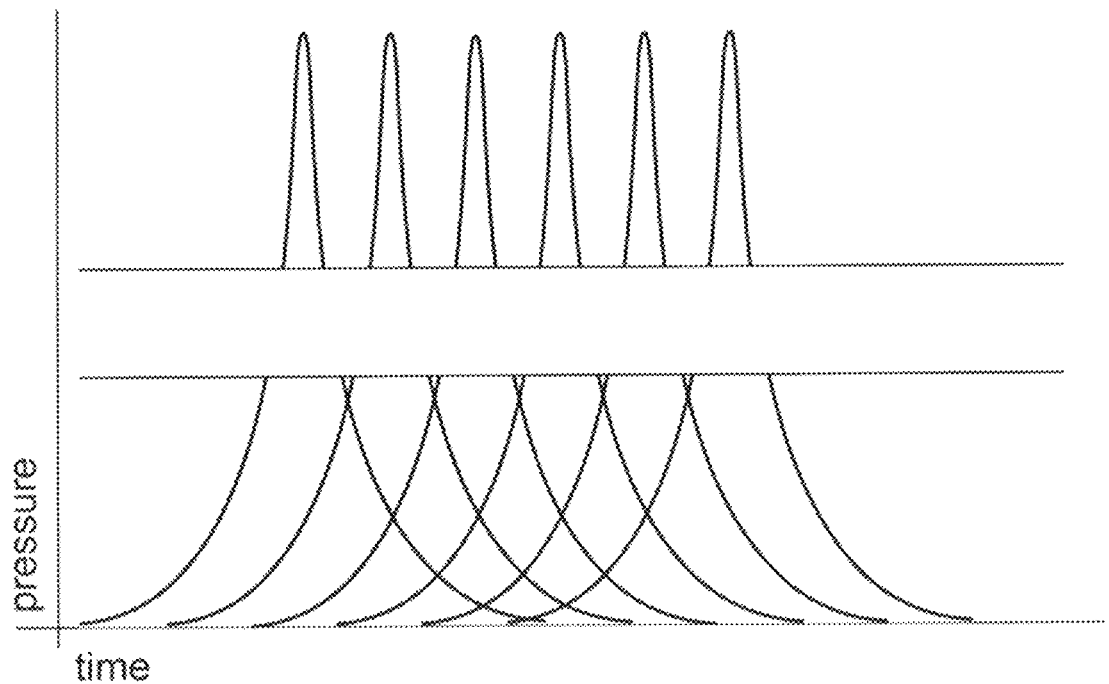
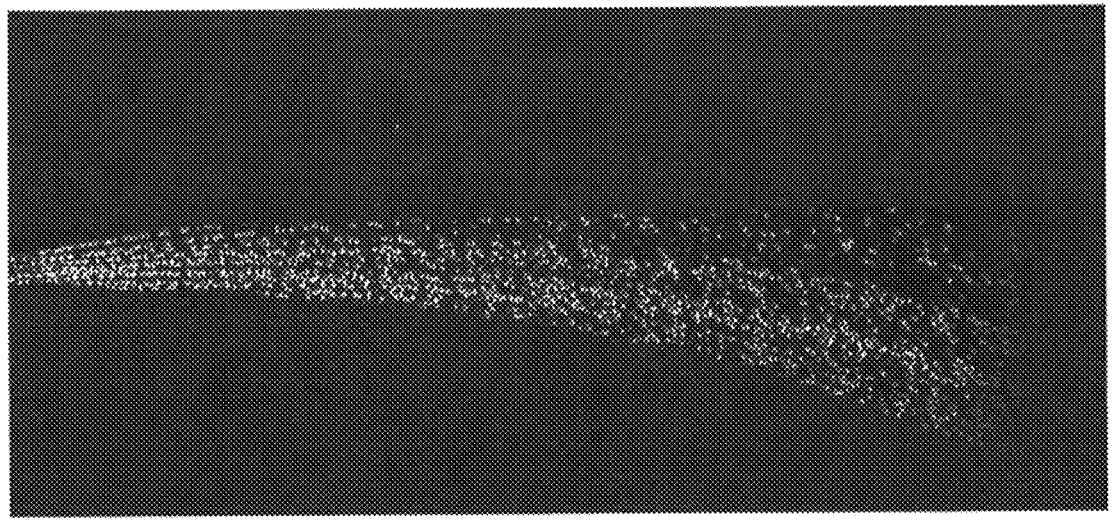
FIG. 8

FIG. 9

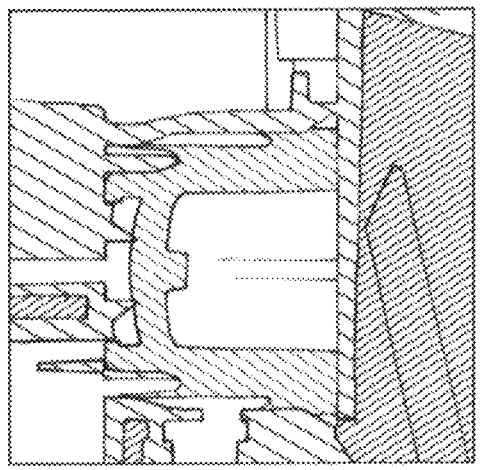
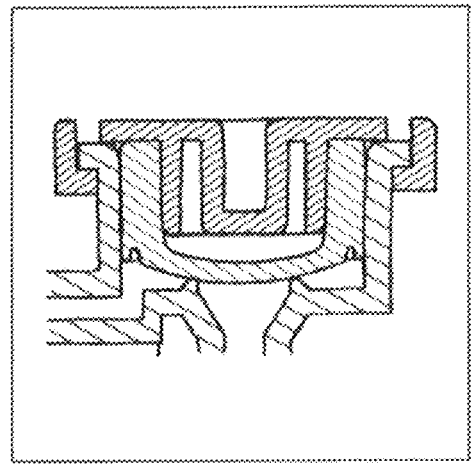
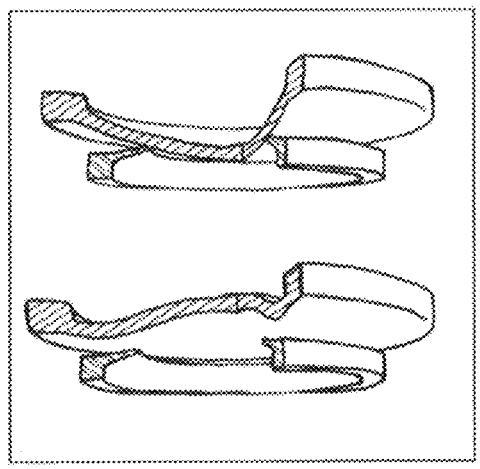
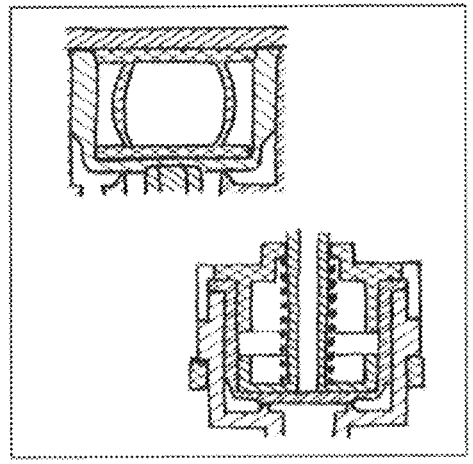
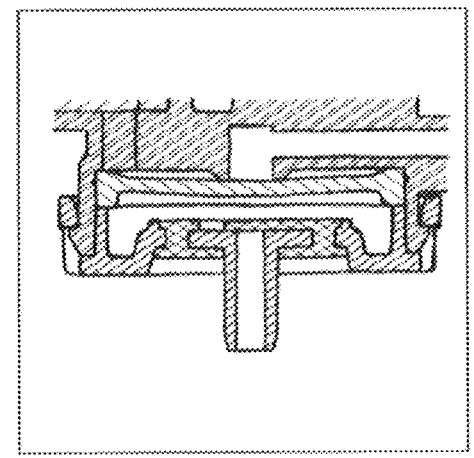
FIG. 10

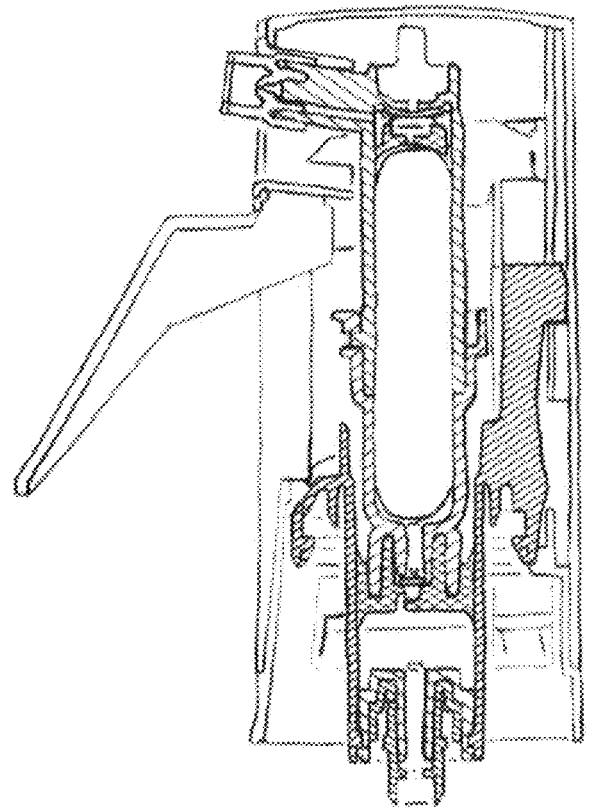
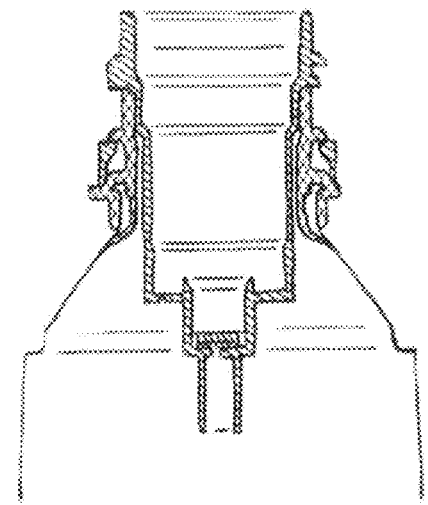
FIG. 19C

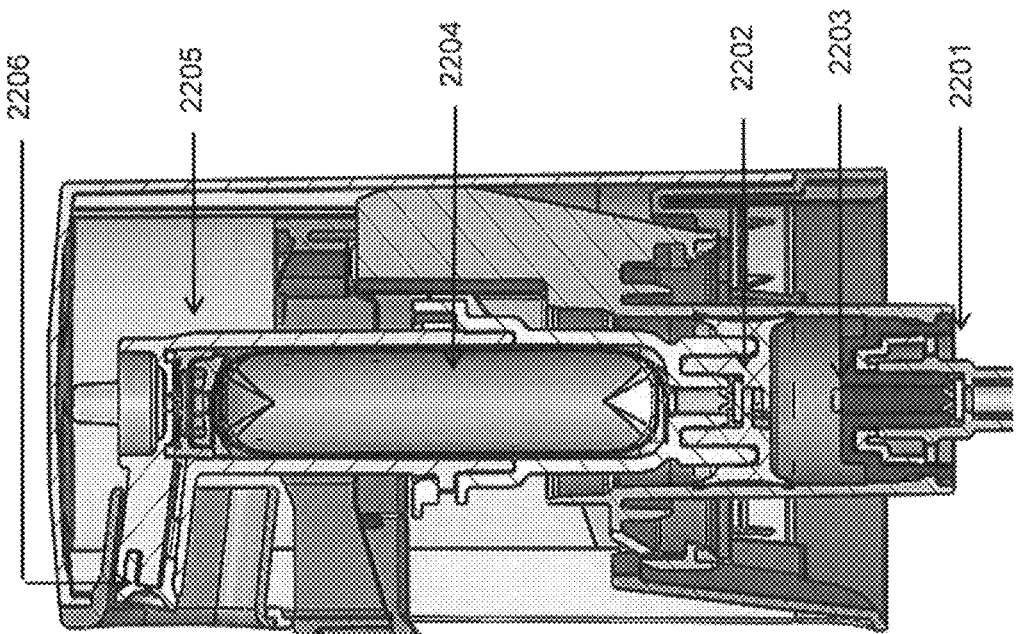
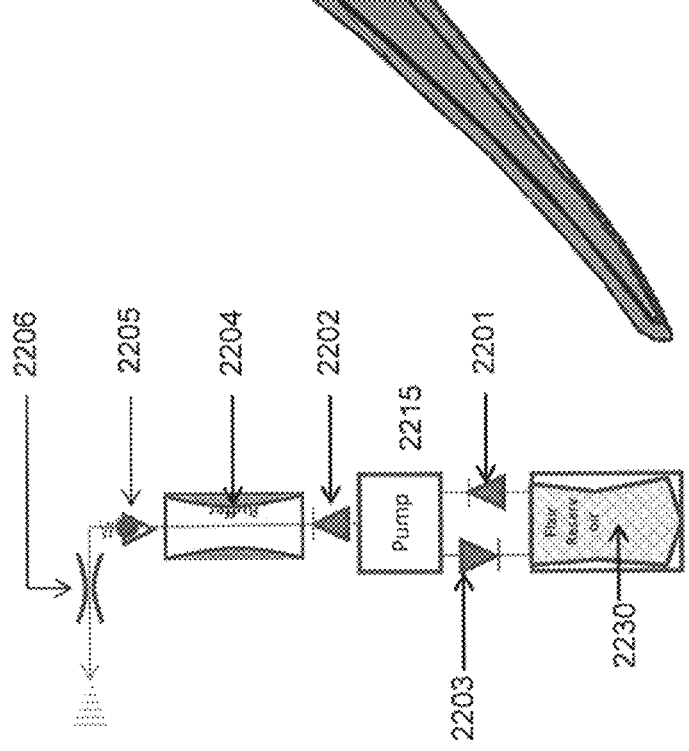

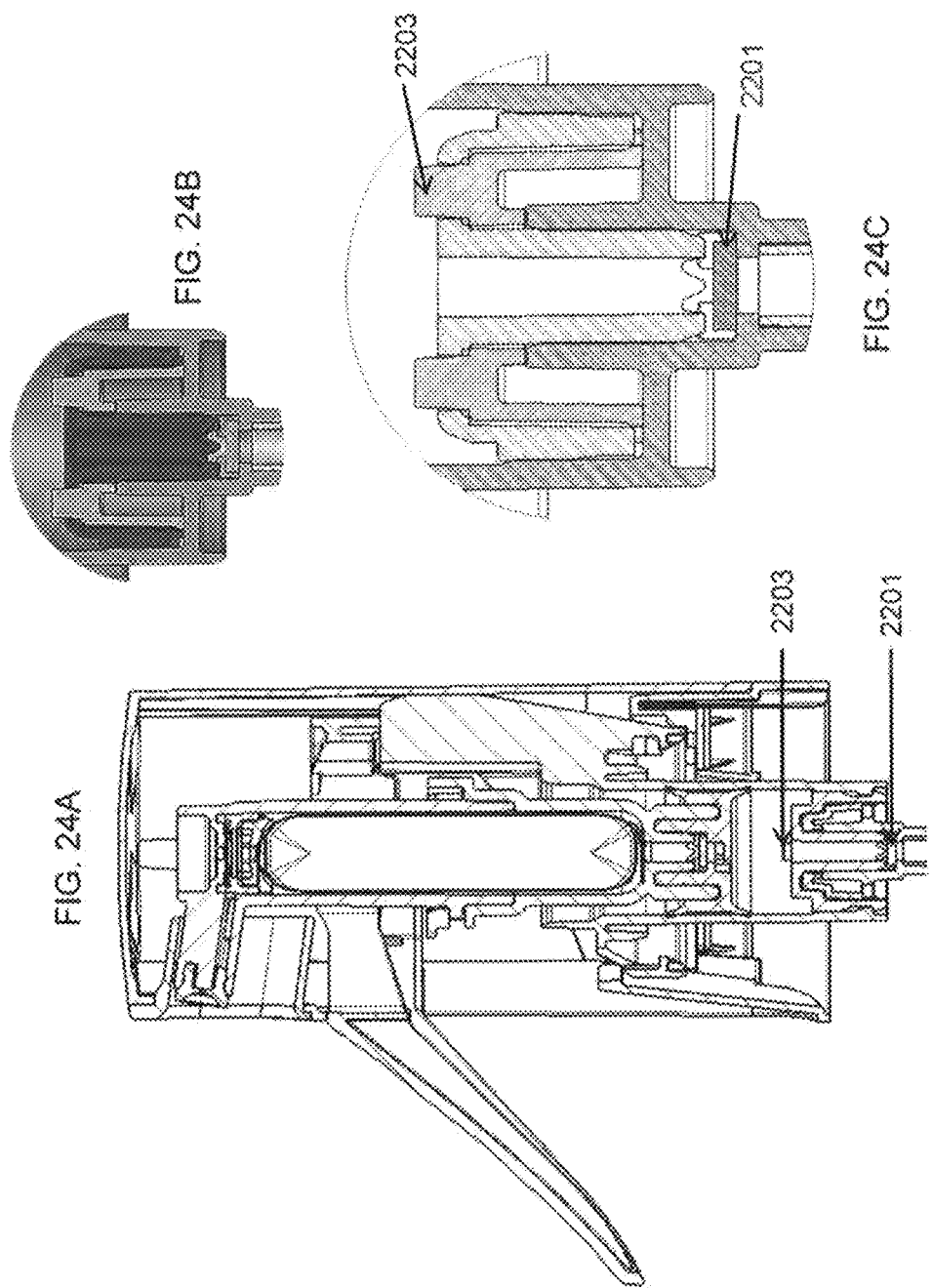

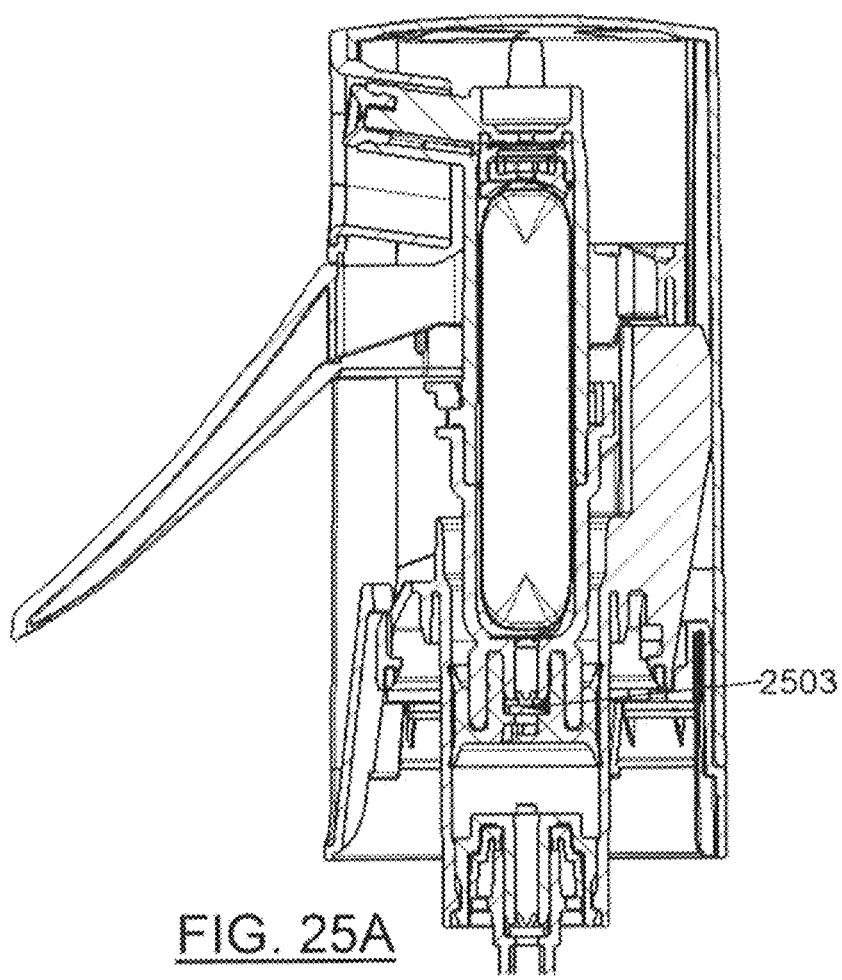
FIG. 25A
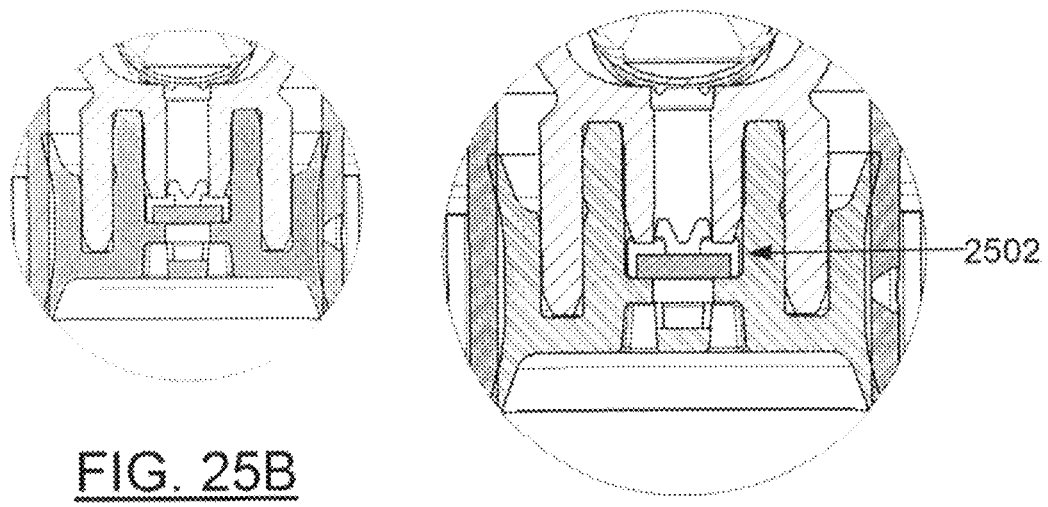
FIG. 25B
FIG. 25C

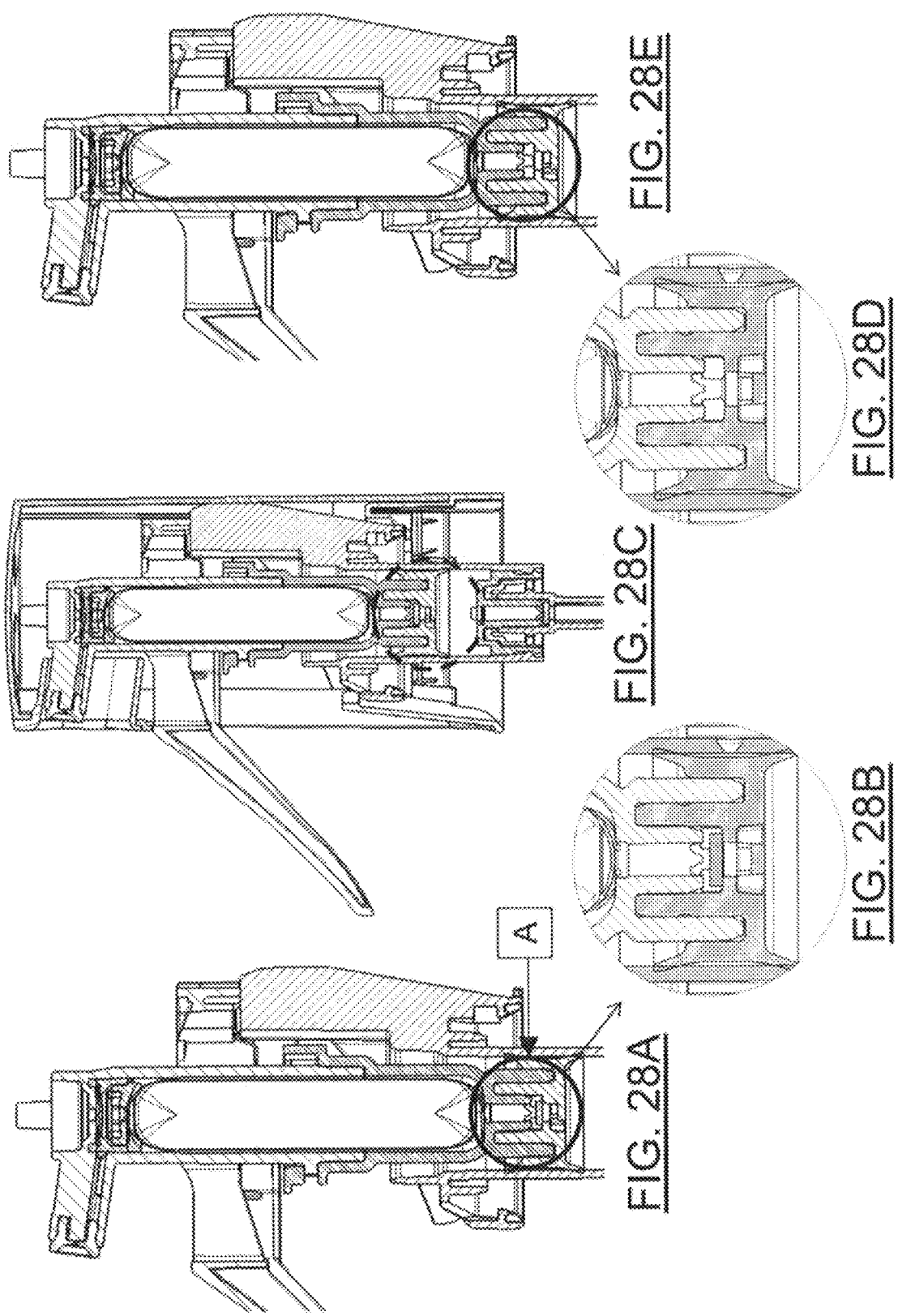

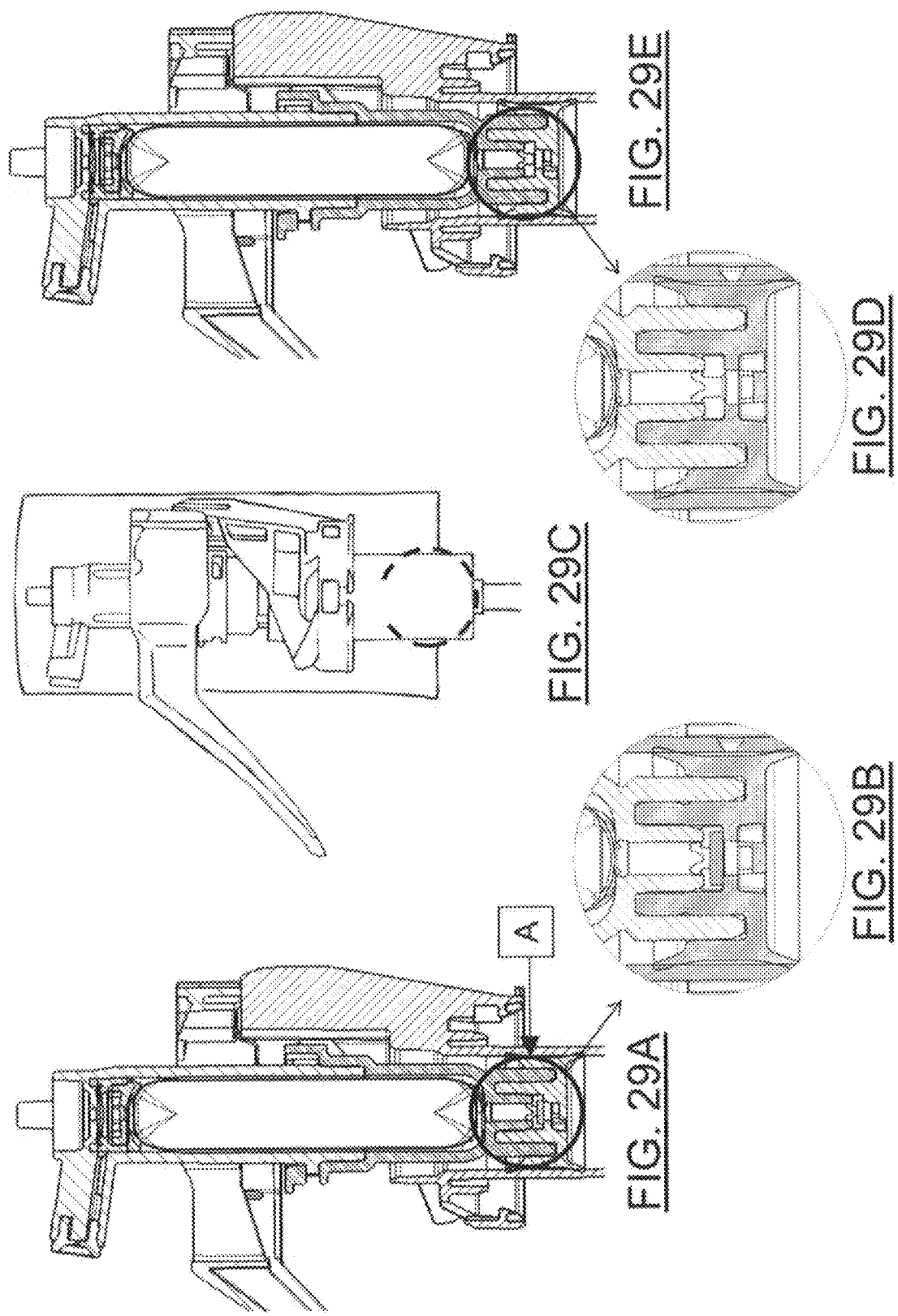

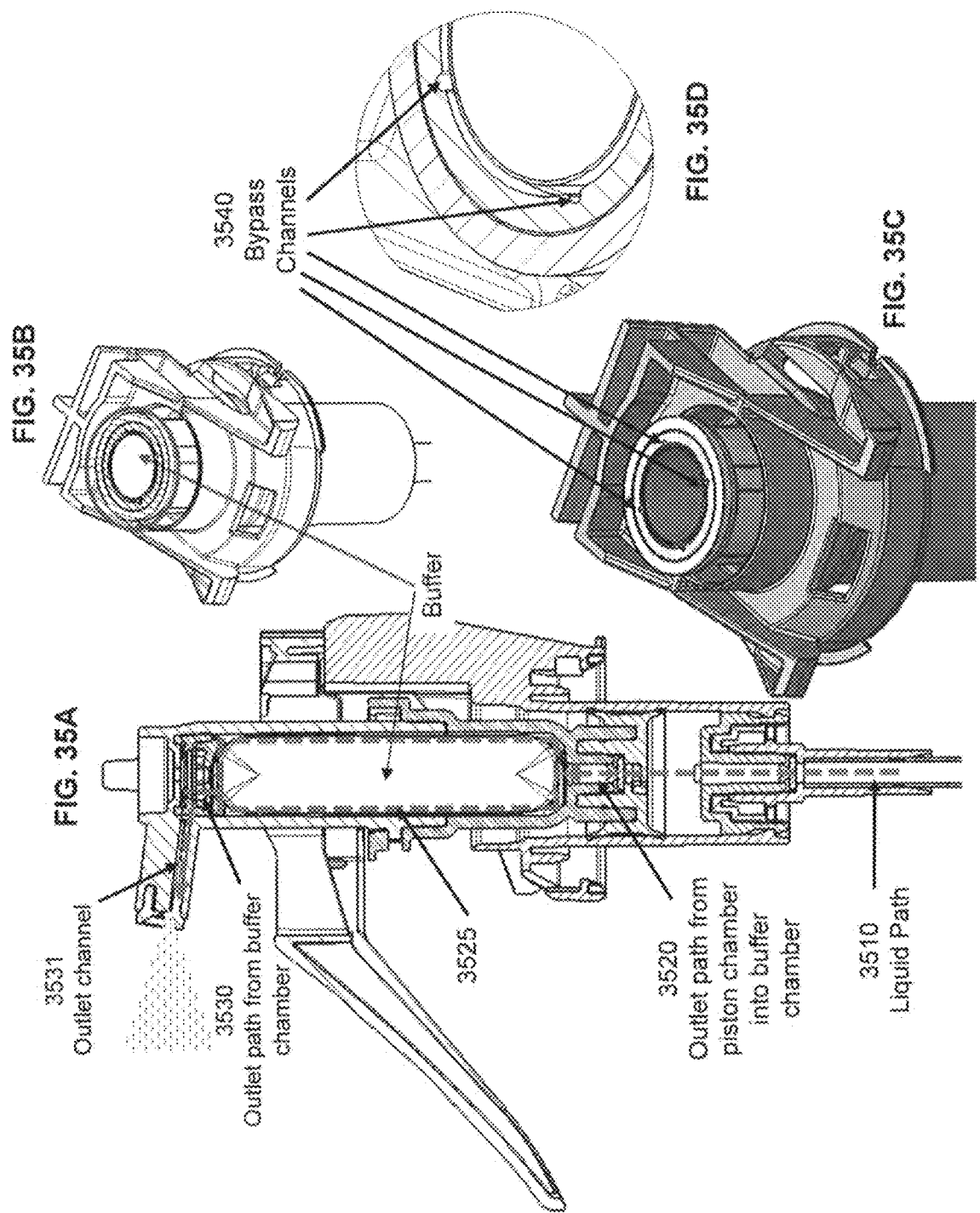

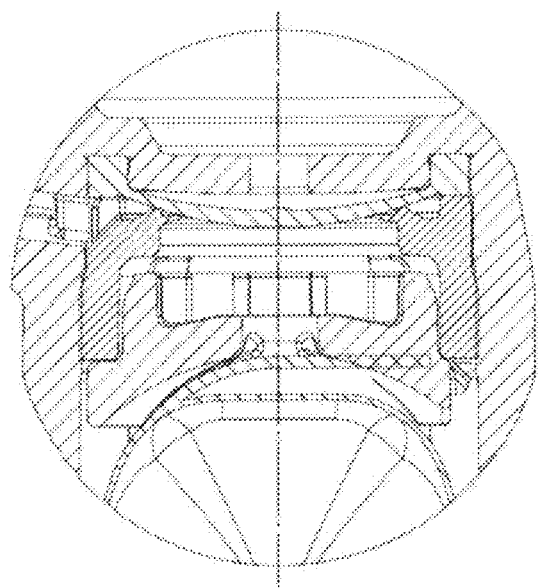
FIG. 41A
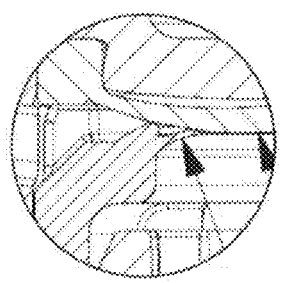 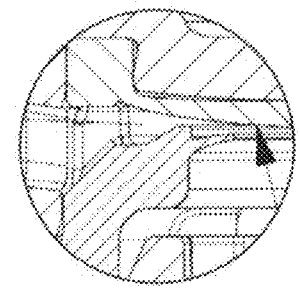
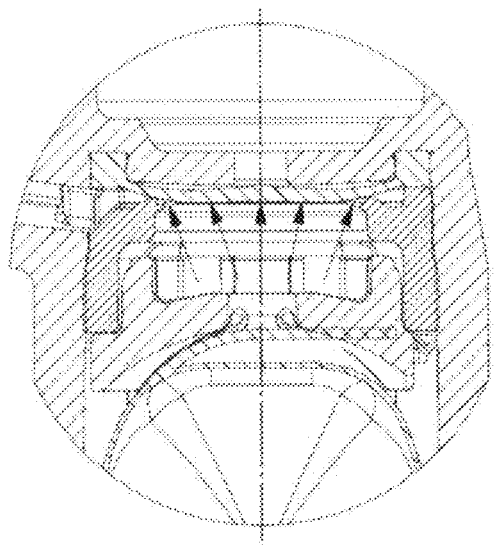 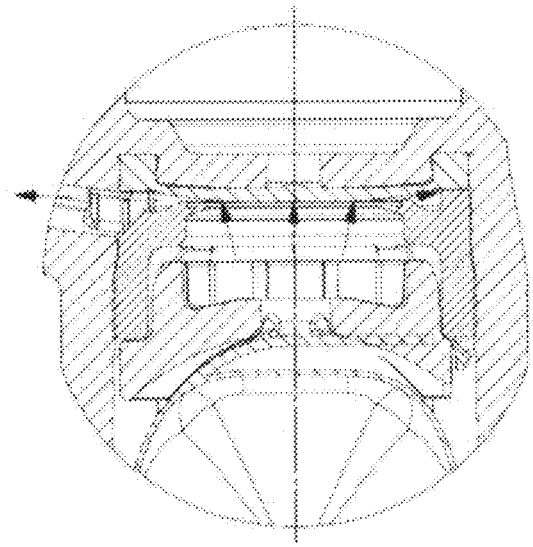
FIG. 41B   FIG. 41C

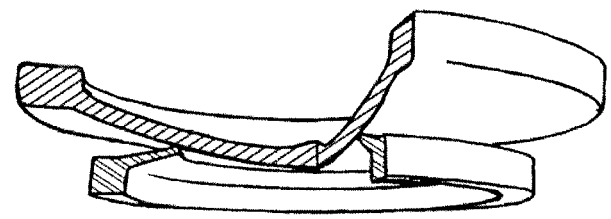
FIG. 44A
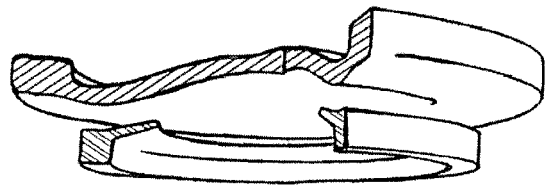
FIG. 44B
FIG. 45
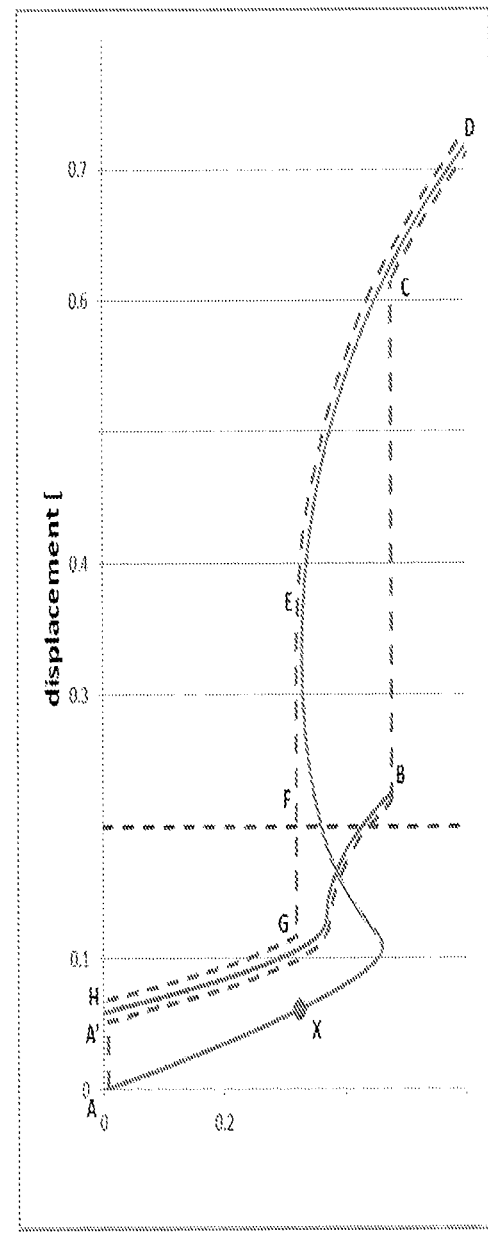

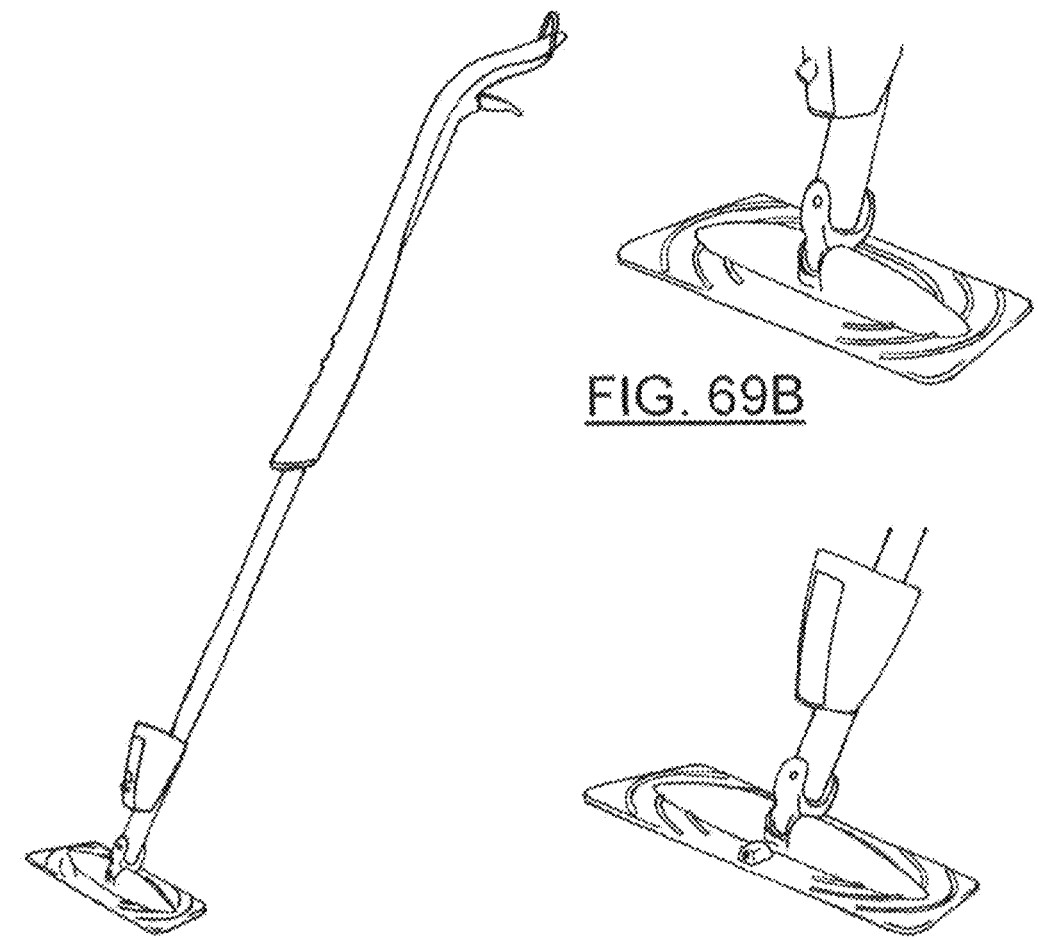
FIG. 69A
FIG. 69B
FIG. 69C
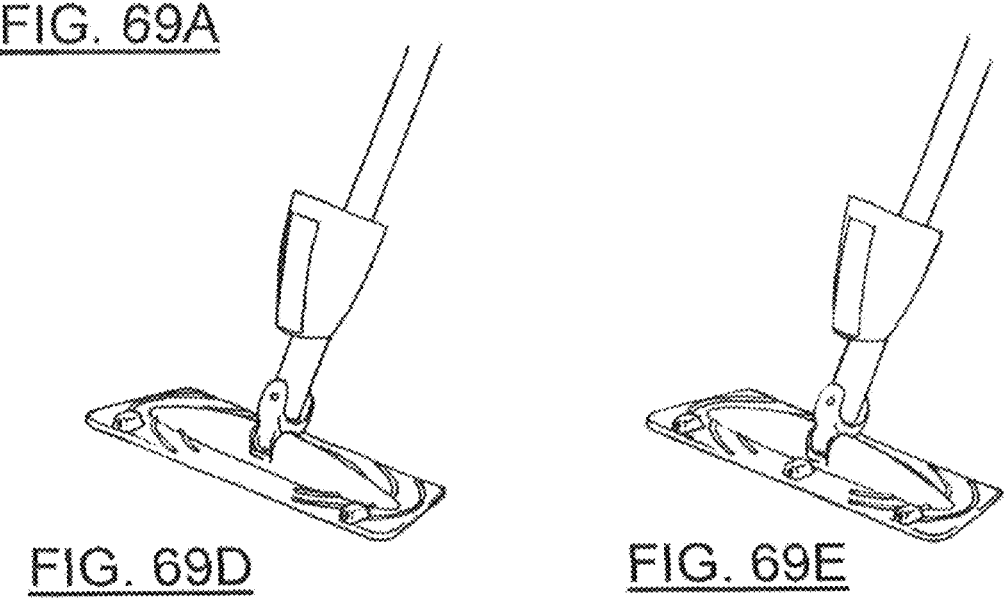
FIG. 69D
FIG. 69E

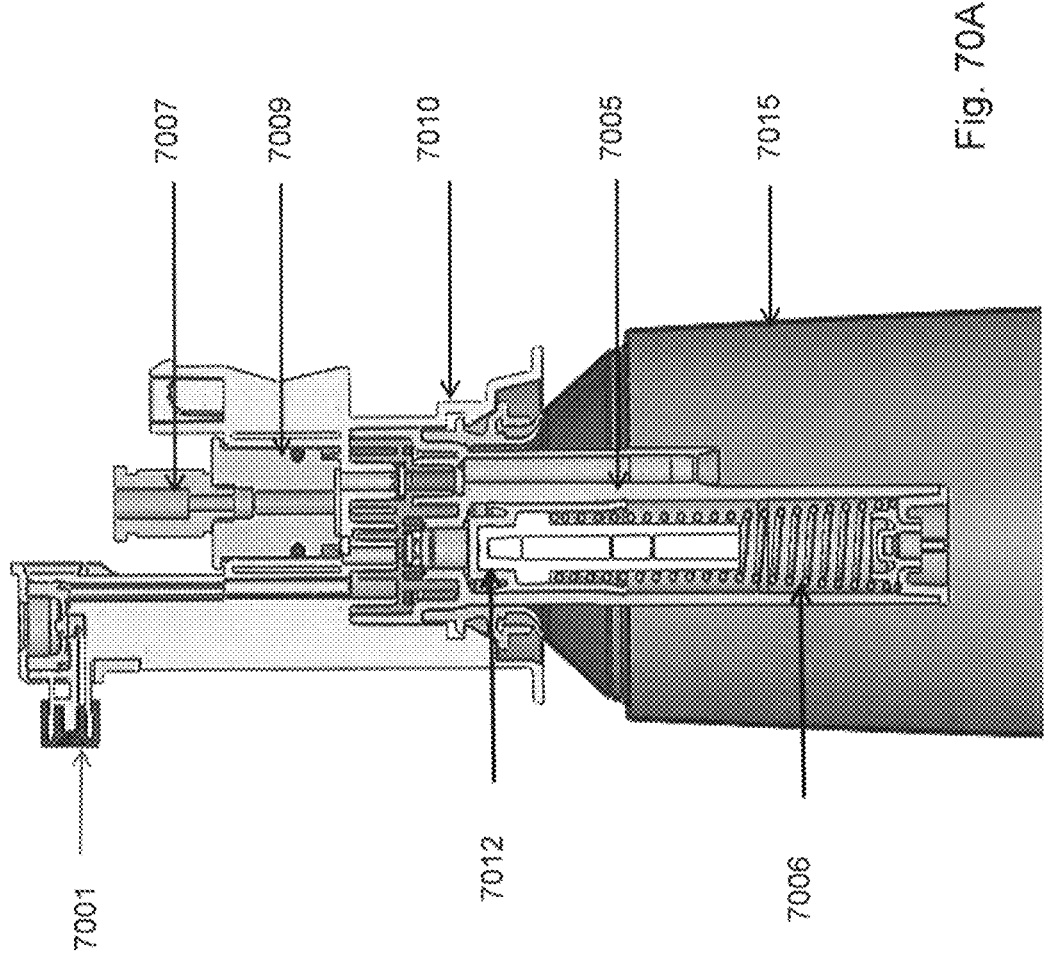

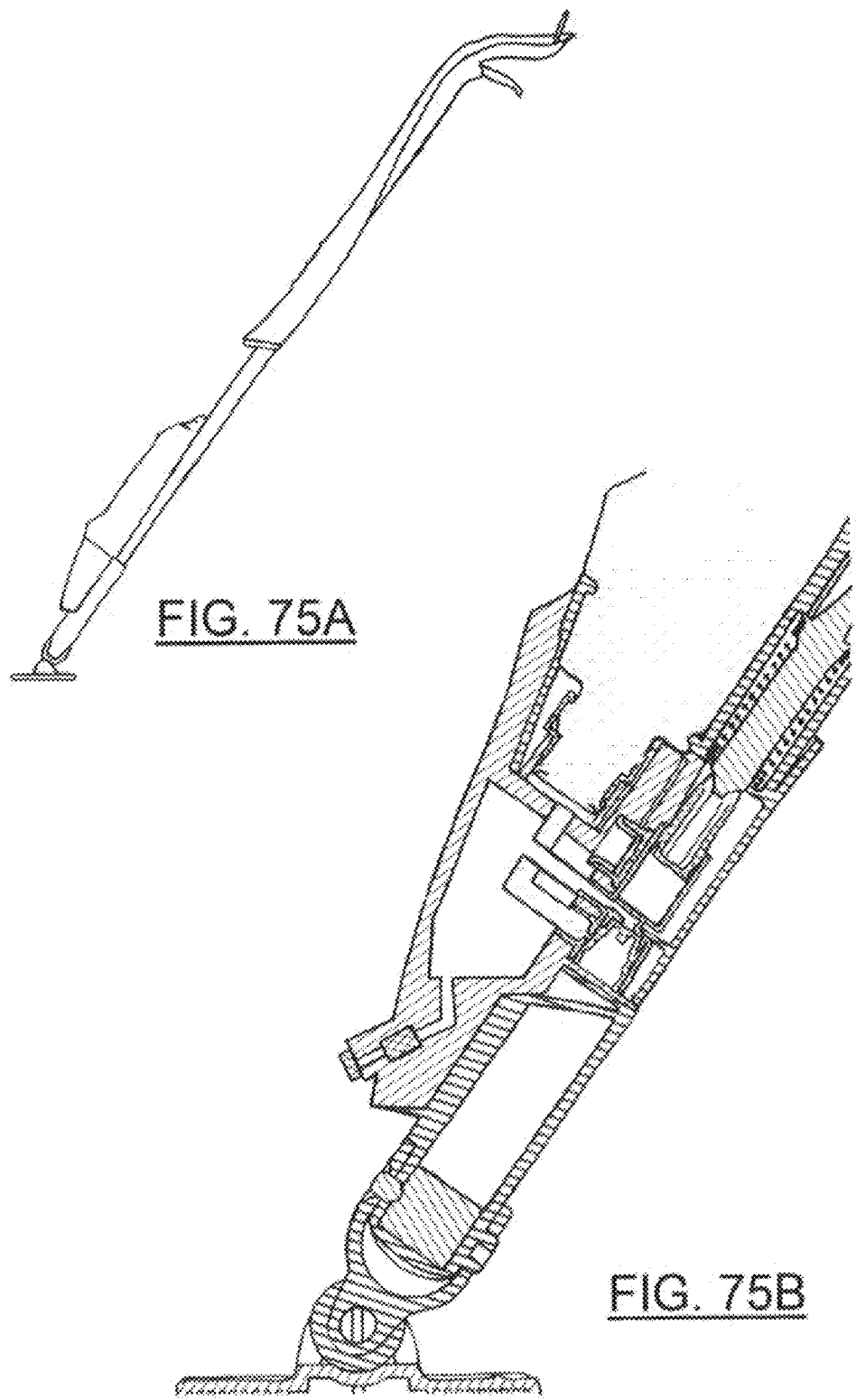

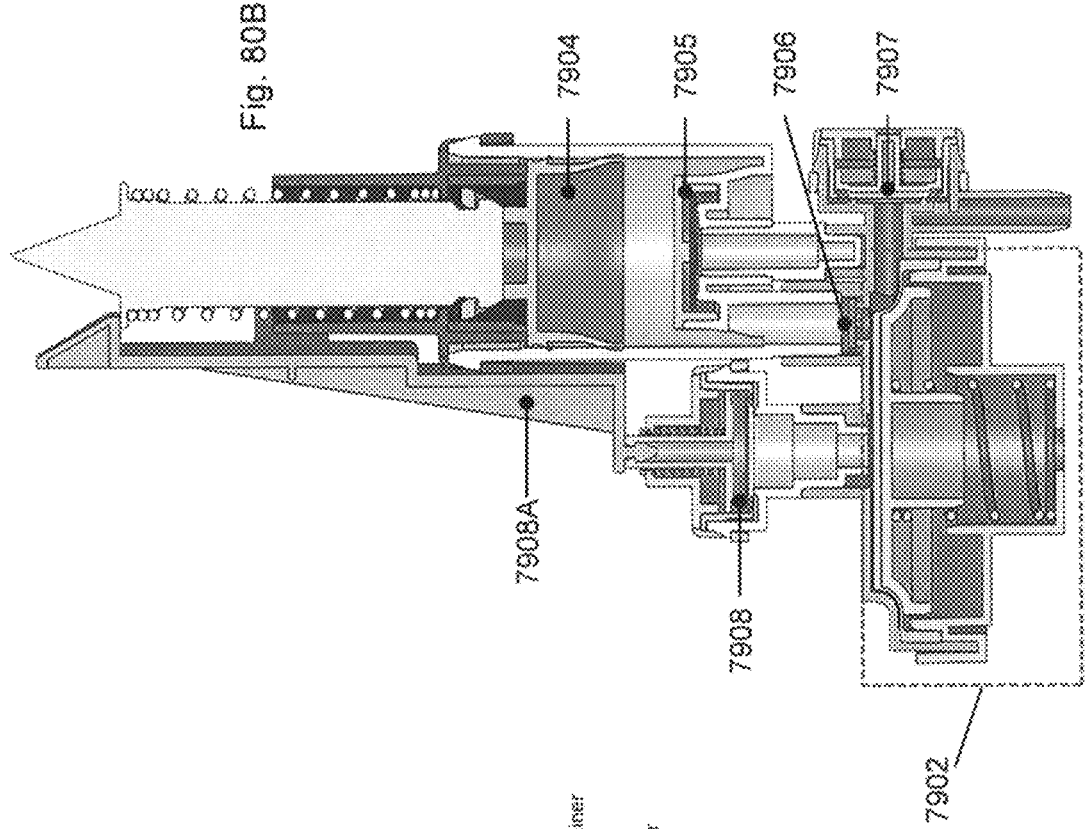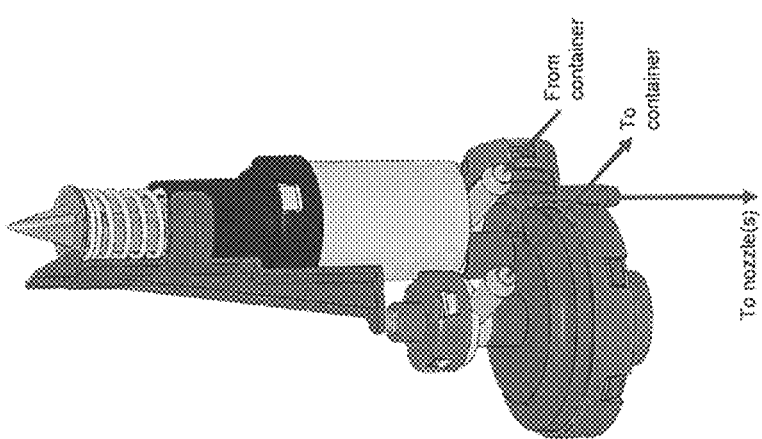

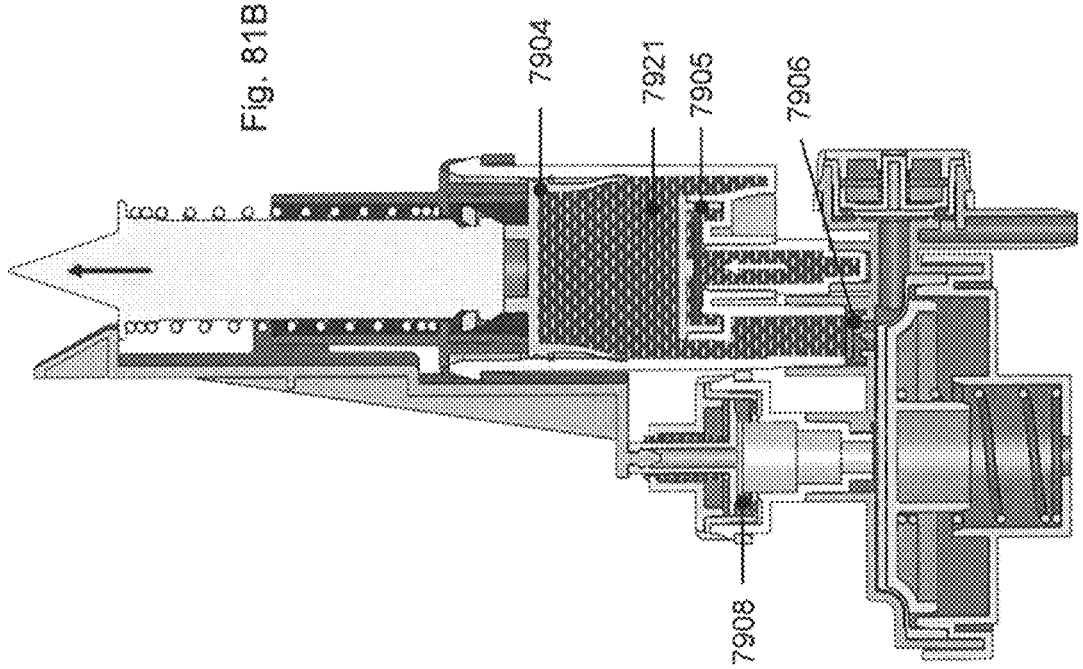
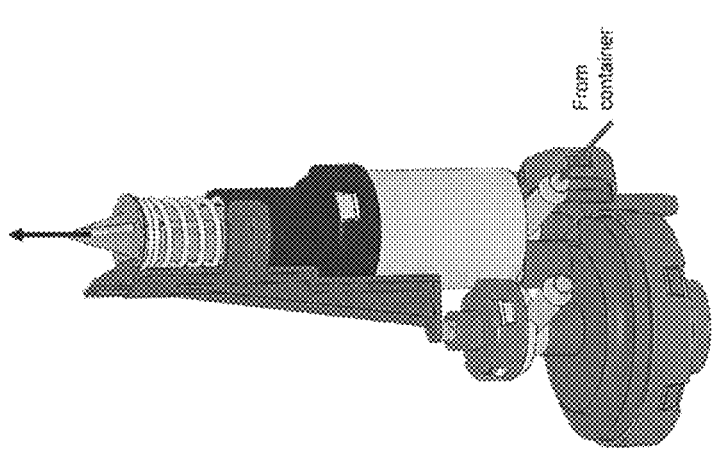

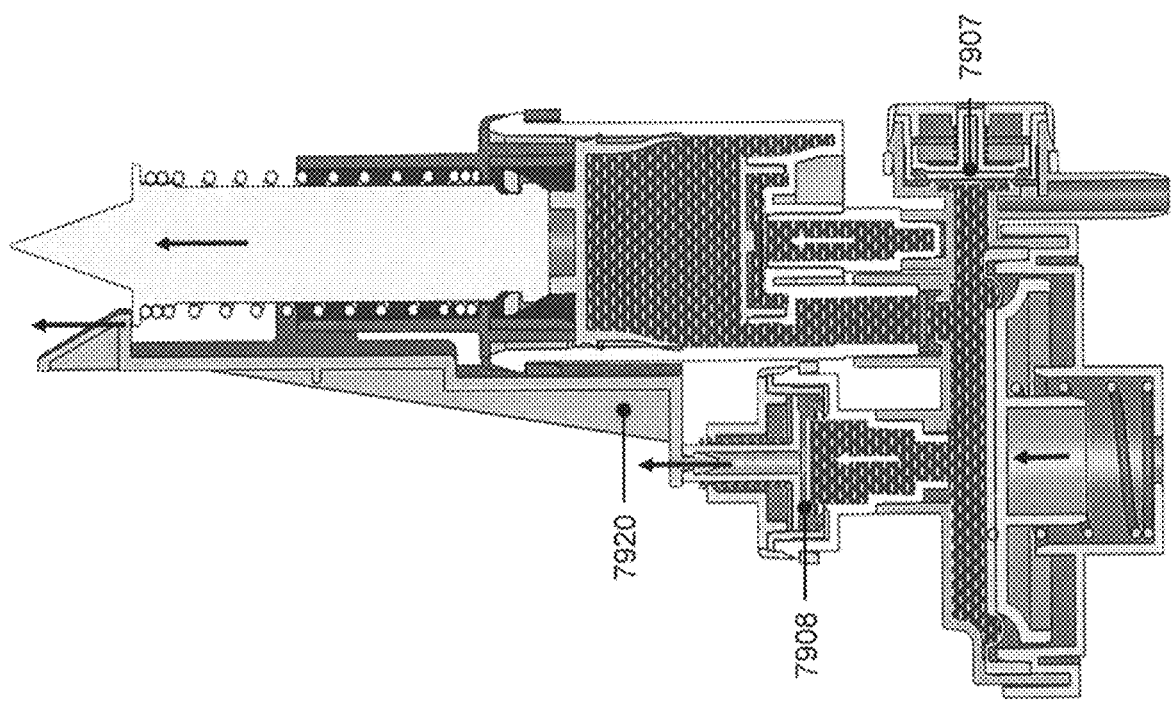

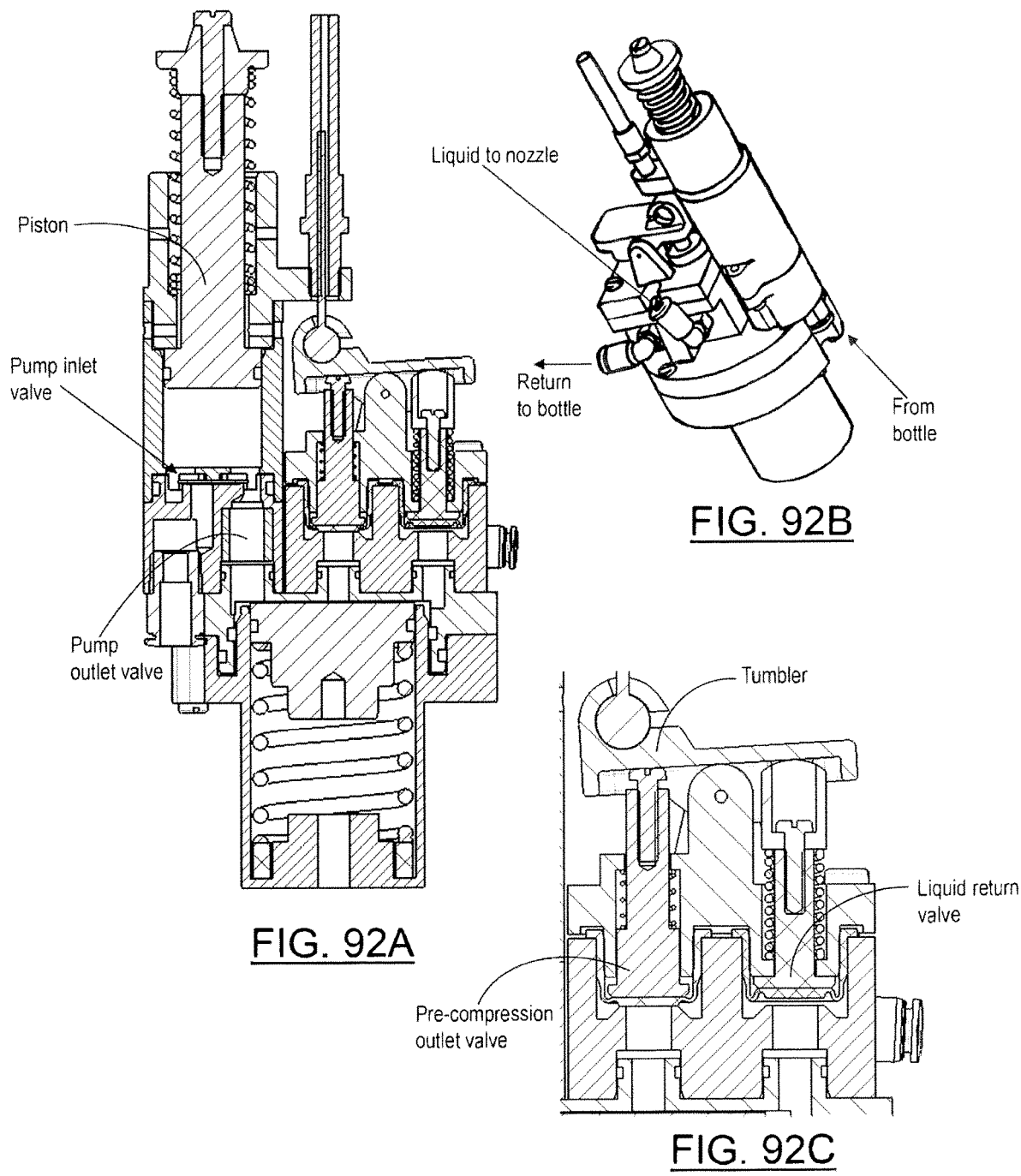

SYSTEMS AND METHODS TO PRECISELY CONTROL OUTPUT PRESSURE IN BUFFERED SPRAYERS (DUO1)

CROSS-REFERENCE TO RELATED APPLICATIONS

This application is a continuation of U.S. patent application Ser. No. 14/073,835, now U.S. Pat. No. 11,027,298, entitled SYSTEMS AND METHODS TO PRECISELY CONTROL OUTPUT PRESSURE IN BUFFERED SPRAYERS ("DuO1"), filed Nov. 6, 2013, which claims the benefit of each of U.S. Provisional Patent Application No. 61/723,045, entitled NEW GENERATION SPRAY/FOAM DISPENSERS, WITH AND WITHOUT BUFFERING SYSTEMS ("NGOP"), filed on Nov. 6, 2012, No. 61/805,044, entitled IMPROVEMENTS TO FLAIROSOL TECHNOLOGY, filed on Mar. 25, 2013, and No. 61/810,697, entitled BUFFER SPRAYER WITH DIRECT ACTION RELEASE ("DU01 PUMP"), filed on Apr. 13, 2013. The disclosure of U.S. patent application Ser. No. 14/073,835, and the disclosure of each of U.S. Provisional Patent Application Nos. 61/723,045, 61/805,044 and 61/810,697 are hereby fully incorporated herein by reference.

TECHNICAL FIELD

The present invention relates to dispensing technologies, and in particular to improved sprayers/foam dispensers of various types, wherein output pressure, and thus droplet size, can be precisely controlled.

BACKGROUND OF THE INVENTION

Liquid dispensing devices such as spray bottles are well known. Some offer pre-compression so as to insure a strong spray when the trigger is pulled and prevent leakage. Sprayers and foamers can be easily manufactured and filled, and are often used to dispense cleaners of all types, for example. However, in many circumstances it is preferred not to have to continually pump a dispensing device to push out the dispensed liquid. Rather, it would be much more convenient to be able to continue the spray or foam substantially past the user pulling a trigger or otherwise actuating the sprayer head. For example, if by actuating a sprayer head a certain reasonable number of times per minute a continuous spray could be obtained, many users would find that optimal.

One set of dispensing devices that provide a continuous spray are aerosol dispensers, such as are used for cooking spray (e.g., Pam®), insect spray (e.g., Raid®), lubricants (e.g., WD-40®), and a host of other uses. Aerosols hold a liquid or other dispensate under pressure such that when a user activates the device (e.g., by pressing a button) the pressurized contents are allowed to escape. However, aerosols present both significant environmental hazards as well as packaging drawbacks, which result from the necessity of using an aerosol propellant in them, and the further necessity of pressurizing them. This requires filling such devices under pressure, using packaging strong enough to withstand the pressure, and taking steps to insure that the propellant maintains a uniform pressure over the life of the can or container. Such conditions often require use of non-environmentally friendly materials and ingredients.

Additionally, conventional aerosols do not continue spraying unless the user keeps their finger on the button. Inasmuch as people generally push on the aerosol can with the index finger of their dominant hand, this requirement precludes their ability to do anything with the spray or the surface/object on which the spray is directed with that hand making it difficult to clean, etc. Thus, users are forced to spray, for example, a cleaner on a surface, then stop spraying, then wipe or scrub, etc. Recently floor cleaning products have emerged to replace mops. Many try to spray a cleaning fluid or floor care product from one or more nozzles while a user is pushing the device along the floor or surface. Some of these devices utilize a motorized pump, run by a power cord or battery. However, such devices are often not robust, and do not last long. Or, for example, in the case of battery powered floor cleaners, any serious current draw requires large batteries, and frequent changing of same, which is both environmentally unfriendly, cumbersome and expensive.

Finally, although conventional pre-compression sprayers control the minimum output pressure, they do not control in any way the maximum output pressure. A conventional sprayer starts dispensing at a low pressure. During a trigger stroke, the pressure rises up to a peak pressure. The liquid is forced through an orifice, but only a part of the liquid can pass the nozzle, so the pressure will build up within the sprayer. Towards the end of the stroke, the liquid pressure drops to zero. The low pressure at the beginning and end of the stroke thus creates larger, non-uniform droplets at the right and left sides of the conventional sprayer pressure time curve. A pre-compression sprayer starts spraying when the liquid pressure is at a pre-determined pressure. This pre-determined pressure is known as the "cracking pressure" of the outlet valve. During the trigger stroke the pressure rises up to a peak pressure. When the pressure drops to a predetermined pressure (closing pressure of the outlet valve) dispensing stops immediately. The droplet size at the beginning and end of a dispensing stroke in a pre-compression sprayer are smaller because the pressure is higher. The peak pressure, creating even smaller droplets is also higher than that of a conventional sprayer, because the same amount of liquid is dispensed in a shorter time. Therefore more pressure builds up. Thus, relative to a conventional sprayer the pressure difference across the pressure time curve will still be there and even be greater. It is only shifted to a higher pressure range.

Thus, difficulties with standard pre-compression sprayers include, for example, (1) wider spreading droplet sizes, and (2) too small droplet sizes.

To overcome these drawbacks, what is needed in the art is a sprayer/foamer device that can provide elongated spray or continuous spray, where a user does not need to continually pump or actuate, thus leaving the user's hands free to work between strokes (continuous spray), or following a stroke (elongated spray), but where output pressure is controlled to be within a specific pressure range.

What is further needed in the art is the adaptation of such functionality to floor cleaning systems, large surface cleaning systems, bathroom and toilet cleaning systems, and the like.

SUMMARY OF THE INVENTION

In exemplary embodiments of the present invention, various novel dispensing devices can be provided. Such devices can involve a range of sprayer heads and sprayer/foamer systems incorporating such heads. Novel sprayer/foamer heads can include buffers of various types. By using a buffer, a user need not continually be pumping the device in order for the device to be spraying or foaming. In exemplary embodiments of the present invention, such a buffer can be spring loaded, spring loaded combination, elastomeric or gas. In exemplary embodiments of the present invention, the buffer can be in line or adjacent to a piston chamber. If adjacent, it can be connected to the piston chamber with a one way valve, to provide for spray after a downstroke of the piston has been completed, or without, to allow spraying to cease once a user releases the trigger or other actuator. In exemplary embodiments of the present invention, such novel sprayers and foamers can be mounted upside down, in various "Flairomop" devices, used to clean floors or the like. When using a buffer, a piston chamber can be designed to deliver greater amount of liquid per unit time than can be possibly dispensed through the nozzle or nozzles. The fraction of liquid that cannot be sent through the nozzle(s), due to their inherent restriction, can thus be sent to the buffer for dispensing after the piston downstroke has been completed. A volume of the piston chamber, a volume of the buffer, a pressure response of the buffer, the throughput of the nozzle, and the minimum opening pressure of the outlet valve can be arranged to restrict the outlet pressures of liquid droplets exiting the nozzle within a defined range.

BRIEF DESCRIPTION OF DRAWINGS

FIG. 5 depicts the pressure v. time plot of FIG. 5 correlated with a pressure range showing minimum pressure and larger droplet size, maximum pressure and smaller droplet size, and a desired pressure level and droplet size, according to various embodiments;

FIG. 7 illustrates a high pressure band to create an output range with smaller droplets, according to exemplary embodiments of the present invention;

FIG. 8 illustrates a low pressure band to create an output range with larger droplets, according to exemplary embodiments of the present invention;

FIG. 9 provides various exemplary combinations of sprayer parameters used to control output pressure according to exemplary embodiments of the present invention;

FIG. 10 depicts various pre-compression technologies that may be used in exemplary embodiments of the present invention;

FIGS. 18A, 18B, 18C, 18D, 19A, 19B, 19C, 19D, 19E, 20A and 20B, depict various lock out systems according to exemplary embodiments of the present invention;

FIGS. 18Aa, 18Ab and 18Ac illustrate exemplary key parameters that can be varied to create user specific lock out keys;

FIGS. 23A and 23B are color versions of FIGS. 22A and 22B, respectively;

FIG. 24A illustrates the exemplary sprayer head of FIG. 22B, focusing on its prime valve;

FIGS. 24B and 24C respectively illustrate a colorized depiction of the prime valve assembly, and a magnified view of the prime valve assembly, according to exemplary embodiments;

FIG. 25A illustrates the exemplary sprayer head of FIG. 22B, focusing on its non-return valve;

FIGS. 25B and 25C illustrate a first magnified view of the non-return valve assembly, and a second, further magnified view of the non-return valve assembly, according to exemplary embodiments;

FIG. 28C illustrates the exemplary sprayer head of FIG. 22B, focusing (via the dashed circle) on the one-way valve assembly;

FIGS. 28A and 28B depict an exemplary "continuous spray" embodiment, where the on-way valve is present, respectively;

FIGS. 28D and 28E illustrate an exemplary "direct stop" embodiment, where the on-way valve is absent, respectively;

FIGS. 29A, 29B, 29C, 29D and 29E are colorized versions of FIGS. 28A, 28B, 28C, 28D and 28E, respectively, for ease of viewing relevant assemblies and structures;

FIG. 35A is a cross-sectional view similar to that of FIG. 34B, but additionally illustrating a liquid path through the buffer chamber;

FIG. 35B is a magnified top view of the buffer chamber assembly of FIG. 35A;

FIG. 35C is a colorized and further magnified version of FIG. 35B that illustrates bypass channels in the buffer chamber;

FIG. 35D illustrates detail of the bypass channels that are shown in FIG. 35C;

FIG. 41A illustrates an exemplary dome valve and dome valve seat in the valve's default state;

FIG. 41B illustrates the dome valve being deformed under pressure;

FIG. 41C illustrates the dome valve as even further deformed under pressure where an opening has been created between the dome valve and the dome seat with seal;

FIG. 44A illustrates a first loading case of the exemplary dome valve of FIG. 41A;

FIG. 44B illustrates a second loading case of the exemplary dome valve of FIG. 41A;

FIG. 44C is a displacement v. pressure graph for the exemplary dome valve loading cases of FIGS. 44A and 44B;

FIG. 46A illustrates segment A-A' of the graph;

FIG. 46B illustrates segment A'-B of the graph;

FIG. 46C illustrates segment C-D of the graph;

FIG. 46D illustrates segment D-E of the graph;

FIG. 46E illustrates segment G-H of the graph;

FIG. 46F illustrates the dome valve as fully returned to point A of the graph;

FIGS. 69A, 69B, 69C, 69D and 69E illustrate an exemplary "Flairomop" device and exemplary nozzle positions on the device according to exemplary embodiments of the present invention;

FIG. 70A illustrates an exemplary Flairomop using a standard Flairosol sprayer mechanism according to exemplary embodiments of the present invention;

FIGS. 71A and 71B illustrate details of producing a high-pressure continuous spray for a Flairomop device that has a buffer, according to exemplary embodiments of the present invention;

FIG. 71C illustrates an exemplary spring-loaded buffer that may be used in the example embodiment of FIG. 71B;

FIG. 71D illustrates an exemplary spring-loaded inline buffer that may be used in the example embodiment of FIG. 71B;

FIG. 71E illustrates an exemplary elastic material buffer that may be used in the example embodiment of FIG. 71B;

FIG. 71F illustrates an exemplary gas loaded buffer that may be used in the example embodiment of FIG. 71B;

FIG. 72A is a schematic diagram of the example system of FIG. 71B;

Figure 72A:
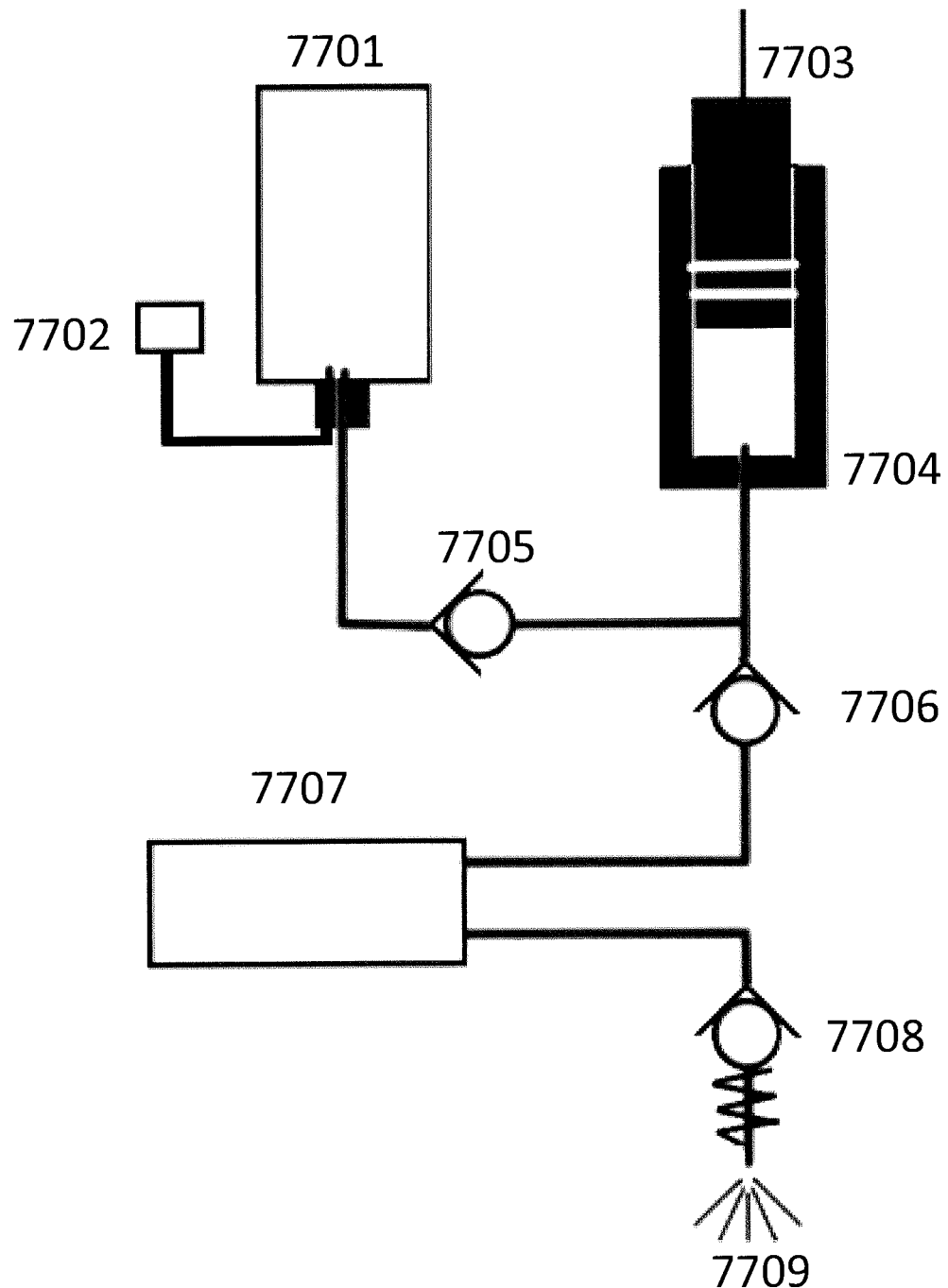
Figure 72B:
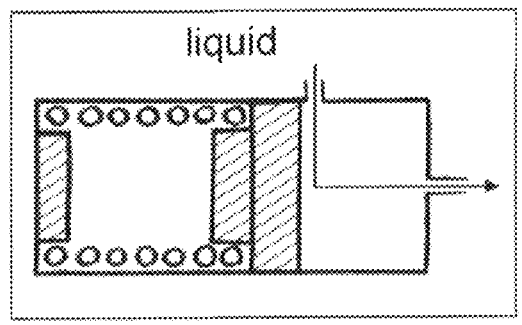
Figure 72C:
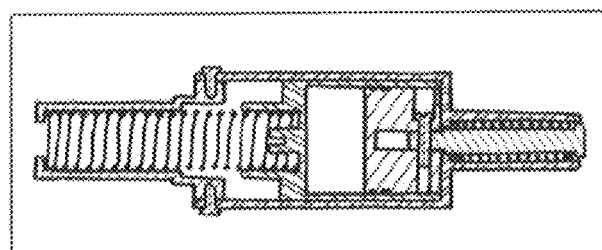
Figure 72D:
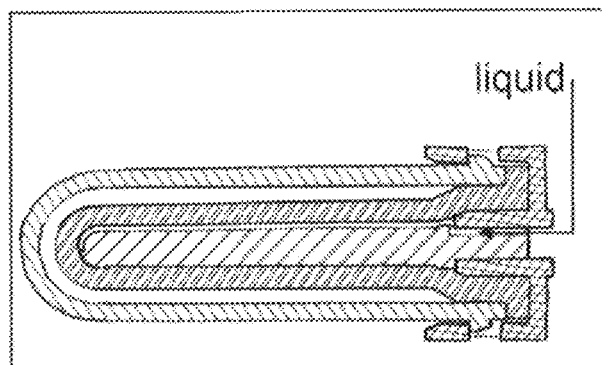
Figure 72E:
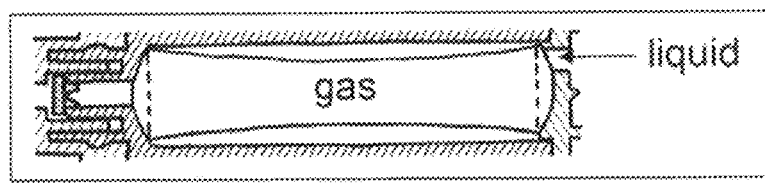
Figures 73A, 73B:
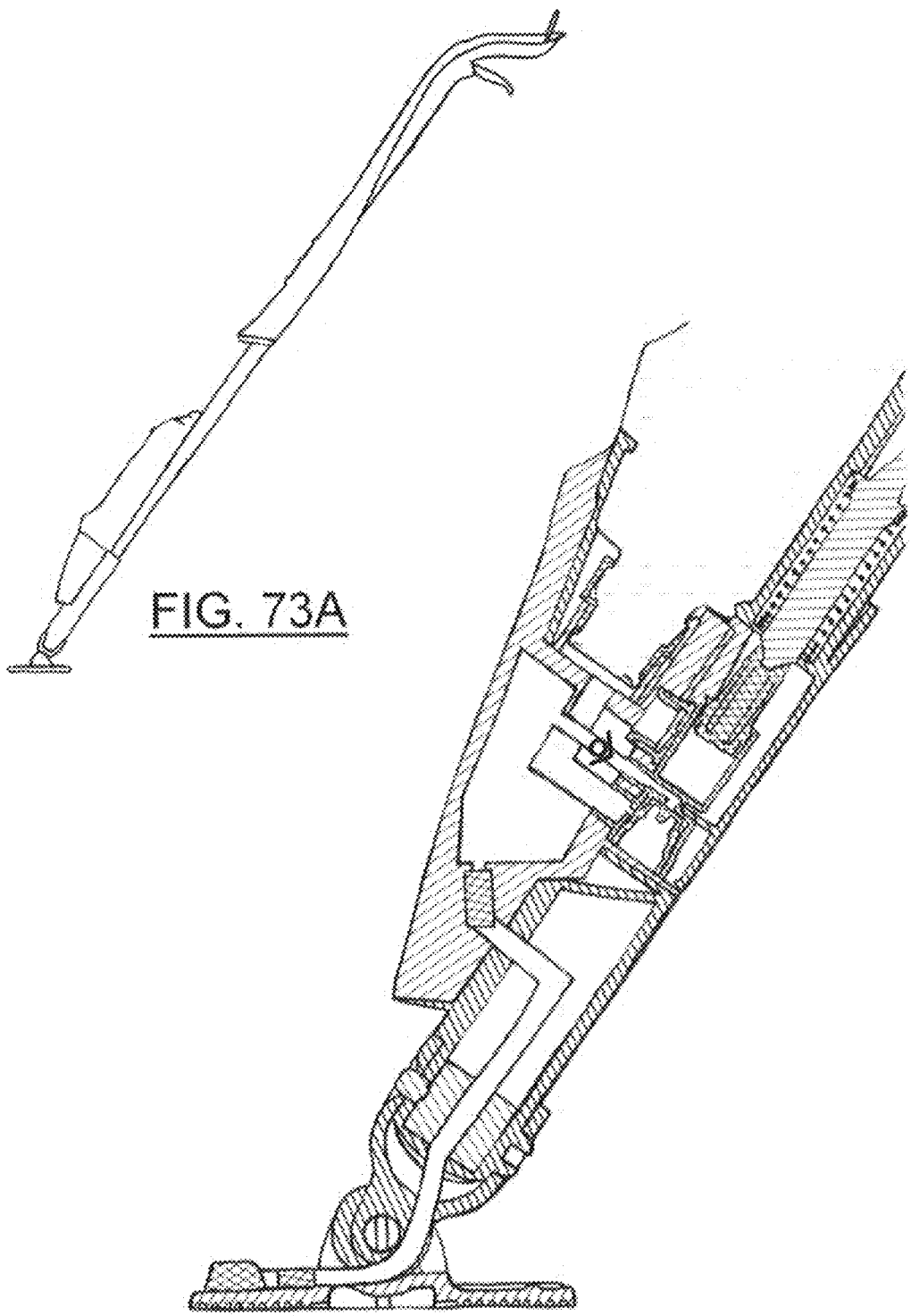
Figure 73C:
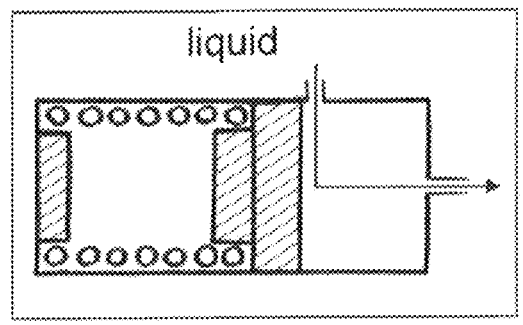
Figure 73D:
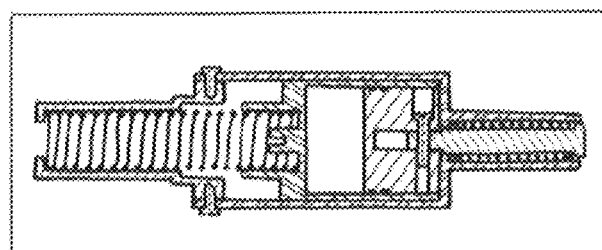
Figure 73E:
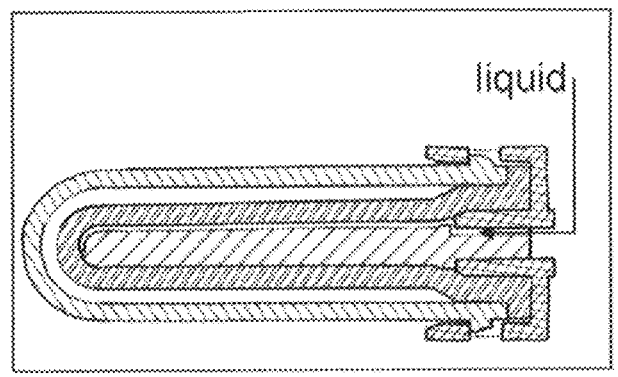
Figure 73F:
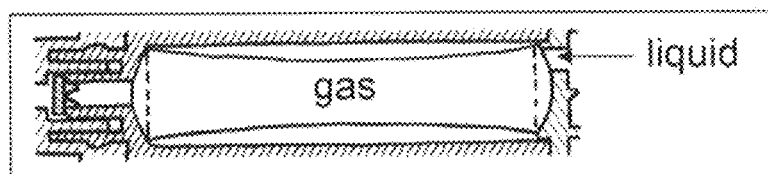
Figure 74A:
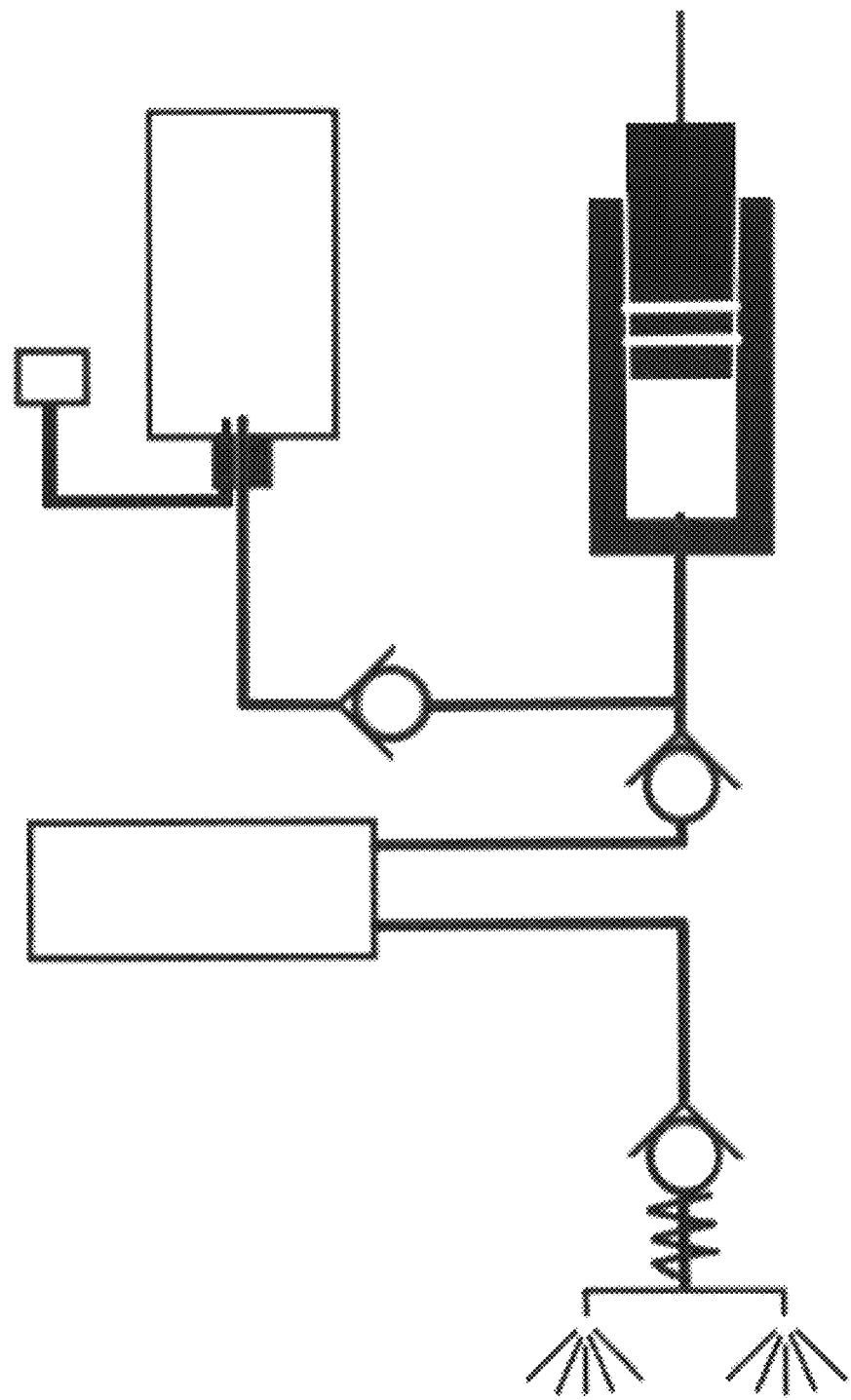
Figure 74B:
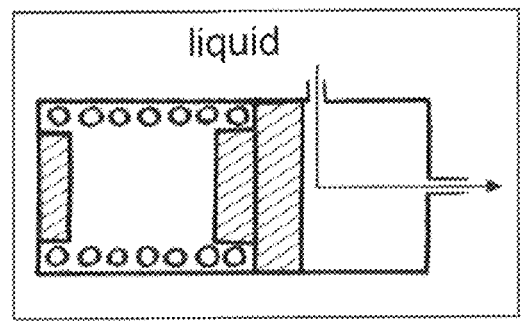
Figure 74C:
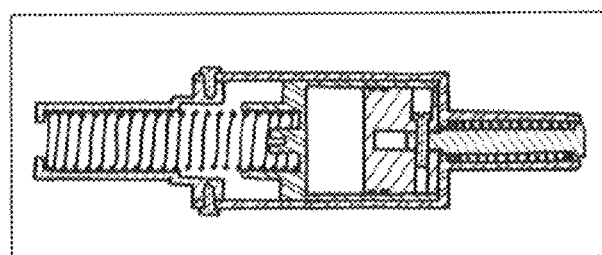
Figure 74D:
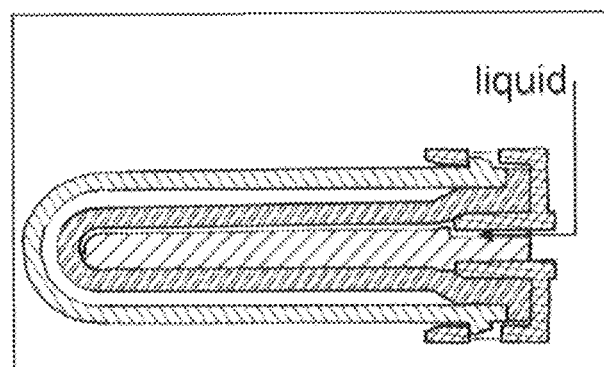
Figure 74E:
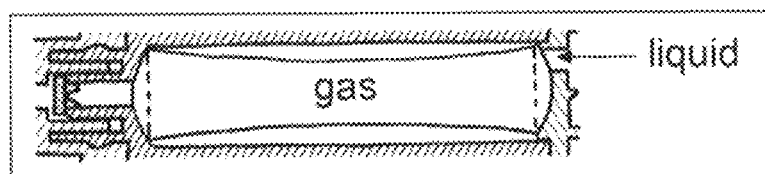
Figure 75C:
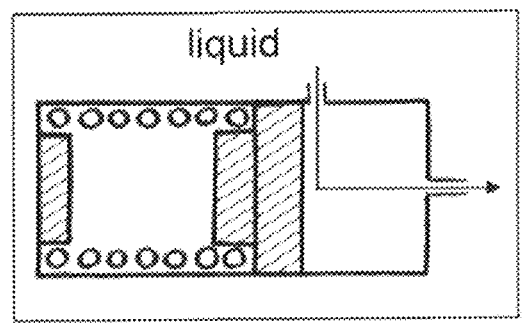
Figure 75D:
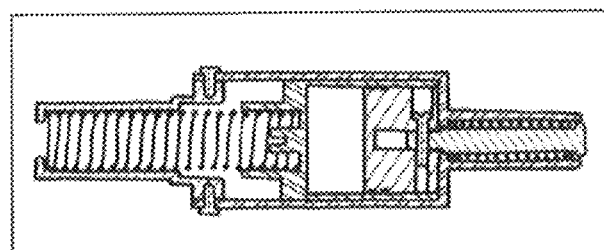
Figure 75E:
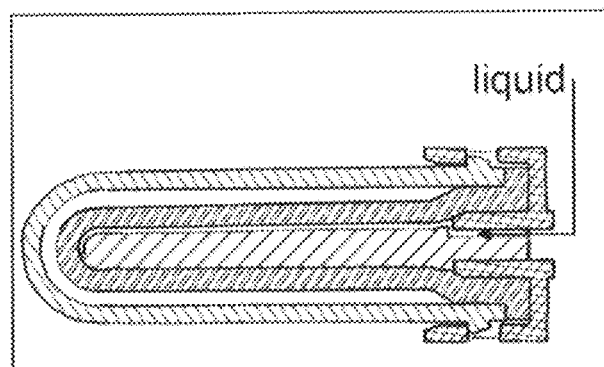
Figure 75F:
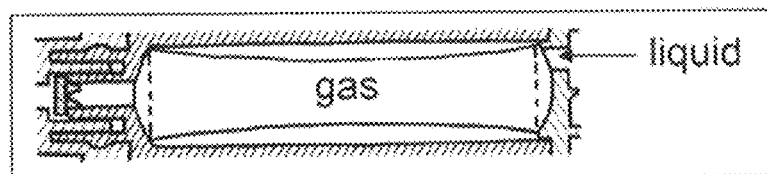
Figure 76A:
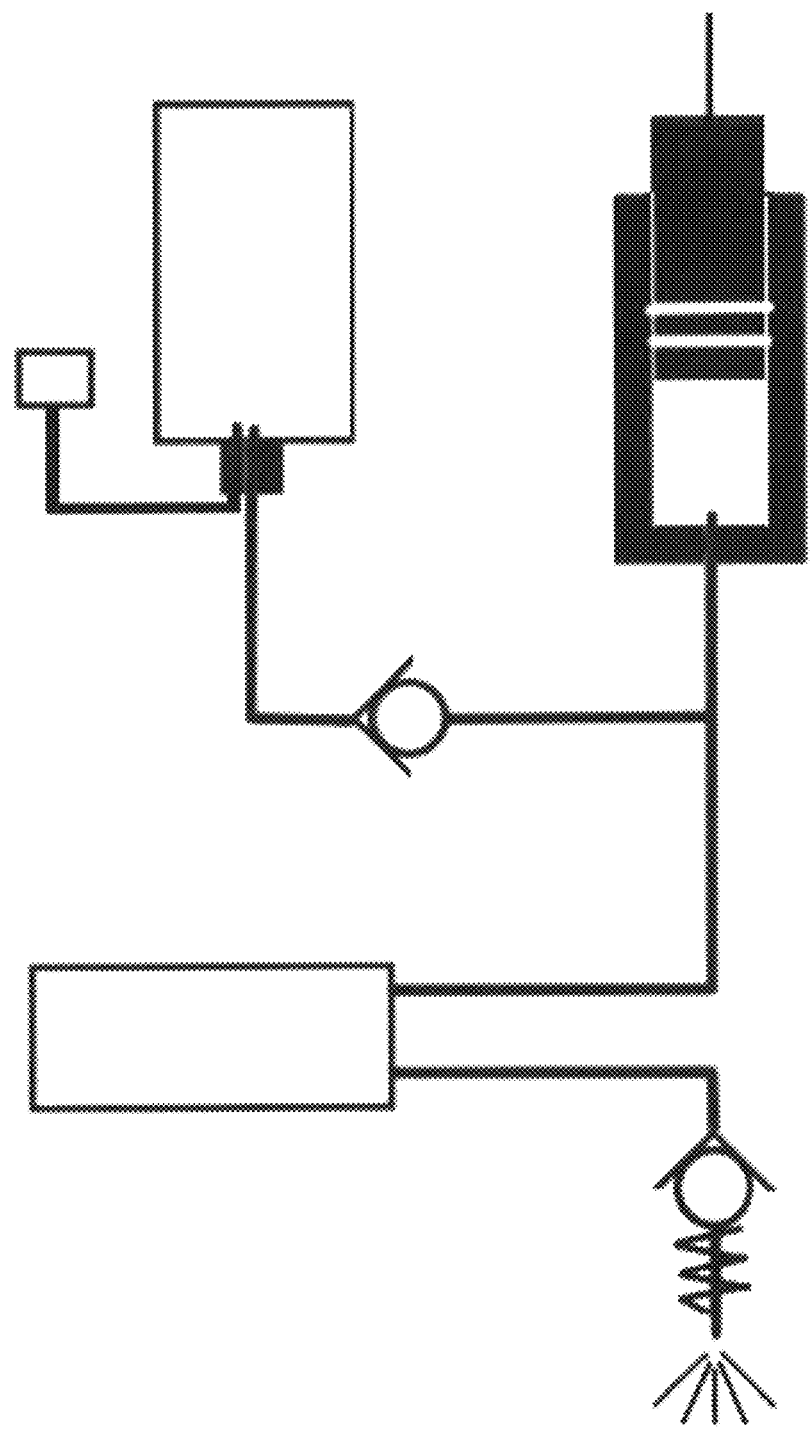
Figure 76B:
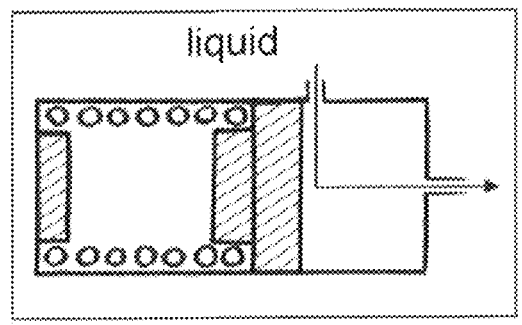
Figure 76C:
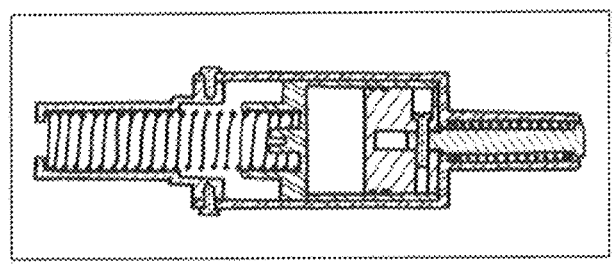
Figure 76D:
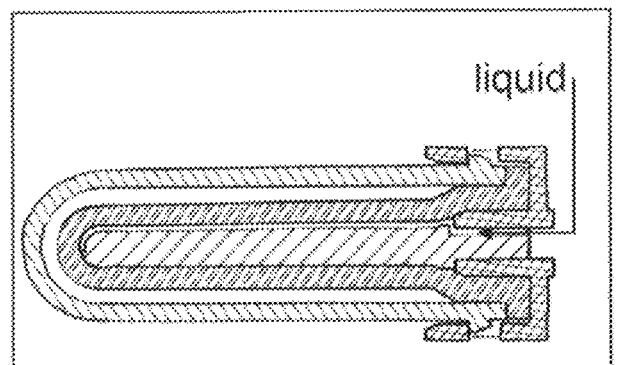
Figure 76E:
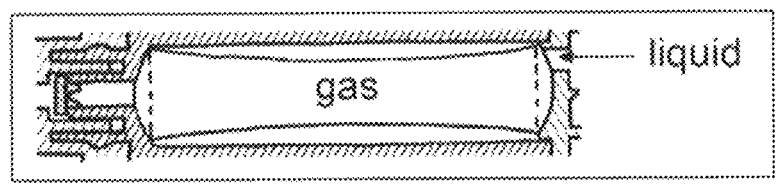
Figures 77A, 77B:
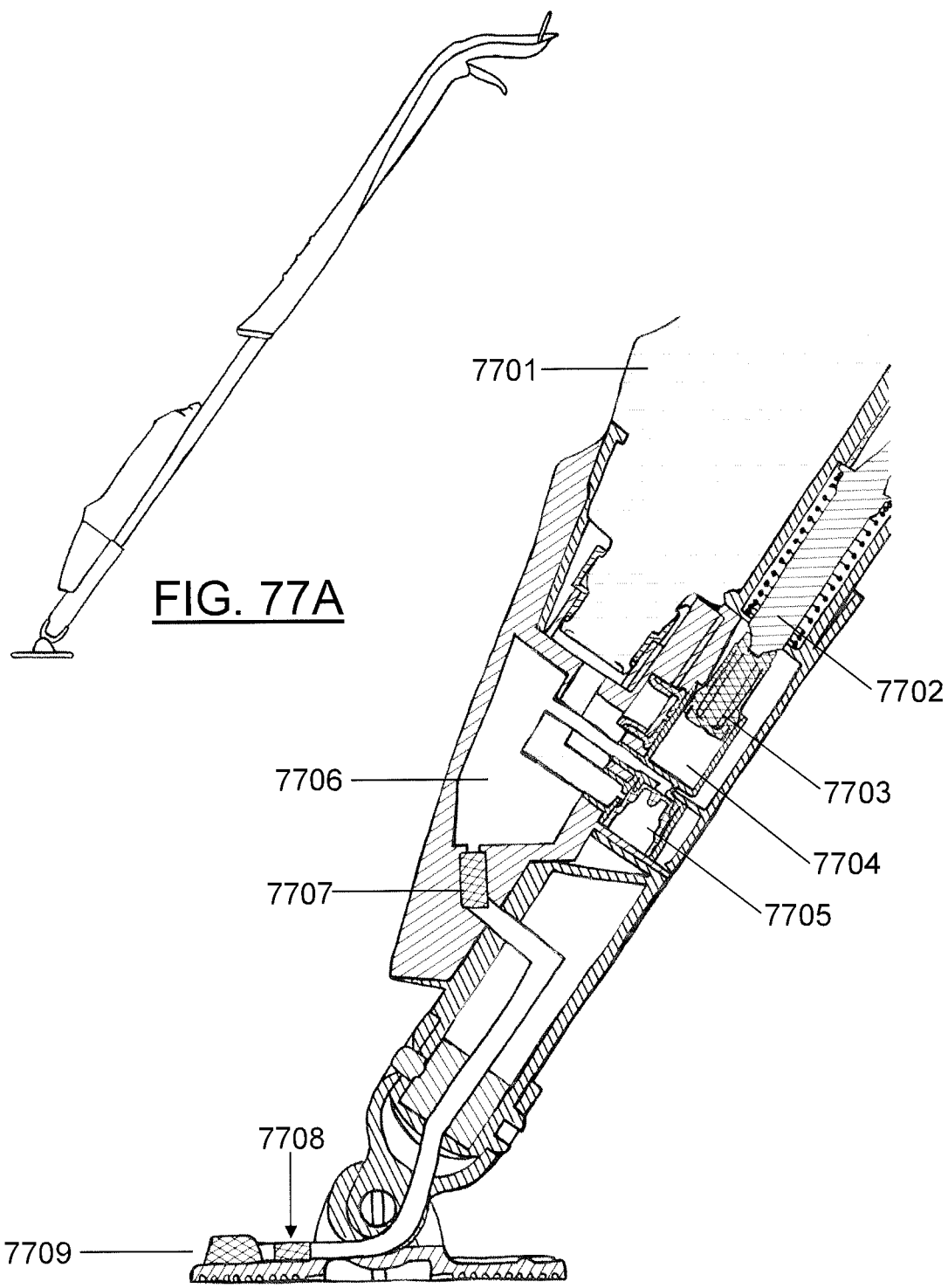
Figure 77C:
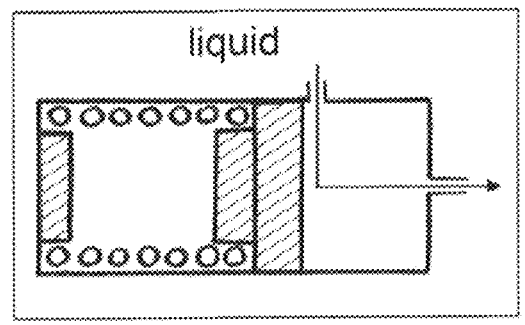
Figure 77D:
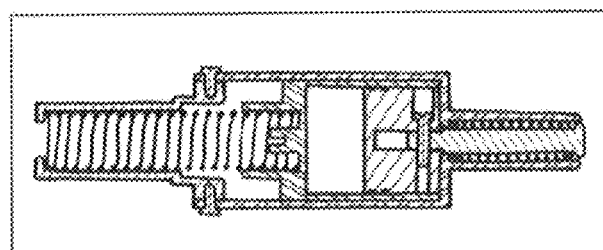
Figure 77E:
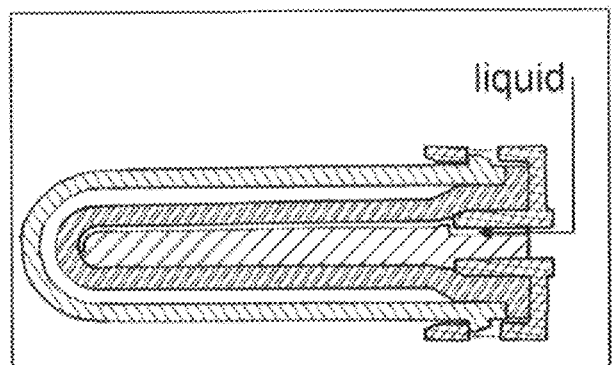
Figure 77F:
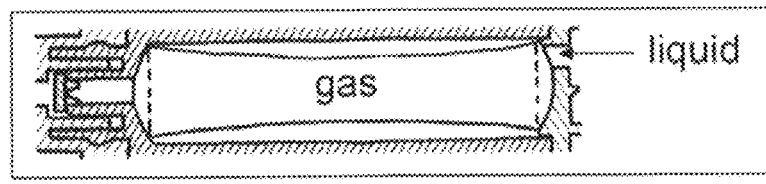
Figure 78A:
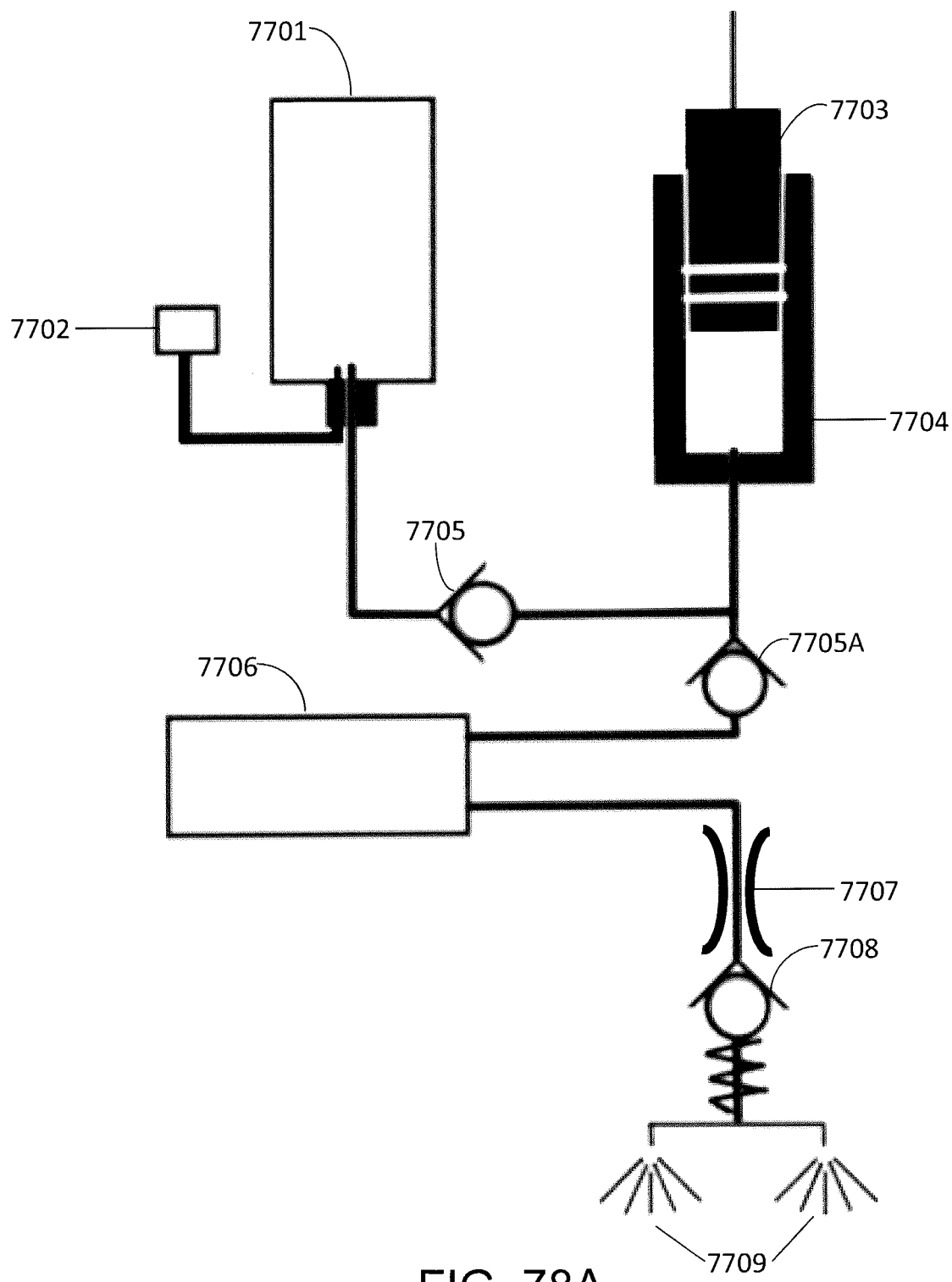
Figure 78B:
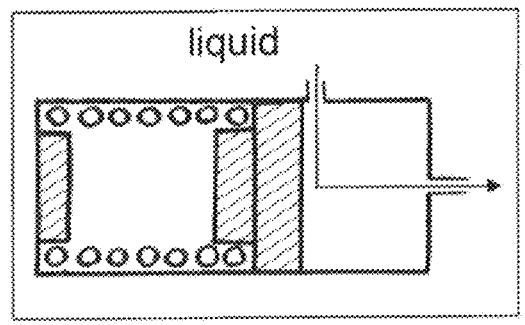
Figure 78C:
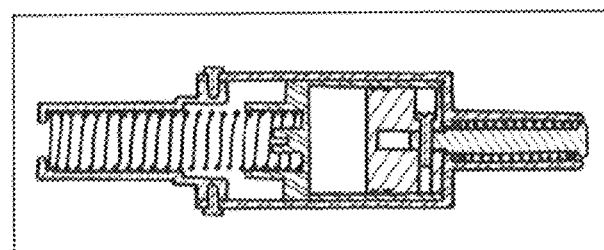
Figure 78D:
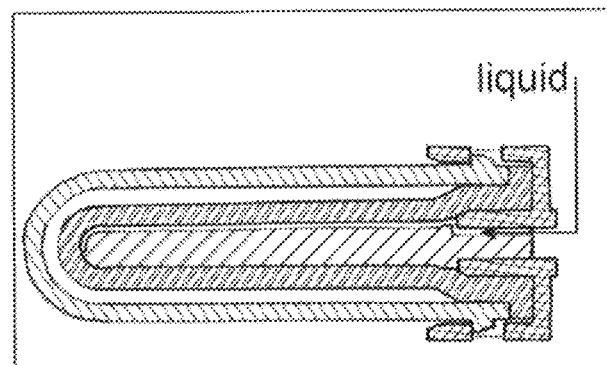
Figure 78E:
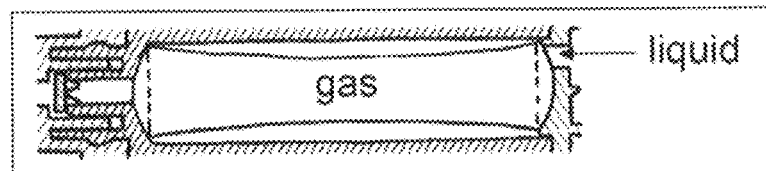
Figure 79:
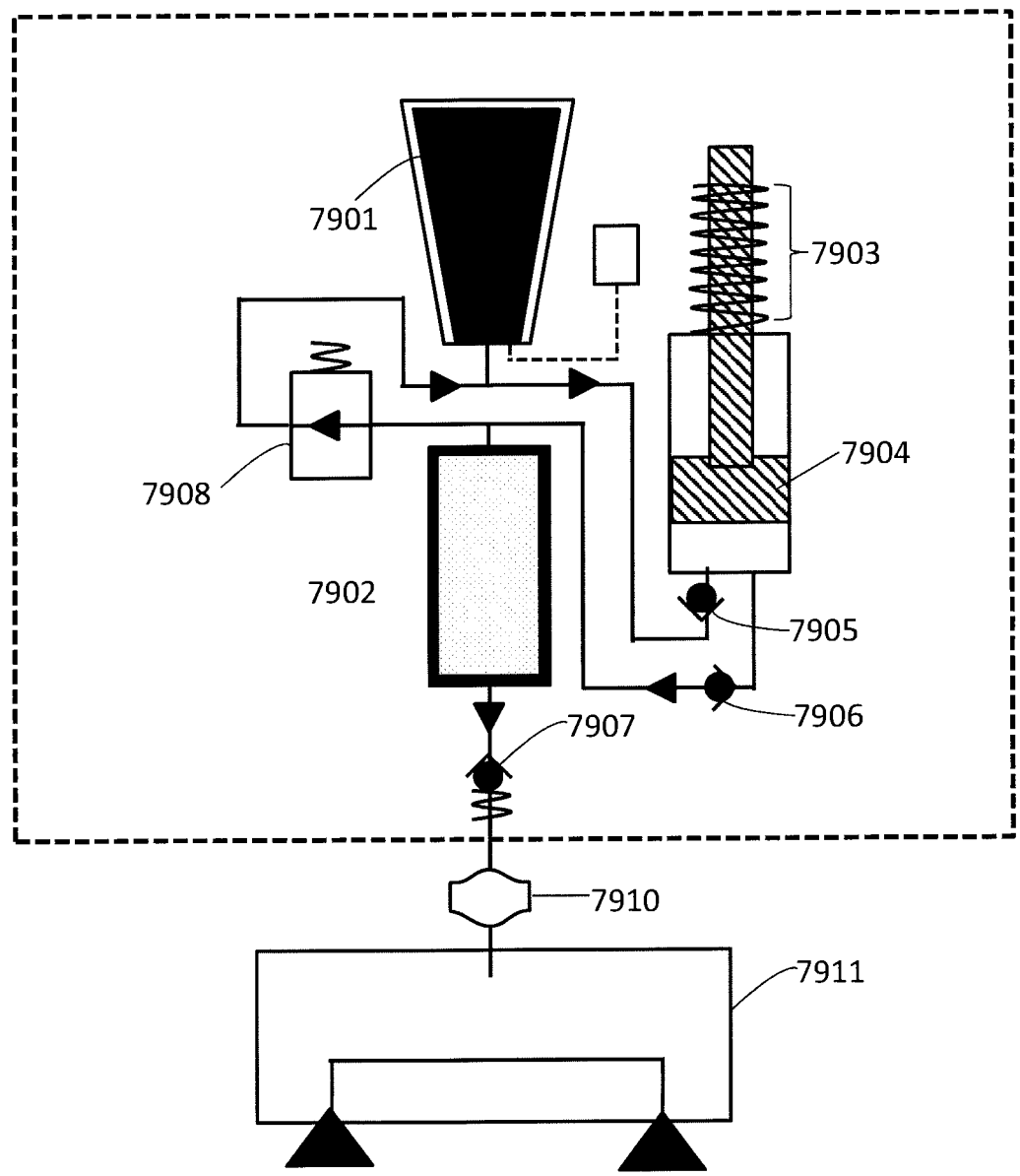
Figure 80C:
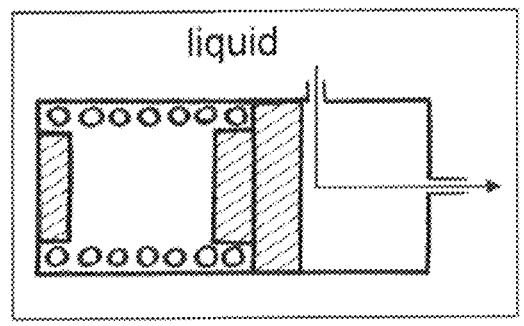
Figure 80D:
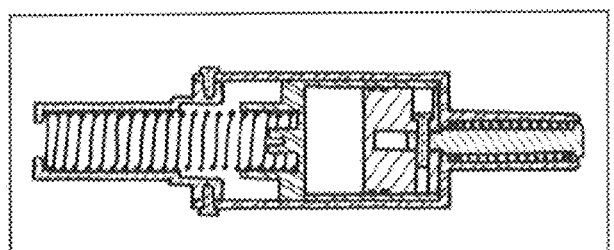
Figure 80E:
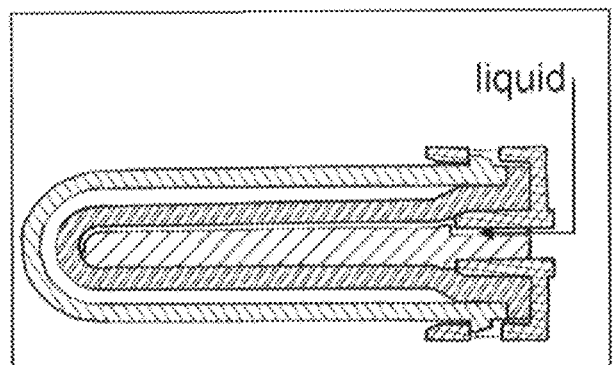
Figure 80F:
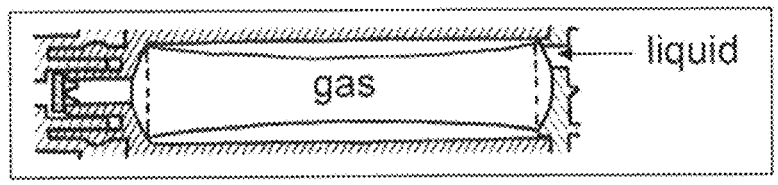
Figure 82A:
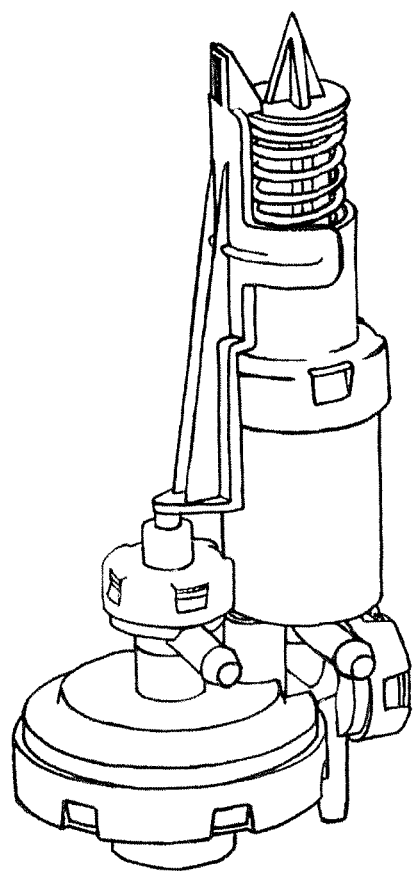
Figure 82B:
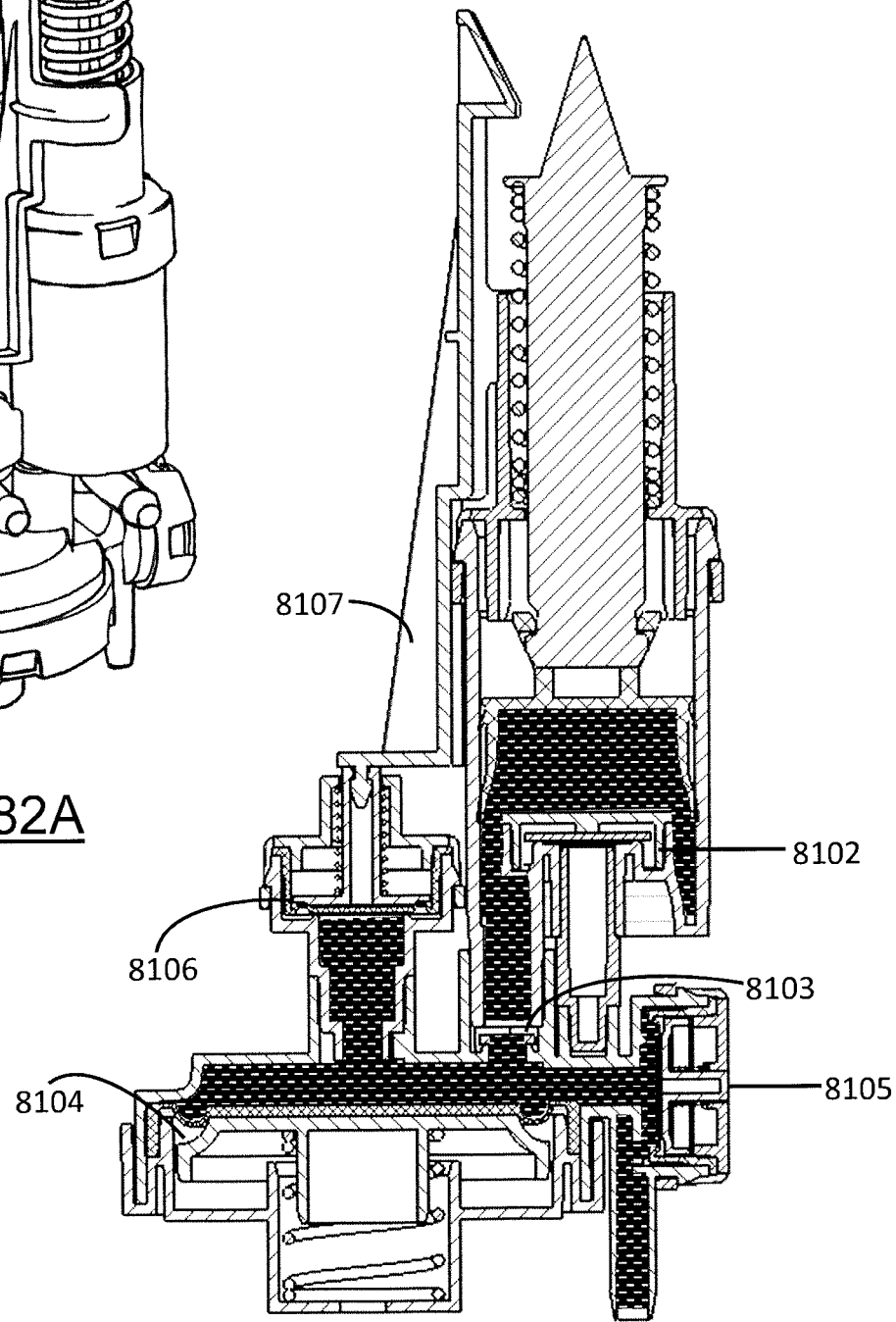
Figures 83A, 83B:
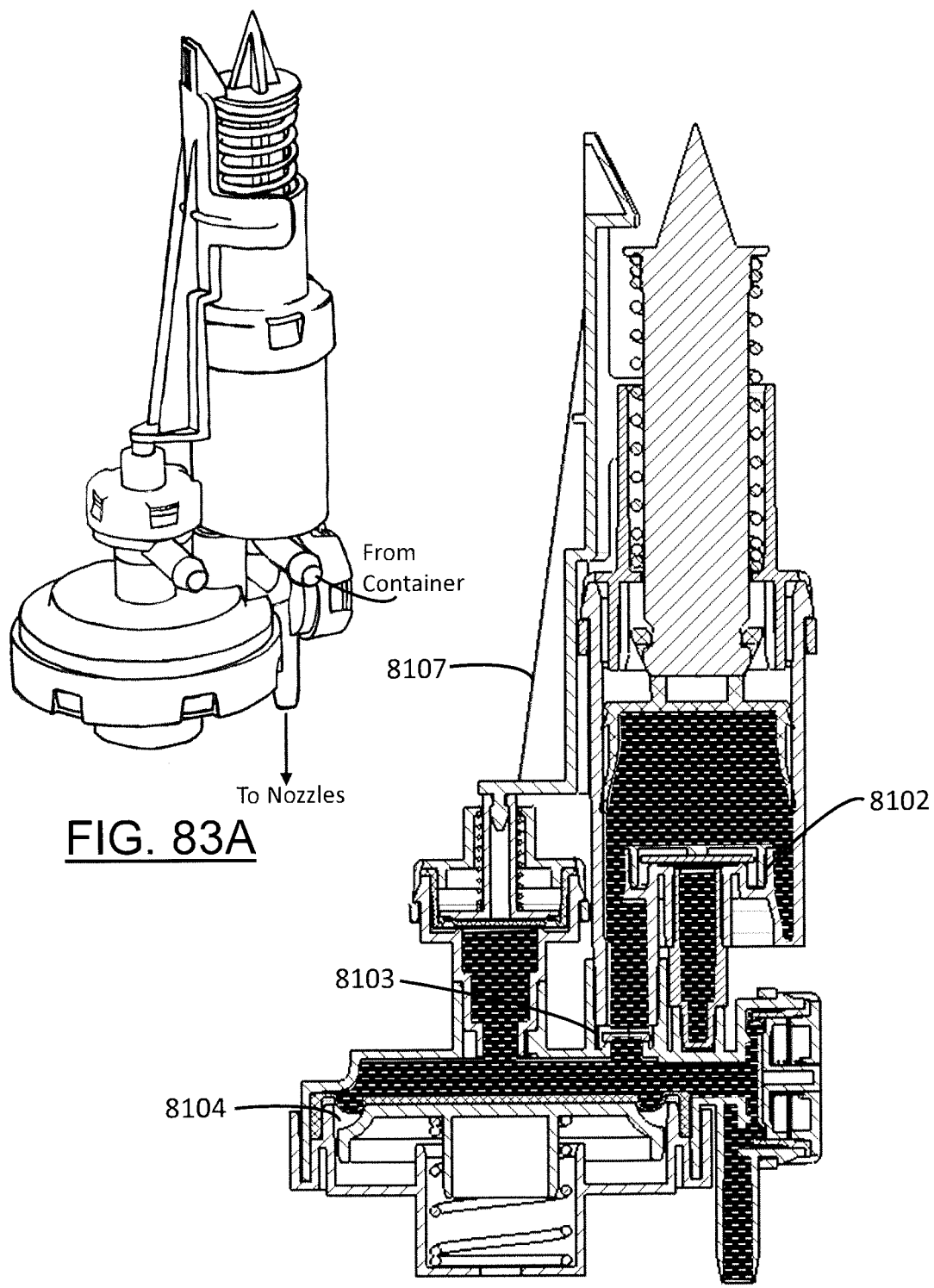
Figure 84:
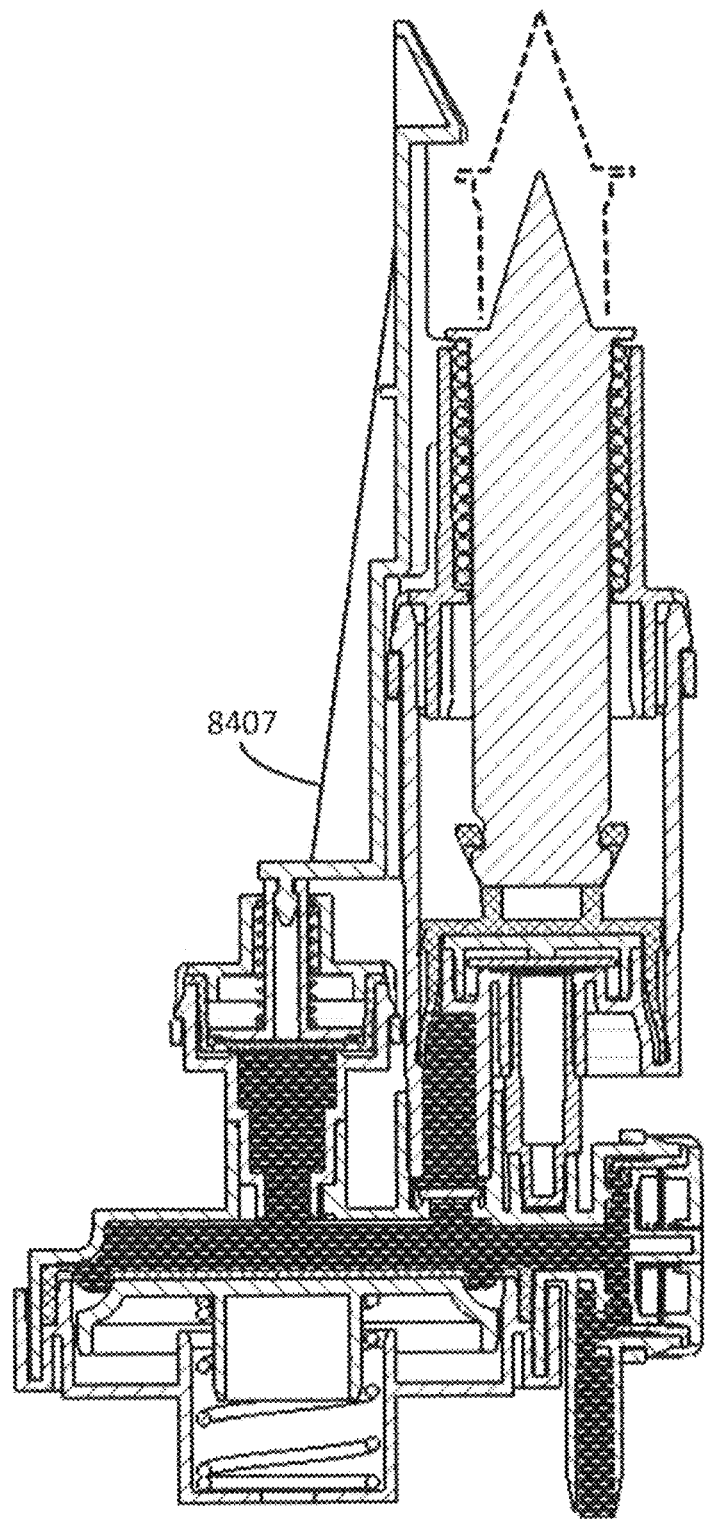
Figure 85A:
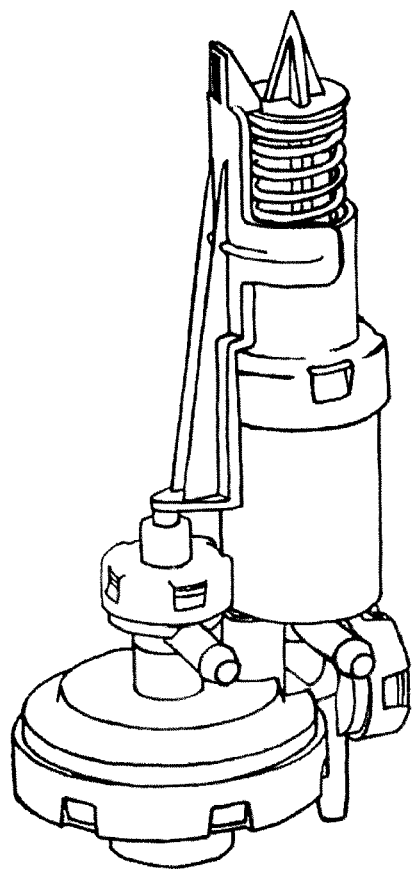
Figure 85B:
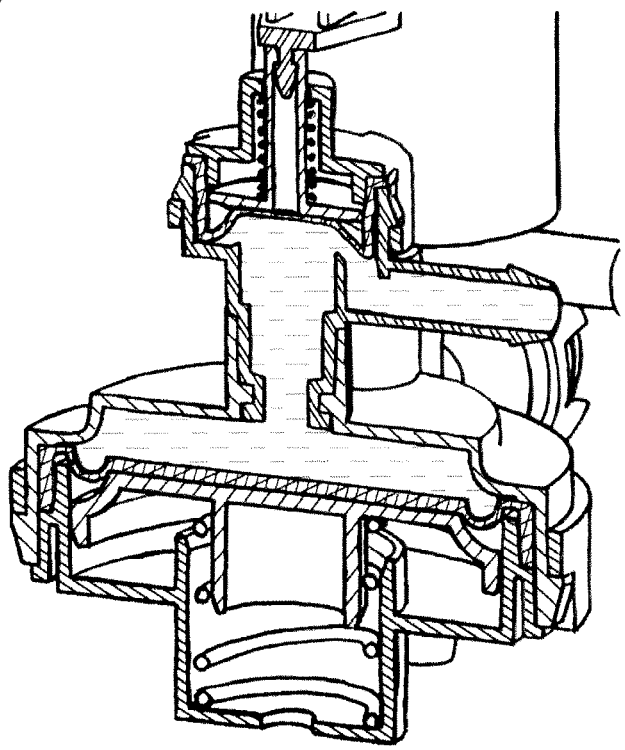
Figure 86:
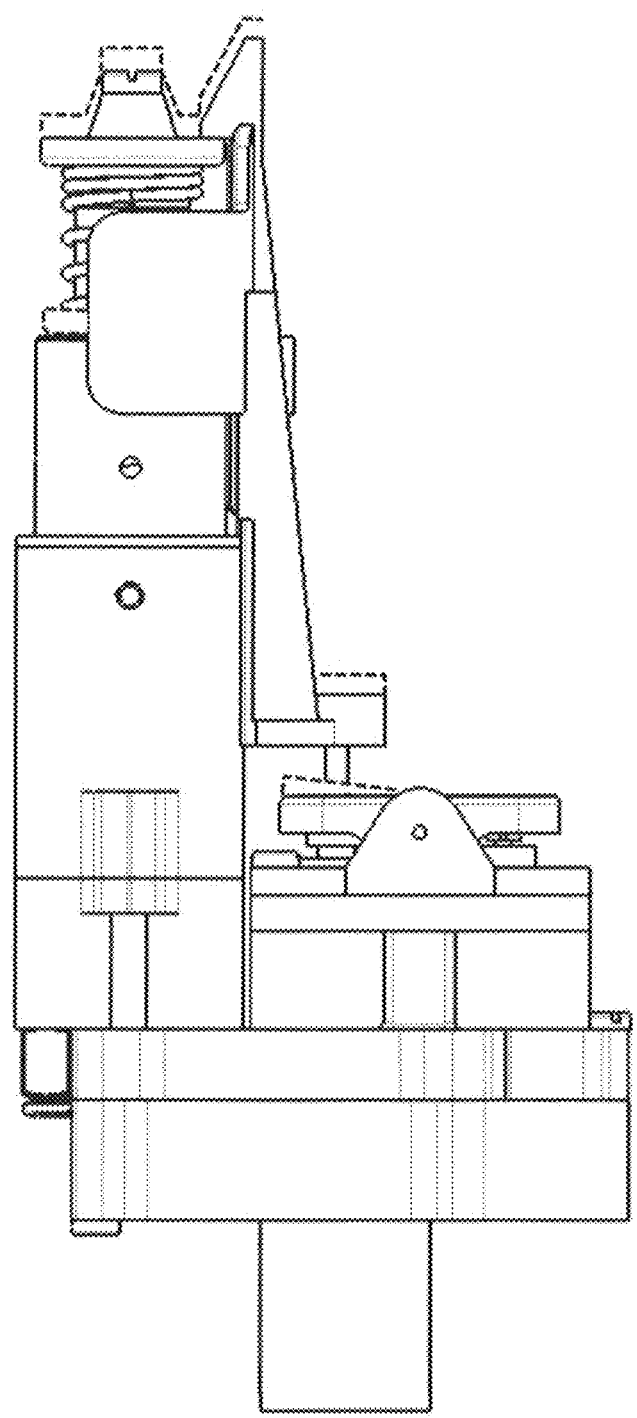
Figures 87A, 87B, 87C:
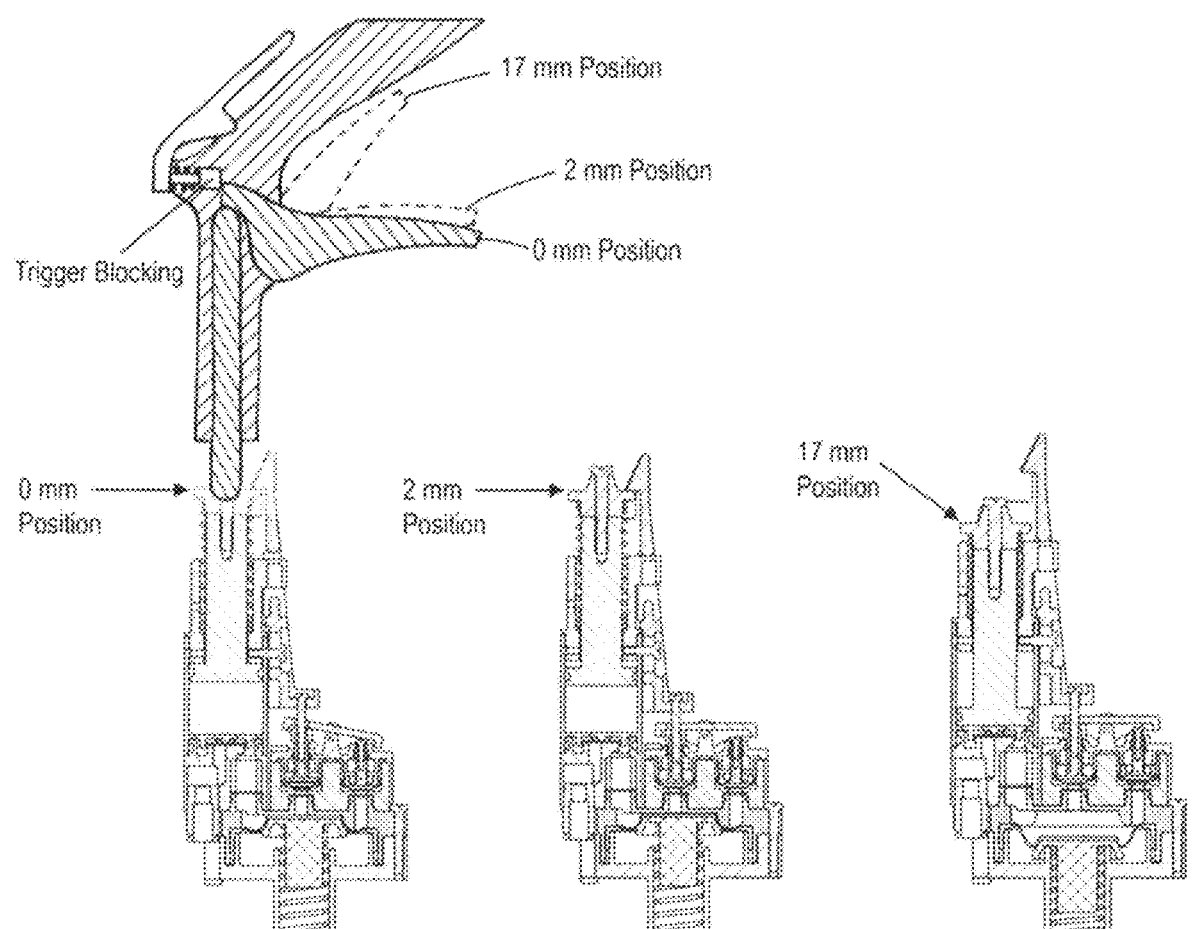
Figure 88A:
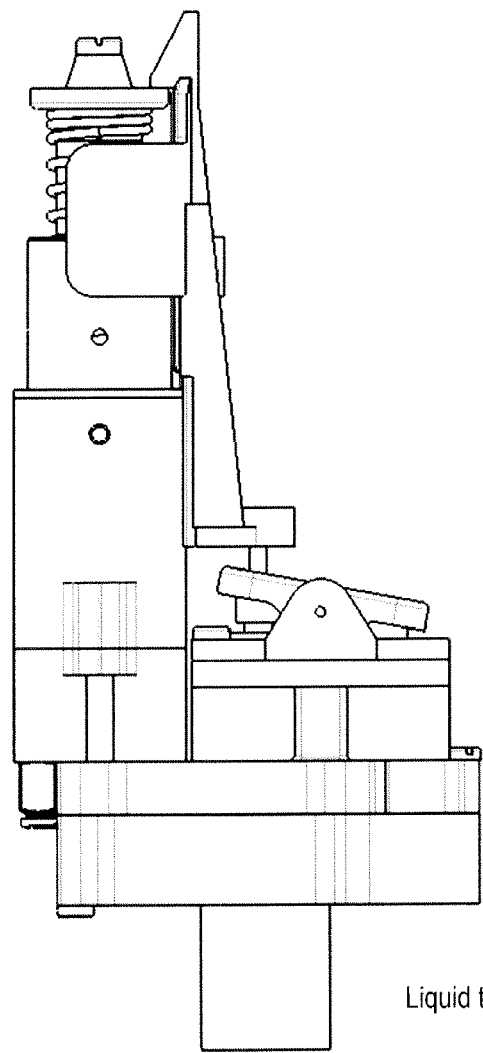
Figure 88B:
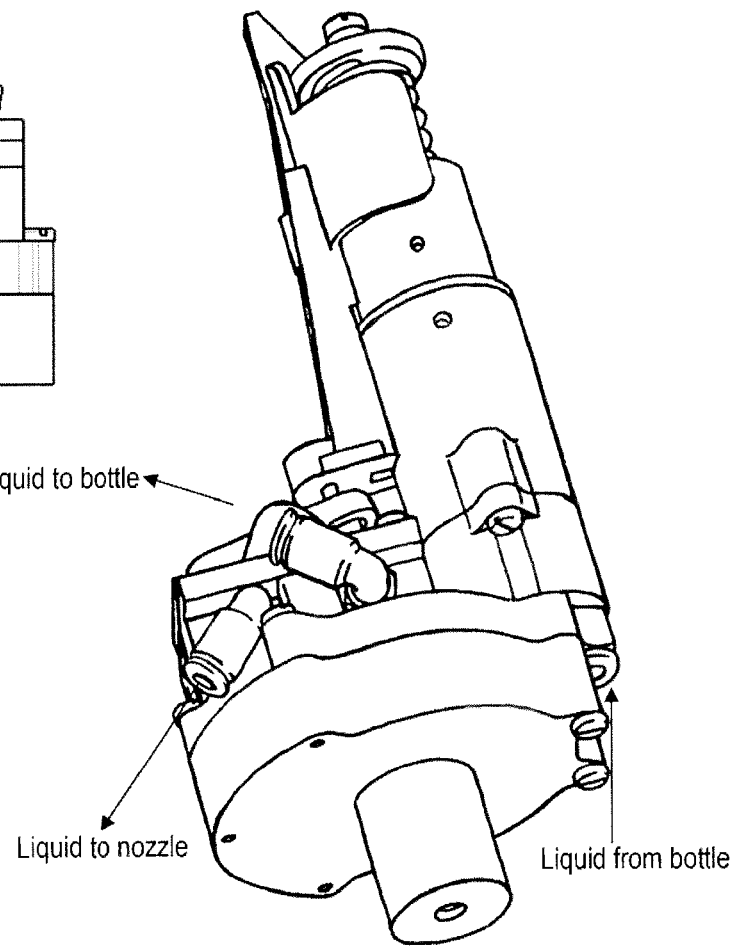
Figure 89A:
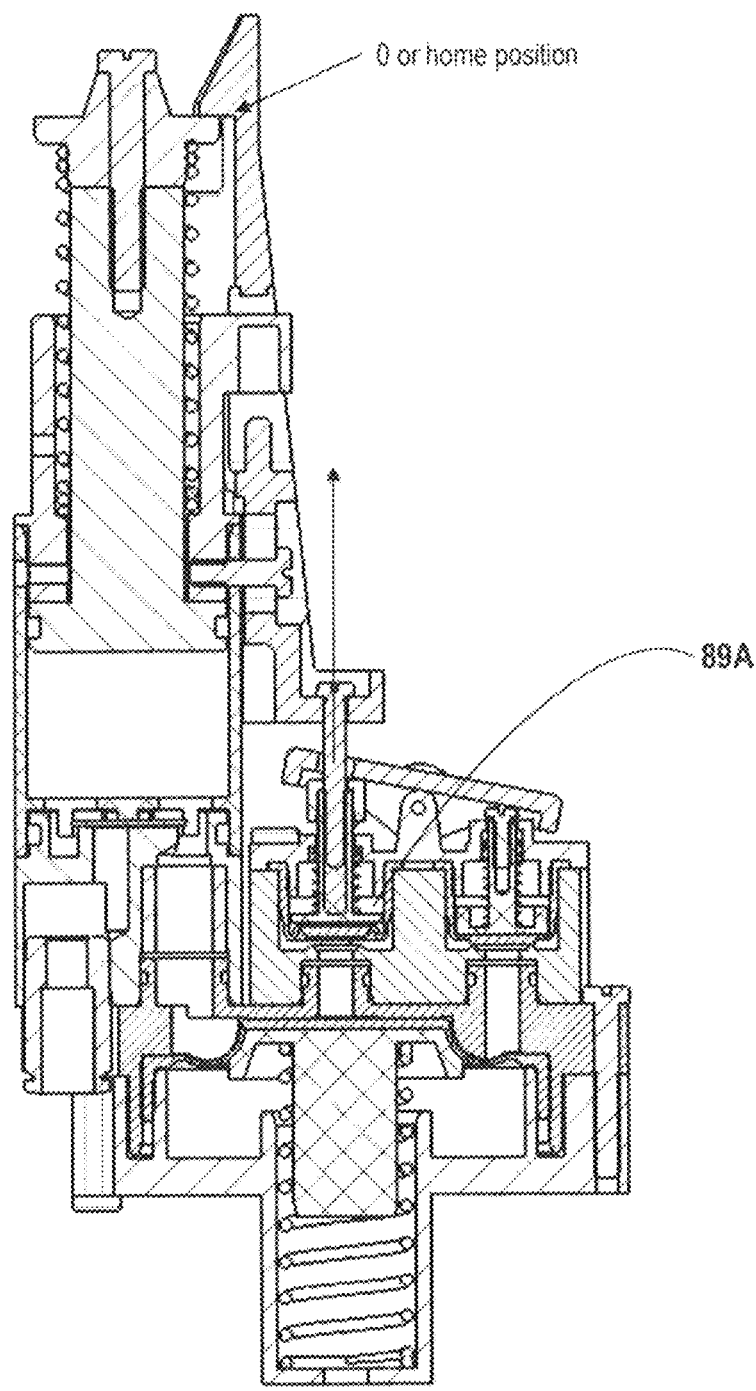
Figure 89B:
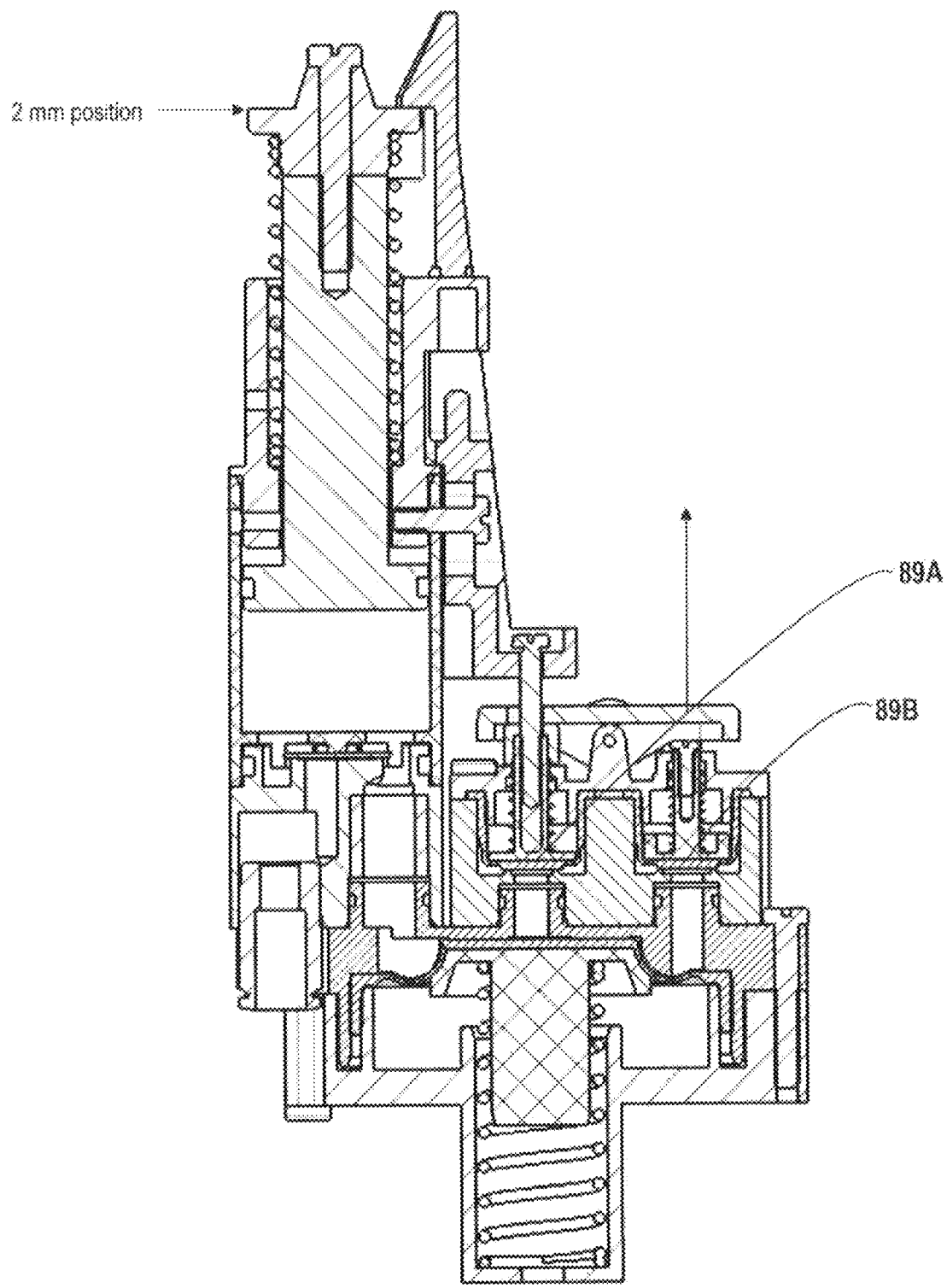
Figure 90A:
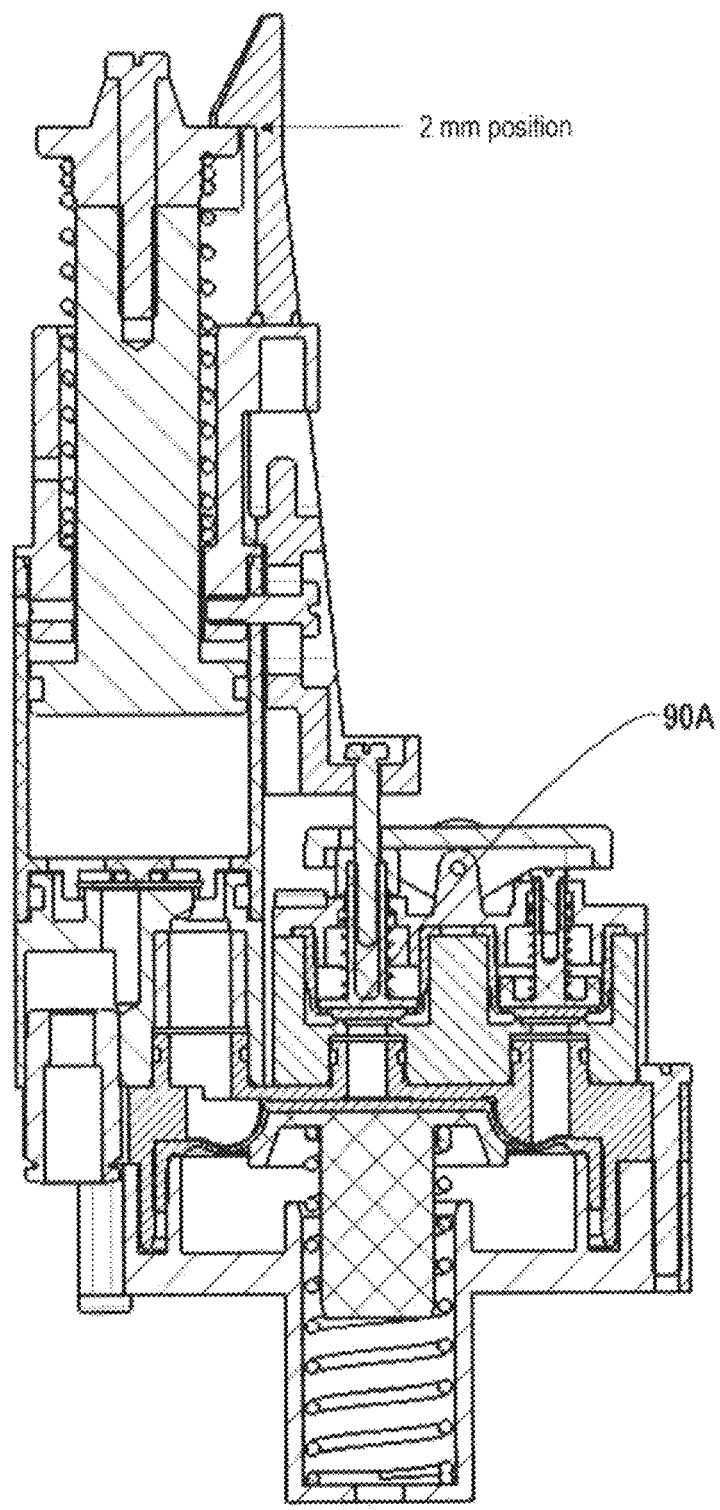
Figure 90B:
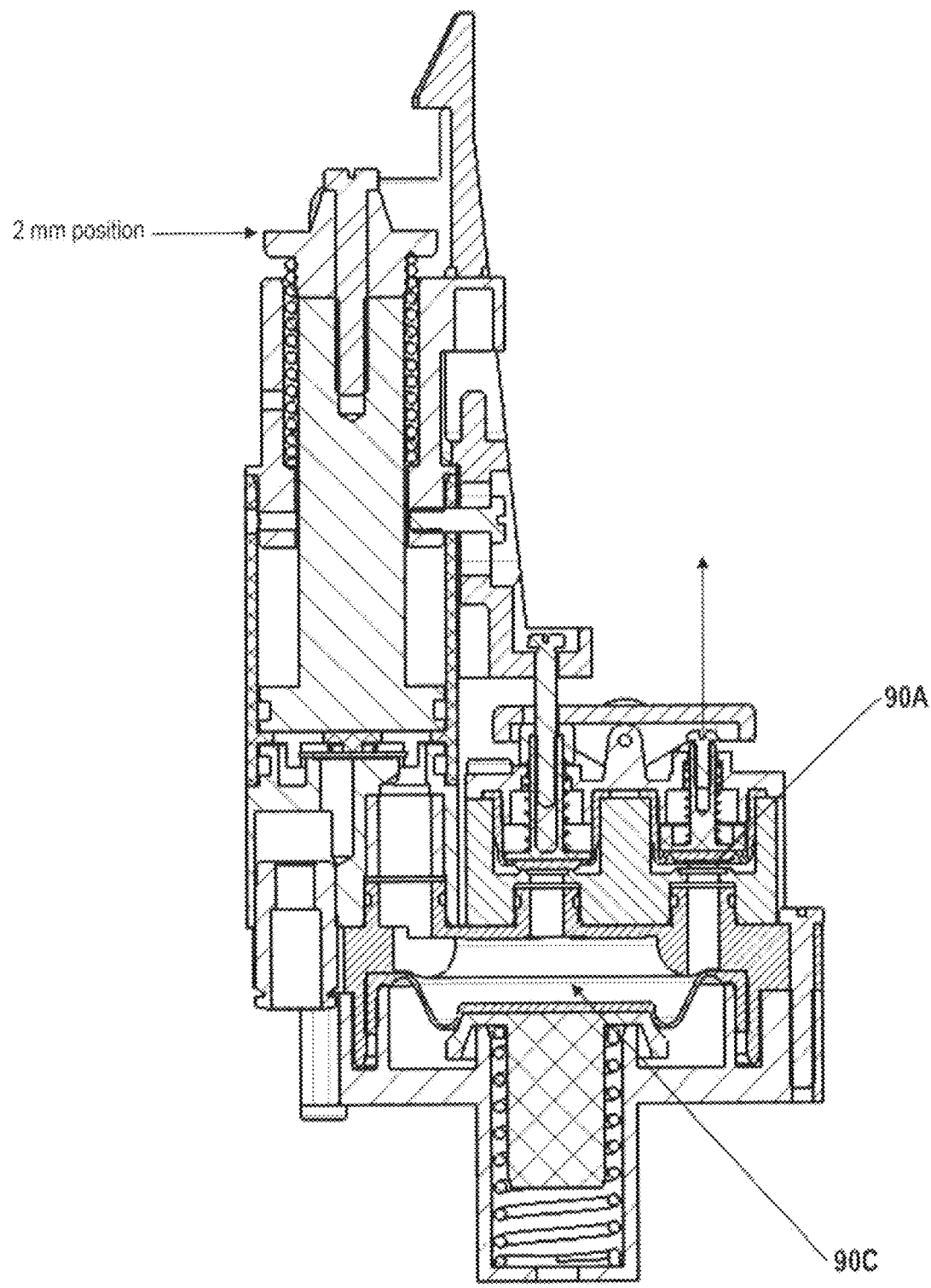
Figure 91A:
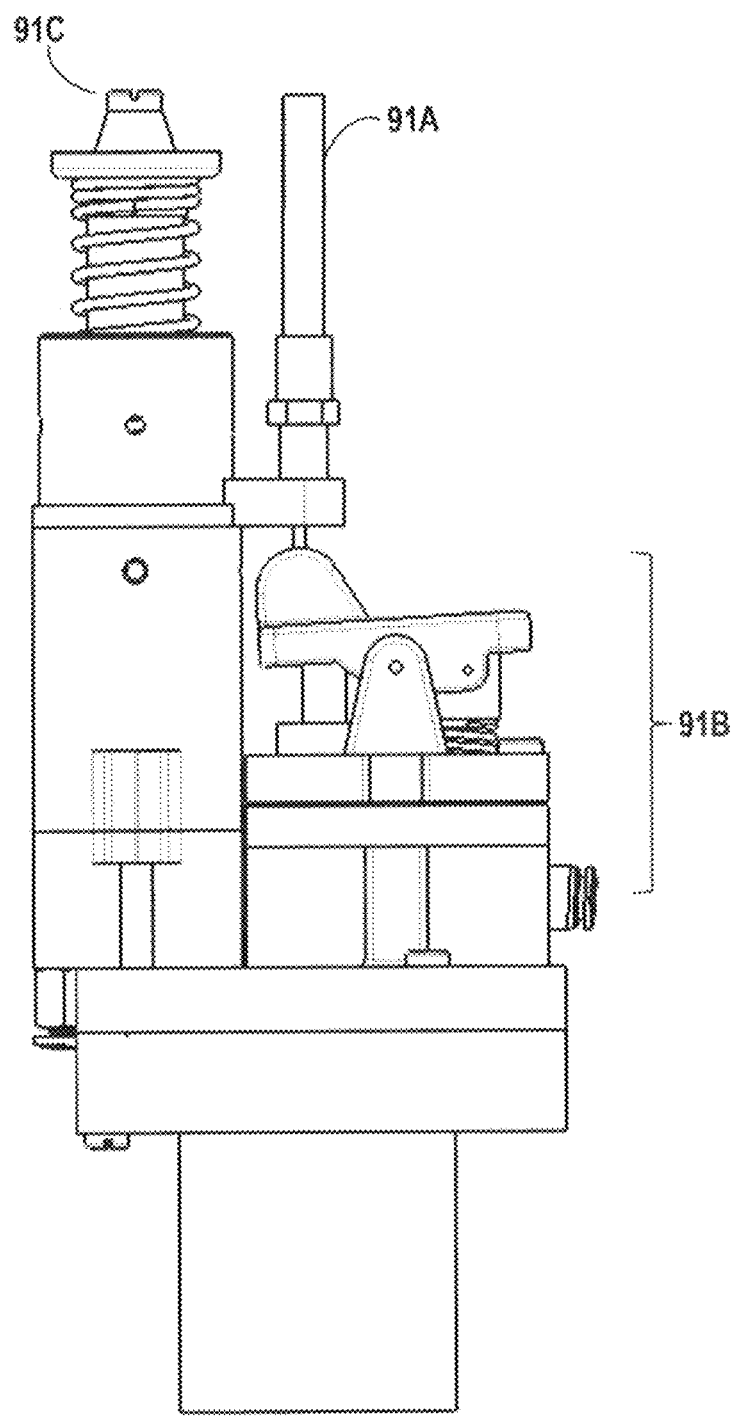
Figure 91B:
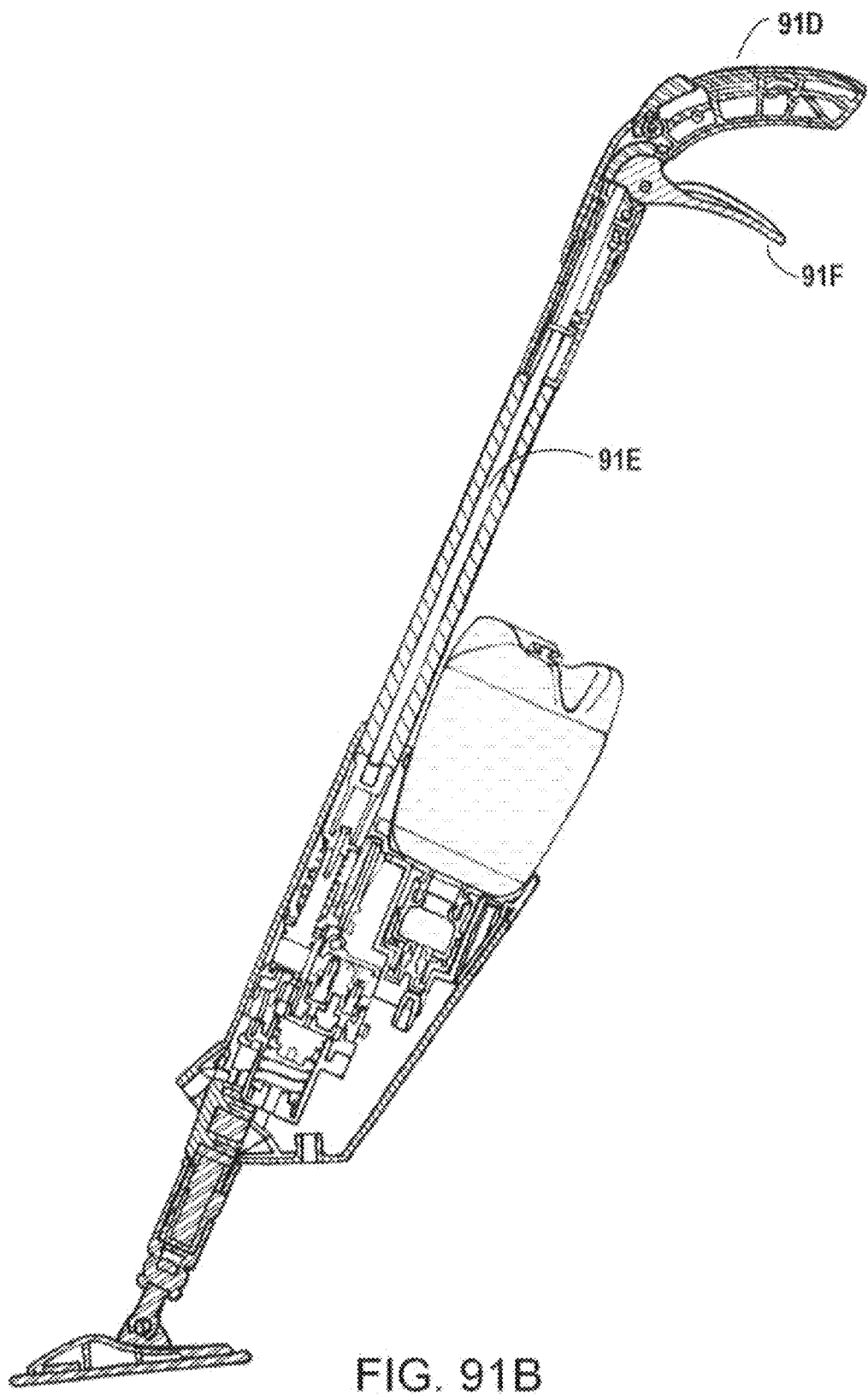
Figure 93A:
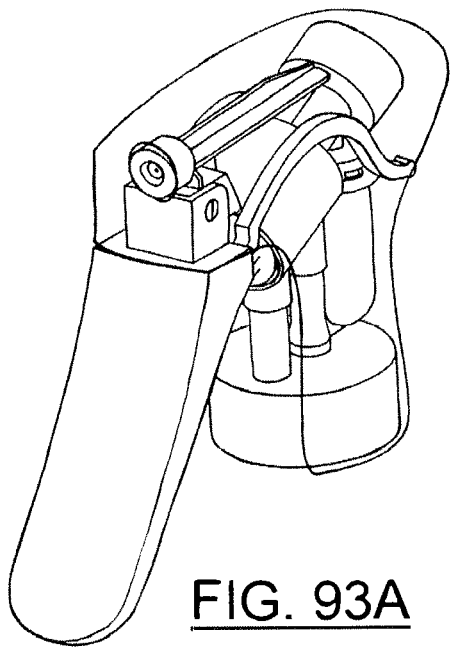
Figure 93C:
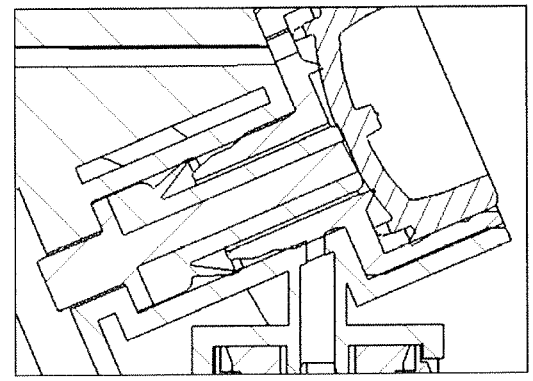
Figure 93B:
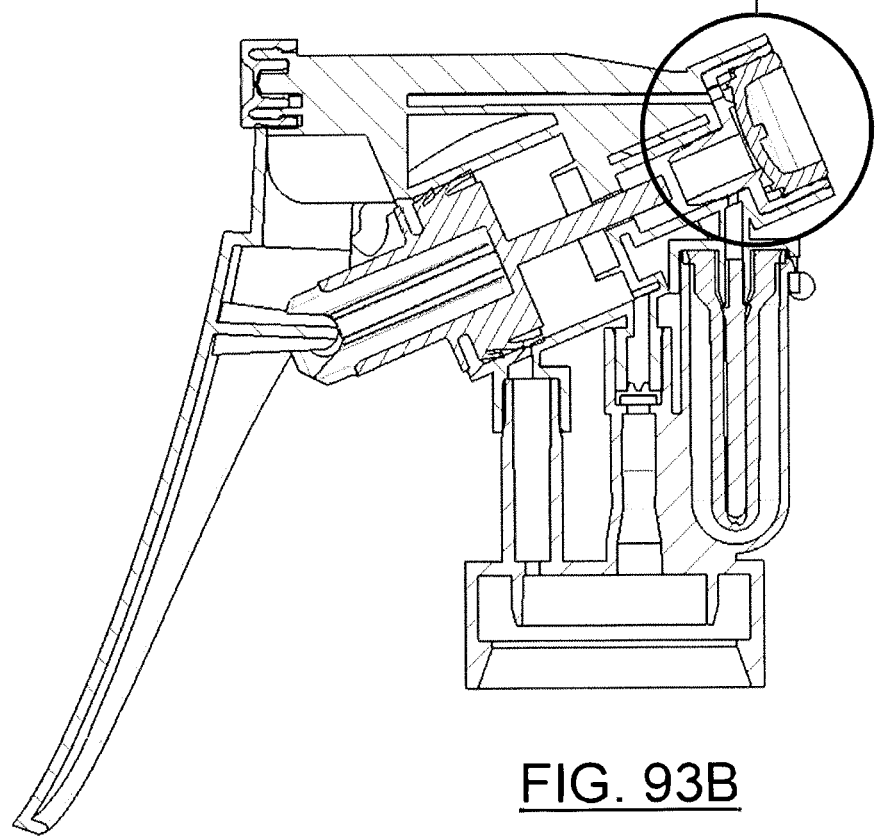
Figure 94A:
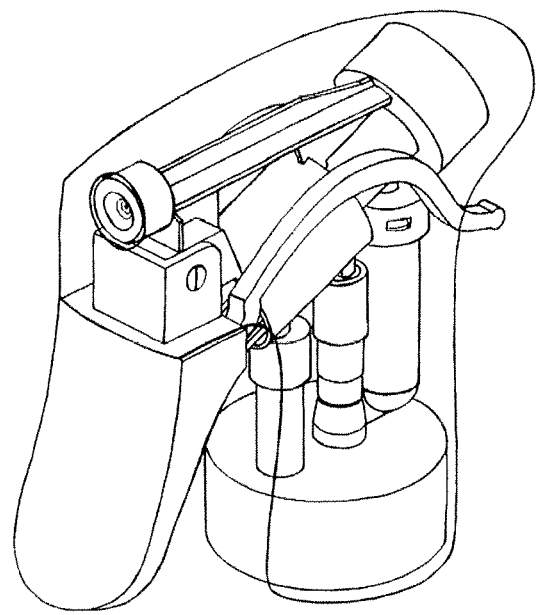
Figure 94B:
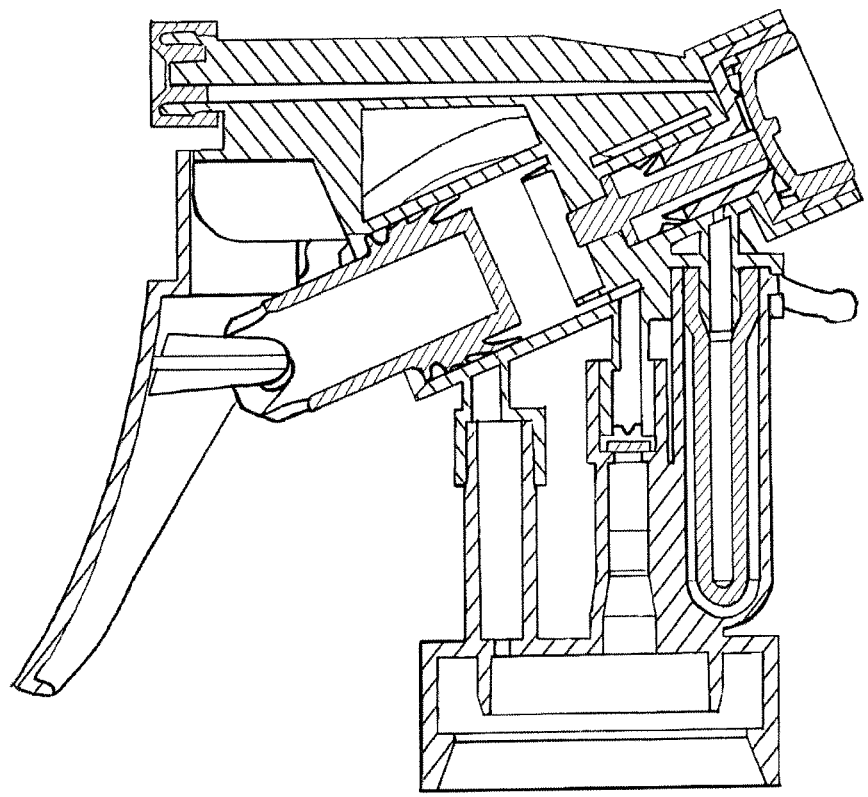
Figure 95A:
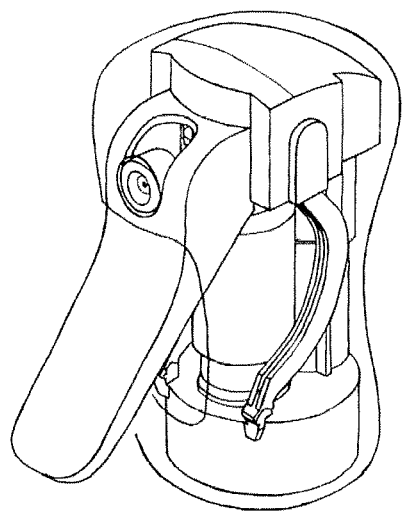
Figure 95B:
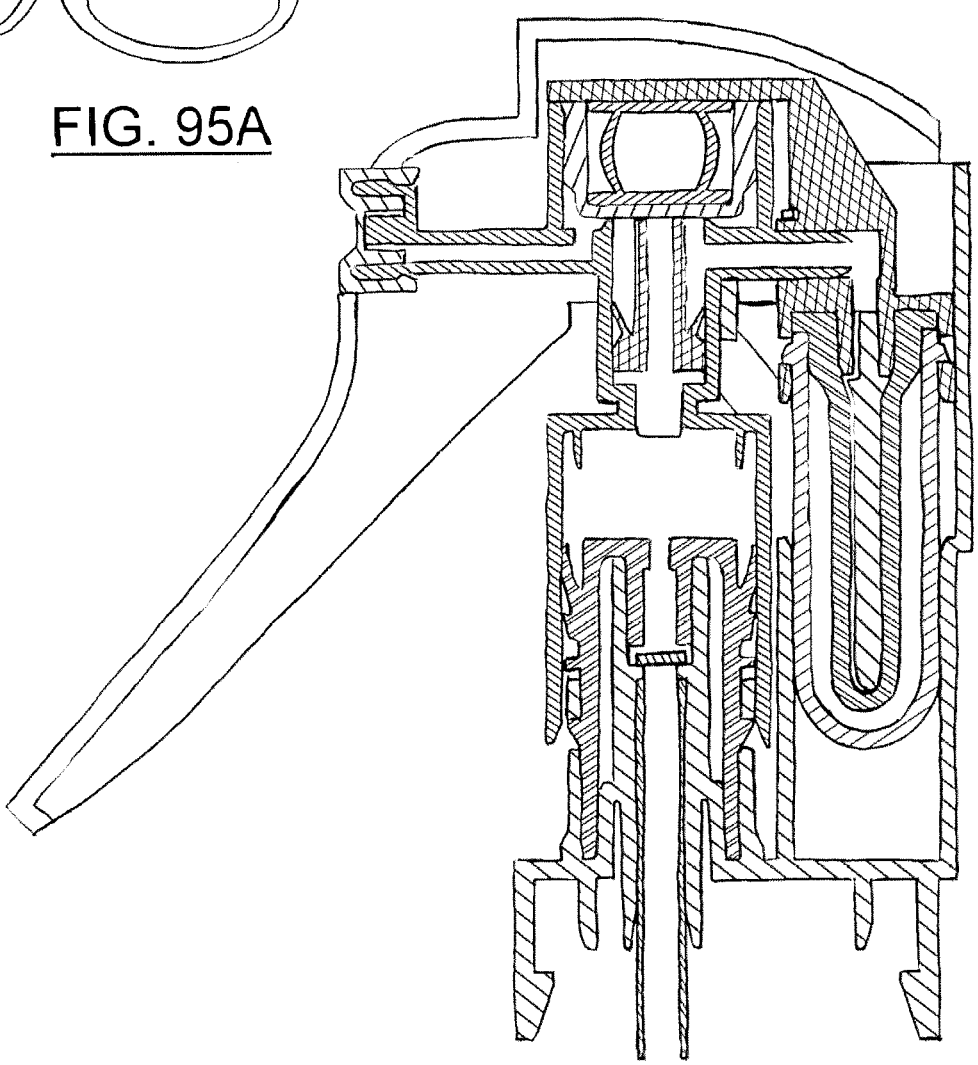
Figure 96A:
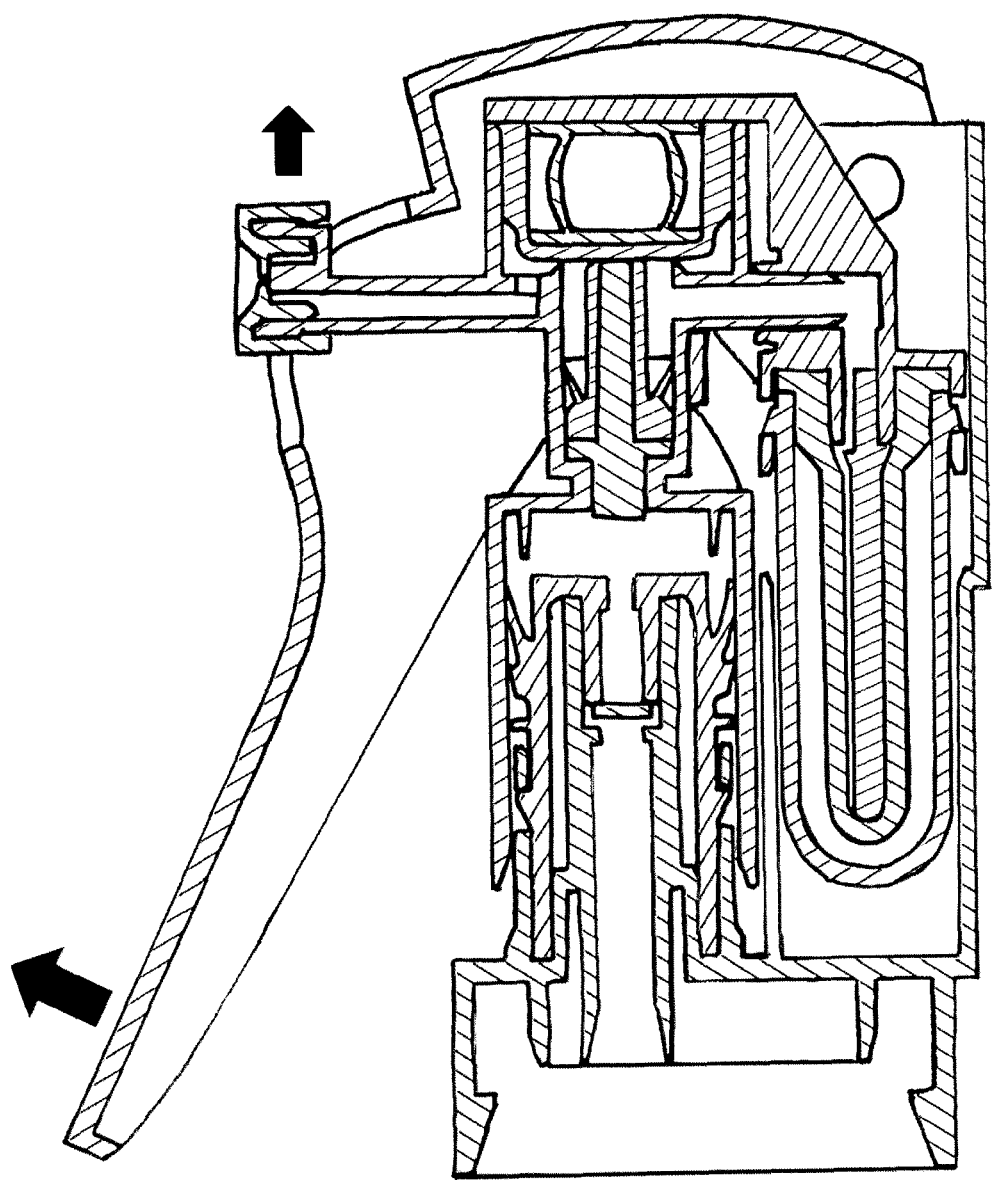
Figure 96B:
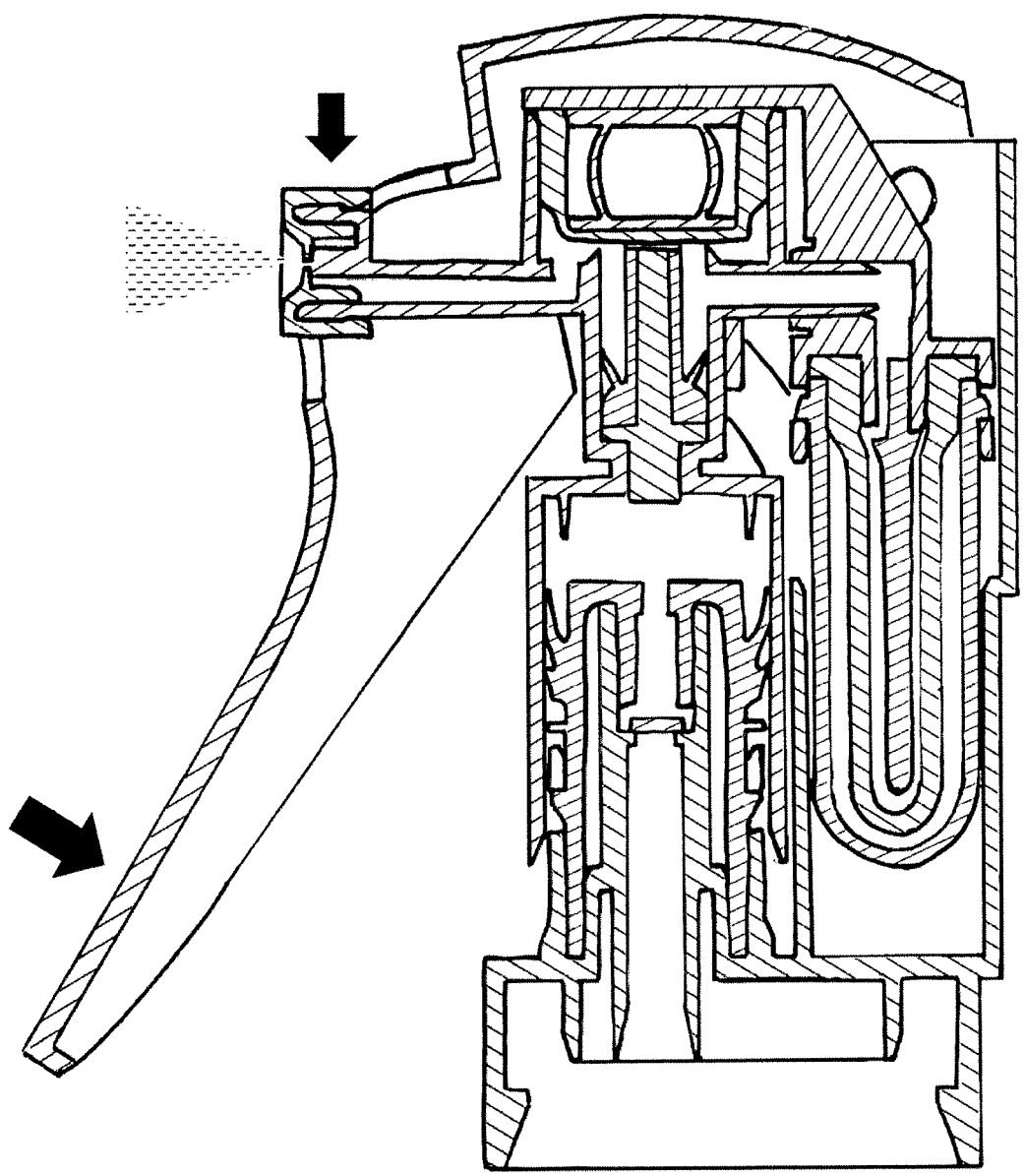
Figure 97A:
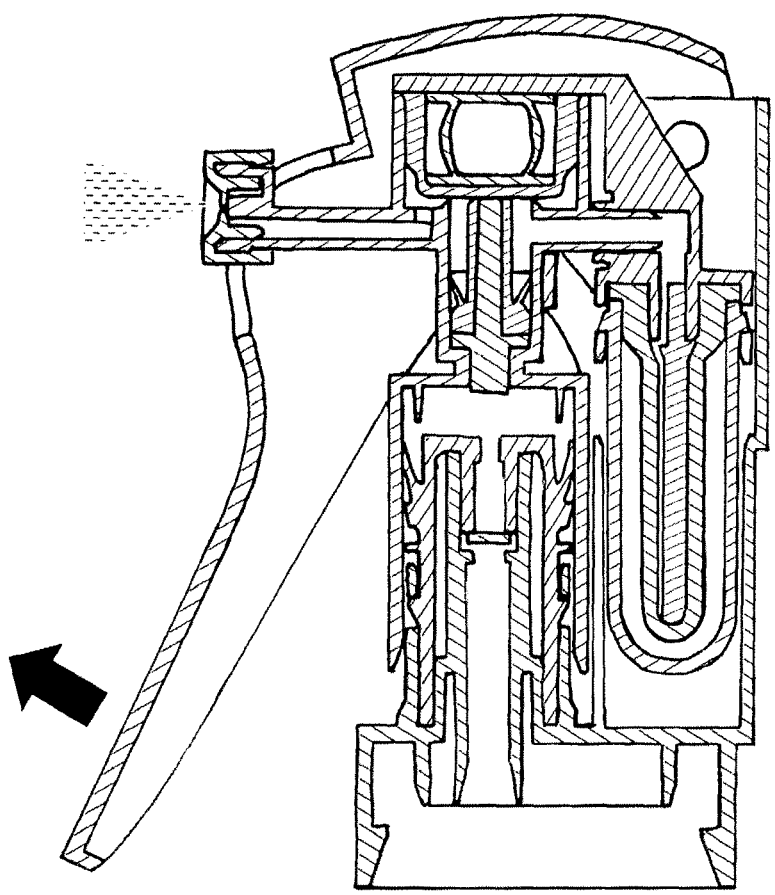
Figure 97B:
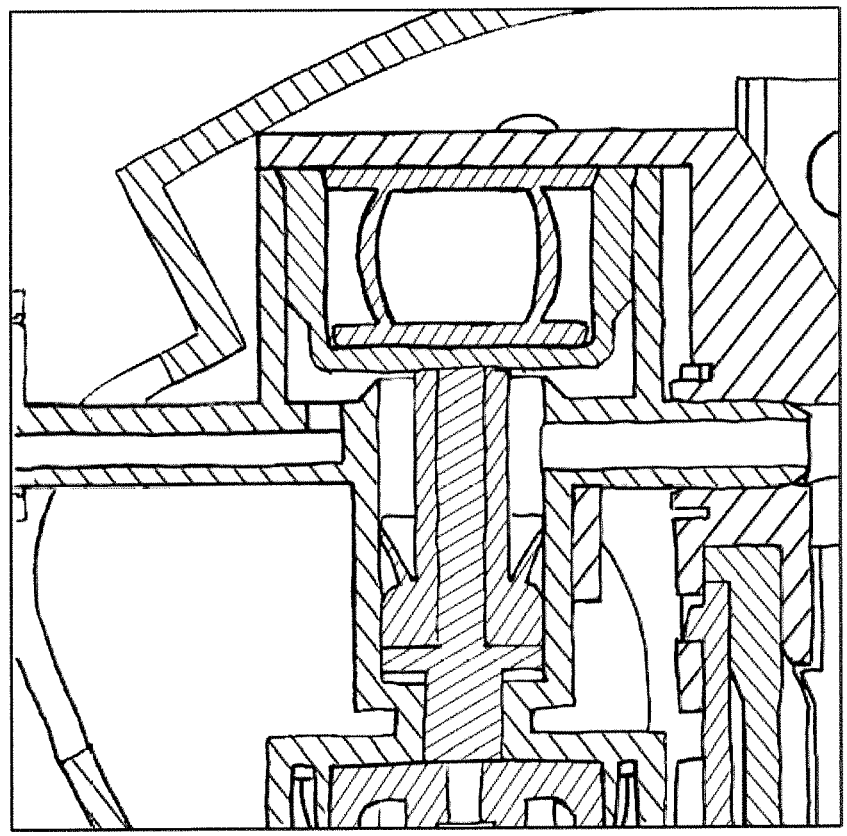

FIGS. 72B, 72C, 72D and 72E respectively show the same exemplary buffers as shown in FIGS. 71C, 71D, 71E and 71F, which may also be used in the example embodiment of FIG. 72A;

FIGS. 73A and 73B illustrate an exemplary high pressure continuous spray Flairomop embodiment with two nozzles on the floor plate, as opposed to one nozzle provided on the handle, under the buffer, according to exemplary embodiments of the present invention;

FIGS. 73C, 73D, 73E and 73F respectively show the same exemplary buffers as shown in FIGS. 71C, 71D, 71E and 71F, which may also be used in the example embodiment of FIG. 73B;

FIG. 74A is a schematic diagram of the exemplary system of FIG. 72B;

FIGS. 74B, 74C, 74D and 74E respectively show the same exemplary buffers as shown in FIGS. 71C, 71D, 71E and 71F, which may also be used in the example embodiment of FIG. 74A;

FIGS. 75A and 75B illustrate an exemplary Flairomop device operating under high pressure with direct action, according to exemplary embodiments of the present invention;

FIGS. 75C, 75D, 75E and 75F respectively show the same exemplary buffers as shown in FIGS. 71C, 71D, 71E and 71F, which may also be used in the example embodiment of FIG. 75B;

FIG. 76A is a schematic diagram of the exemplary system of FIG. 75B;

FIGS. 76B, 76C, 76D and 76E respectively show the same exemplary buffers as shown in FIGS. 71C, 71D, 71E and 71F, which may also be used in the example embodiment of FIG. 76A;

FIGS. 77A and 77B present an exemplary Flairomop operative at low pressure device, according to exemplary embodiments of the present invention;

FIGS. 77C, 77D, 77E and 77F respectively show the same exemplary buffers as shown in FIGS. 71C, 71D, 71E and 71F, which may also be used in the example embodiment of FIG. 75B;

FIG. 78A is a schematic diagram of the system of FIG. 77B;

FIGS. 78B, 78C, 78D and 78E respectively show the same exemplary buffers as shown in FIGS. 71C, 71D, 71E and 71F, which may also be used in the example embodiment of FIG. 78A;

FIG. 79 is a schematic diagram of an exemplary continuous stop engine, according to an exemplary embodiment of the present invention;

FIG. 80A illustrates a volumetric perspective view of an exemplary embodiment of the exemplary continuous stop engine of FIG. 79;

FIG. 80B illustrates a cross sectional view of the exemplary continuous stop engine of FIG. 80A;

FIGS. 80C, 80D, 80E and 80F respectively show the same exemplary buffers as shown in FIGS. 71C, 71D, 71E and 71F, which may also be used in the example embodiment of FIGS. 80A and 80B;

FIGS. 81A and 81B respectively illustrate perspective and cross-sectional views of the exemplary continuous stop engine of FIGS. 80A and 80B in a first, liquid intake, operational step;

FIGS. 82A and 82B respectively illustrate perspective and cross-sectional views of the exemplary continuous stop engine of FIGS. 80A and 80B in a second, piston moving down, operational step;

FIGS. 83A and 83B respectively illustrate perspective and cross-sectional views of the exemplary continuous stop engine of FIGS. 80A and 80B in a third, piston moving up, operational step;

FIG. 84 illustrates the exemplary continuous stop engine of FIGS. 80A and 80B in a fourth, continuous output, operational step;

FIGS. 85A, and 85C respectively illustrate perspective and cross-sectional views of the exemplary continuous stop engine of FIGS. 80A and 80B in a fifth, stopping, operational step;

FIG. 85B illustrates a magnified perspective cross-sectional view of the buffer and release valve assembly;

FIG. 86 illustrates an improved stopping feature for the exemplary continuous stop engine of FIGS. 80A and 80B, according to an embodiment;

FIGS. 87A, 87B and 87C respectively illustrate further details of the improved stopping feature of FIG. 86, at each of three respective positions of a trigger;

FIGS. 88A and 88B respectively illustrate an example implementation of the improved stopping feature in side and bottom perspective views;

FIGS. 89A and 89B respectively illustrate movement between an example home position (FIG. 89A) and an example 2 mm position (FIG. 89B) of the trigger;

FIGS. 90A and 90B respectively illustrate movement between an example 2 mm position (FIG. 90A) and an example 17 mm position (FIG. 90B) of the trigger;

FIGS. 91A and 91B respectively illustrate a first alternate stop feature of an exemplary continuous stop engine, according to an exemplary embodiment of the present invention;

FIGS. 92A, 92B and 92C respectively illustrate, via cross-sectional, top perspective and magnified valve assembly views, a second alternate stop feature of an exemplary continuous stop engine, according to an exemplary embodiment of the present invention;

FIGS. 93A, 93B and 93C respectively illustrate, via side perspective, cross-sectional and magnified outlet path views, an example direct stop sprayer according to exemplary embodiments of the present invention;

FIGS. 94A and 94B respectively illustrate top perspective and cross-sectional views of an example continuous sprayer according to exemplary embodiments of the present invention;

FIGS. 95A and 95B respectively illustrate top perspective and cross-sectional views of an example non-inline buffer sprayer according to exemplary embodiments of the present invention;

FIGS. 96A, 96B, 97A and 97B respectively show various operational states of the example non-inline buffer sprayer of FIGS. 95A and 95B;

FIG. 96A illustrates a first upstroke, or trigger released state, where liquid is sucked into the piston chamber;

FIG. 96B illustrates a first downstroke, or trigger being pulled state, where liquid is pushed past an outlet valve to a nozzle;

FIG. 97A illustrates a second upstroke, or trigger released state, where excess liquid stored in the buffer is released to the nozzle; and FIG. 97B illustrates detail of the umbrella valve and the dome valve with reinforcing spring, thus to make sure that the sprayer always primes, the valve is mechanically opened when the piston reaches the end of the stroke; by this means air can be evacuated.

DETAILED DESCRIPTION OF THE INVENTION

In exemplary embodiments of the present invention, various novel sprayers and related dispensing devices are presented. The sprayer heads shown can, in general, work with both standard bottles or reservoirs as well as the "bag within a bag" or "container within a container" Flair® technology developed and provided by Dispensing Technologies B.V. of Helmond, The Netherlands. The "bag within a bag" Flair® technology, which causes the inner container to shrink around the product, thus obviates headspace or air bubbles in the inner container. Because in Flair® technology the pressure applied to the inner bag results from a pressurizing medium, often atmospheric pressure vented between said inner and outer containers, venting of the liquid container is not required. Of course, whenever a product is dispensed from an inner bag in a Flair system, which shrinks to the remaining volume of the product as it dispenses, then the pressure has to be equalized in the gap between the outer container and the inner container. This can be done, for example, using a medium, such as, for example, air, whether at atmospheric pressure or higher. This can easily be done by venting the gap to ambient air somewhere between the inner container and the outer container. This can be done, for example, by providing a vent, such as, for example, on the bottom of the Flair container, or at any other convenient position of the outer container. In some exemplary embodiments such a vent is moved to the sprayer head itself, via a novel outlet valve.

Figure 1:
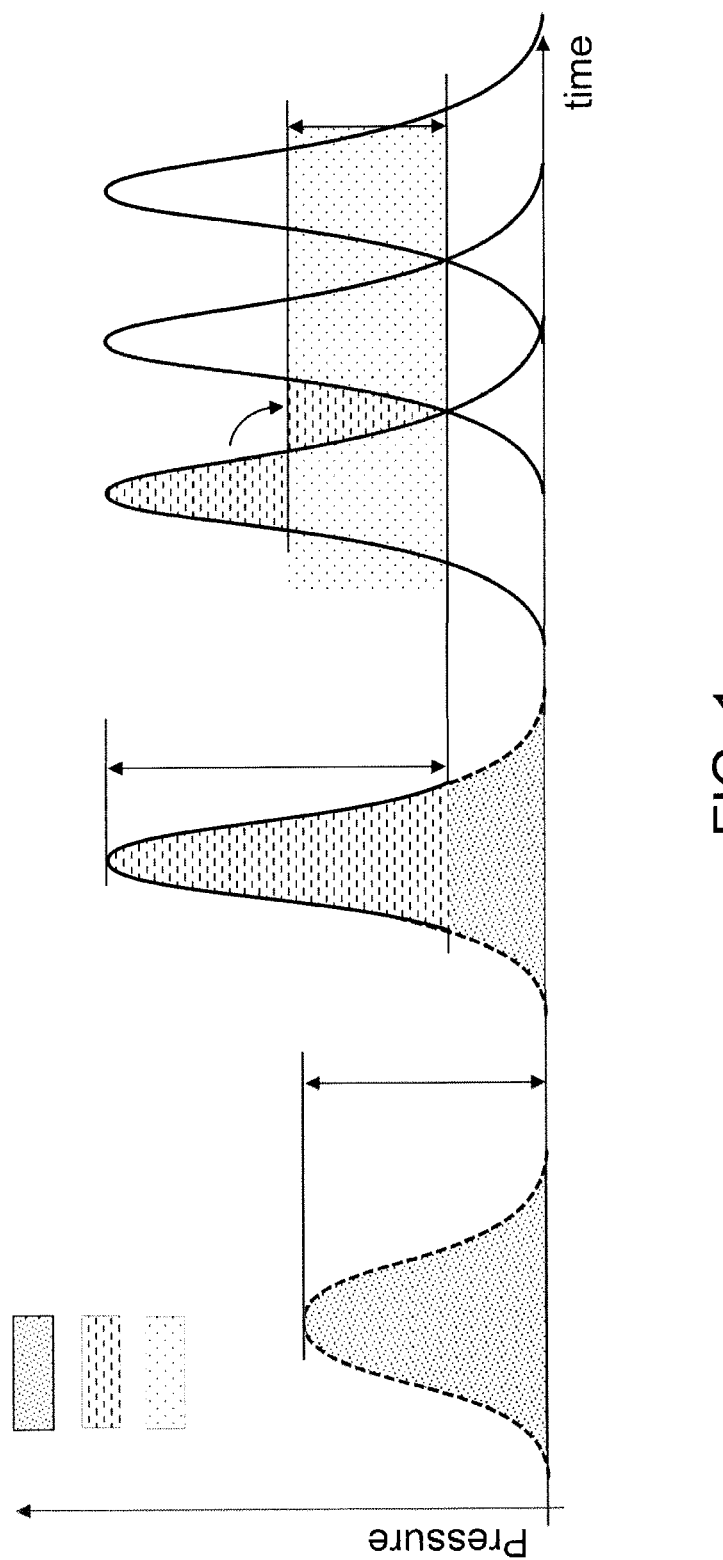
FIG. 1 illustrates, from left to right, pressure v. time plots for a conventional sprayer, a pre-compression sprayer, and a sprayer according to various embodiments.

FIGS. 1 through 4, next described, illustrate the relationship between output pressure and time of the outflow of various types of sprayers. With reference to FIG. 1, the left-most image shows the pressure time curve of a conventional sprayer. There is a distribution of pressures, essentially a Gaussian curve, and with greater pressure there is a smaller droplet size. Thus, in the pressure curve of conventional sprayer there is a distribution of droplet sizes. A conventional sprayer has no closed valves. When the piston is actuated the sprayer immediately starts dispensing. Thus, slow actuation of the pump by a user results in large droplets or drips and the liquid pressure is low. On the other hand, fast actuating of the piston can decrease the amount of large droplets because the pressure then rises more quickly towards the peak pressure. Thus, in a conventional sprayer performance is highly dependent upon the user operating or the behavior of the user operating the sprayer.

The middle image of FIG. 1 is the pressure curve of a pre-compression sprayer. Notably there is a larger range of pressures that are output from a pre-compression sprayer. A pre-compression sprayer has normally closed valves. The outlet valve therefore only opens at a pre-determined pressure. The displacement volume between inlet and outlet valve of the pump is to become zero during a compression stroke. If it does not, the pump cannot prime. When the piston is actuated by a user the sprayer only starts dispensing when the liquid pressure is above the cracking pressure of the outlet valve. Therefore slow actuation of the pump will give no drips because the pump starts dispensing at a higher pressure. Here in a pre-compression sprayer performance is less dependent upon the user's operating behavior than in the case of a conventional sprayer.

The right-most image of FIG. 1 illustrates the pressure time curve of a sprayer according to exemplary embodiments of the present invention. It is noted that on occasion the inventive sprayers described herein will be referred to as "DuO1" sprayers. A DuO1 dispenser has normally closed valves just as in the case of a pre-compression sprayer. Therefore the outlet valve only opens at a pre-determined pressure. There is also a buffer, however. The buffer immediately stores the overflow of liquid, thus preventing peak pressures. The DuO1 synchronized components determine the output performance. Fast or slow triggering by a user has little effect on the output, because the pressures are equalized through buffering. The performance of a DuO1 dispenser is very little dependent upon the operating behavior of the user. As noted in the right-most image of FIG. 1 there is a much-narrower range of output pressures because peak pressures are topped off by buffering the overflow and thus the pressures at the top of the pre-compression sprayer pressure curve are cut off at the maximum pressure which is the uppermost line in FIG. 1, right-most image. By buffering the overflow this reduces the pressure range/droplet size spread. And thus, for a DuO1 sprayer, output pressure runs in a narrow band between the minimum pressure, that of the pre-compression valve, and the maximum pressure, which is a function of the pressure generated by the buffer during continuous strokes or during one single stroke in case of a direct stop embodiment (as described below). Various DuO1 synchronized components determine the output performance. Fast or slow triggering has little effect on the output, because the pressures are equalized through buffering. Output pressure tends to be at the buffer pressure.

Figure 2:
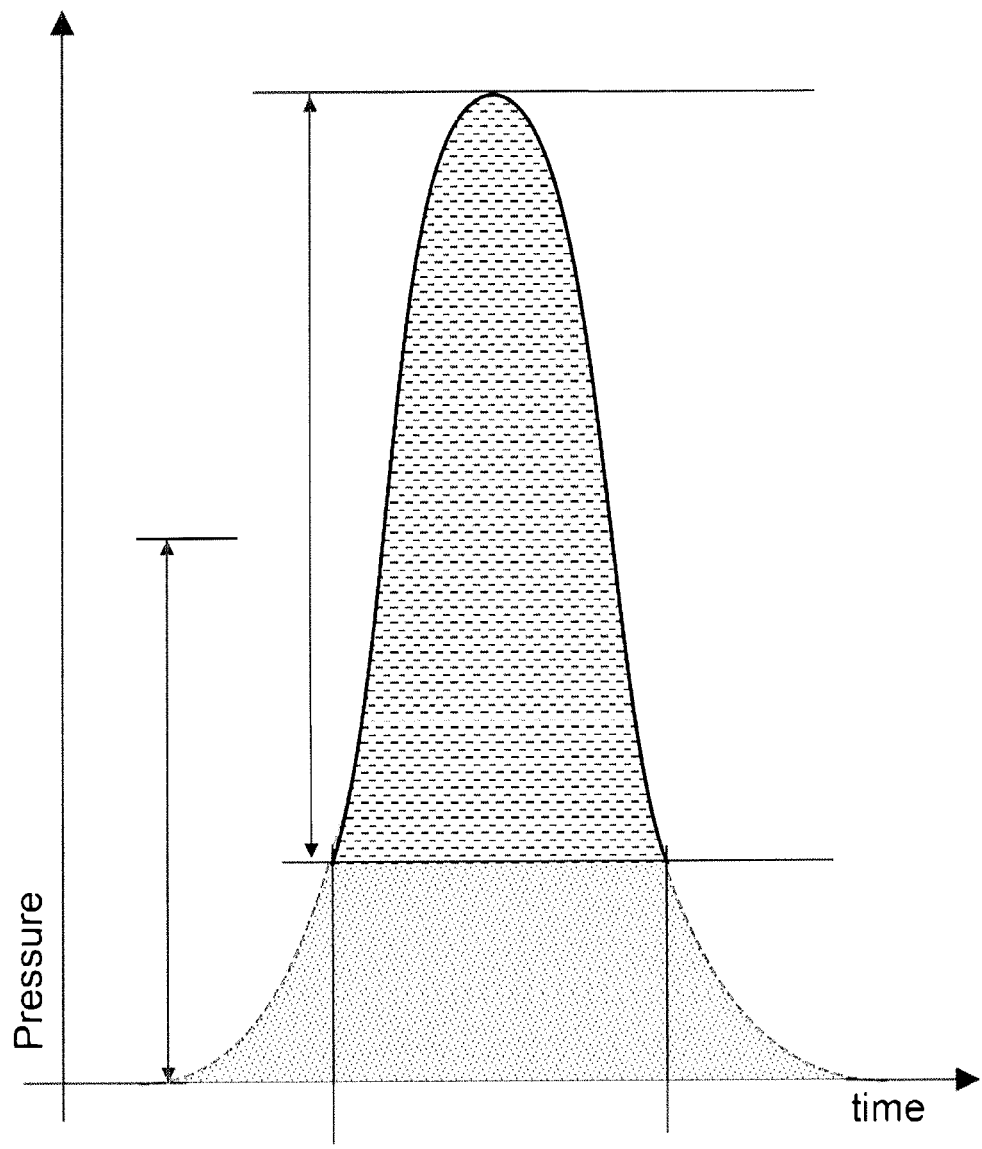
FIG. 2 is a magnified view of the pressure v. time plot for the pre-compression sprayer shown in FIG. 1.

FIG. 2, next described, provides further details of a pre-compression sprayer. As noted with reference to FIG. 1 a conventional sprayer starts dispensing at a low pressure. During a trigger stroke, the pressure rises up to a peak pressure. The liquid is forced through an orifice, but only a part of the liquid can pass the nozzle, so the pressure will build up within the sprayer. Towards the end of the stroke, the liquid pressure drops to zero. The low pressure at the beginning and end of the stroke thus creates larger, non-uniform droplets as shown at the right and left sides of the conventional sprayer pressure time curve shown in FIG. 2.

A pre-compression sprayer starts spraying when the liquid pressure is at a pre-determined pressure. This pre-determined pressure is known as the "cracking pressure" of the outlet valve. During the trigger stroke the pressure rises up to a peak pressure. When the pressure drops to a predetermined pressure (closing pressure of the outlet valve) dispensing stops immediately. The droplet size at the beginning and end of a dispensing stroke in a pre-compression sprayer are smaller because the pressure is higher. The peak pressure, creating even smaller droplets is also higher than that of a conventional sprayer as shown in FIG. 2, because the same amount of liquid is dispensed in a shorter time. Therefore more pressure builds up. Thus, relative to a conventional sprayer the pressure difference across the pressure time curve will still be there and even be greater. It is only shifted to a higher pressure range.

Thus, a conventional sprayer starts dispensing at a low pressure, and during a trigger stroke the pressure rises up to a peak pressure. The liquid is forced through an orifice, but only a part of the liquid can pass through the nozzle, so pressure will build up. Towards the end of the stroke the liquid pressure drops to zero.

The low pressure seen at the beginning and the end of the stroke creates larger non uniform droplets.

A pre-compression sprayer starts spraying when the liquid pressure is at a pre-determined pressure (the cracking pressure of the outlet valve). During a trigger stroke the pressure rises up to a peak pressure. When the pressure drops to a predetermined pressure (closing pressure of the outlet valve), dispensing stops immediately.

The droplet sizes at the start and end of the dispensing stroke are smaller, because the pressure is then higher. The peak pressure (creating even smaller droplets) is higher than in a conventional sprayer because the same amount of liquid is dispensed in a shorter time. (more pressure build up). Compared to a conventional sprayer the pressure difference will still be there, or be even larger. It only shifted to an higher pressure level.

Issues with pre-compression sprayer: (1) a wider spread in droplet sizes, and (2) too small droplets sizes due to very high peak pressure, as shown.

Figure 3:
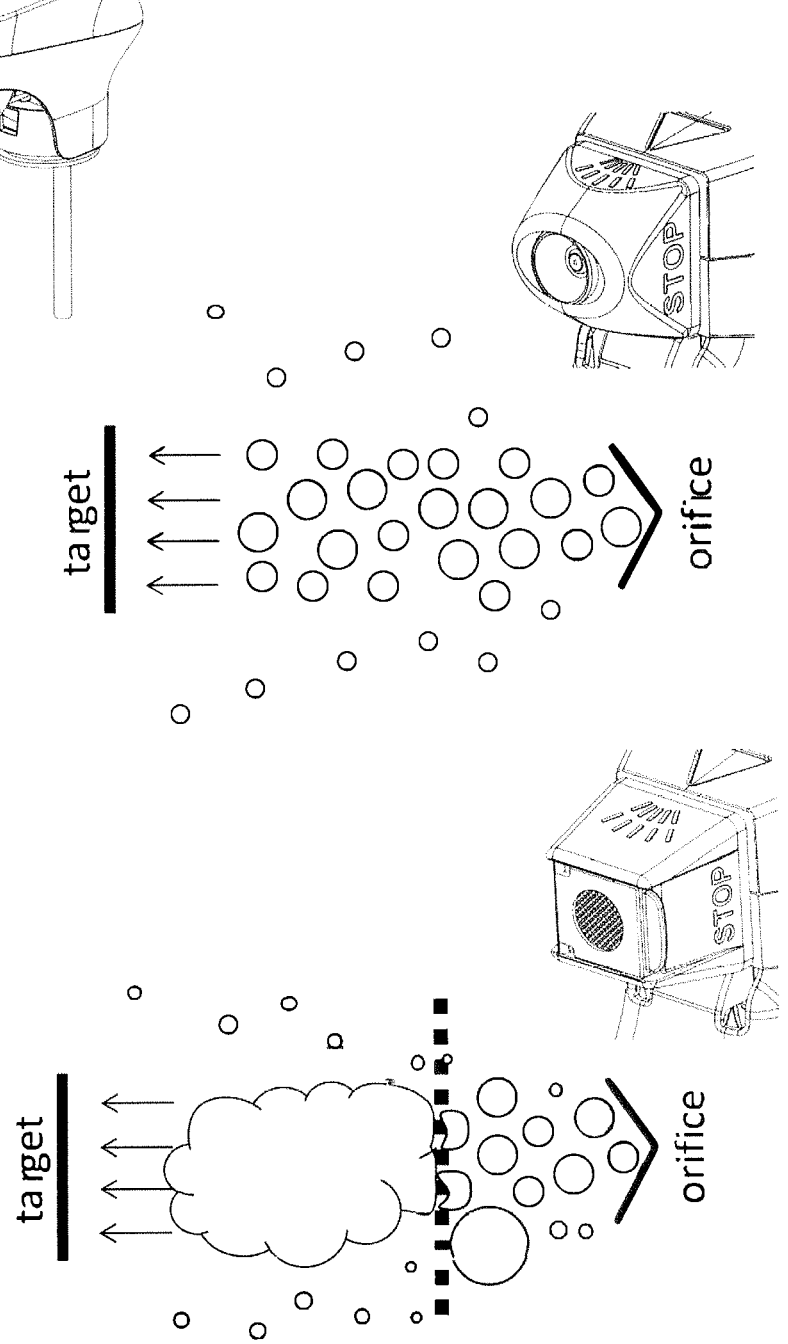
FIG. 3 illustrates problems with conventional pre-compression sprayers.

FIG. 3 illustrates the difficulties with standard pre-compression sprayers. These include, for example, (1) wider spreading droplet sizes, and (2) too small droplet sizes. For many liquids a wider spread of droplet sizes is not a problem.

Sometimes, however, the range of droplet sizes is required to be smaller in order to have better performance of the liquid, such as, for example to create a foam. Too small droplet sizes (less than or equal to 10 microns) can cause a health hazard when they are of such a size that can be inhaled and wherein the liquid can be dangerous, such as, for example when using bleach contained liquids. Also, too small droplet sizes can stray off when dispensed and not hit the target. Rather they can land on a non-intended surface which they can damage. For example, a hard surface cleaner which causes stains when it lands on a fabric. These processes are illustrated at the bottom of FIG. 3. Additionally, as shown, in a foamer context, screen is sized for a particular droplet size which would hit its grid and thus become foam. Too small droplets do not hit the foaming screen, and thus pass through without making foam, can stray off, be inhaled, and fail to land on an intended target.

Figure 4:
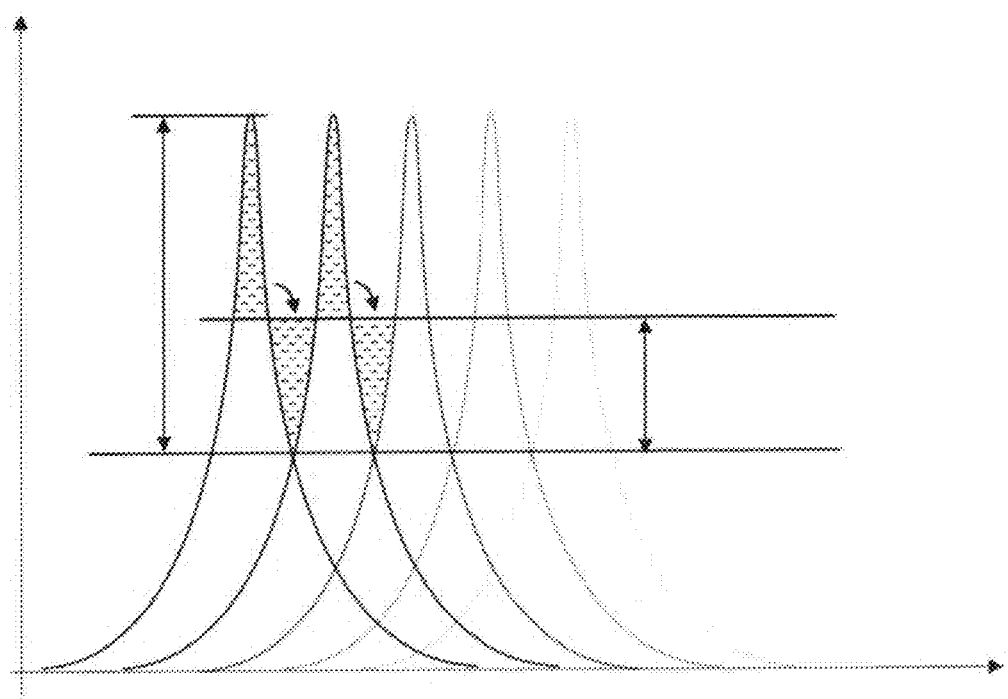
FIG. 4 depicts a pressure v. time plot for a novel combination of pre-compression and control of maximum pressure according to exemplary embodiments of the present invention.
Figure 6:
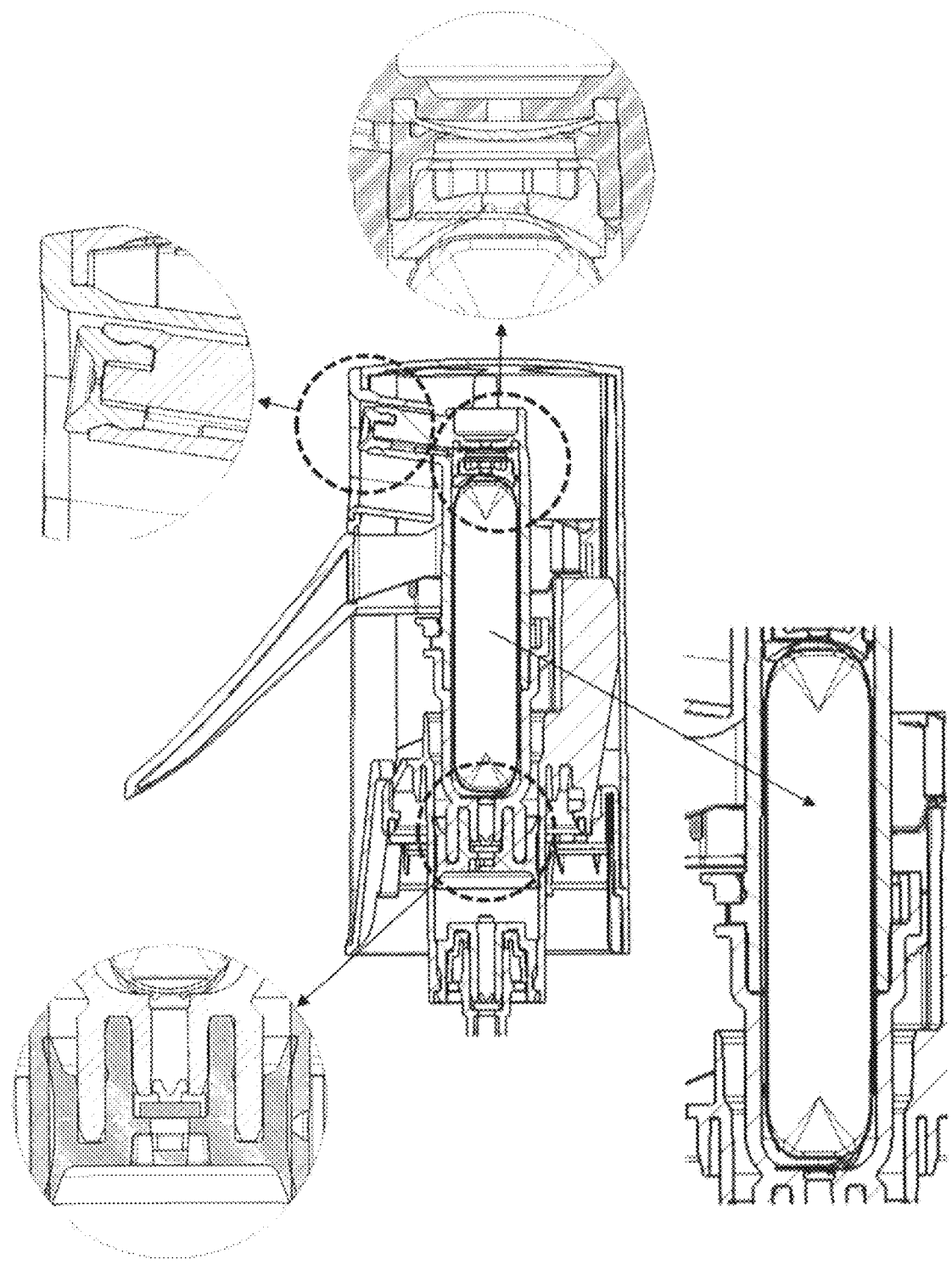
FIG. 6 illustrates correlation of various sprayer elements to control output pressure in a defined band according to exemplary embodiments of the present invention.
Figure 11:
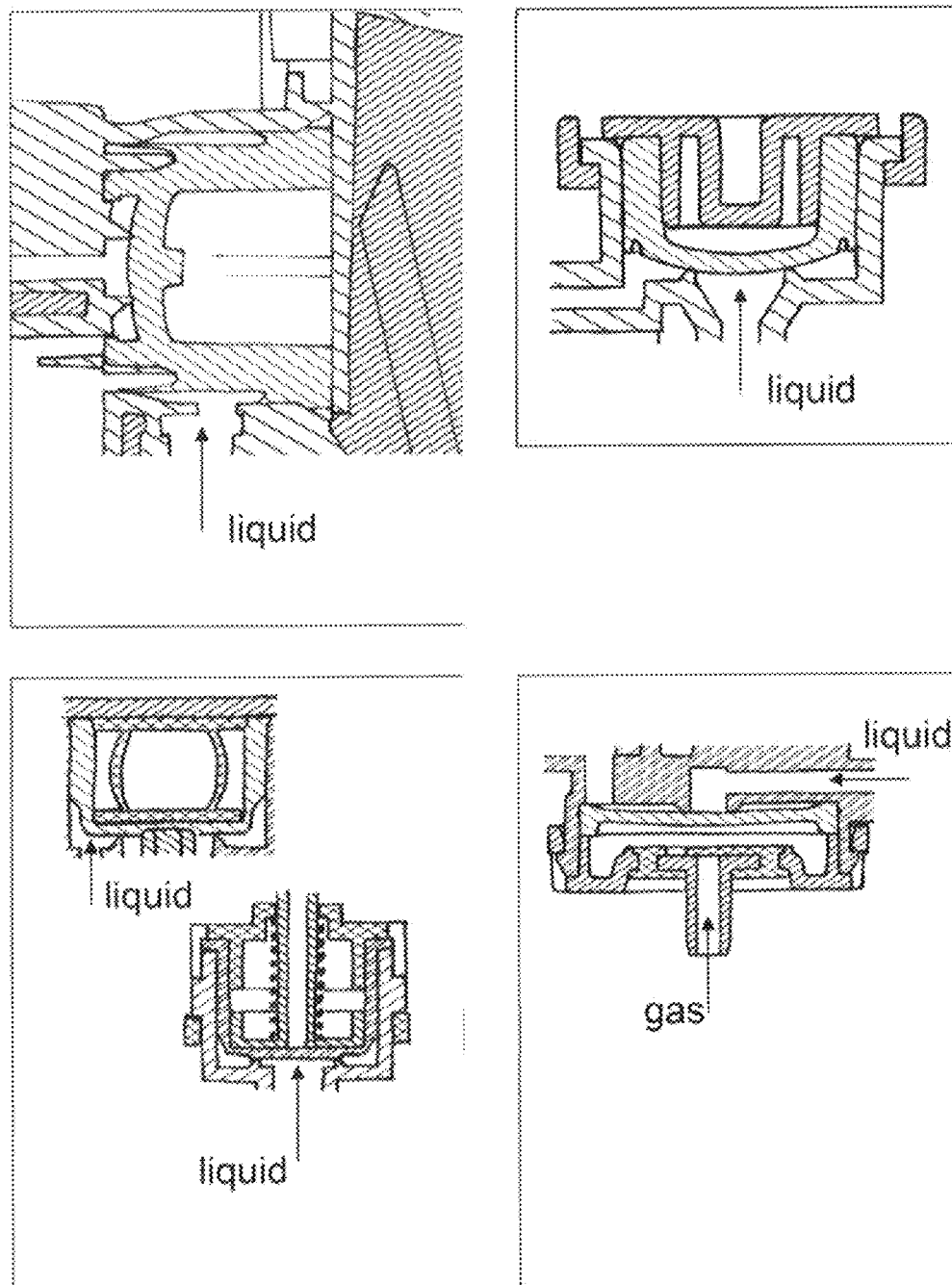
FIG. 11 depicts various pre-compression valves that may be used in exemplary embodiments of the present invention.
Figure 12:
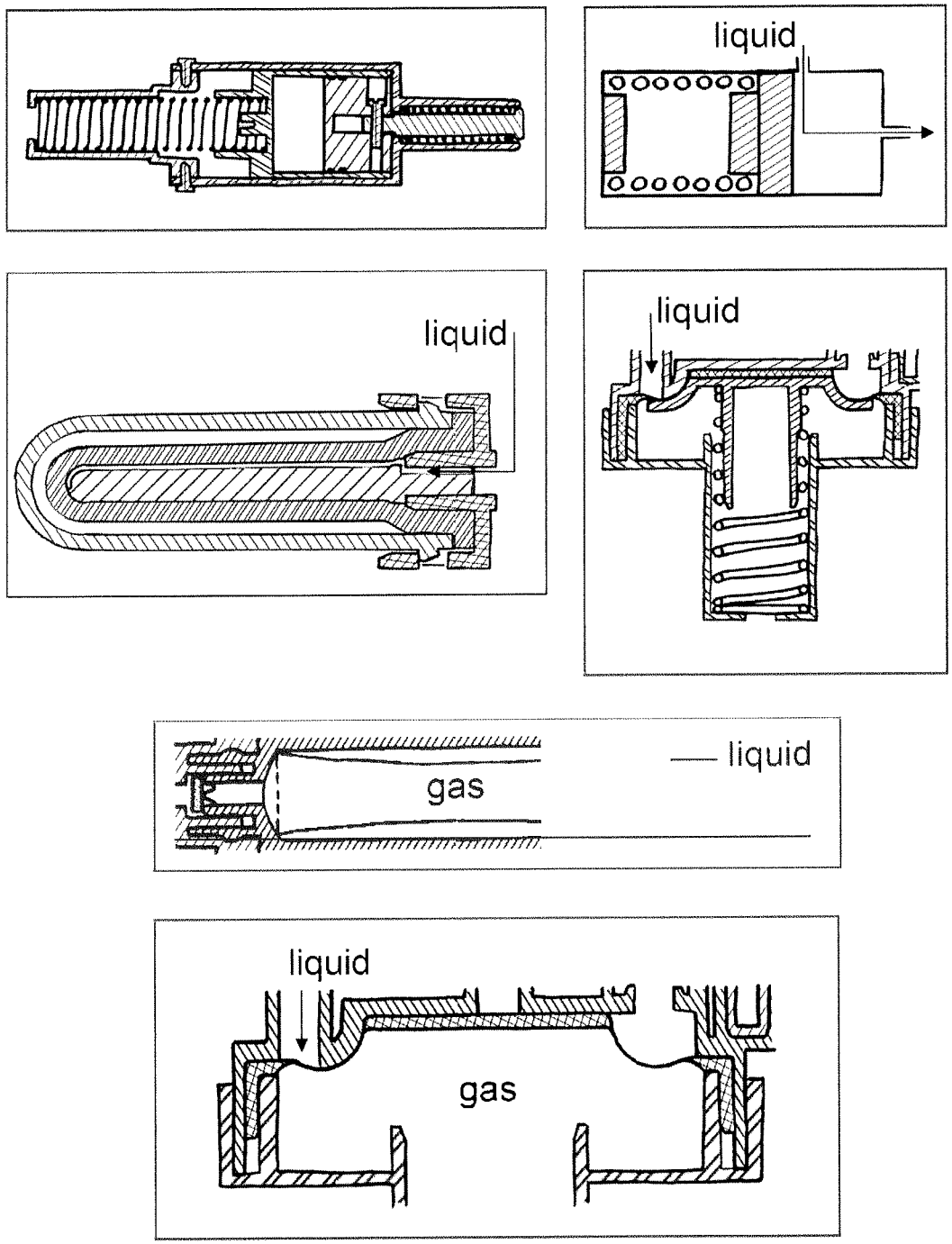
FIGS. 12, 13A, 13B, 13C, 14A, 14B, 15A and 15B describe various buffers that can be used in exemplary embodiments of the present invention.
Figure 13A:
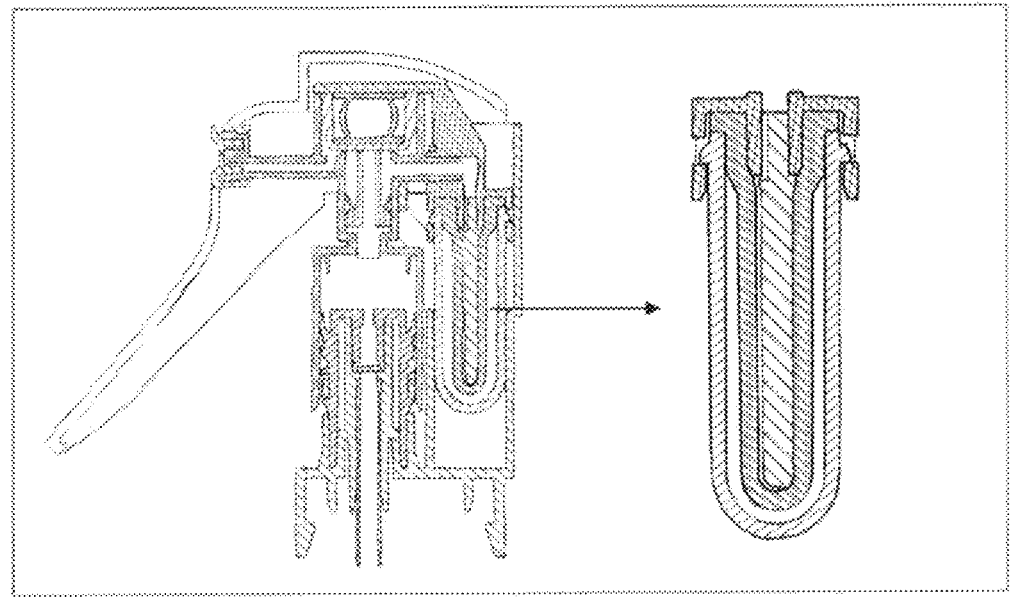
Figure 13B:
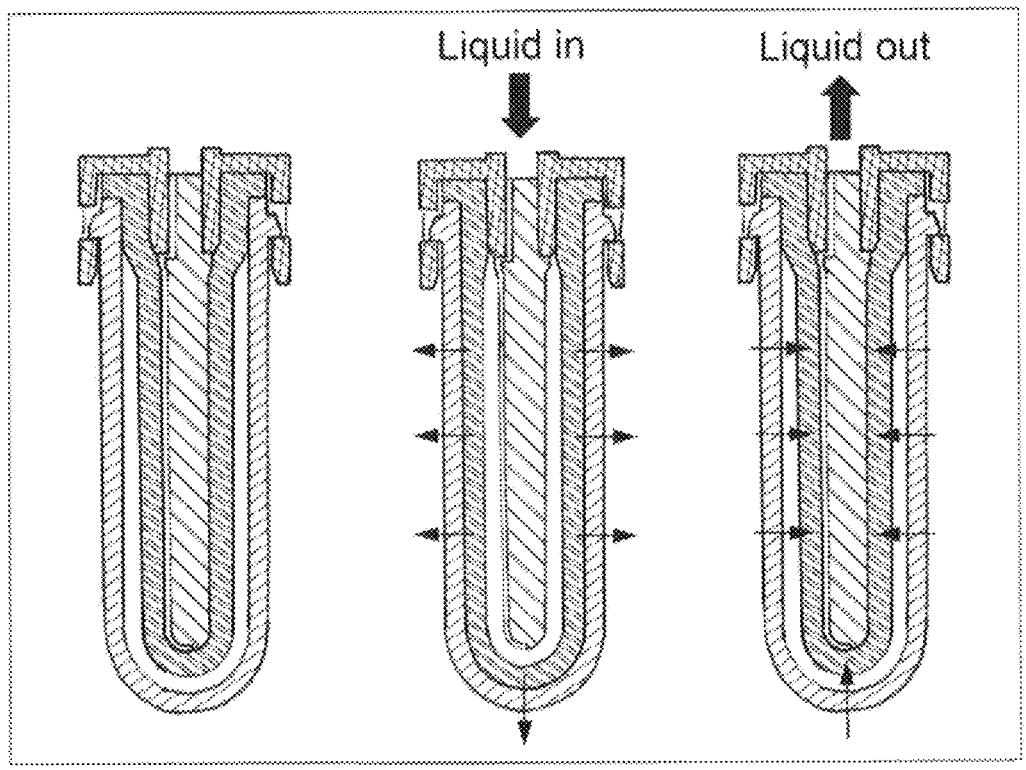
Figure 13C:
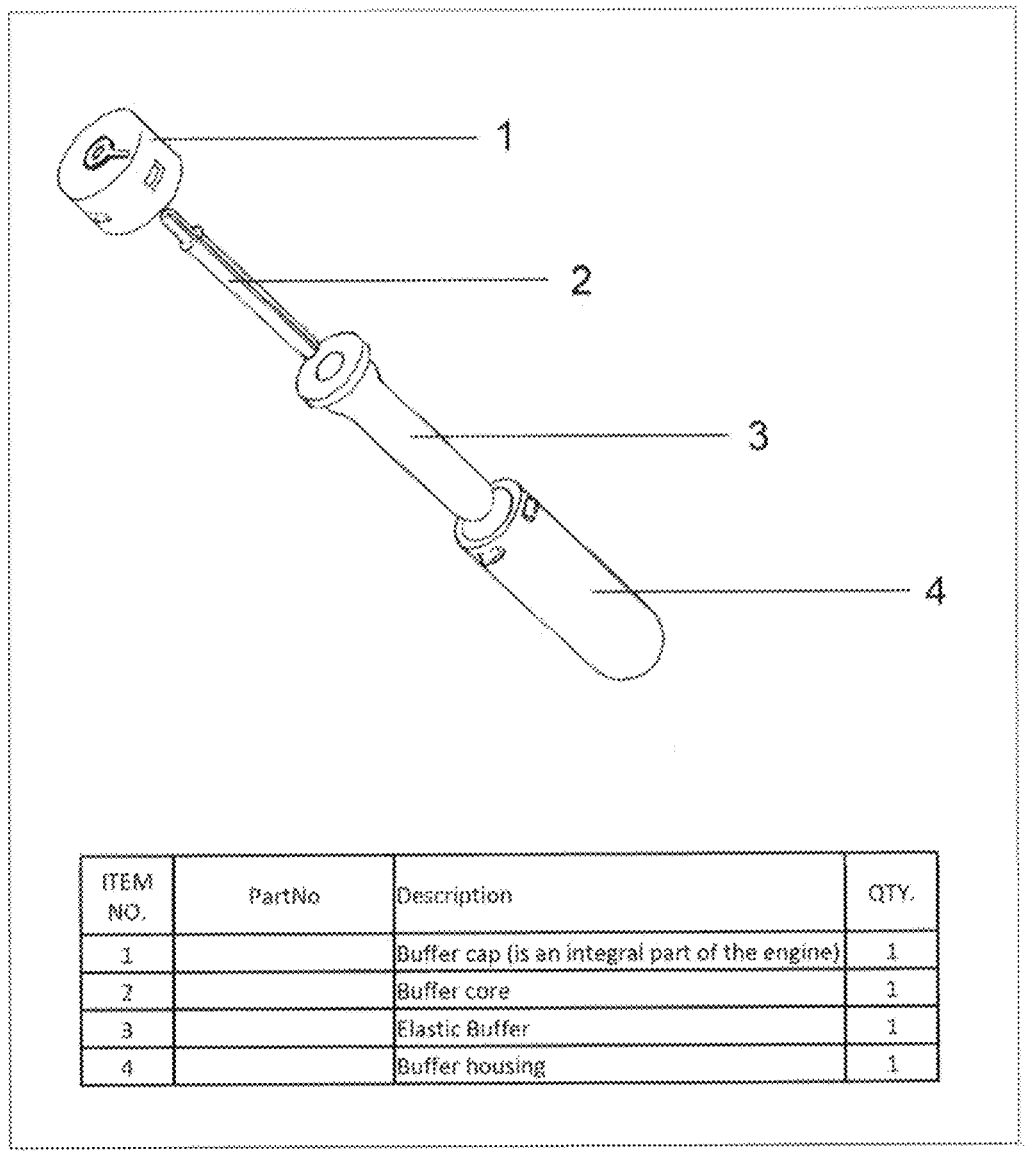
Figure 14A:
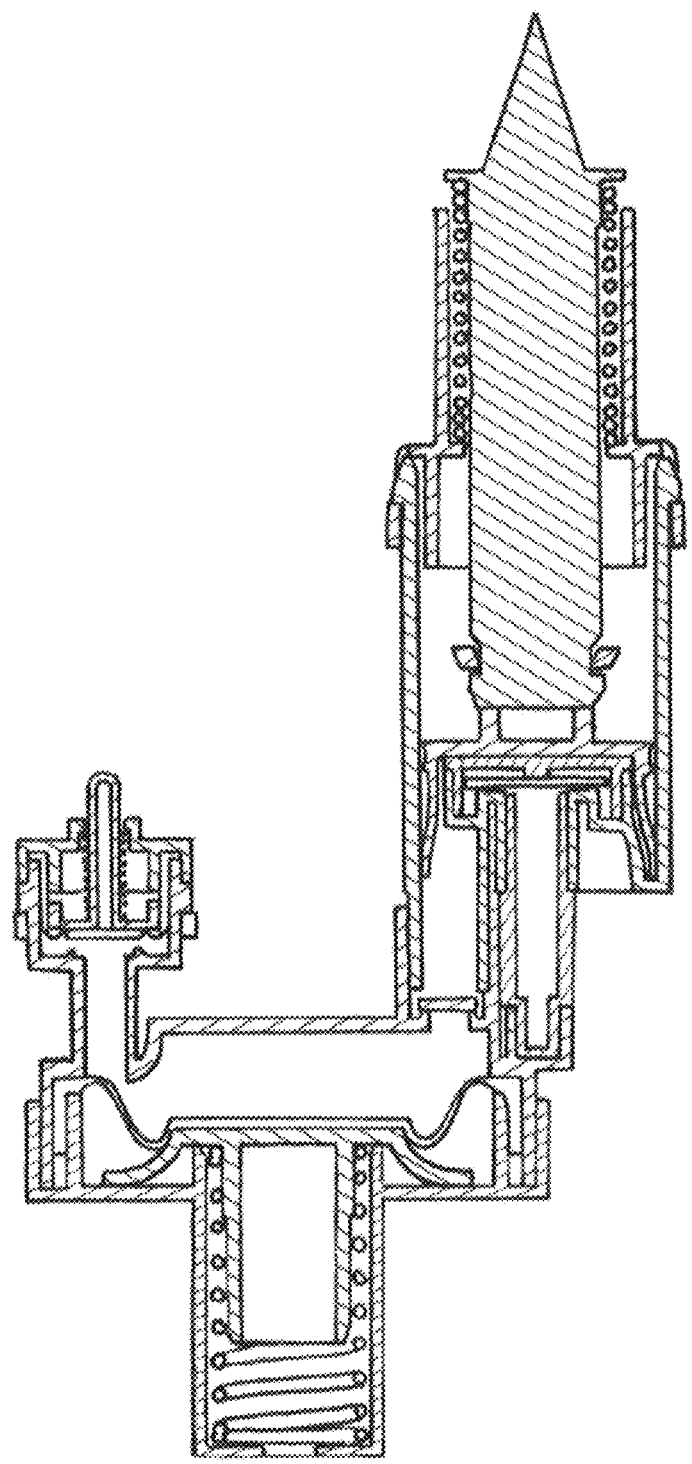
Figure 14B:
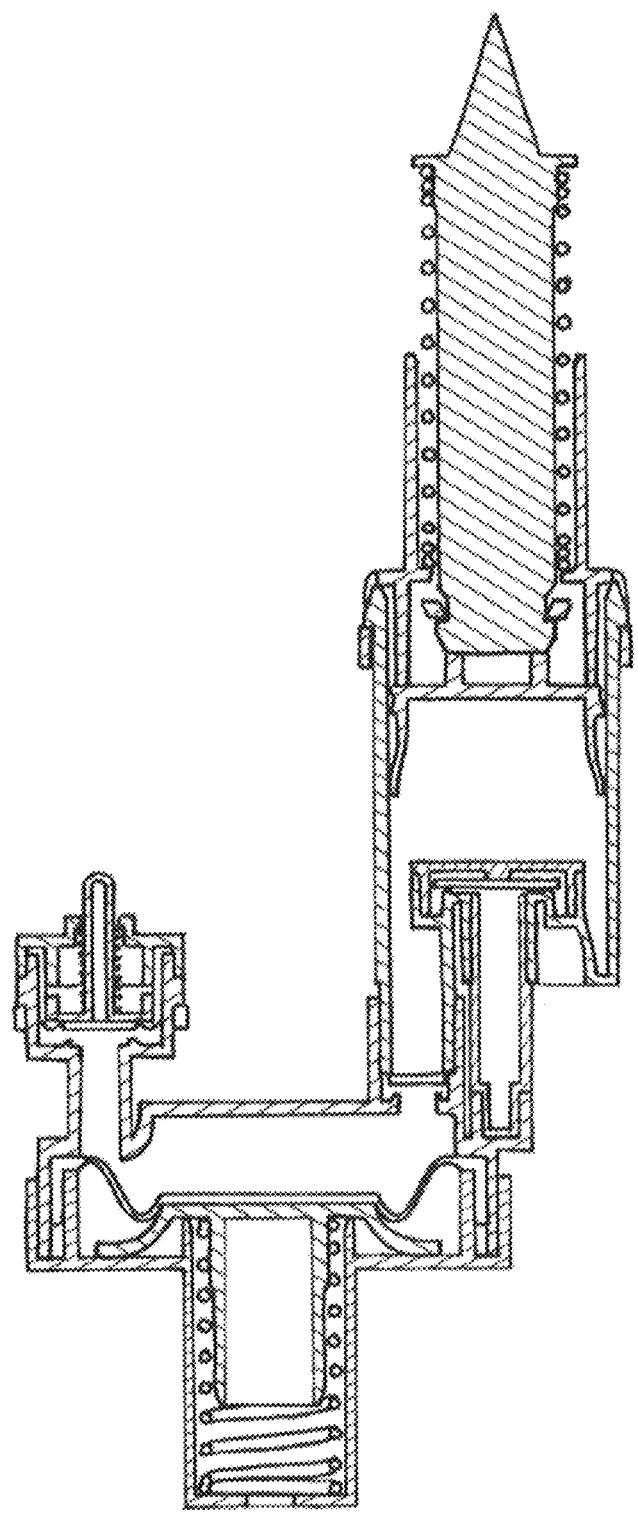
Figure 15A:
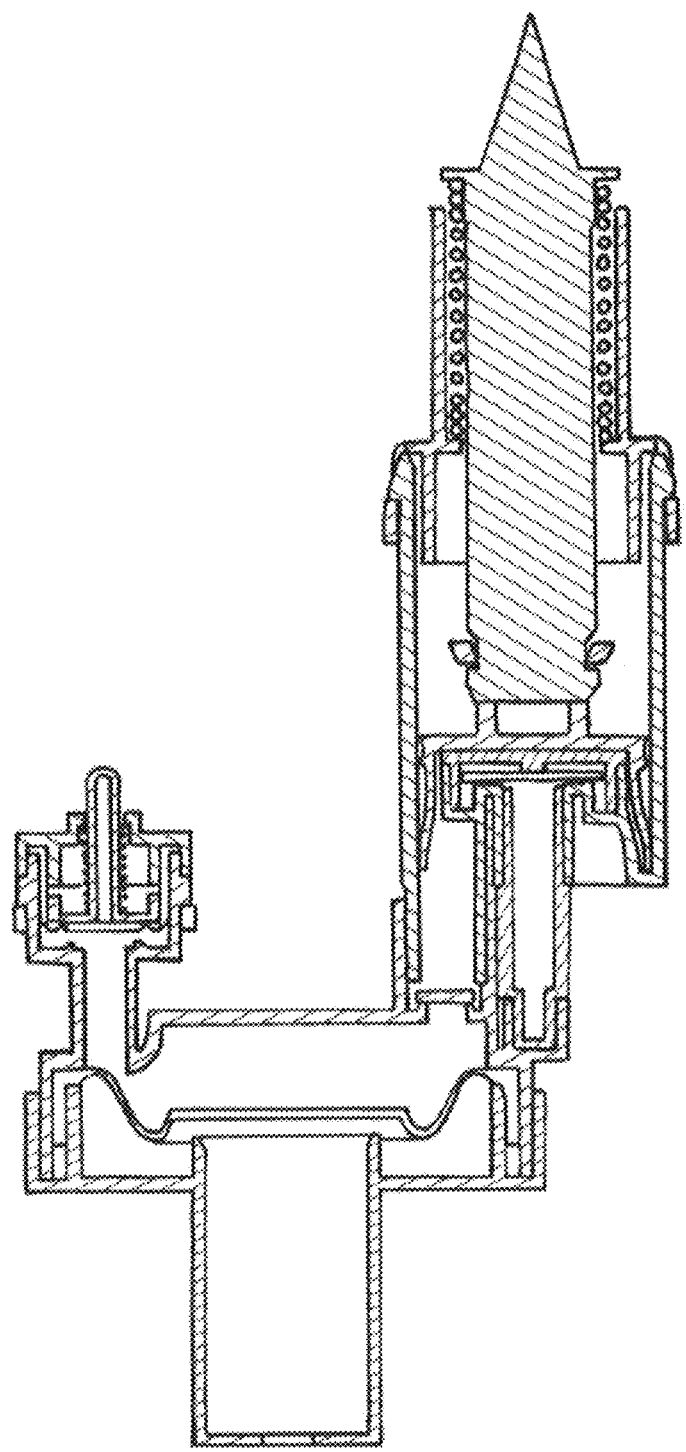
Figure 15B:
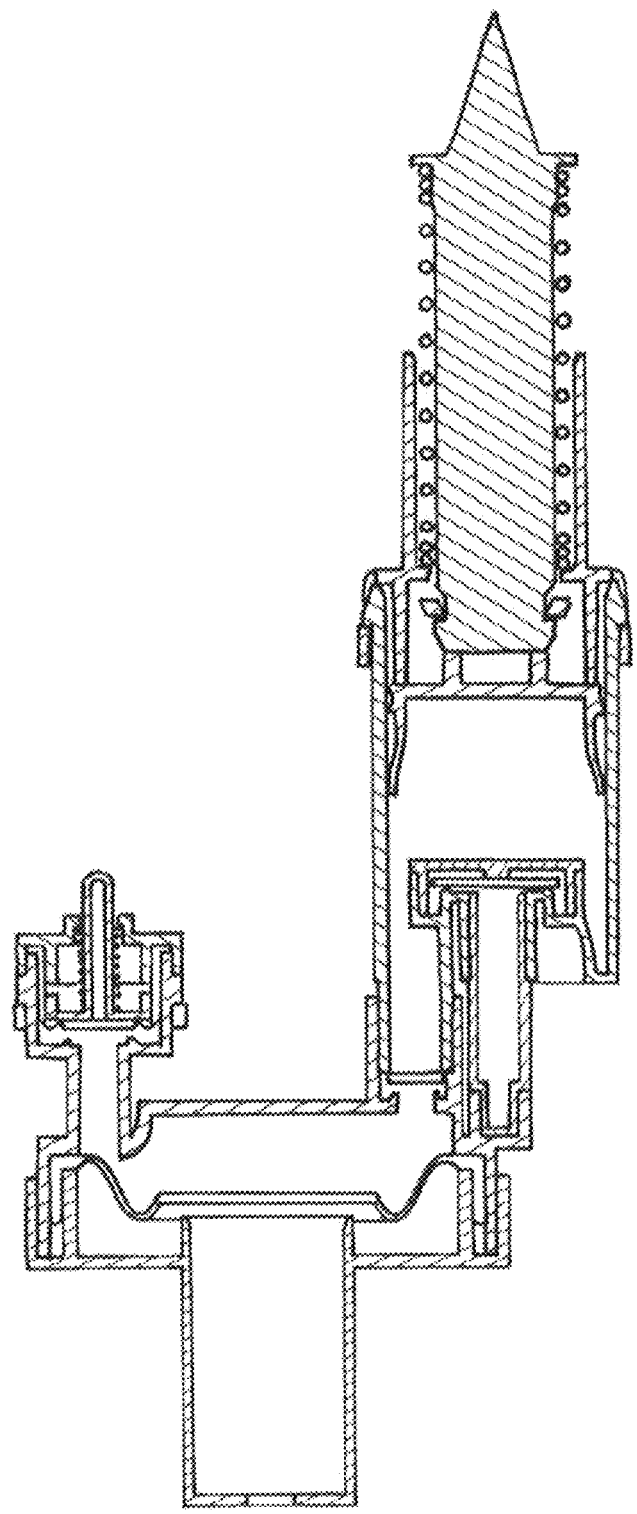

On the other hand, too large droplets are held back by the foamer screen, and drop down, also not reaching the target. FIGS. 4 and 5, as do the rightmost image of FIG. 1, respectively illustrate a solution to the above-described problems with standard pre-compression sprayers.

As shown in FIG. 4, DuO1 technology avoids the issues which evolve when using a pre-compression sprayer. To do so, it avoids the pressure peaks which cause the droplet sizes to be too small, and makes the range of droplet sizes smaller. In other words the pressure range in which the dispenser operates needs to be made smaller.

DuO1 technology does this because the amount of liquid displaced by the pump which cannot leave the nozzle within a given dispense time causes pressure peaks. This overflow of liquid needs to be temporarily stored. DuO1 stores this liquid within a buffer. The pressure peak is then avoided and makes the pressure range smaller. When no more liquid is displaced by the pump, the buffer releases* the stored liquid. The buffer releases the liquid either through the nozzle (continuous or prolonged output) or by return to the piston chamber or container (direct stop). By coordinating the components of the DuO1 technology, a tailor fit dispenser can be created to fit any specified performance requirements.

A DuO1 technology equipped dispenser includes at least: a pump engine (stroke volume/absolute flow at a certain stroke rate); a pre-compression outlet valve (opening/closing pressure); an orifice/nozzle (performance at a certain flow); and a buffer (overflow storage capacity, overflow storage pressure).

It is desired to avoid the issues which come about when using a standard pre-compression sprayer. In order to do so it is necessary to avoid the pressure peaks at the top of a down stroke cycle which cause the droplet sizes to be too small.

Therefore we need to make the range of droplet sizes smaller. In other words, the pressure range in which the dispenser operates needs to be narrowed. In exemplary embodiments of the present invention this is done as follows. The amount of liquid displaced by the pump which cannot leave the nozzle within the given dispense time, causes the pressure peaks. This overflow of liquid needs to be temporarily stored. This liquid can be stored within a buffer in exemplary embodiments of the present invention. The pressure peak can then be avoided and this makes the pressure range smaller. When no more liquid is displaced by the pump the buffer releases the stored liquid. The buffer releases the liquid either through the nozzle (continuous or prolonged output) or returns the liquid to the piston chamber or container (direct stop). The difference between continuous or prolonged output and direct stop is whether or not a one-way valve is provided between the buffer and the piston chamber or not. If the valve is provided then liquid cannot leave the buffer in a backwards direction running back to the piston chamber and therefore the sprayer exhibits continuous prolonged output. If there is no such one way valve any liquid remaining in the buffer can return to the piston chamber and be used in the next downspout.

By synchronizing, or coordinating, the components of an exemplary DuO1 sprayer a dispenser can be created that is tailor-made to fit the performance requirements of any user or customer. The narrow output range and concomitant droplet size range that is possible with an inventive DuO1 sprayer is illustrated in FIG. 4.

Therefore in exemplary embodiments of the present invention, a DuO1 equipped dispenser includes at least a pump engine (stroke volume/absolute flow at a certain stroke rate), a pre-compression outlet valve (opening/closing pressure), an orifice/nozzle (performance at a certain flow) and a buffer (overflow storage capacity, overflow storage pressure).

FIG. 5 illustrates further details of the correlations between elements of an exemplary DuO1 sprayer. The opening pressure of the outlet, responsible for the larger droplet sizes and the maximum dispensing pressure, responsible for the smaller droplet sizes, are the controls which can be used to set the limits of the pressure range/droplet size spread. The right side of FIG. 5 illustrates a desired pressure level/droplet size which can be provided by a specification or by a user or by a customer. Given the desired pressure level/droplet size in exemplary embodiments of the present invention, a DuO1 sprayer can be created which outputs a range of pressures or droplet sizes centered on the desired pressure size and running from {p minus delta p} and {p plus delta p}. The minus delta p is the opening pressure of the outlet valve and the p plus delta p is the maximum dispensing pressure at a certain stroke rate.

When a desired pressure level/droplet size and a range (limits) is given the DuO1 technology enables this to be achieved by setting the controls mentioned above.

When a desired pressure level/droplet size and a range is given in exemplary embodiments of the present invention DuO1 technology and it allows this to be achieved by setting the controls mentioned above. As noted above, output pressure tends to be at the buffer pressure.

FIG. 6 illustrates the various elements of a DuO1 sprayer which need to be correlated to provide the desired pressure range illustrated in FIG. 5. With reference to FIG. 6 there is a pump, a dome valve, a buffer, and an outlet orifice. The maximum dispensing pressure is a function of the flow of the pump at a certain stroke rate, the flow at which the orifice/nozzle performs, and the capacity and pressure of the buffer. The opening and closing pressure of the pre-compression outlet valve, is, in exemplary embodiments of the present invention, always set lower than the default buffer pressure. The default buffer pressure of the buffer gives all liquid stored in the flow needed for the orifice/nozzle to perform. The flow of the pump at a certain stroke rate will always be greater than the flow at which the orifice nozzle performs. This ensures that there will be an overage of liquid in every down stroke which cannot possibly be handled by the throughput of the office or nozzle. The difference between the flow of the pump at a certain stroke rate and the flow at which the orifice/nozzle performs is the overflow and the overflow is the excess liquid that can be delivered between strokes. Therefore the capacity of the buffer should be greater than or equal to the overflow such that the buffer can always take up the overflow and then allow it to be released later. If the buffer could not take up the entire overflow in its capacity pressure would rise and the situation seen in the standard pre-compression valve would occur in that higher pressures and smaller droplet sizes at the peak of a down stroke would ensue. The maximum dispensing pressure multiplied by the surface area of the piston or diameter multiplied by the trigger torque equals the operating force. When peak pressures exist in a system (unlike the DuO1 system described herein) the trigger force required to be supplied by a user is thus higher when such peak pressures prevail in a sprayer. Thus, it takes more force to continue the spraying operation in such sprayers. This is in contrast to the DuO1 systems described herein, where buffering eliminates the peak pressures, and the system operates most of the time at an essentially constant lower pressure (i.e., the upper horizontal line in FIG. 5—maximum dispensing pressure).

Thus, in a sprayer of the type shown FIG. 6, the maximum dispensing pressure is correlated to:

The flow of the pump at a certain stroke rate,

The flow at which the orifice/nozzle performs, and

The capacity and pressure of the buffer.

Opening and closing pressure of the pre-compression outlet valve<The default buffer pressure. The default buffer pressure of the buffer gives all liquid stored the flow needed for the orifice/nozzle to perform.

The flow of the pump at a certain stroke rate>The flow at which the orifice/nozzle performs, creating overflow. The difference between the flow of the pump at a certain stroke rate and the flow at which the orifice/nozzle performs, (which is the overflow)≥than that which the orifice needs to perform in between strokes of the before mentioned stroke rate. The capacity of the buffer≥The overflow.

The (maximum dispensing pressure)×(Surface area of piston bore diameter)×(Trigger torque)=Operating force.

Figure 9:
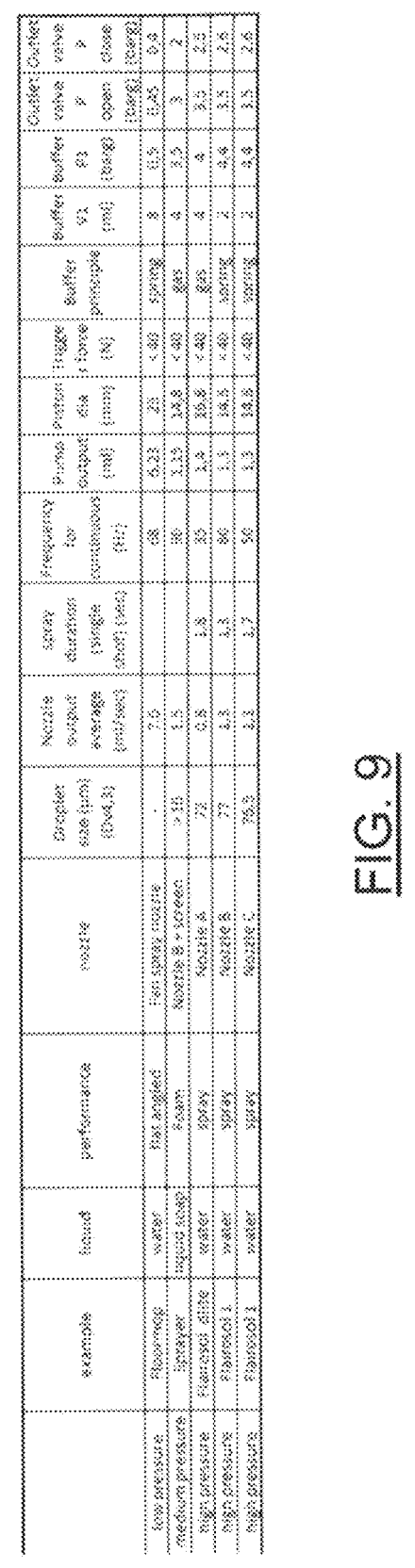

FIGS. 7-9 illustrate further details of correlation of various elements within an exemplary DuO1 sprayer. With reference to FIG. 7, superimposed on a standard pressure time curve is a white band which is a narrow range of pressures between Pmin and Pmax which shows a consistent output pressure of a DuO1 sprayer. If smaller droplets are desired this pressure bandwidth is high as shown in FIG. 7.

FIG. 7 thus depicts a high pressure bandwidth to create an output range with smaller droplets. With high pressures a small piston diameter is needed to maintain an ergonomic operating force. A maximum possible piston stroke is set to maintain an ergonomic actuation of the trigger. The (small piston diameter)×(the maximum piston stroke)=a small displacement volume. The small displacement volume, having a large flow caused by the high pressure, requires a nozzle/orifice with a lower flow. So the large flow, small liquid volume is partially blocked by the low flow orifice. This overflow is stored in the buffer.

FIG. 8 illustrates a lower bandwidth of output pressure which is a low pressure bandwidth to create an output range with larger droplets. Here to achieve this result a low pressure dome and buffer are used. FIG. 8 thus depicts a low pressure bandwidth to create an output range with larger droplets. This uses a low pressure dome and buffer. With low pressures a larger piston diameter can be used to maintain an ergonomic operating force. A maximum possible piston stroke is set to maintain an ergonomic actuation of the trigger. The (larger piston diameter)×(the maximum piston stroke)=a large displacement volume. The large displacement volume having a low flow caused by the low pressure, can use a nozzle/orifice with a larger flow to generate large droplets. So here the large liquid volume needs to have overflow with a larger flow nozzle. This overflow is stored in the buffer. This is essentially the opposite of the situation illustrated in FIG. 7.

Generalizing from FIGS. 7 and 8 one can easily see that by manipulating the various parameters of an exemplary DuO1 sprayer any desired output pressure band, whether low, medium or high, can be achieved. FIG. 9 is the table of possible correlation values for such a range of pressure bands and providing example uses for such pressure bands and example liquids. It is noted that the frequency for continuous spray is the number of strokes per minute to have an output in between strokes. And the spray duration single stroke is the time between the start and stopping of dispensing when a user makes one stroke and holds the trigger for prolonged spray.

FIG. 10 illustrates various pre-compression technologies which can be used for the dome valve, or pre-compression valve. Pre-compression technology can be used in all kinds of dispensing applications. For example, Floor mops, Window washers, Sprayers, etc. Pre-compression technology can be used in a wide pressure-range of dispensing applications, from low to high pressures. Pre-compression valves can be made in all kind of types, configurations and combinations of configurations and materials, for example, as shown in FIG. 10: (1) All plastic elastic dome valve with integrated inlet valve; (2) All plastic elastic dome valve; (3) All plastic Binary dome valve; (4) Spring loaded membrane valve; and (5) Membrane valve.

Pre-Compression Valves

FIG. 11 illustrates various types of pre-compression valves. With reference thereto, there is an all plastic elastic dome valve (with and without integrated inlet valve). Here the closing force of the valve and therefore the force needed to open the valve is determined by the elasticity of the material and the pre-tension in assembly. Additionally, there is a spring loaded membrane valve. Here the closing force of the valve and therefore the force needed to open the valve is determined by the force of the metal or plastic spring placed behind the membrane. The membrane is the seal between spring and liquid. Finally, there is a membrane valve. Here the closing force of the valve, and therefore the force needed to open the valve, is determined by gas pressure behind the membrane. The gas pressure acts like a spring. The membrane is the seal between gas and liquid.

Buffers

FIG. 12 illustrates various types of buffers that can be used in exemplary embodiments of the present invention. With reference thereto, there is a spring loaded buffer, where the buffer pressure is set by the properties of the metal spring behind the buffer piston. The buffering volume is set by the maximum travel of the buffer piston. Additionally, there is an elastic material buffer, where the buffer pressure is set by the properties of the buffer, material, thickness. The buffering volume is set by size of the elastic part and the buffer housing volume which limits the stretch of the elastic part. There is a gas loaded buffer, where the buffer pressure is set by the size of the buffer bag and the pressure of the gas inside the bag. The buffering volume is set by the size of the buffer bag. There is a spring loaded membrane buffer, where the buffer pressure is set by the properties of the metal spring behind the membrane. The buffering volume is set by the maximum travel of the membrane. Finally, there is a membrane buffer, where the buffer pressure is set by gas pressure put behind the membrane. The gas pressure acts like a spring. The membrane is the seal between gas and liquid. The buffering volume is set by the maximum travel of the membrane.

FIGS. 13A, 13B and 13C respectively illustrate assembly and operation of an exemplary elastic material buffer. With reference to FIG. 13B, the elastic buffer is placed over a core, and liquid is pumped between the buffer and core. The buffer will thus stretch. Then, liquid is pushed out of the buffer until the buffer pushes against the core.

FIGS. 14A, 14B, 15A and 15B respectively illustrate operation of a spring loaded membrane buffer, and a membrane buffer, respectively. As shown in FIG. 14A, when the piston moves down, liquid from the piston chamber is pushed, via the buffer, towards the nozzle(s). The overflow of liquid which cannot leave the nozzle(s) is stored in the buffer (01). The buffer spring compresses and the membrane moves down. When the piston moves up, as shown in FIG. 14B, the spring pushes up the membrane of the buffer. The overflow of liquid stored in the buffer is pushed toward the nozzle(s).

As shown in FIG. 15A, when the piston moves down, liquid from piston chamber is pushed via the buffer towards the nozzle(s). The overflow of liquid which cannot leave the nozzle(s) is stored in the buffer (01). The gas behind the membrane compresses and the membrane moves down. As shown in FIG. 15B, when the piston moves up, the gas behind the membrane pushes up the membrane. The overflow of liquid stored in the buffer is pushed toward the nozzle(s). It is here noted that the buffers of FIGS. 14A and 14B and 15A and 15B are not in line with the piston chamber.

DuO1 Engines

Figure 16A:
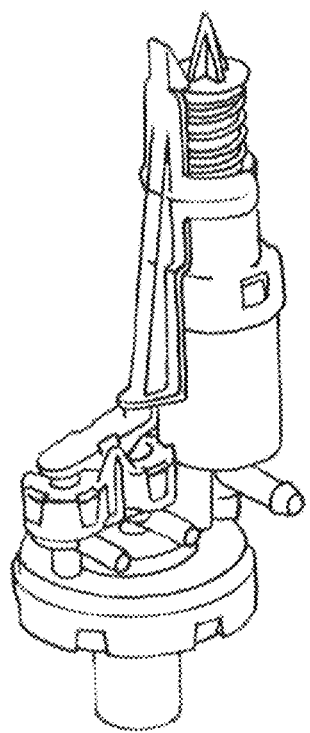
FIGS. 16A, 16B, 16C, 17A, 17B and 17C depict the various functionalities sprayer engines can have in exemplary embodiments of the present invention.
Figure 16B:
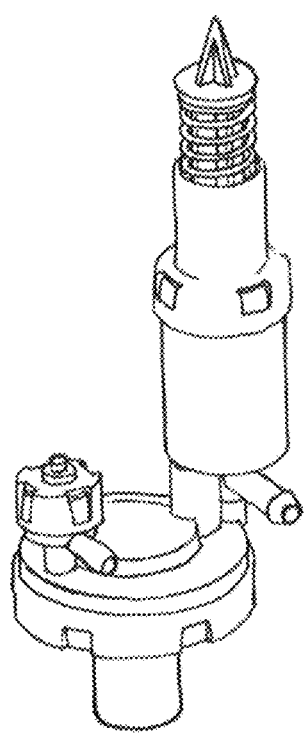
Figure 16C:
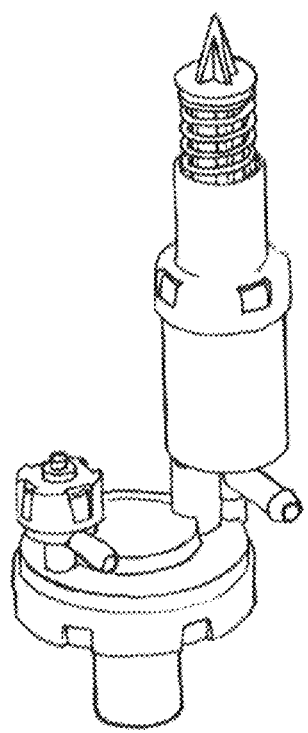
Figure 17A:
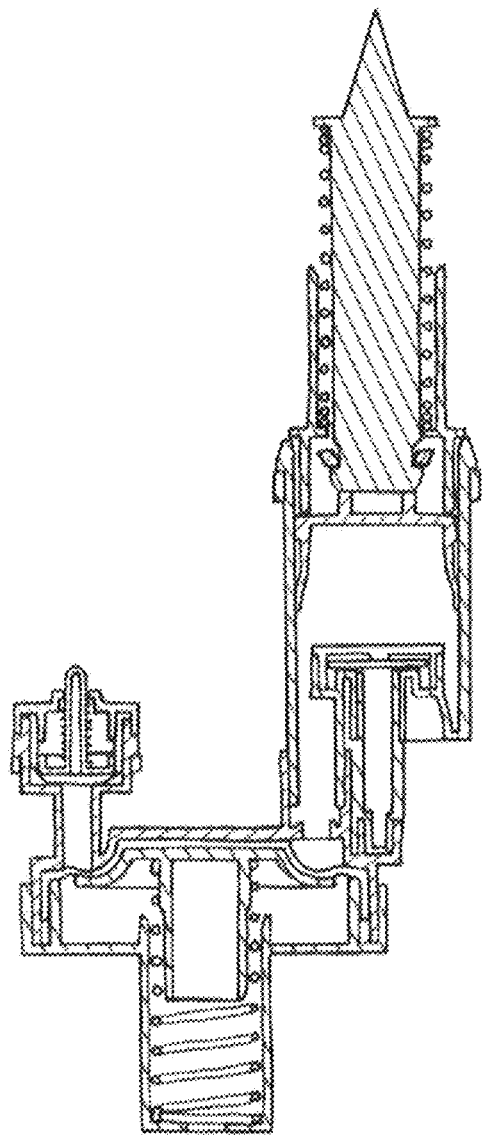
Figure 17B:
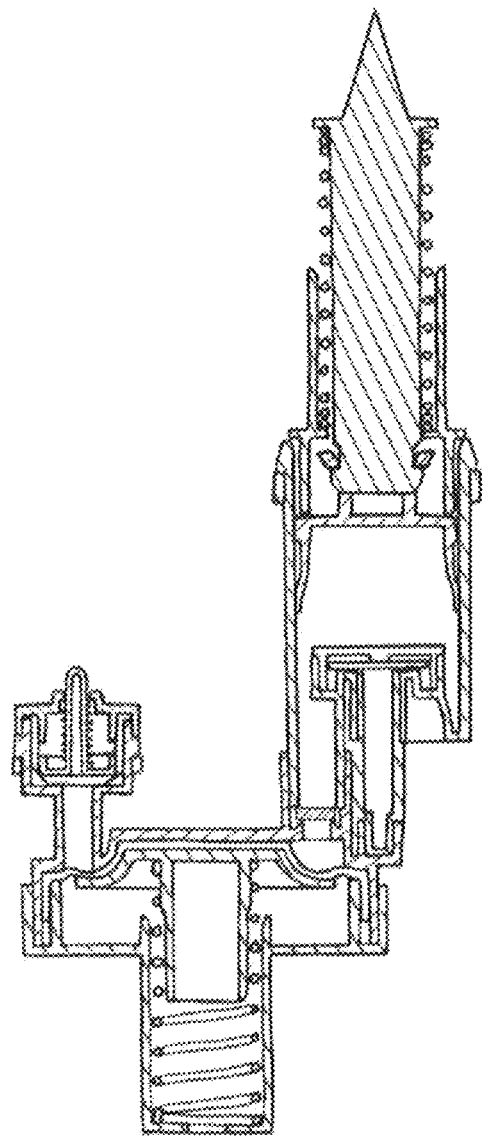
Figure 17C:
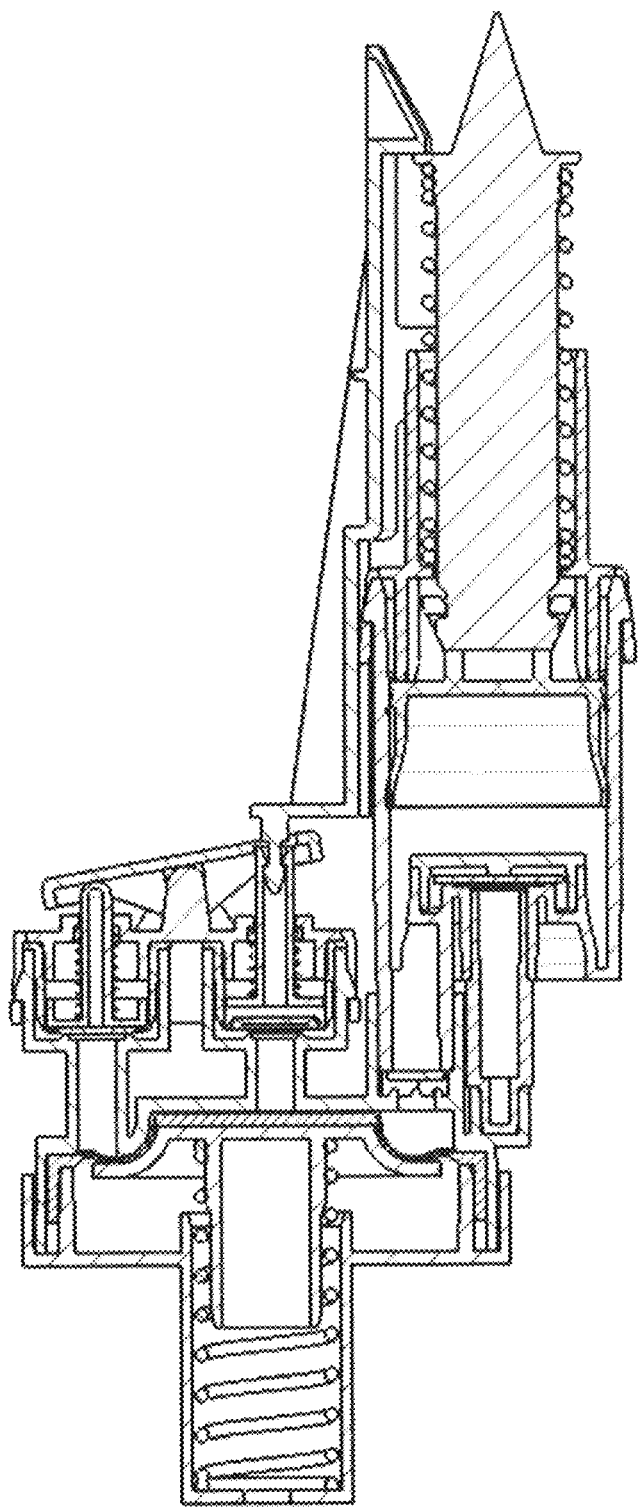

FIGS. 16A, 16B and 16C respectively illustrate how in exemplary embodiments of the present invention, various DuO1 engines may be used, including a continuous stop engine, a continuous spray engine, and one with direct stop functionality. Cross sections of these engines, and further details, are provided in FIGS. 17A, 17B and 17C, respectively.

Thus, for DuO1 Engines:

These engines are based upon the DuO1 platform technology.

They use a buffer to store the overflow of liquid.

Additionally, these engines can be fitted with the OnePak platform technology.

All DuO1 Engines can be executed in 3 main functionalities: (01) Direct Stop, (02) Continuous (=Direct Stop+ One way valve), and (03) Continuous-Stop (=Continuous+ Release valve).

Within these functions, parameters can be changed to meet custom requirements.

Parameters that may be changed include, for example:

Output volume (stroke and bore of the piston);

Working pressures (pressure set of buffer and pre-compression valve, nozzle configuration); and Spray performances (nozzle configuration).

Lock Out

FIGS. 18A, 18B, 18C, 18D, 19A, 19B, 19C, 19D, 19E, 20A and 20B respectively illustrate exemplary lock-out systems that can be used in exemplary embodiments of the present invention. A lock out system prevents a different supplier's bottle from being used with a given sprayer head. It also prevents users from refilling a container supplied with a sprayer with competitor's or imitator's liquids. Such a lock out system can be controlled and owned by a sprayer manufacturer, who provides and controls the various "keys" to open each bottle. In exemplary embodiments of the present invention, a sprayer manufacturer, provides, owns and controls the lock-out system. A unique key is given to a customer to protect against competitors within his own field of use during a licensing period. The lock out prevents competitors from selling products compatible with the dispenser, preventing consumers to refill the bottle with competitor products. The lock out thus acts as an interface between a bottle and the dispenser.

As noted, the lock out incorporates the inlet valve of the pump system; this means that the dispenser cannot operate without being connected to the lock out. The lock-out has unique 'key' features, dedicated to a customer. The geometry of the lock-out can be changed to create these unique features. For example: the diameter, depth and added geometries. Thus, in general, the lock out geometry has to match the interfacing geometry of the dispenser in order to be connected.

It is noted that to have a dispensing system which is a 100% lock out of competitors, a Flair bottle is to be used. In this case the dispenser does not have to vent a Flair system, or a closed bag within a bag, or container within a container, system needs no venting (and no headspace in the inner container), and the bottle cannot be refilled by drilling a hole in the bottle wall. Any tampering disables the dispensing system.

FIG. 18 illustrates lock out systems for underpressure sprayers. In a lock out for under pressure, the inlet valve can be normally open in the output direction of the bottle. The passage way to the bottle is closed during a compression stroke or when refilling is attempted. Removing the valve disables the use of the bottle, since the valve also acts like the inlet valve of the pump. The passage way to the dispenser is open when the valve rests against the upper valve seat when liquid enters the pump by under pressure. The upper valve seat has openings, providing the passage of liquid. There is a 'Key' interface, a set compatible interface features between lock out and dispensing head, which is customer dedicated.

Figure 18A:
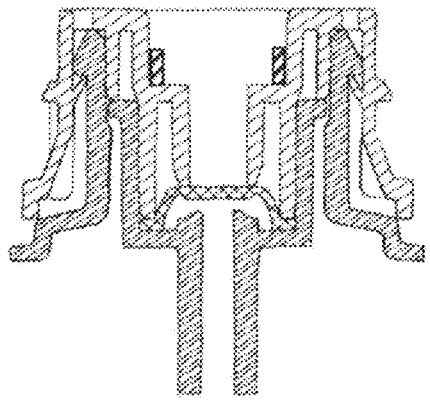
Figure 18C:
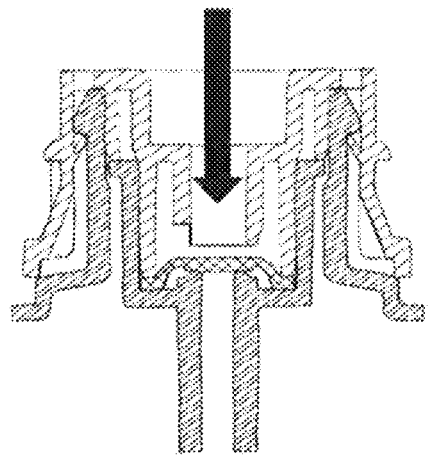
Figure 18B:
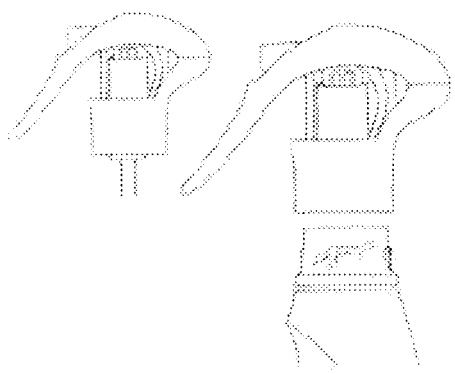
Figure 18D:
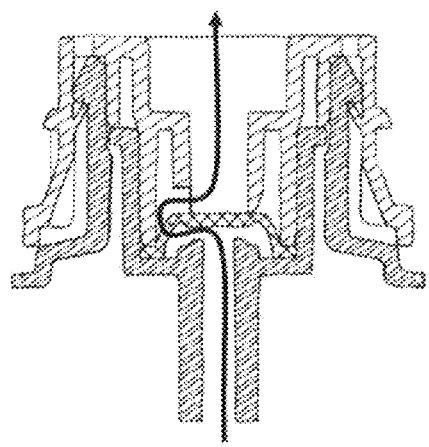
Figure 18A:
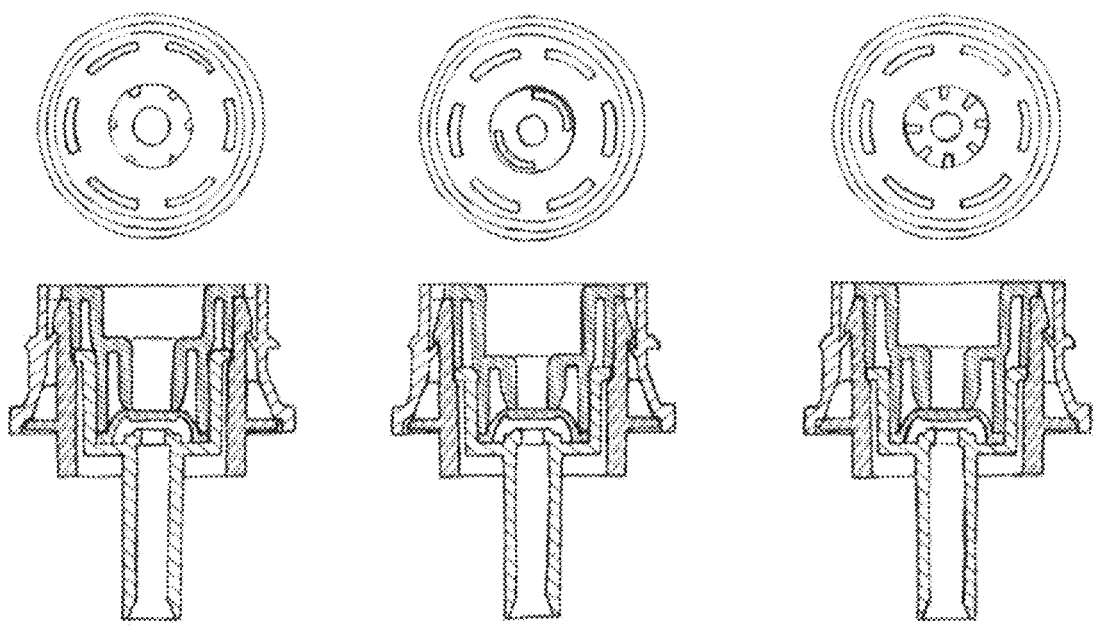
Figure 19A:
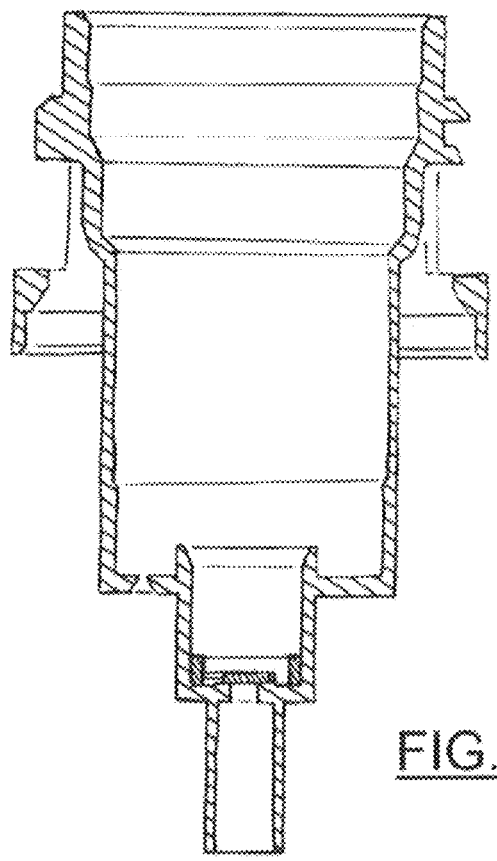
Figure 19B:
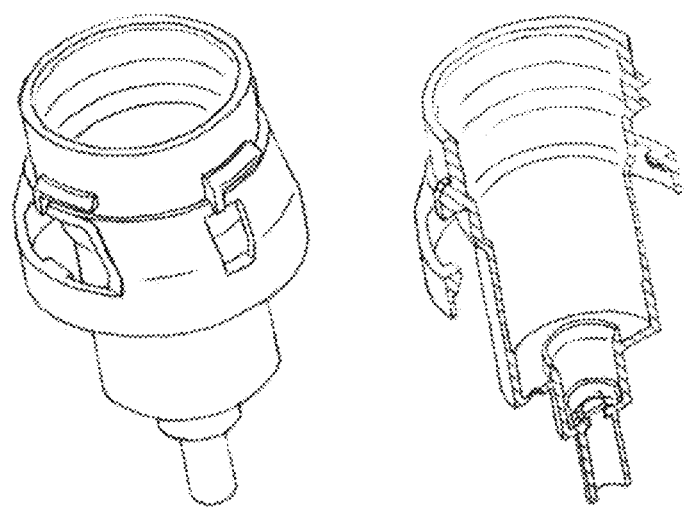
Figure 19D:
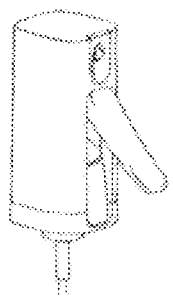
Figure 19E:
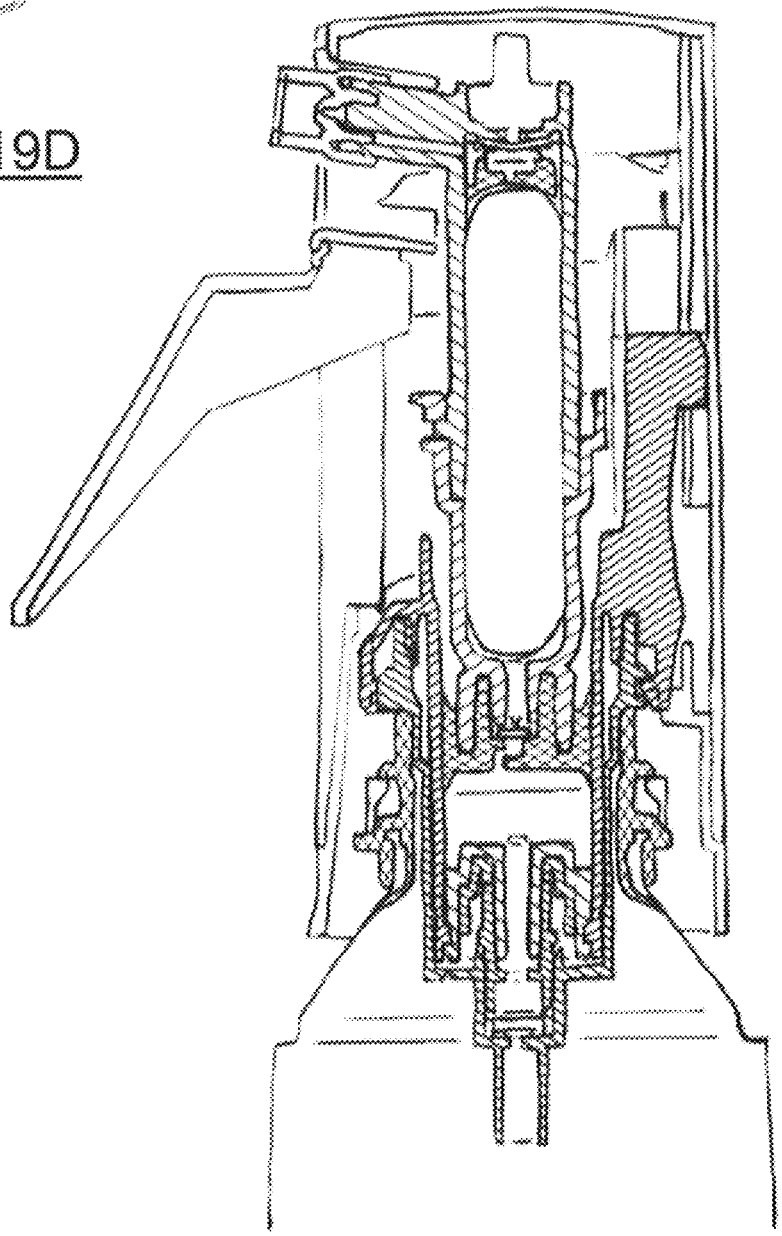

FIGS. 18A, 18B, 18C, 18D, 18Aa, 18Ab and 18Ac respectively illustrate exemplary key parameters that can be varied to create user specific lock out keys. For example, working with various heights and diameters, and rib geometries, as shown in FIG. 18Aa, heights h3 and h4 can be used to lock a custom bottle to a custom lock out key. Moreover, diameter d1, heights h1, h2, and rib feature geometry can be used to lock a dispense head to a custom lock system. The dispenser has to be fitted with matching geometries. For example, when the rib features of the lock out and contra rib features on the dispenser do not correspond, the combination of bottle and dispensing head cannot be made. Thus, a dispenser geometry matching height h1 of example lock out key B of FIG. 18Ab cannot fit to height h1 of example lock out key A of FIG. 18Aa. As well, a dispenser geometry matching diameter d1 of example lock out key A of FIG. 18Aa cannot fit to diameter d1 of example lock out key B of FIG. 18Ab. In exemplary embodiments of the present invention, the sprayer manufacturer can own all such keys and variations, and assign/license to a set of customers or distributors a particular field of use specific to one lock out key. Thus the manufacturer can control which bottles can interoperate with which sprayer heads. Similarly, FIGS. 19A, 19B and 19C respectively illustrate a lock out that can be used with an exemplary sprayer according to the present invention. As shown, there is a 'Key' interface, i.e., a set of compatible interface features between lock out interface on bottle and dispensing head, which is customer dedicated. As noted, these can include a blocking geometry, a certain diameter, and a certain depth.

Figure 20A:
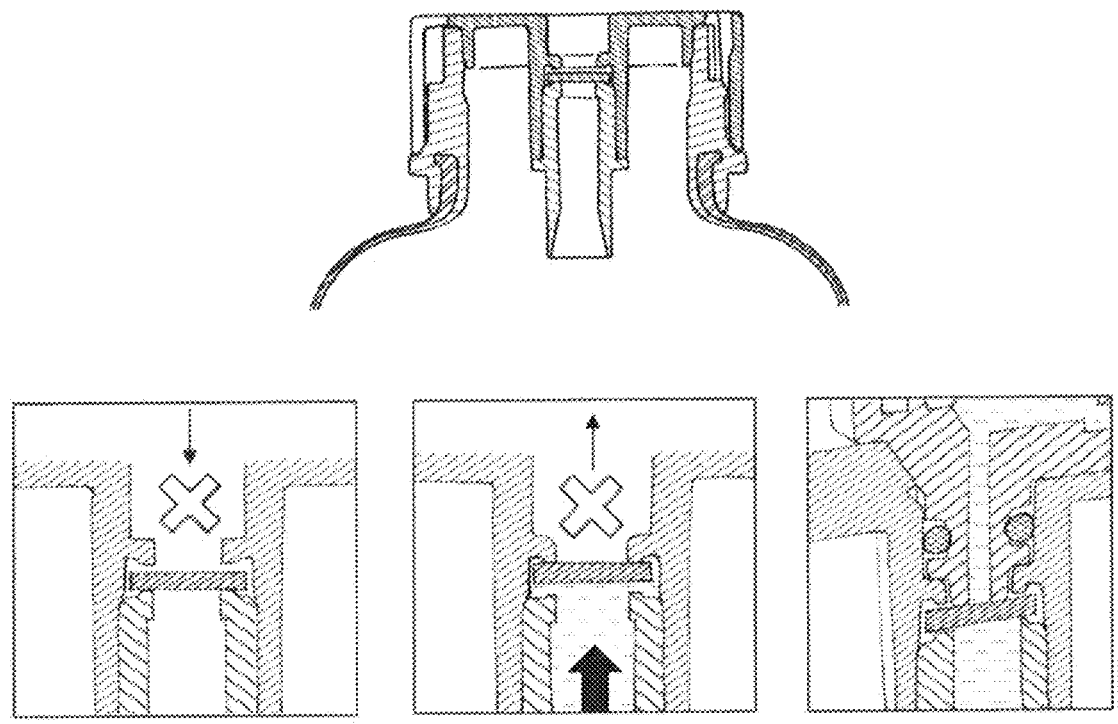
Figure 20B:
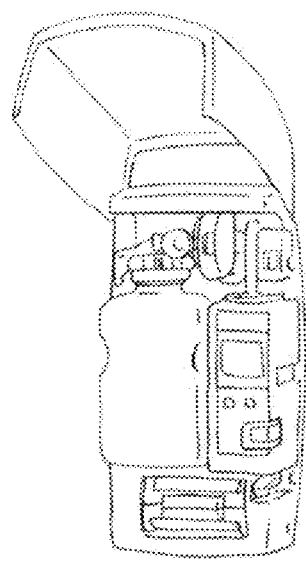

FIGS. 20A and 20B illustrate a lock out system for an overpressure system, where the Flair bottle (bag within a bag, or bottle within a bottle system) is actively pressurized between the layers to squeeze out the liquid or product in the inner layer. Such an overpressure system is disclosed, for example, in U.S. patent application Ser. No. 13/467,971, filed on May 9, 2012. As shown, in a lock out for over pressure, the inlet valve is normally closed in inlet and outlet direction. There is a 'Key' interface, a set compatible interface features between lock out and dispensing head, which is customer dedicated.

The passageway to the bottle is closed during a compression stroke or when refilling is attempted. Removing the valve disables the use of the bottle, since the valve also acts like the inlet valve of the pump. When the bottle is disconnected from the dispenser, the valve is pushed to close by the liquid pressure in the bottle.

Liquid will not leave the bottle. When bottle and dispenser are connected, a protrusion part of the dispenser needs to hold the valve in intermediate position it not touching both seat valves. When the pump performs a compression stroke, the valve is pushed on the lower valve seat, closing the passage way to the bottle.

During the recovery stroke of the pump, liquid can enter the pump, because the protrusion prevents the valve to close on the upper valve seat.

Flairosol D'Lite

Figure 21A:
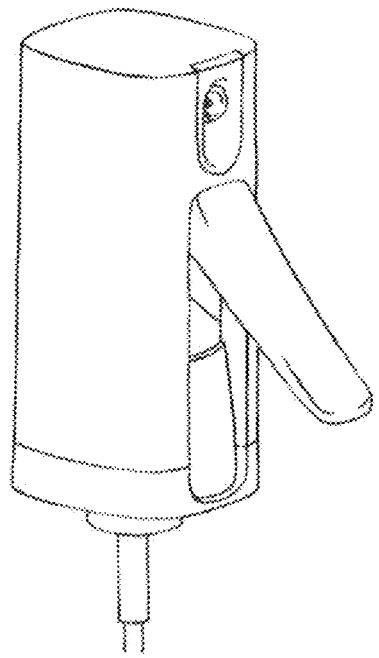
FIGS. 21A and 21B illustrate an exemplary "Flairosol D'Lite" sprayer head according to exemplary embodiments of the present invention.
Figure 21B:
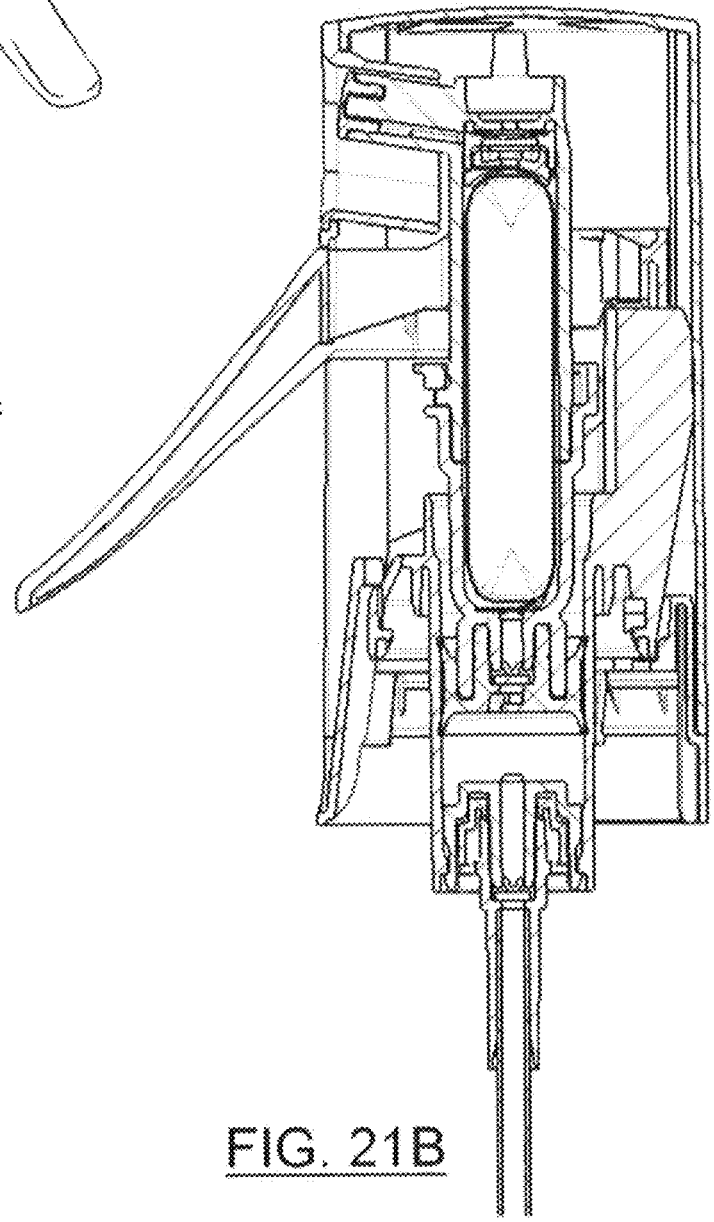
Figures 22A, 22B:
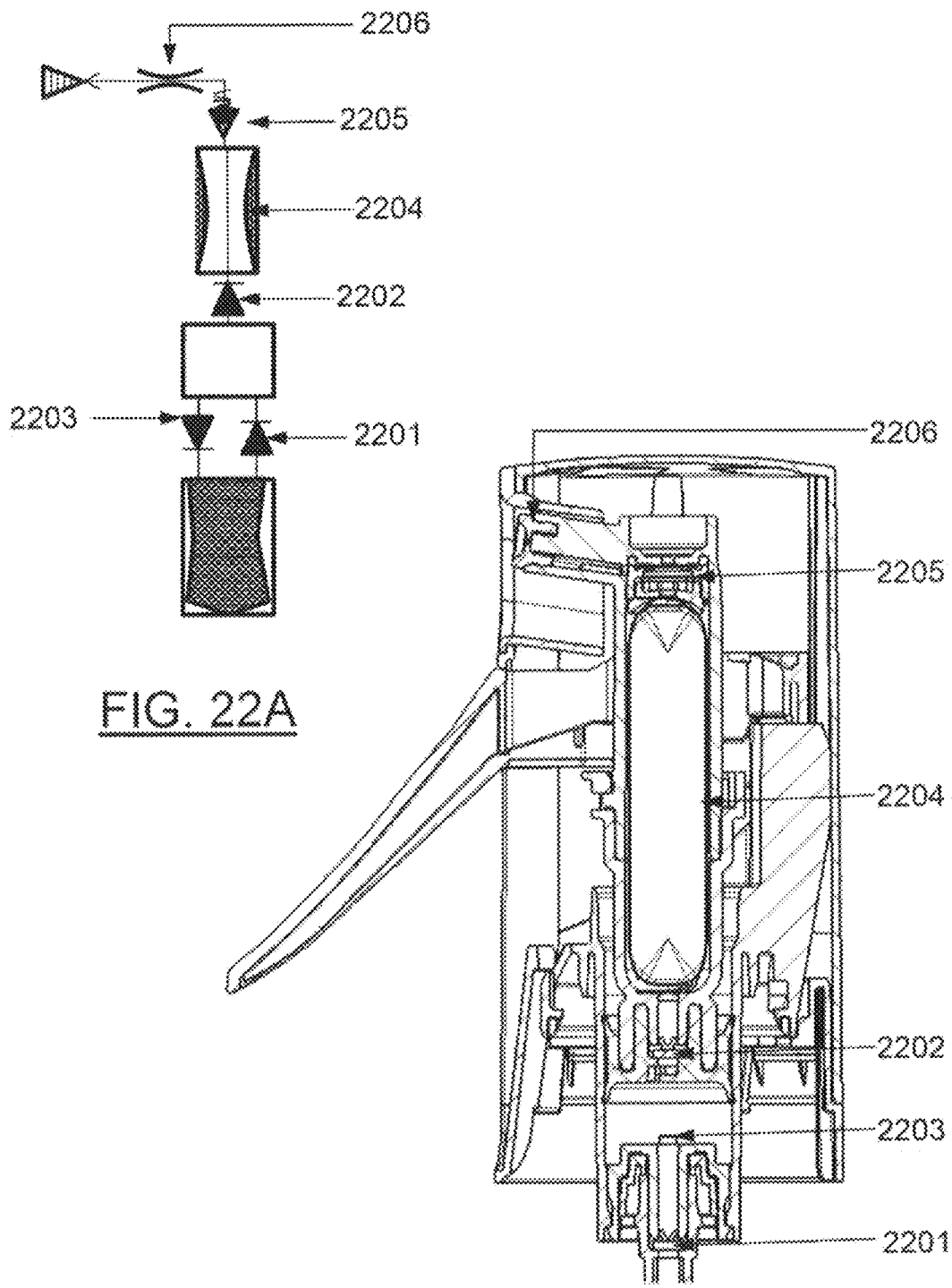
FIG. 22A is a fluid flow schematic of the exemplary sprayer head of FIG. 21B.
FIG. 22B presents the exemplary sprayer head of FIG. 21B with added index numbers.
Figure 26A:
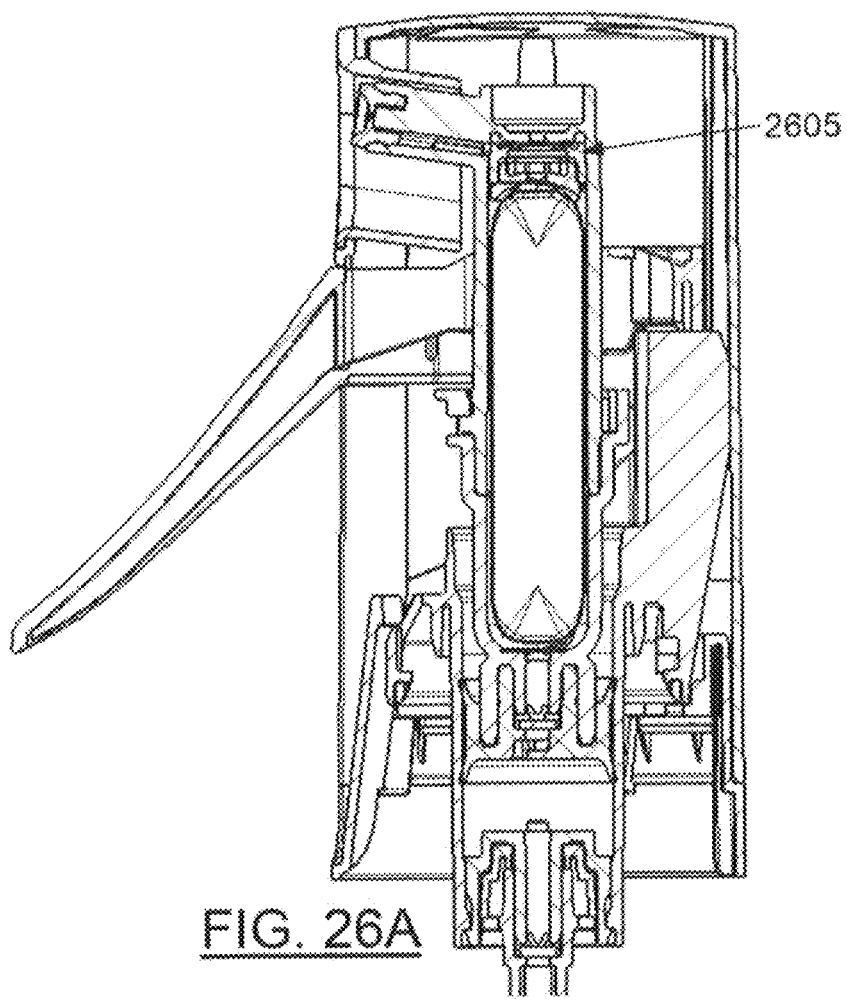
FIG. 26A illustrates the exemplary sprayer head of FIG. 22B, focusing on its pre-compression valve.
Figure 26B:
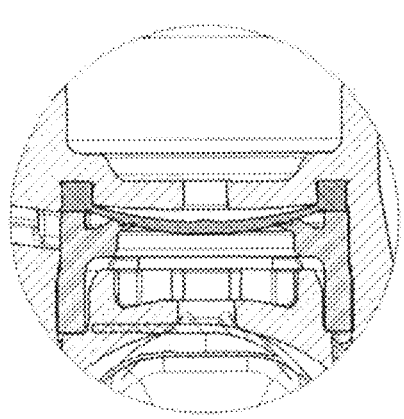
FIGS. 26B and 26C illustrate a first magnified view of the pre-compression valve assembly, and a second, further magnified view of the pre-compression valve assembly, according to exemplary embodiments.
Figure 26C:
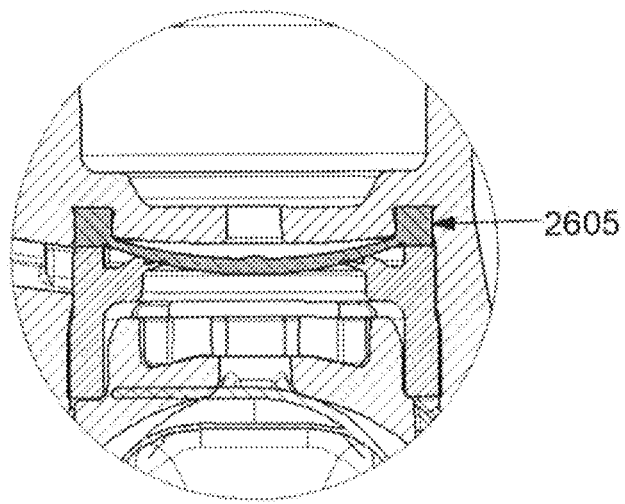
Figure 27A:
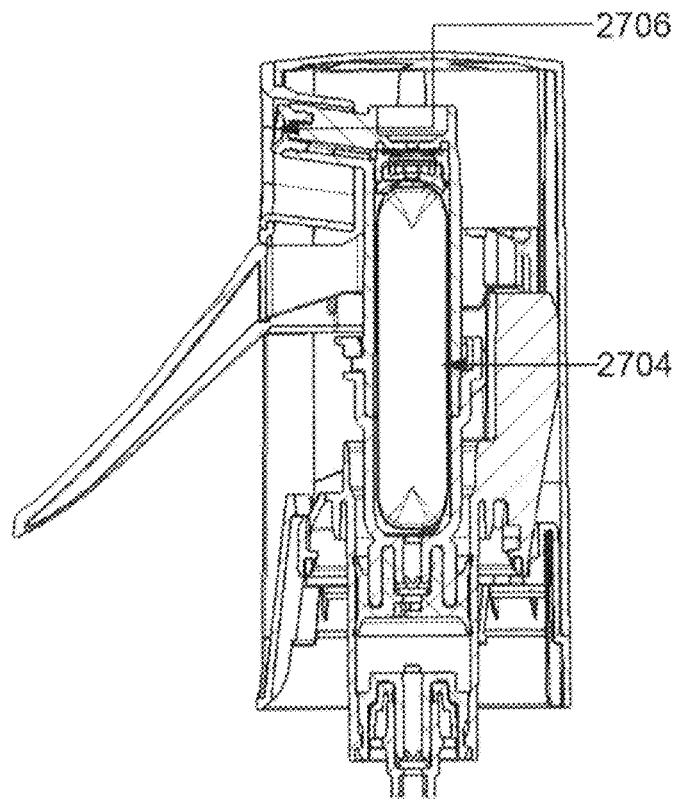
FIG. 27A illustrates the exemplary sprayer head of FIG. 22B, focusing on its nozzle orifice and buffer.
Figure 27B:
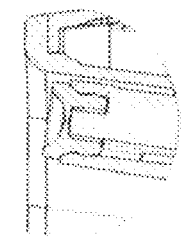
FIGS. 27B and 27D illustrate a first magnified view of the nozzle orifice assembly, and a second, further magnified view of the nozzle orifice assembly, respectively, according to exemplary embodiments.
Figure 27C:
FIGS. 27C and 27E illustrate a first magnified view of the buffer assembly, and a second, further magnified view of the buffer assembly, respectively, according to exemplary embodiments.
Figure 27D:
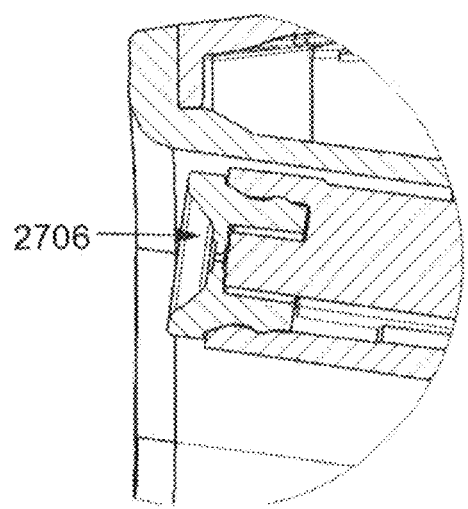
Figure 27E:
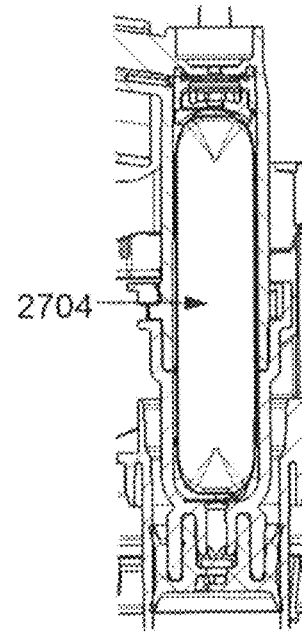
Figure 30A:
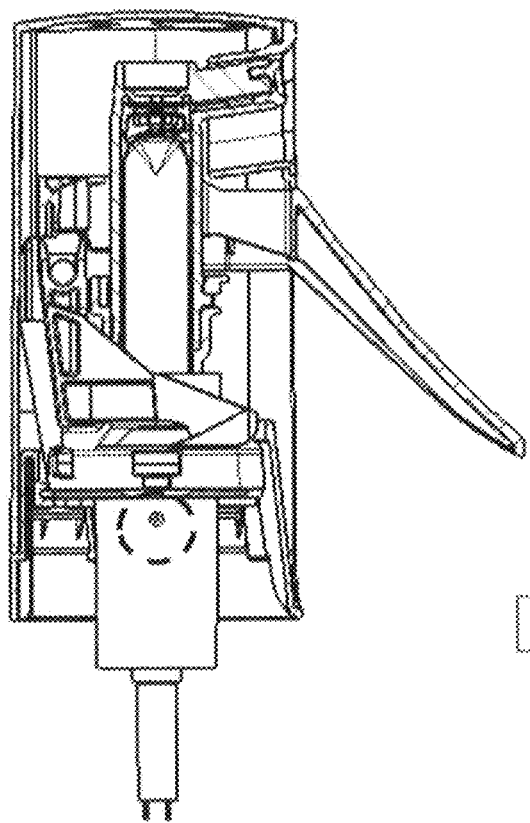
FIG. 30A illustrates the exemplary sprayer head of FIG. 22B, focusing (via the dashed circle) on a position where a venting hole may be provided.
Figure 30C:
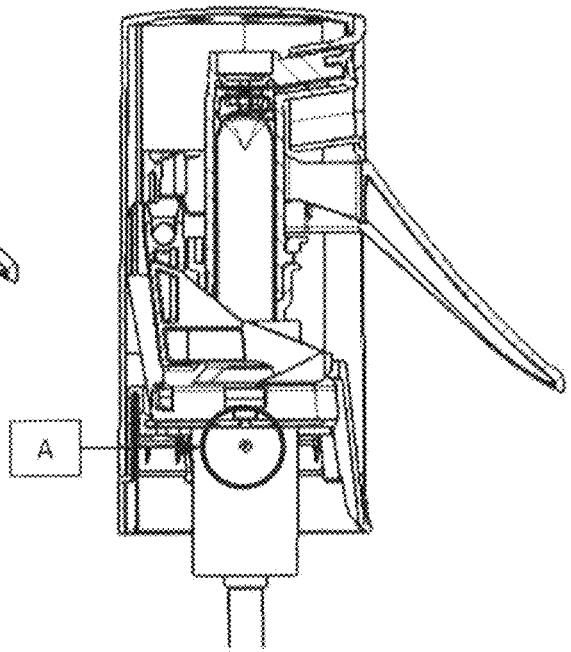
FIGS. 30B and 30C illustrate an exemplary embodiment where the housing wall is fully bored through, thereby providing a venting hole, the view of FIG. 30B rotated 90 degrees from that of FIG. 30C and also magnified.
Figure 30B:
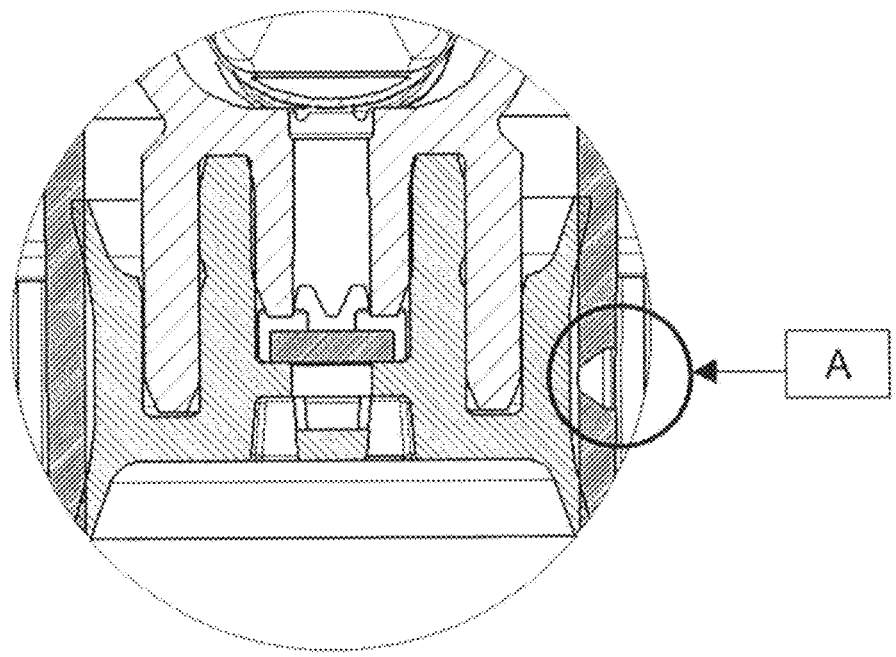
Figure 30D:
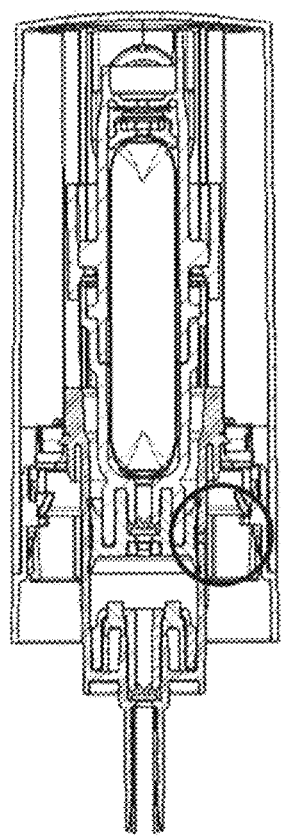
FIGS. 30D and 30E illustrate an alternate exemplary embodiment where the venting hole bevel is not bored through the housing wall, and thus no venting hole is provided, the views of FIGS. 30D and 30E being side views, and that of FIG. 30E being a magnified view.
Figure 30E:
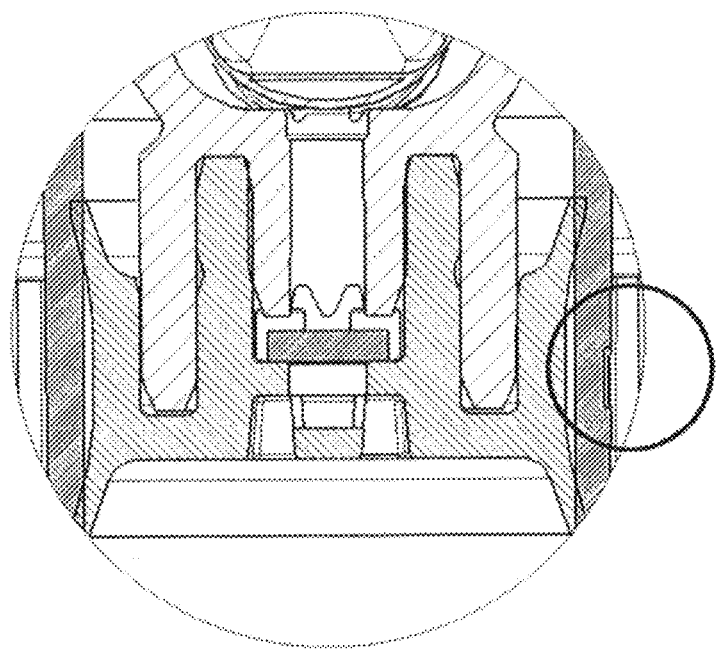
Figure 31B:
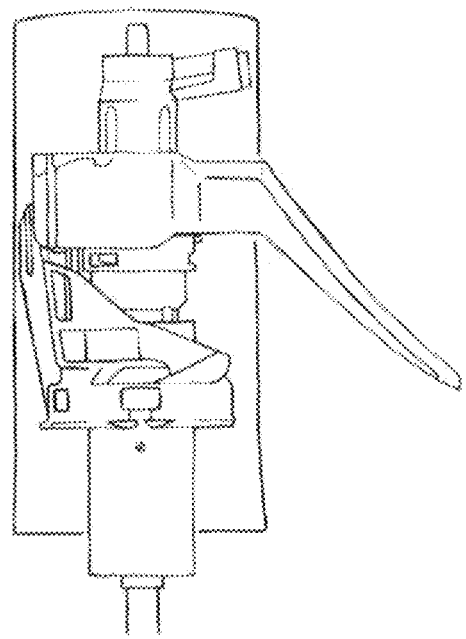
FIG. 31B is a volumetric view of FIG. 30A, showing the venting hole position.
Figure 31A:
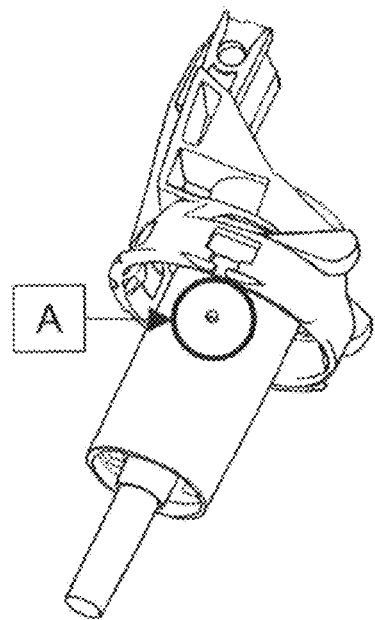
FIG. 31A is a magnified view of an exemplary piston housing with the venting hole opened.
Figure 31C:
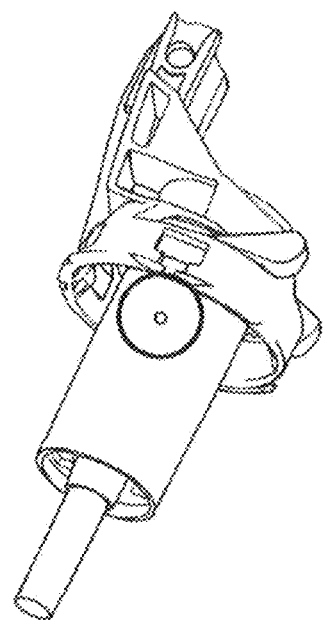
FIG. 31C is a magnified view of an exemplary piston housing with the venting hole not opened.
Figure 32A:
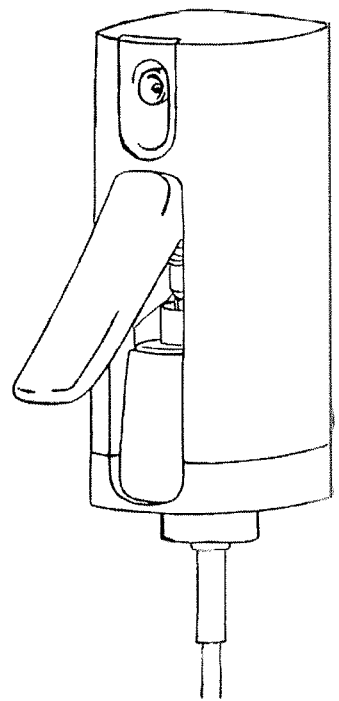
FIG. 32A illustrates an example sprayer head without a nozzle door or transport lock.
Figure 32B:
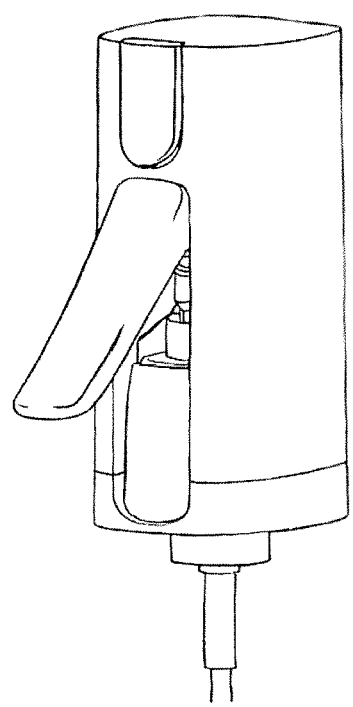
FIG. 32B illustrates sprayer head with a nozzle door and integrated transport lock.
Figure 32C:
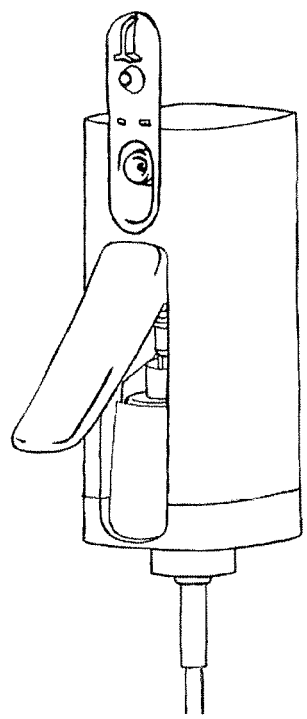
FIG. 32C illustrates the example sprayer head of FIG. 32B with the nozzle door opened.
Figure 33A:
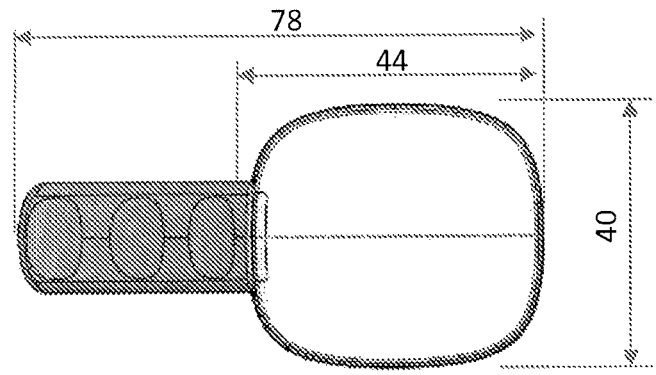
FIG. 33A illustrates a top view of an exemplary sprayer head and trigger according to an exemplary embodiment.
Figures 33B, 33C:
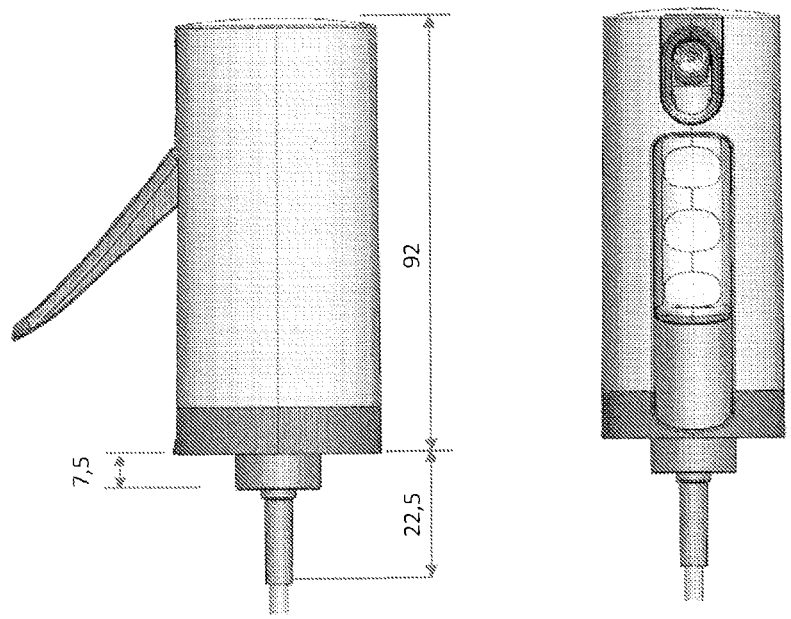
FIGS. 33B and 33C respectively show side and front views of the exemplary sprayer head of FIG. 33A.

FIGS. 21A through 33C illustrate an exemplary "Flairosol D'Lite" sprayer according to exemplary embodiments of the present invention. FIGS. 21A and 21B provide exemplary materials for the sprayer, and FIGS. 22A through 32C highlight each of these in detail. FIGS. 33A, 33B and 33C respectively provide exemplary dimensions of such a sprayer.

Features/Objectives

Flairosol D'Lite has certain features, with defined objectives, as follows:

1. Buffer

No metal, all plastic. Store and release the overshoot of liquid in order to get a continuous and constant output. This technology gives more possibilities to adjust the Flairosol to the customer application, when necessary.

2. Prime/Over Pressure Valve

Remove air out of the pump during priming, to avoid no or to late priming, due to the normally closed valve. When the internal pressure increases too much, the valve will release this pressure.

3. Dome Valve Configuration

Obtain greater control of the dome valve mechanical behavior and hysteresis.

Flairosol D'Lite Technological Features

Figure 34A:
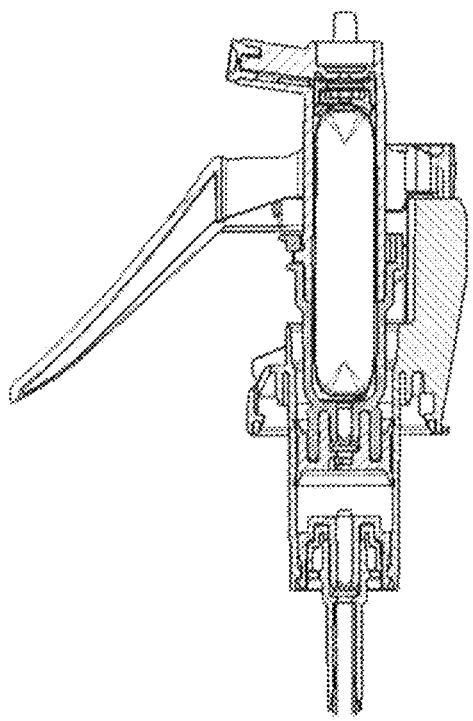
FIG. 34A is a colorized rendered view of the internal mechanisms of the exemplary sprayer head of FIG. 22B.
Figure 34B:
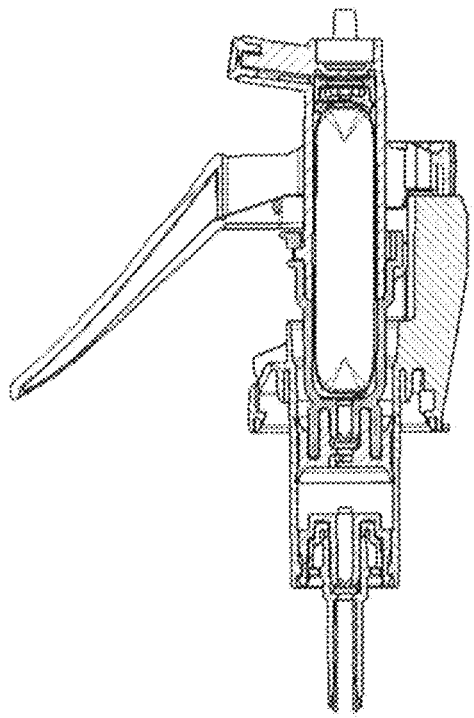
FIG. 34B is a black and white version of FIG. 34A.
Figure 34C:
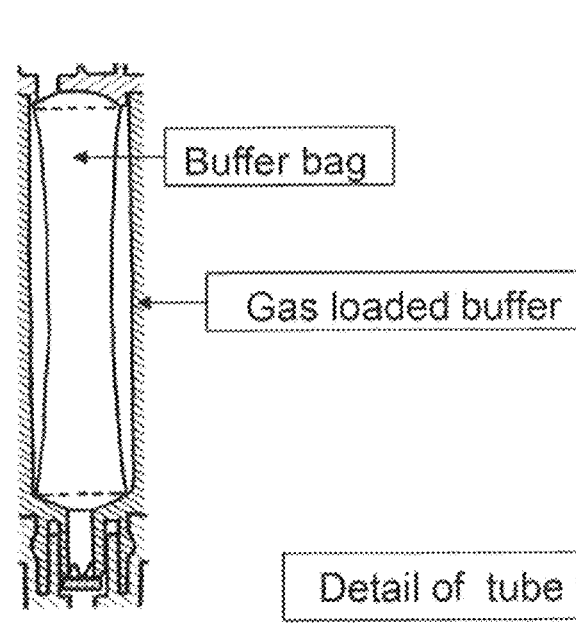
FIG. 34C illustrates an exemplary gas loaded buffer with an internal buffer bag according to an exemplary embodiment.
Figure 34D:
FIG. 34D illustrates an exemplary buffer bag according to an exemplary embodiment.
Figure 34E:
FIG. 34E illustrates an exemplary multiple layer tube that may be used as a buffer bag according to an exemplary embodiment.
Figure 34F:
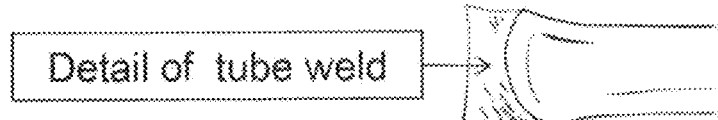
FIG. 34F illustrates detail of the tube weld of the exemplary multiple layer tube of FIG. 34E.
Figures 36A, 36B:
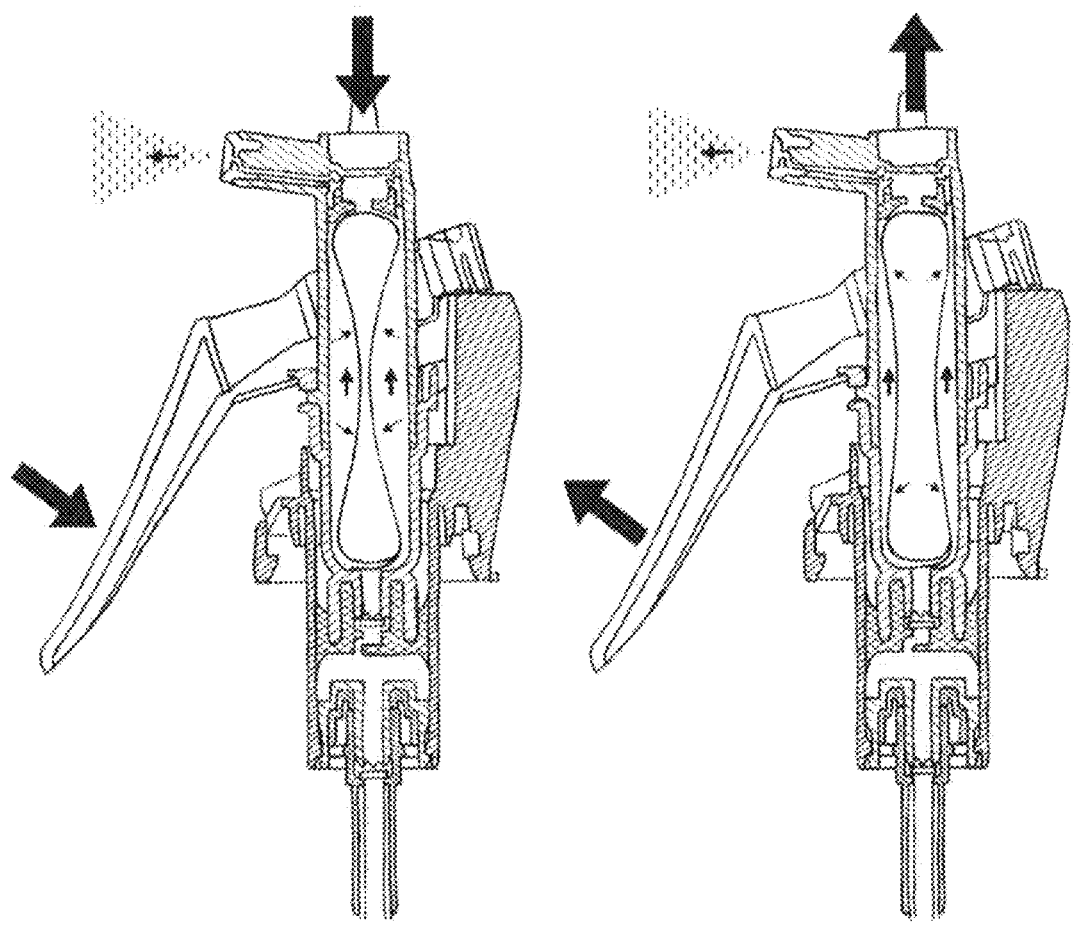
FIG. 36A illustrates a downstroke of the exemplary sprayer, where the piston is pulled down, liquid is sprayed out the nozzle and the buffer is compressed.
FIG. 36B illustrates an upstroke of the exemplary sprayer, where the piston is allowed to move up, and the buffer expands, causing liquid from the buffer chamber to be sprayed out the nozzle.
Figure 37A:
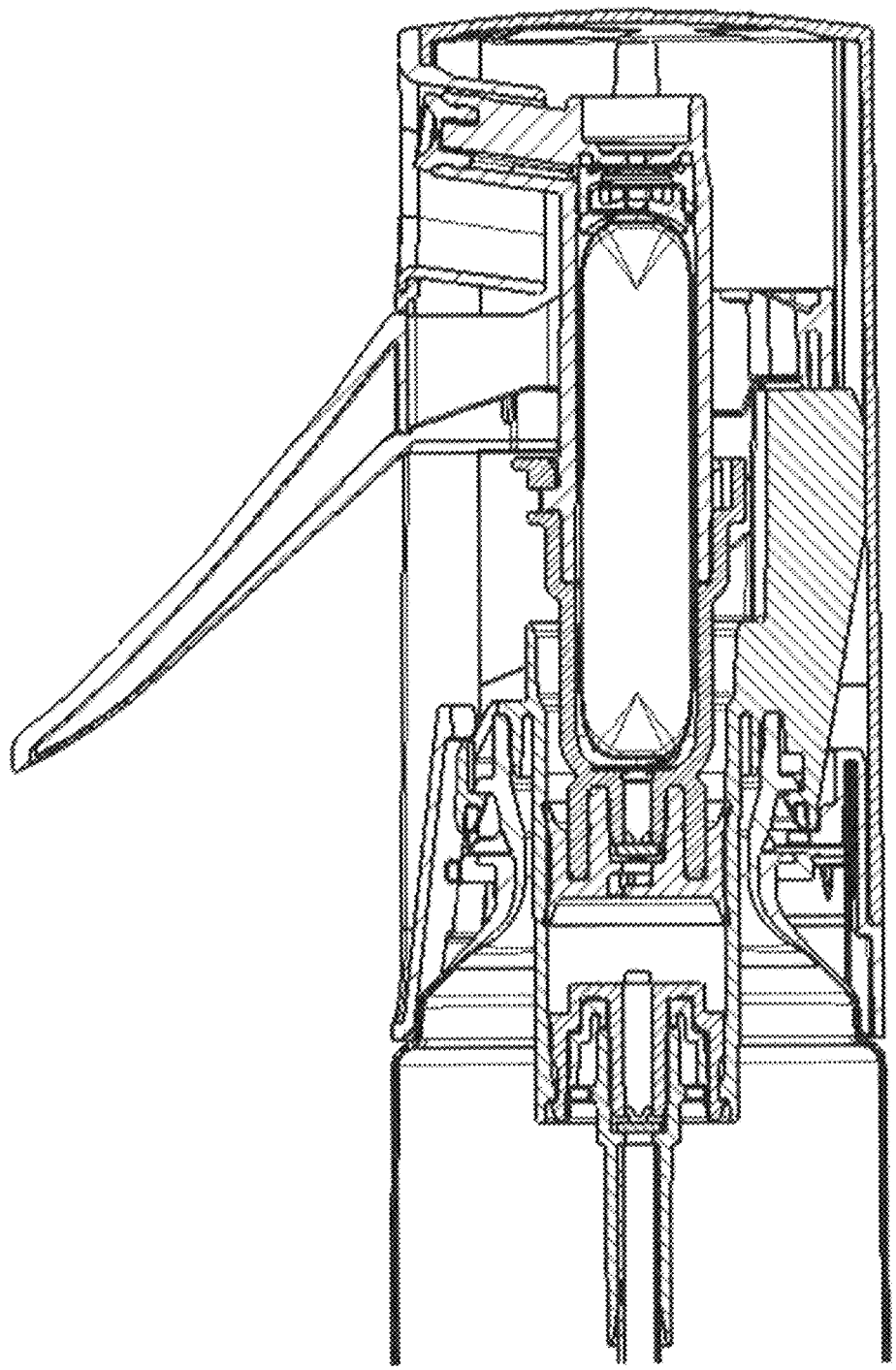
FIG. 37A illustrates an exemplary sprayer head where the piston chamber is filled with air.
Figure 37B:
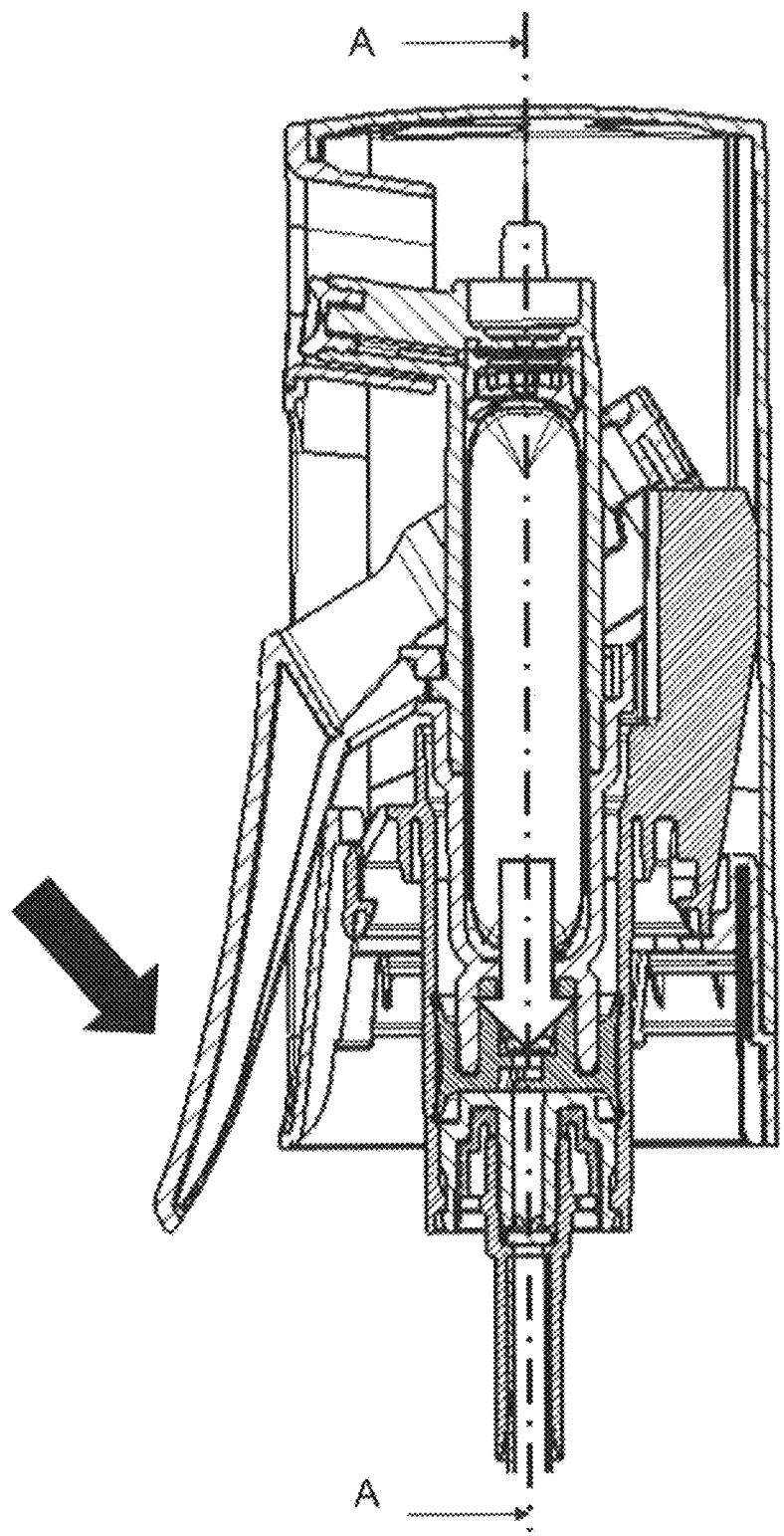
FIG. 37B illustrates exemplary sprayer head of FIG. 37A with the trigger being pulled down, thereby compressing the air in the piston chamber.
Figure 37C:
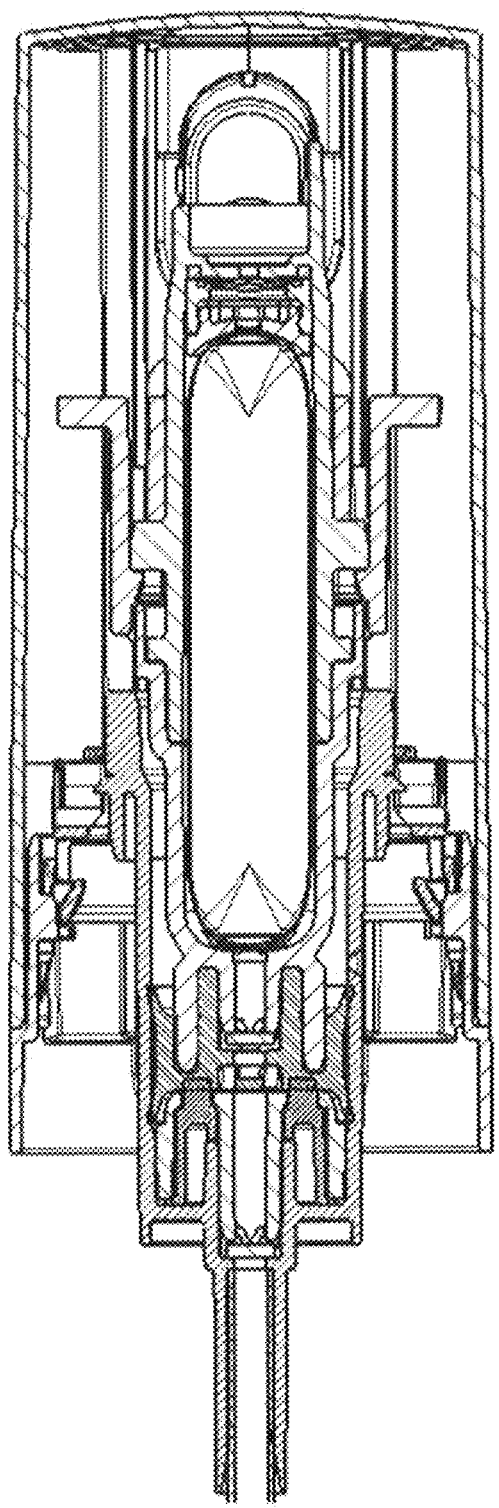
FIG. 37C is a cross sectional view along the line A-A shown in FIG. 37B, the cross-sectional slice being perpendicular to the page of FIG. 37B.
Figure 37D:
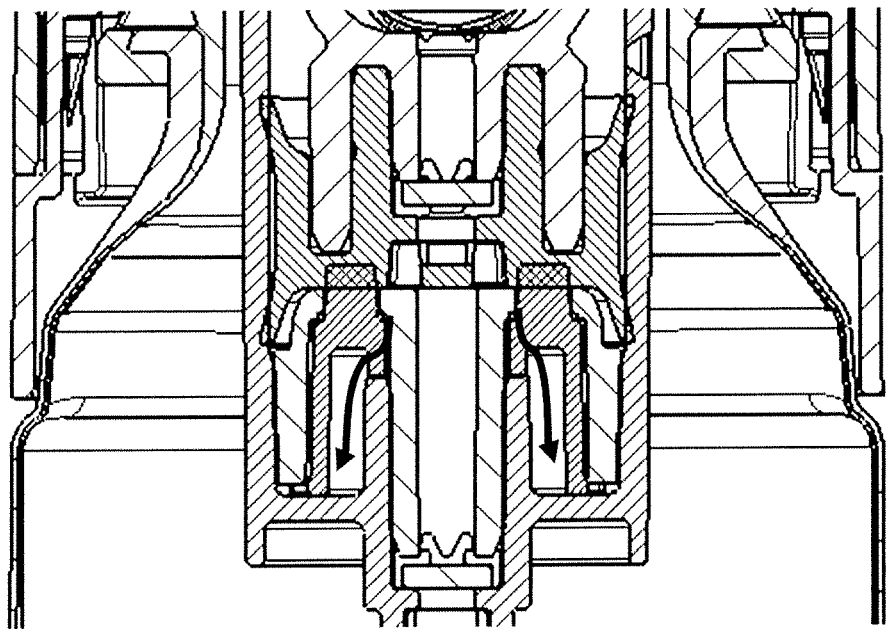
FIG. 37D is a magnified view of the bottom portion of FIG. 37C, illustrating the normally closed prime-overpressure valve being mechanically opened by the piston at the end of a piston downstroke.
Figure 37E:
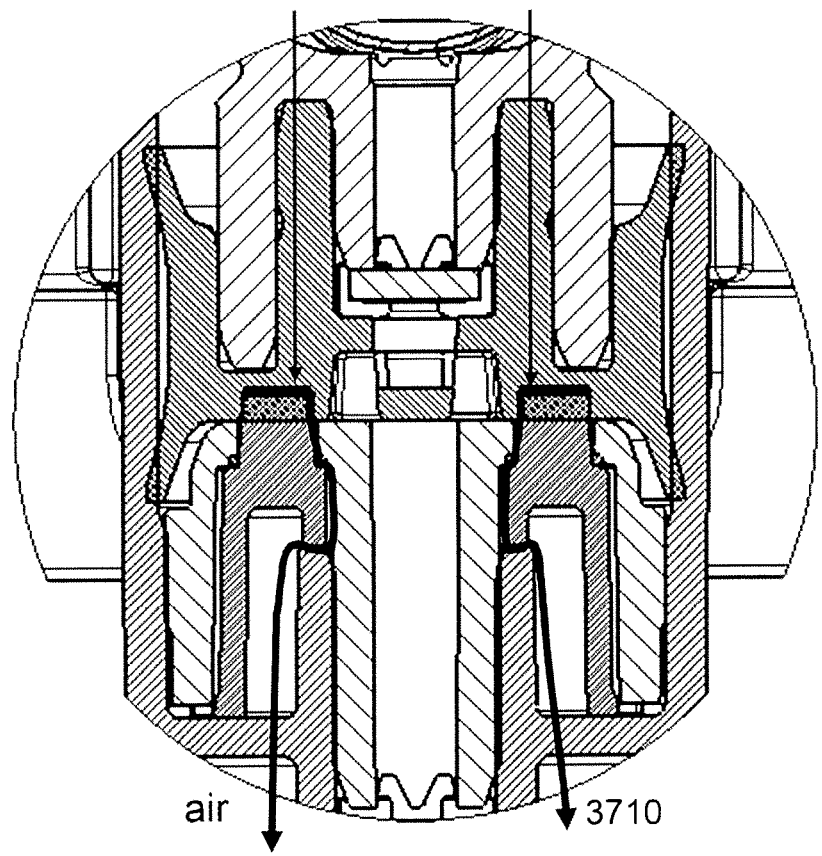
FIG. 37E illustrates the air escaping from the piston chamber into the bottle.
Figure 38:
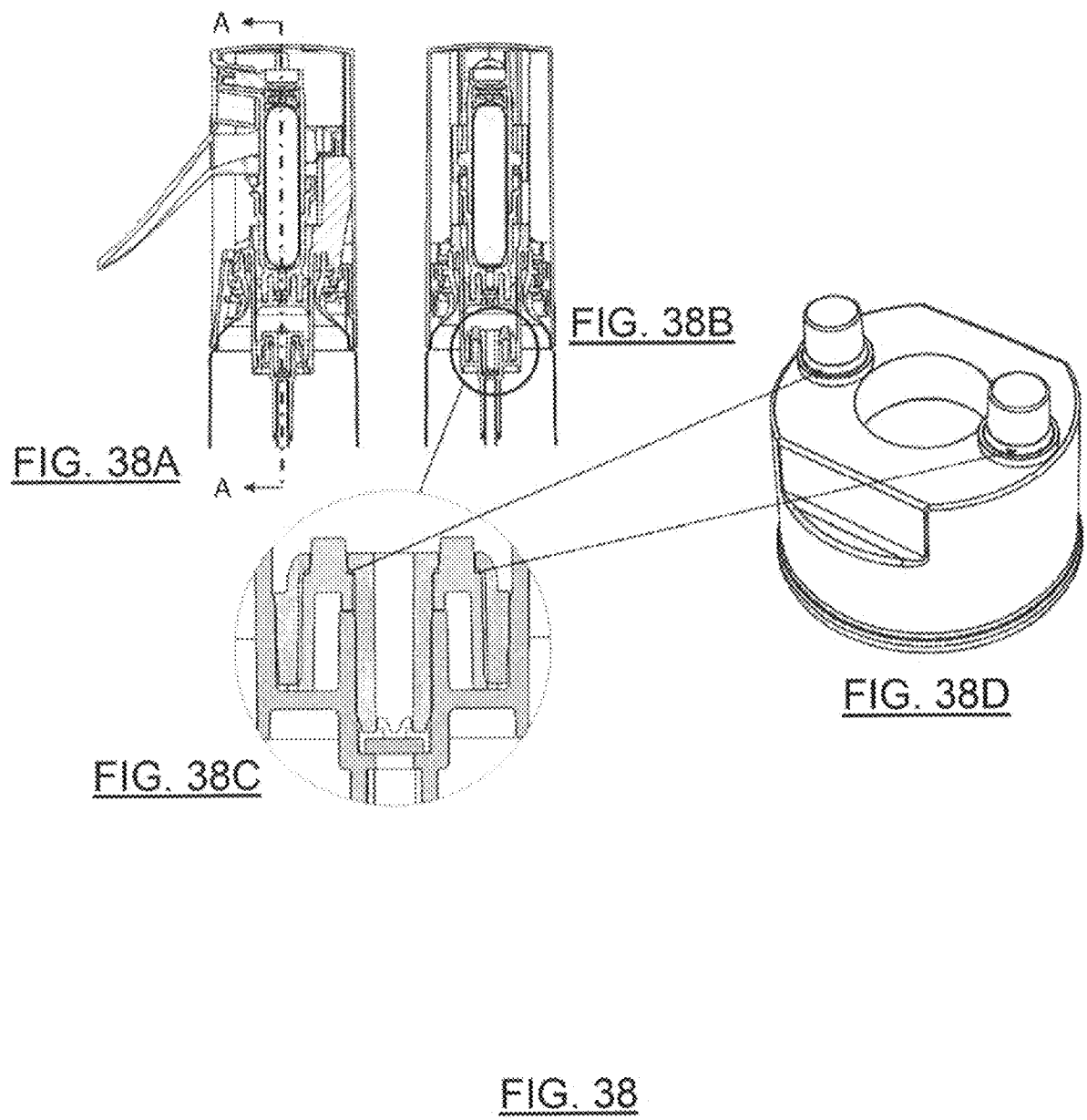
FIG. 38A is a magnified version of FIG. 37A.
FIG. 38B is a cross section along the line A-A shown in FIG. 38A, the cross-sectional slice being perpendicular to the page of FIG. 38A.
FIG. 38C is a magnified view of the prime overpressure valve assembly that is encircled in FIG. 38B.
FIG. 38D is a volumetric view of the prime valve and its sealing surfaces, according to exemplary embodiments.

FIGS. 34A through 40C, next described, respectively illustrate various technological advances of a Flairosol D'Lite type sprayer. With reference to FIGS. 34A and 34B, a gas loaded buffer can be used. The buffer pressure is set by the size of the buffer bag and the pressure of the gas inside the bag. As shown in FIG. 35A, the buffer is placed inside the piston. This improves compactness, the liquid travels in a straight upwards direction which helps to prevent entrapment of air, and one or more bypass channels are made to ensure the flow of liquid around the buffer. The buffering volume is set by the size of the buffer bag. As shown in FIG. 36A, when the piston moves down liquid is pushed to the nozzle. The overshoot of liquid not leaving the nozzle is stored by compression of the gas loaded buffer. As shown in FIG. 36B, when the piston moves up the gas loaded buffer pressure pushes out the stored liquid.

FIGS. 37A through 39 illustrate a novel Prime-Overpressure valve. When priming, the valve is mechanically opened by the piston. When the piston reaches the end of the stroke, it mechanically forces the normally closed Prime-Overpressure Valve to open. Air escapes into the bottle and the engine primes. FIG. 37E illustrates, via the two arrows 3710 at the bottom center of the figure, the air escaping from the piston chamber into the bottle. FIGS. 38C and 38D show the sealing surfaces of the valve. Finally, FIG. 39, Priming the DuO1 Engine, illustrates in detail its operation.

Prime issue with DuO1 Engine

Figure 39:
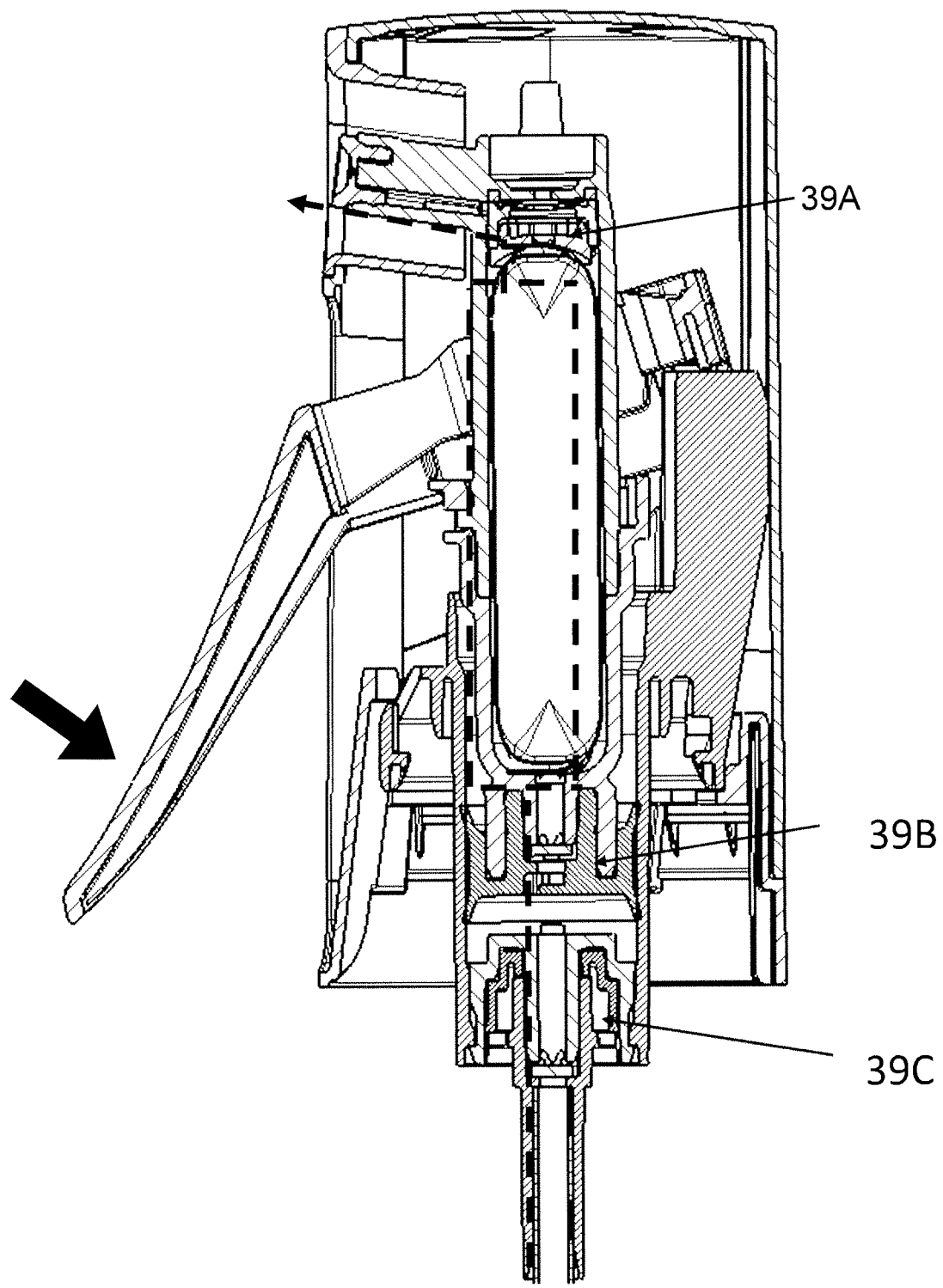
FIG. 39 illustrates priming of an exemplary sprayer head in accordance with various embodiments.

With reference to FIG. 39, when the piston 39B moves down it compresses air within the system and the air wants to get passed the normally closed outlet valve 39A. When the air pressure created is not high enough, the outlet valve is not opened and the engine does not work. The Prime-Overpressure Valve 39C makes sure that the engine primes.

Pressure Build Up Issue (DuO1 Engine Continuous)

When trigger frequency and speed is high, the internal pressure could be build-up to a critical level. If this level is reached, the pressure needs to be released. The Prime-Overpressure Valve 39C acts as an overpressure valve as well.

Novel Dome Valve

Figure 40A:
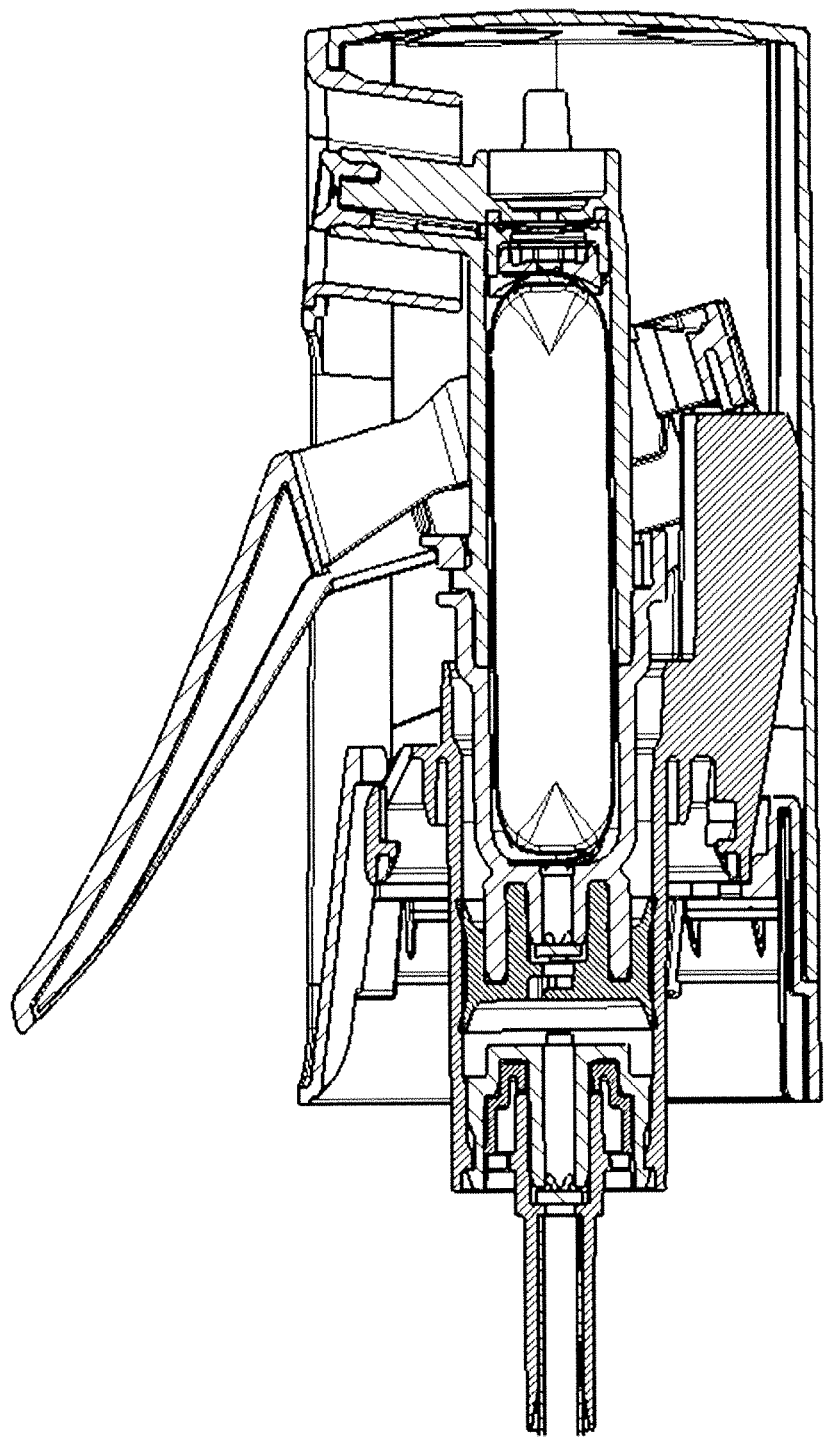
FIG. 40A illustrates an exemplary binary dome valve positioned above an exemplary buffer according to an exemplary embodiment.
Figure 40B:
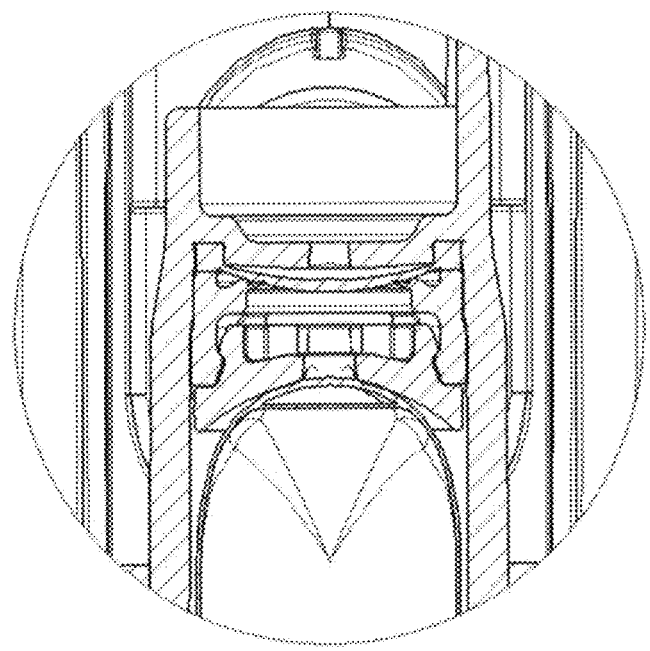
FIG. 40B is a magnified view of the dome valve assembly shown in FIG. 40A.
Figure 40C:
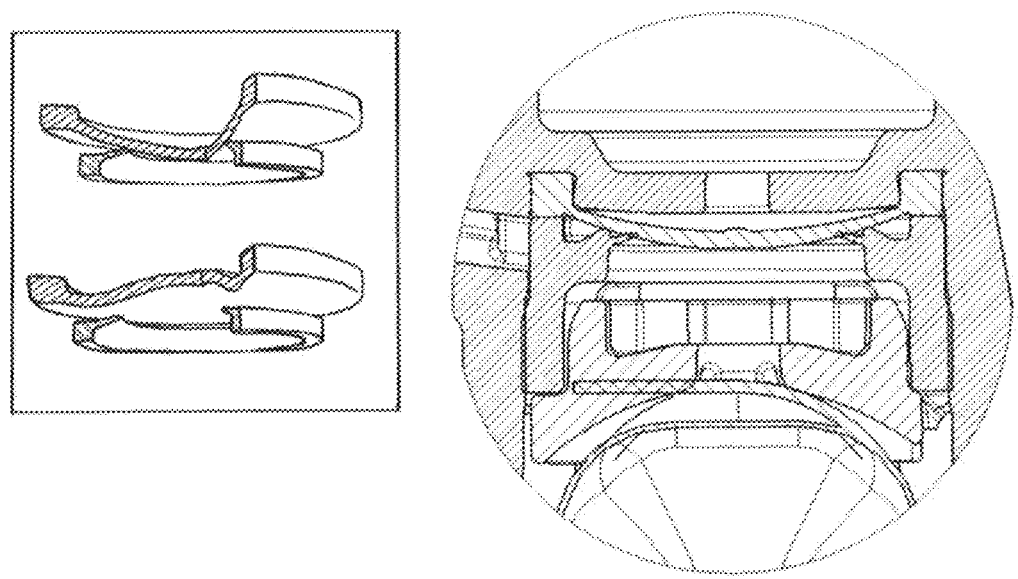
FIG. 40C depicts two cut-away perspective views, and a further magnified view, of the exemplary dome valve shown in FIG. 40A.

FIGS. 40A, 40B and 40C respectively illustrate the use of a novel all plastic binary dome valve. This pre-compression valve was developed to get a more "snappy" response on changes in pressure. I.e., digital opening and closing of this valve, without drips or bigger droplets in the spray, which improves the nozzle performance.

FIG. 40A shows where the exemplary dome valve is placed within an exemplary DuO1 engine or application.

Figure 42A:
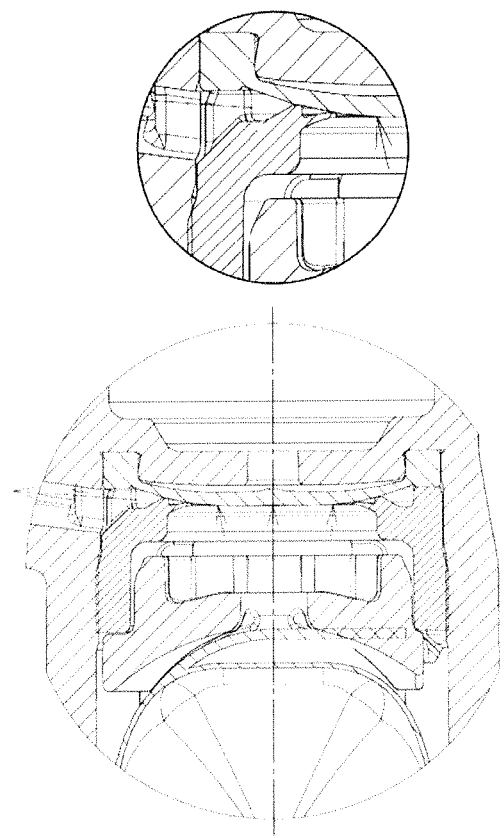
FIG. 42A illustrates the dome valve returning to touch the seal as pressure drops.
Figure 42B:
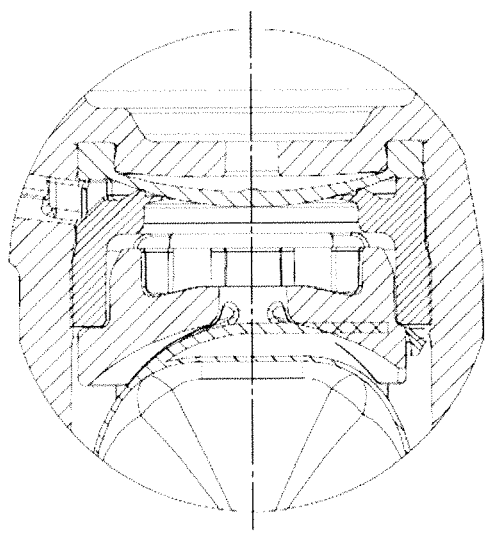
FIG. 42B illustrates the dome valve back in its default state, resting against the seal.
Figure 42C:
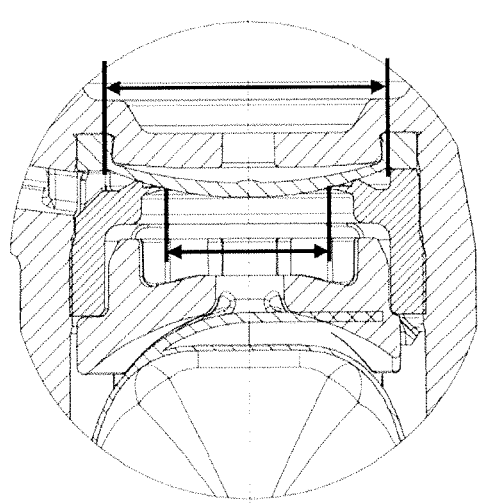
FIG. 42C illustrates the dome valve diameter being larger than the seal diameter, which affects hysteresis.
Figure 43A:
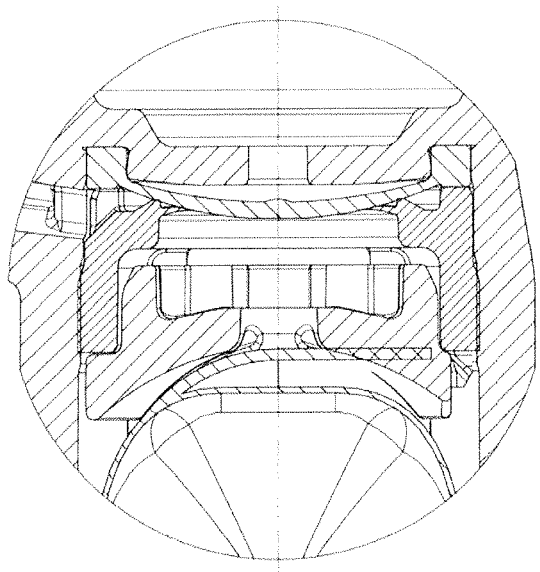
FIG. 43A illustrates the dome valve in default position.
Figure 43E:
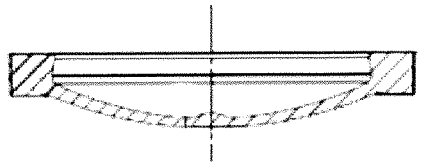
FIGS. 43D, 43E and 43F illustrate alternative diameter/thickness ratios for the dome valve, according to exemplary embodiments.
Figure 43F:
Figure 43G:
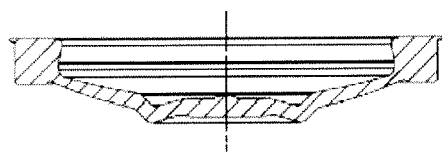
FIGS. 43G and 43H illustrate alternative dome shapes, according to exemplary embodiments.
Figure 43B:
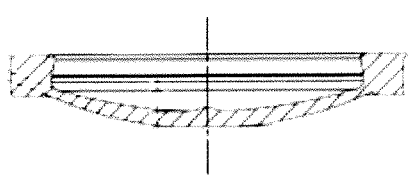
FIGS. 43B and 43C illustrate alternate thicknesses of the dome valve, according to exemplary embodiments.
Figure 43H:
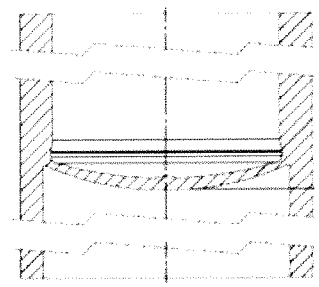
Figure 43C:
Figure 43D:
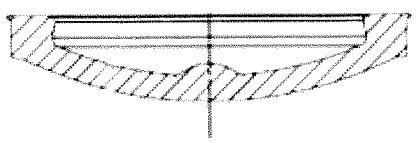
Figure 43I:
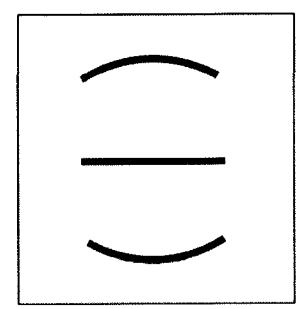
FIG. 43I illustrates that as regards shape, the dome valve may be concave, flat, or convex, in accordance with various embodiments.
Figure 46A:
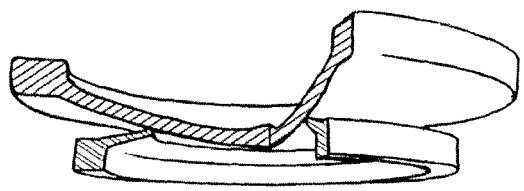
FIGS. 46A, 46B, 46C, 46D, 46E, and 46F respectively illustrate dome shape and configuration during various operational states of the exemplary dome valve, with reference to portions or segments of the graph of FIG. 44C, as follows.
Figure 46B:
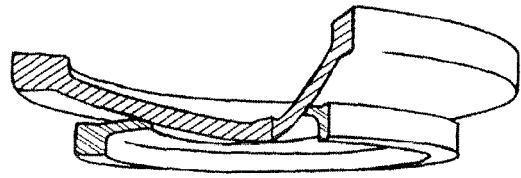
Figure 46C:
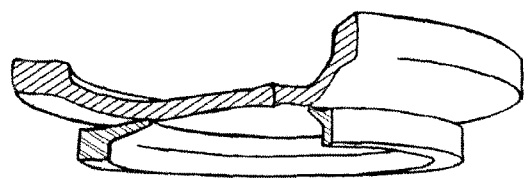
Figure 46D:
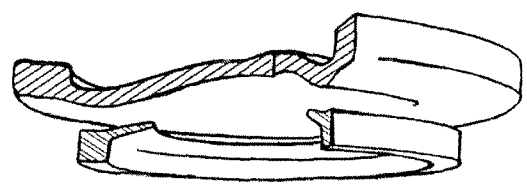
Figure 46E:
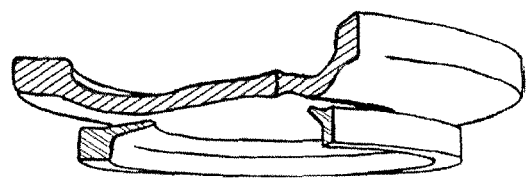
Figure 46F:
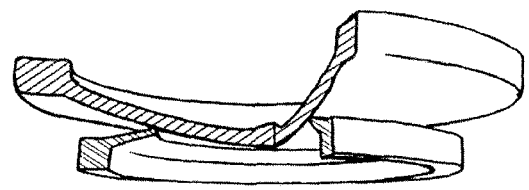

FIGS. 41A-47 present details of the novel dome valve. As noted in FIG. 41A, the main inventive goal was to create a dome valve having a more binary behaviour. I.e., a more instantaneous opening and closing of the dome with as little as possible differences in these pressures (small hysteresis). For this purpose a dome valve was created which interacts with a flexible seal. FIGS. 41A through 41C and 42A through 42C respectively show six snapshots of the dome valve in operation. These are as follows:

A. FIG. 41A: Dome valve and dome seat at default. The dome seat seal rests against the dome valve with pre-tension;
B. FIG. 41B: Pressure deforms the dome valve. The seal of the dome seat flexes and still rests against the dome valve;
C. FIG. 41C: The dome valve deforms even more. The seal valve has flexed to default position and no longer rests against the dome valve. An opening between seal and dome valve is created;
D. FIG. 42A: When the pressure decreases, the dome valve swiftly deforms back again touching the seal. Dispensing stops instantaneously;
E. FIG. 42B: Dome valve and dome seat at default. The dome seat seal rest s against the dome valve with pre-tension; and
F. FIG. 42C: The dome valve diameter is equal or larger than the seal diameter. A larger the difference increases the hysteresis, the opening pressure will be higher than the closing pressure of the dome valve.

As shown in FIGS. 43A through 43I, the dome and seal can be changed in order to adapt or modify properties such as the opening and closing pressure and flow. Changes made can be for example the wall thickness, diameter, material, height, curviness (convex, flat, concave). The material of the dome valve is ideally a semi-crystalline plastic such as a PP or PE grade. This suitable for a wider range of liquids. If the dome needs specific properties such as a higher flexible modulus, other materials can be used such as POM grades. This limits compatibility with liquids, and thus bleach, for instance, is not compatible with POM. Various shapes, sizes and executions of the dome valve can exist, such as are shown in FIGS. 43A through 43I, for example. In these examples, dimensions are merely exemplary.

FIGS. 44A, 44B and 45 respectively depict a graph (FIG. 45) and two load cases for an exemplary dome valve. The graph shows the displacement of the point of the dome which is in contact with the seal. There are two possible load cases:

Case 1—Closed situation where only part of the dome is pressurized and there is a pressure difference over the seal (solid blue line (initially upper line) in graph).

Case 2—Open situation where the complete dome is pressurized and there is no pressure difference over the seal (solid green line (initially lower line that crosses upper line at 0.4 Mpa) in graph). The dashed blue line (horizontal line at displacement=0.2 mm) is the position of the seal in the "open" situation.

With reference to the graph of FIG. 45, there are various operational states of the valve:

A-A': The seal is pre-tensioned by moving the seal 0.2 mm relative to the dome;

A'-B: Pressure buildup gives a displacement of the dome accompanied with the seal up to the point B. At this point the contact force between the dome and the seal becomes zero and the valve opens;

B-C: When the valve is open the behaviour of the dome changes due to the fact that the seal is no longer pushing against the dome and the pressurized section on the dome has become larger. The seal which is no longer pressurized will go back to its neutral position at 0.2 mm while the dome jumps to 0.62 mm. This gives a sudden opening of 0.42 mm over a theoretic infinitesimal small pressure step. This binary behaviour is necessary to make sure that the pressure drop over the valve is small enough to have a negligible effect on the flow through the nozzle; C-D When the pressure increases further the displacement of the dome will increase. (this can be limited by establishing a contact between the dome and another part);

D-E: When the pressure decreases the dome will become instable at point E. At this point the distance between the seal and the dome is still 0.35-0.2=0.15 mm. This opening is necessary to make sure that the pressure drop over the valve is small enough to have a negligible effect on the flow through the nozzle;

E-F: Due to the instability the displacement of the dome will decrease instantaneously and the seal (in neutral position) comes into contact with the dome at point "F". The neutral position of the seal has to be between point "E" and "X" to ensure the functionality of the seal;

F-G: When the seal is in contact with the dome the "closed" situation is established and the seal will accompany the dome to point G. This will happen instantaneously as well; and G-H: Further decrease in pressure will result in gradual decrease in displacement.

FIGS. 46A through 46F respectively illustrate the dome shape and configuration during some of the above-identified operational states.

Figure 47:
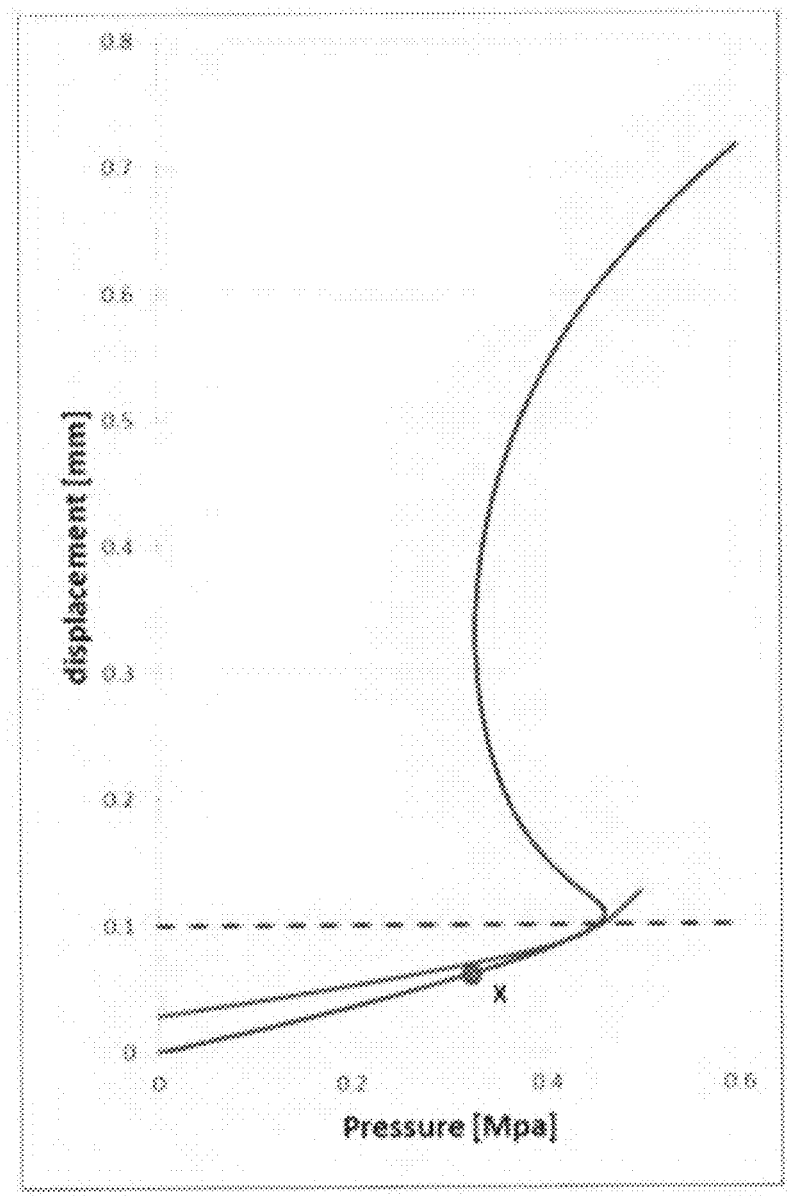
FIG. 47 illustrates an example of how over time the pre-stresses in an exemplary seal and exemplary dome valve may relax.

Finally, FIG. 47 presents a different graph than that shown in FIG. 44C. The graph of FIG. 47 illustrates how, over time, the pre-stresses in the seal and dome will relax. This will particularly change the "closed" behaviour. In the graph presented in FIG. 47 the effect of an example 50% relaxation is presented. It shows that the valve will continue to function as illustrated in the previous figures.

Gas Buffer Technology

Figure 48A:
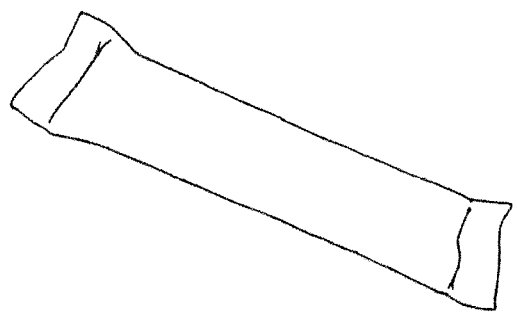
FIG. 48A illustrates an example gas buffer.
Figure 48B:
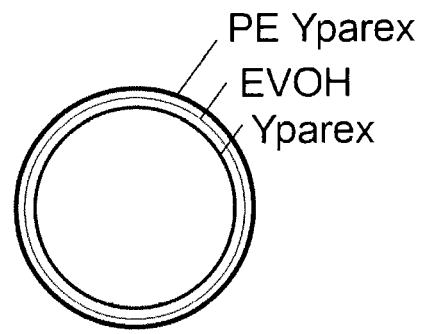
FIG. 48B illustrates a cross-section an example multiple layer tube gas buffer.
Figure 48C:
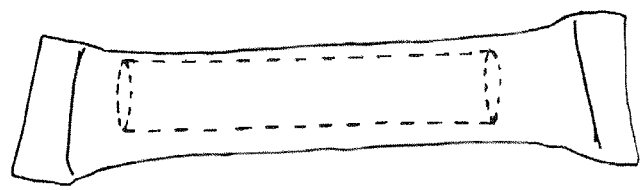
FIG. 48C illustrates an example multiple layer tube gas buffer.
Figure 48D:
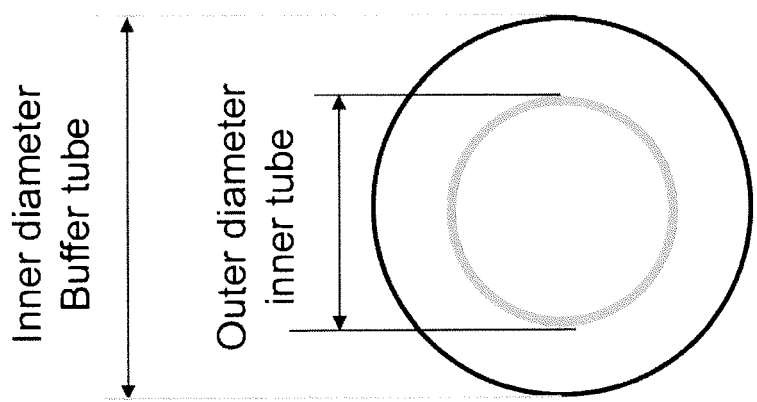
FIG. 48D illustrates differences between inner tube outer diameter and buffer tube outer diameter.
Figure 65:
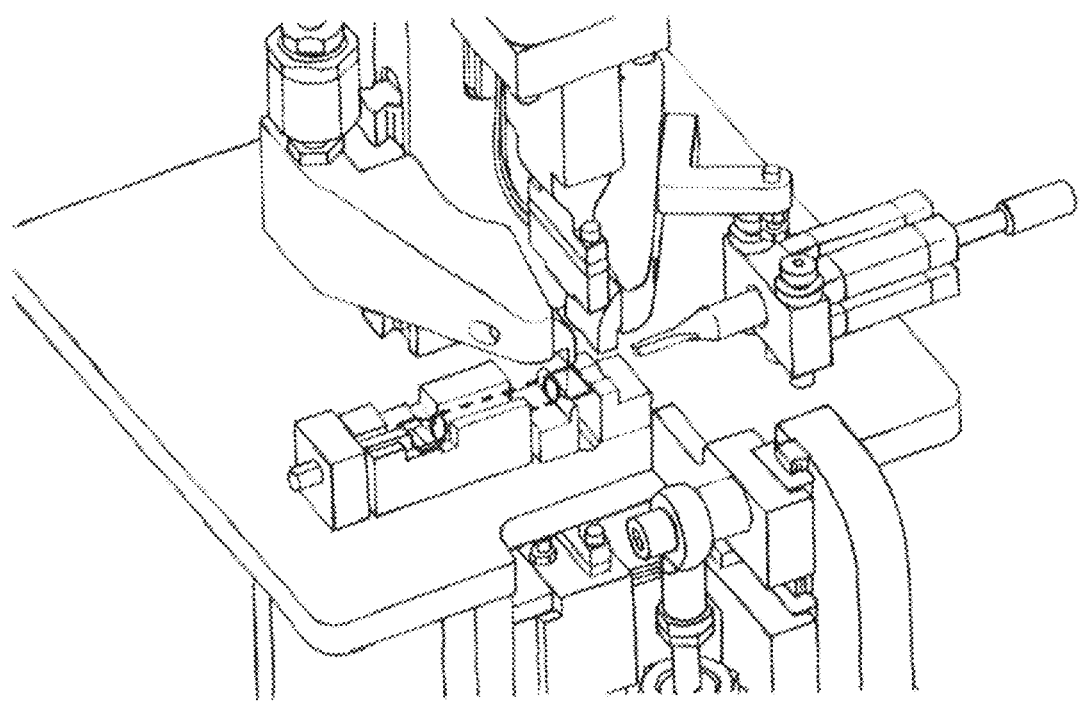
FIG. 65 illustrates where after cooling the tube, the cooling clamps open, and the welded buffer can be removed, according to an exemplary embodiment.
Figure 66:
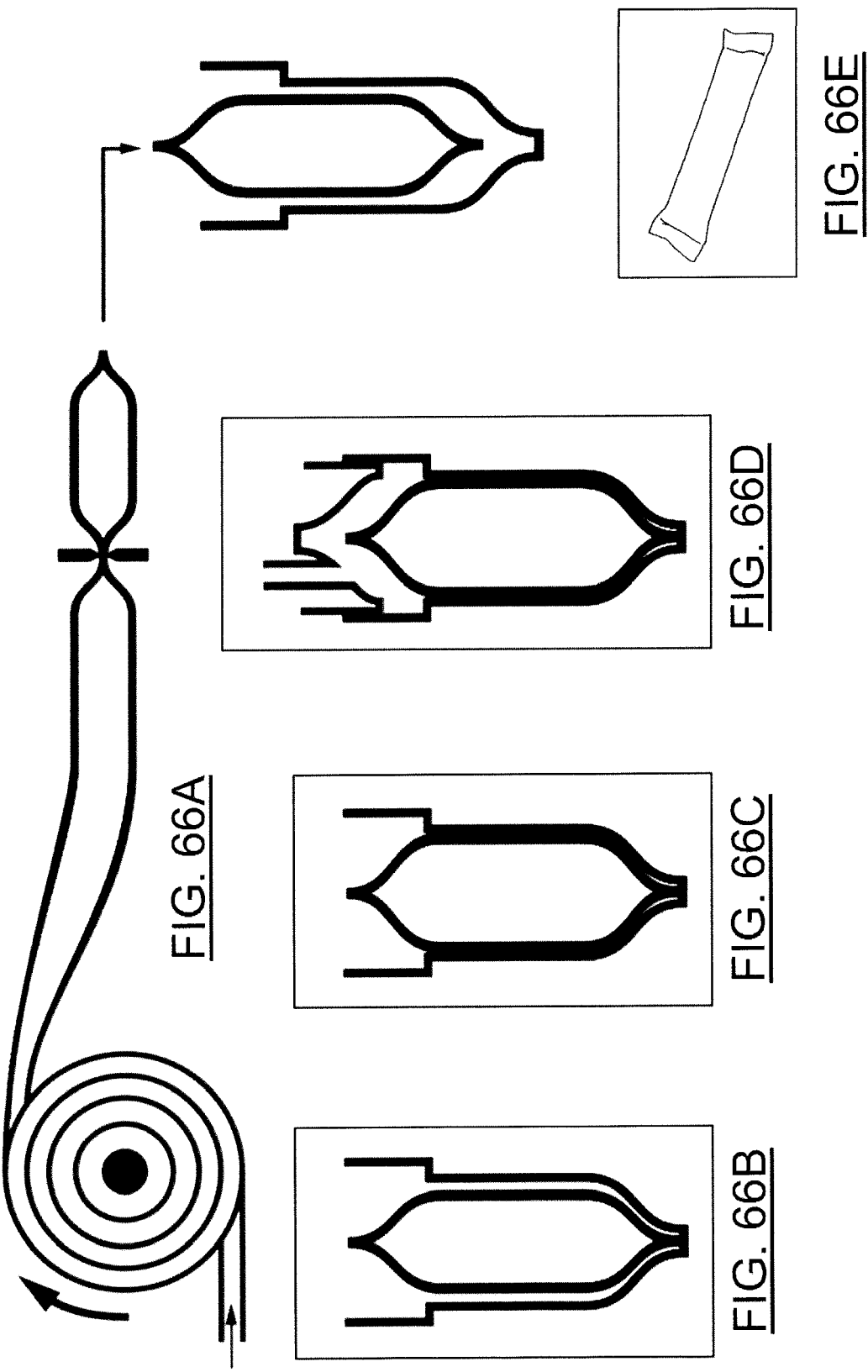
FIGS. 66A through 66E respectively illustrate successive steps in an alternate exemplary gas buffer manufacturing technique, according to an embodiment.
Figure 67:
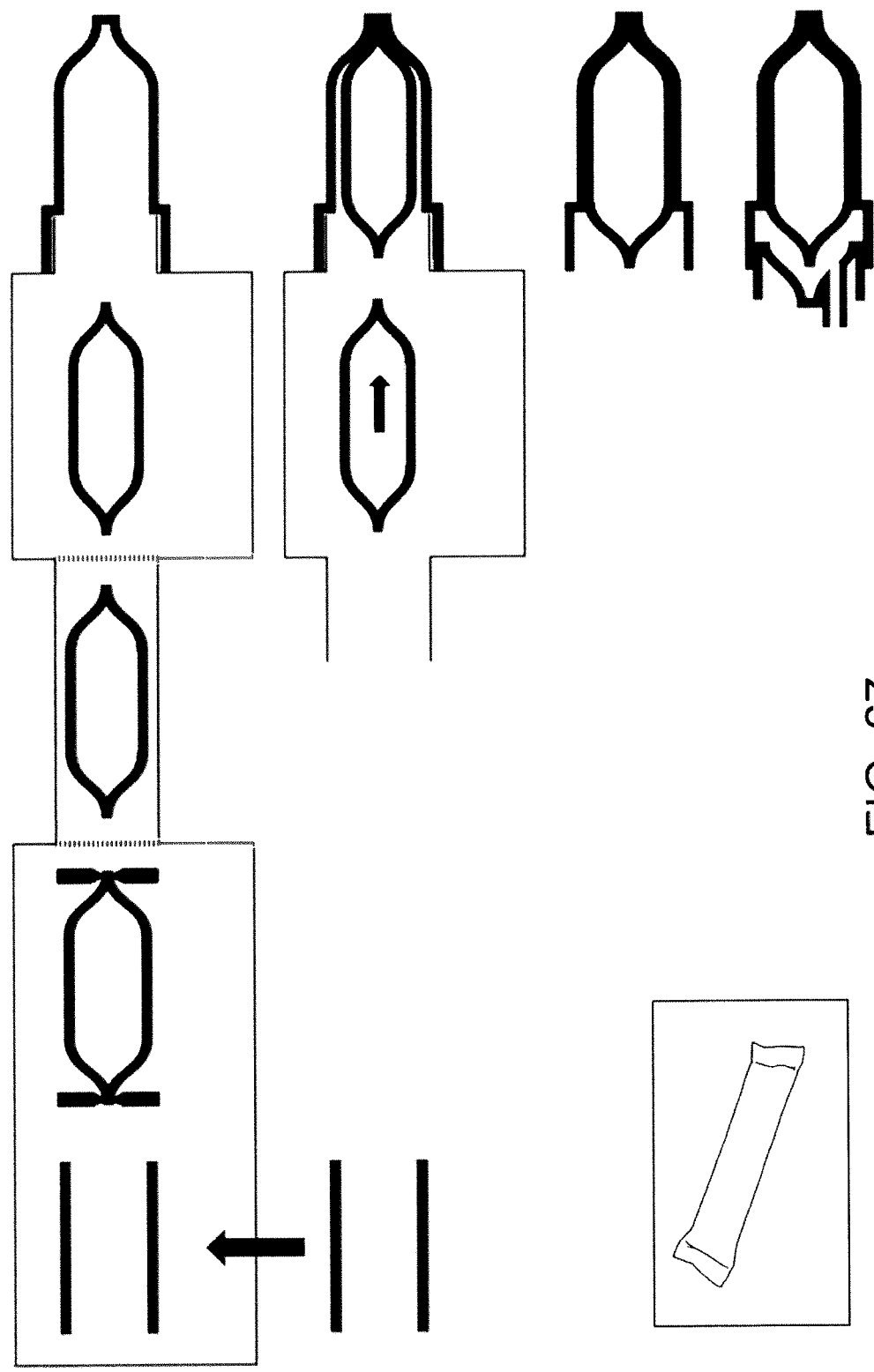
FIG. 67 illustrates further details of the alternate gas buffer manufacturing technique of FIGS. 66A, 66B, 66C, 66D and 66E.

FIGS. 48A-65 respectively illustrate exemplary gas buffers that can be used in exemplary embodiments of the present invention, as well as exemplary methods of manufacturing them. FIG. 66A through FIG. 67 respectively illustrate alternate manufacturing methods. With reference to FIG. 48B, the buffer can be made from a multi-layer tube containing for example; PE, EVOH, or Yparex. It may be pressurized by filling with a gas such as, for example, air, nitrogen or other gasses. The multi-layer is needed to provide the desired properties like; The ability to be welded, maintaining flexibility so all energy is stored and released by the enclosed compressed gas, blocking the gas from leaving the buffer and therefore maintaining the pressure over time, and chemical resistance to the liquid dispensed.

A gas buffer can have, for example, an inner tube. The difference between the inner tube outer diameter and the buffer tube inner diameter is related to the buffer capacity. The greater the difference, the more the capacity. In theory, the external pressure applied to the could increase to a level in which the buffer would collapse to an extend it fails. A tube with open ends can be placed in the buffer to prevent the collapse which leads to failure. This will limit the extend to which the buffer can collapse when a external pressure is applied.

Figure 49A:
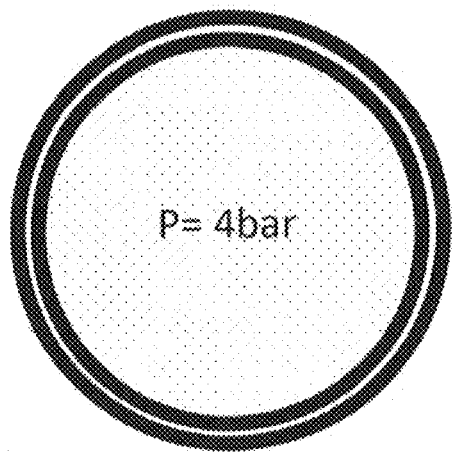
FIGS. 49A, 49B and 49C illustrate example default, stored energy and releasing energy states of an example gas buffer, respectively, according to an exemplary embodiment.
Figure 49B:
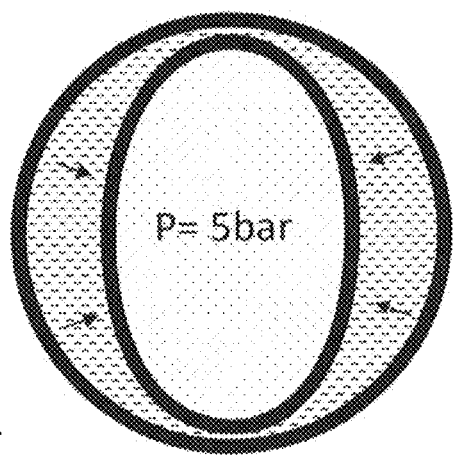
Figure 49C:
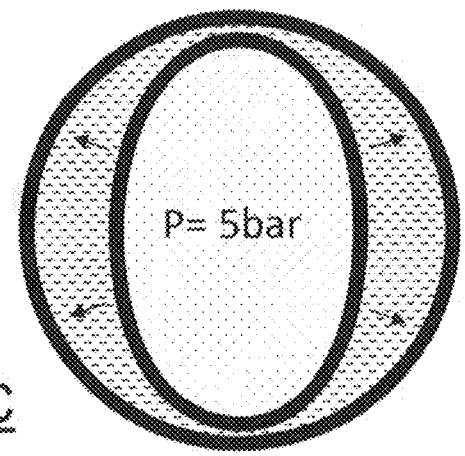

As respectively shown in FIGS. 49A, 49B and 49C, the buffer may be an accumulator to store energy. In a gas buffer, the gas temporarily stores the energy delivered by the liquid pressure. The pressures are equalized. This energy is returned when the external liquid pressure is less than the internal pressure of the gas buffer. As shown in the schematic of FIG. 49A, in a default buffer position the buffer tube is filled with a gas having a pressure of e.g., 4 bar. The gas buffer housing retains the gas buffer tube from gradually expanding by the internal gas pressure. In a stored energy state shown in FIG. 49B, by pressure an amount of liquid has entered the gas buffer housing. The liquid pressure compresses the gas in the gas buffer tube, thereby storing energy and equalizing the pressure. The external liquid pressure is equal to the internal gas pressure. As shown in FIG. 49C, in a releasing energy state, when the external pressure applied by the liquid is decreases, the gas pressure returns the energy. The liquid is displaced by the expanding gas. As long as the external liquid pressure is less than the internal gas pressure, the gas keeps expanding until the buffer has returned to its default position and therefore default pressure.

Figure 50A:
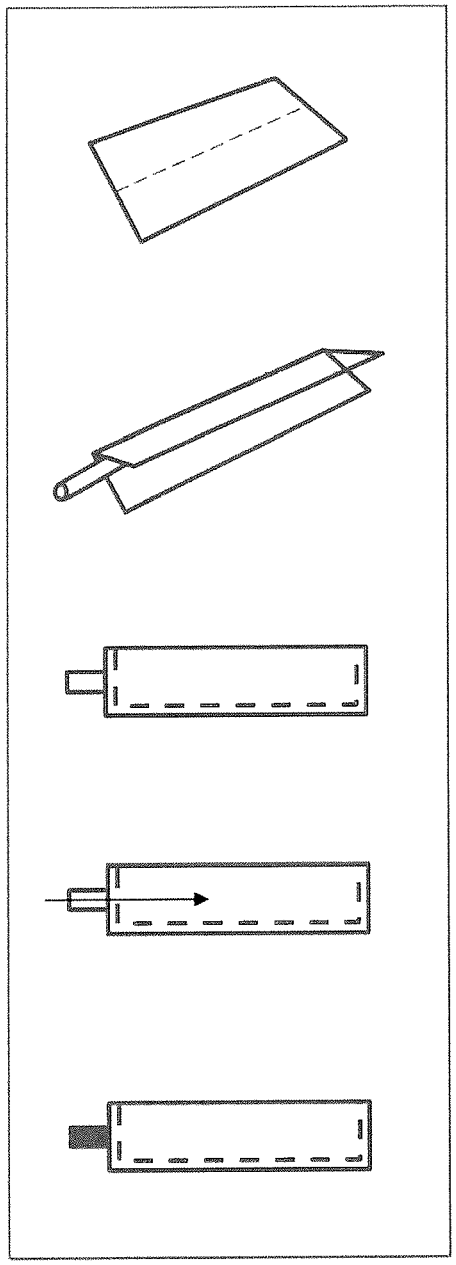
FIG. 50A Illustrates various sequential tasks in manufacture of an exemplary gas buffer.
Figure 50B:
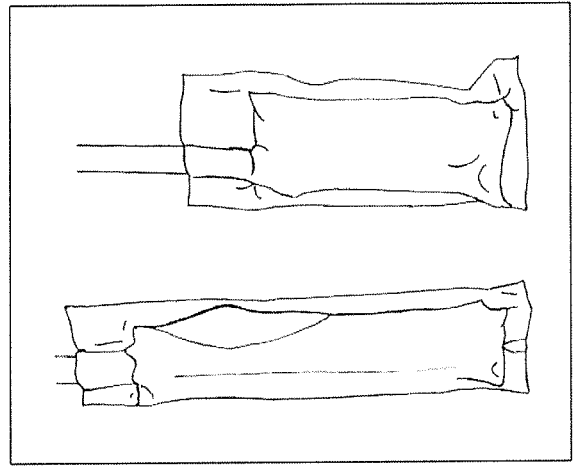
FIG. 50B Illustrates examples of a foil bag type gas buffer.
Figure 50C:
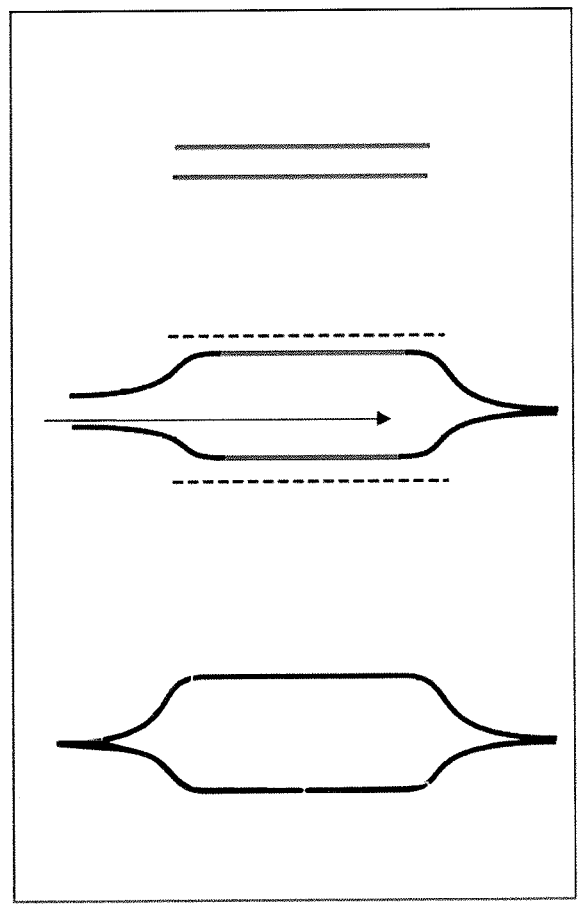
FIG. 50C illustrates buffers made with blow molding techniques.
Figure 51A:
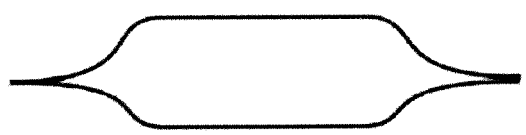
FIGS. 51A and 51B illustrate a single layer extruded tube filled with gas, and the single layer extruded tube as inserted in a second single layer tube or bag, respectively.
Figure 51B:
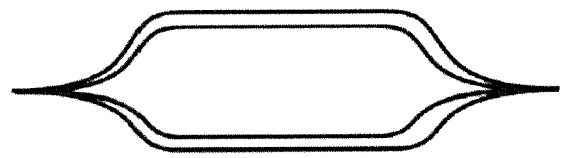

As respectively shown in FIGS. 50A, 50B and 50C, besides the gas buffer being made with a multi-layer extruded tube, it can also be made in alternative ways, such as, for example: buffers made from single or multi-layer foil, welded to become a buffer bag which can be filled by a gas. The foil can, for example, be a laminate comprising various layers, each layer being a specific material with specific properties. For example, to have better chemical resistance, or better barrier properties. With laminates, almost all materials can be used. Buffers can, for example, be made with blow molding techniques like extrusion blow molding, one stage blow mold processes, and in mold stretch blow molding. FIGS. 51A and 51B respectively illustrate alternate techniques by which gas buffers can be made, for example, and FIGS. 52A and 52B respectively illustrate use of a dispenser using gas buffer technology. FIGS. 51A and 51B thus show a buffer made by injection molding techniques. For example, a buffer made by welding a bag in a bag. First, a single layer extruded tube is filled with gas and welded similar to the multi-layer tube.

Then, the single layer welded is inserted in a second single layer tube or bag, and welding is performed to close. Thus, the buffer may be made, for example, by injection molding techniques. The welding techniques can include, for example, ultrasonic welding, laser welding, hot stamp welding, gluing, etc.

FIGS. 53-65 respectively illustrate exemplary manufacturing techniques for gas buffers. In particular, FIG. 53 lays out a sequence that can be implemented on an automated or semi-automated machine. With reference thereto, this sequence includes 12 steps: (1) Feed the tube to the manufacturing line; (2) Press to close one end of the tube; (3) Weld one end of the tube (=Weld 1); (4) Cool down weld; (5) Place injection needle; (6) Press to seal needle and inject air pressure; (7) Press to close tube; (8) Remove the needle; (9) Weld to seal the tube (=Weld 2); (10) Cool down weld; (11) Check pressure; and (12) Check dimensions.

Figure 53:
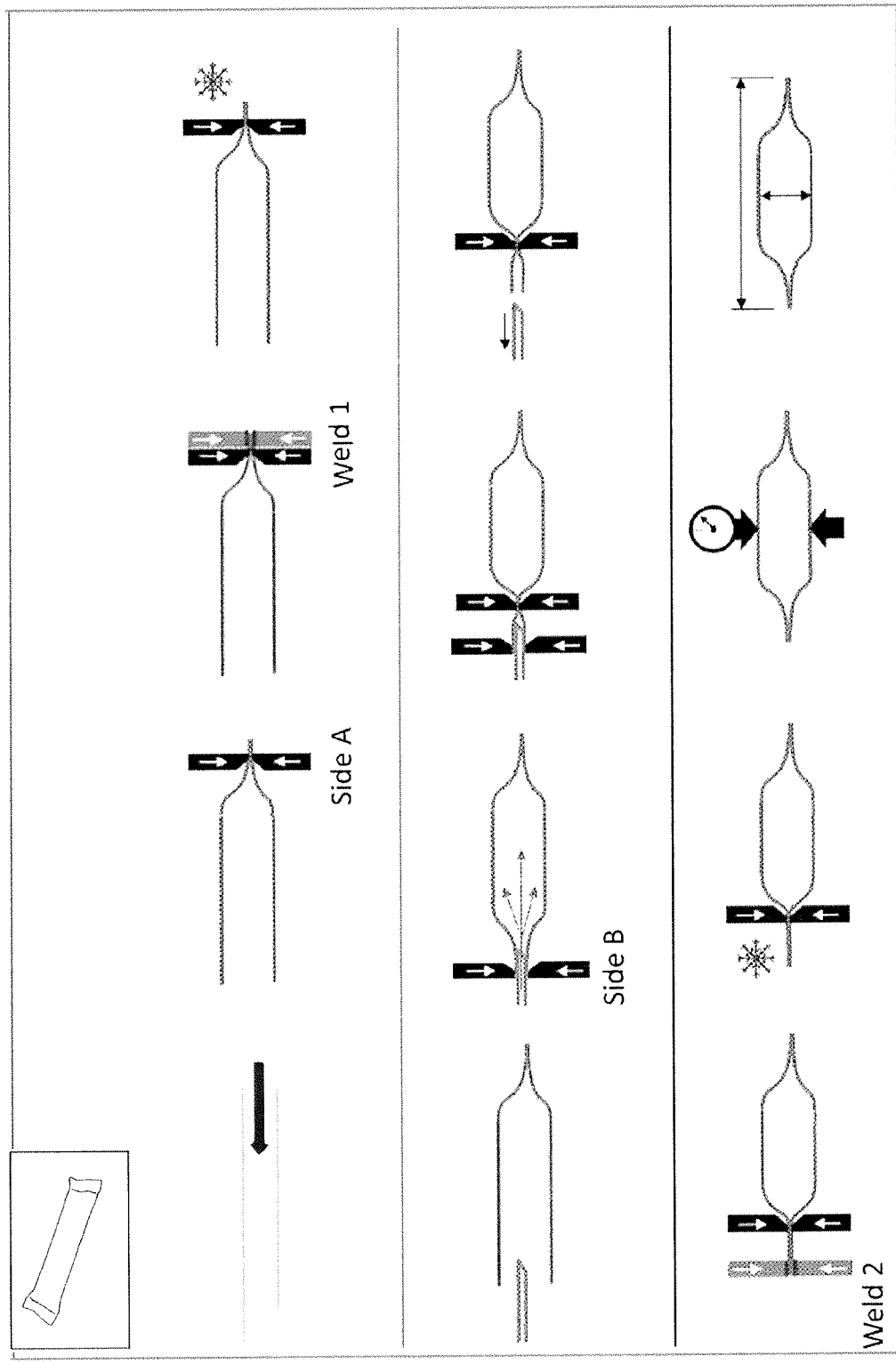
FIG. 53 illustrates an exemplary gas buffer technology manufacturing technique, according to an exemplary embodiment.
Figure 54A:
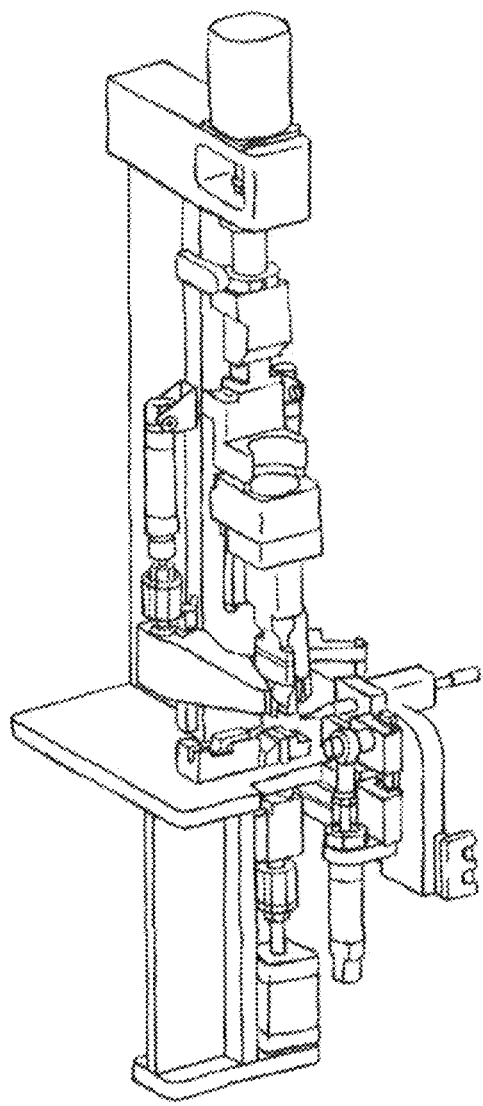
FIGS. 54A and 54B respectively illustrate front and rear perspective views of exemplary welding equipment for an exemplary gas buffer manufacturing technique according to exemplary embodiments.
Figure 54B:
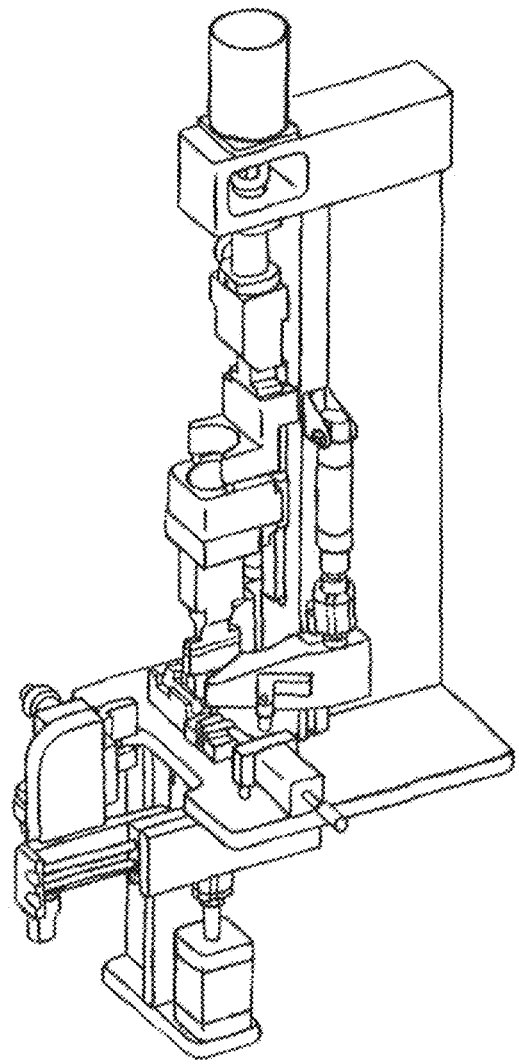
Figure 55:
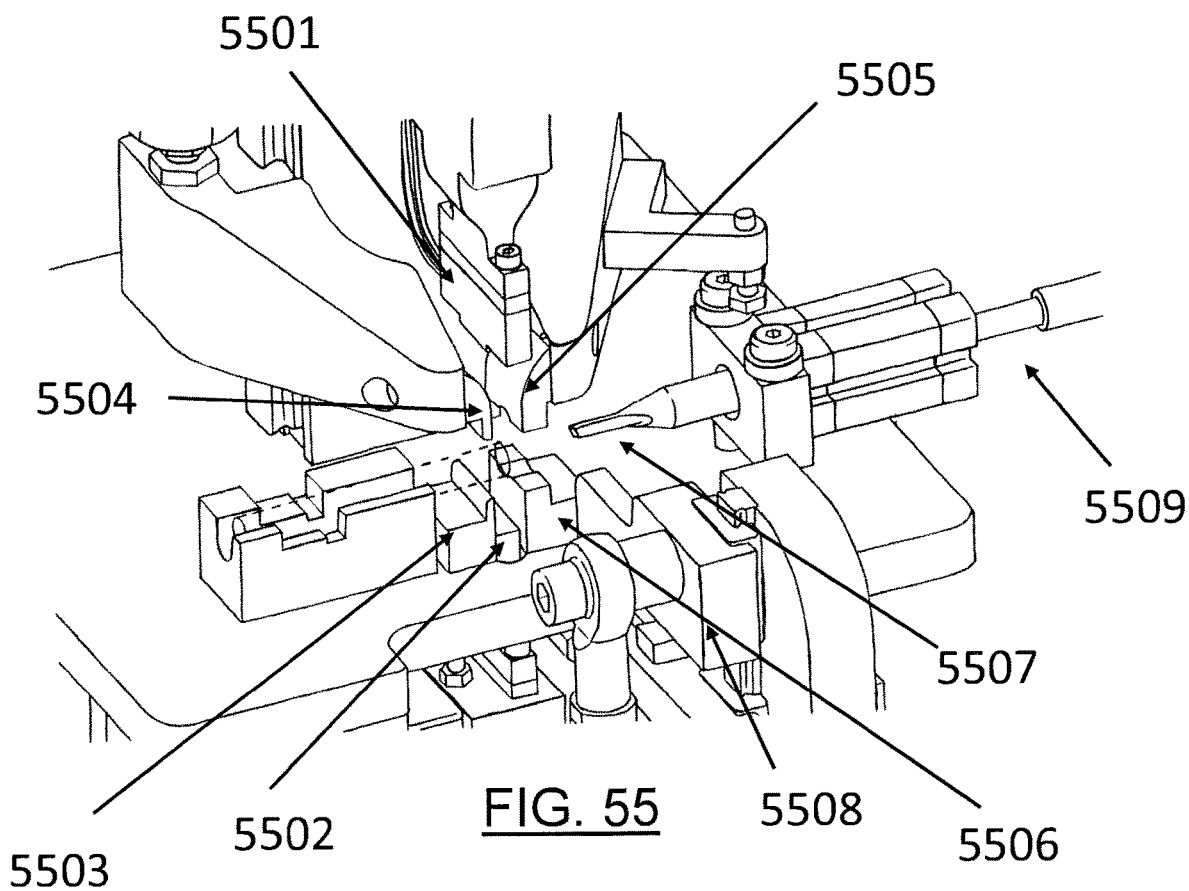
FIG. 55 illustrates detail of the exemplary welding equipment of FIGS. 54A and 54B.

FIGS. 54A and 54B respectively depict an exemplary machine for manufacturing a gas buffer using essentially the sequence of FIG. 53, and FIG. 55 presents an overview and illustrates key parts for the exemplary machine. There is, for example, an Upper welding head 5501, a Lower welding head 5502, a Lower clamp left 5503, an Upper clamp left 5504, an Upper clamp right 5505, a Lower clamp right 5506, a Needle 5507, Cooling clamps 5508 and a pressurized gas 5509.

Figure 56:
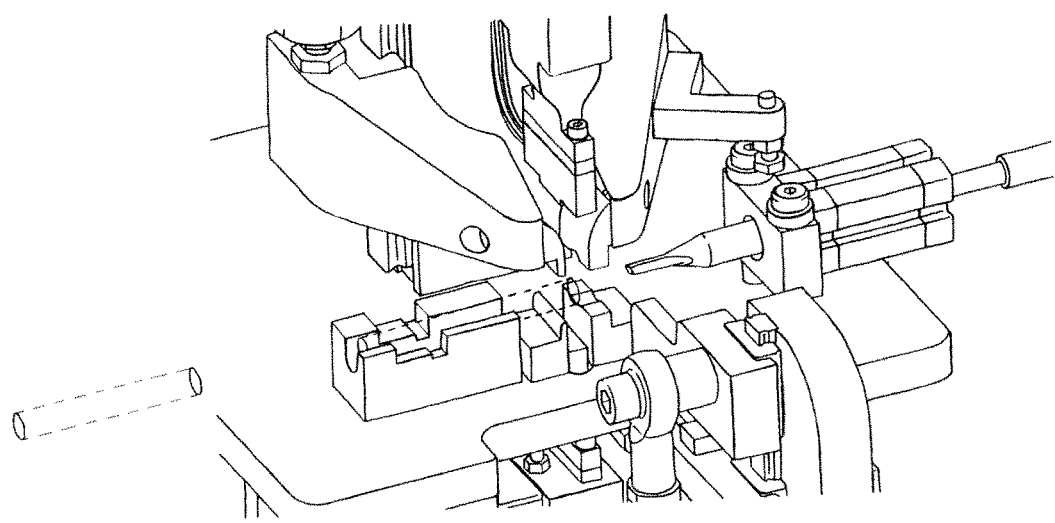
FIG. 56 illustrates introducing a tube to weld a first end, according to an exemplary embodiment.
Figure 57:
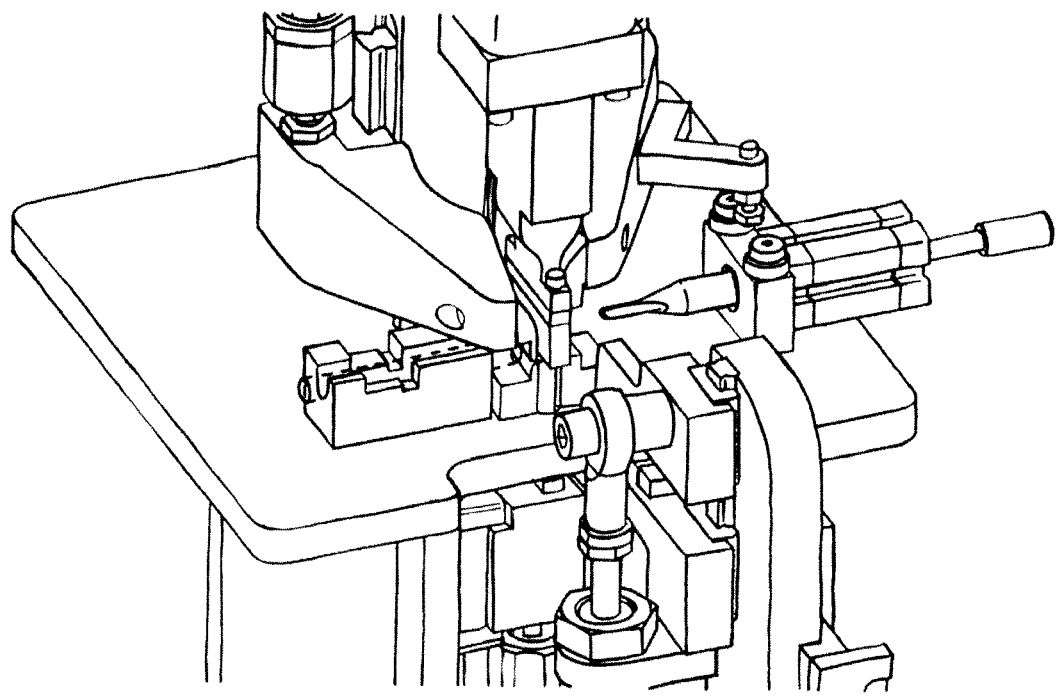
FIG. 57 illustrates closing of the upper and lower left clamps and heads, and welding, according to an exemplary embodiment.
Figure 58:
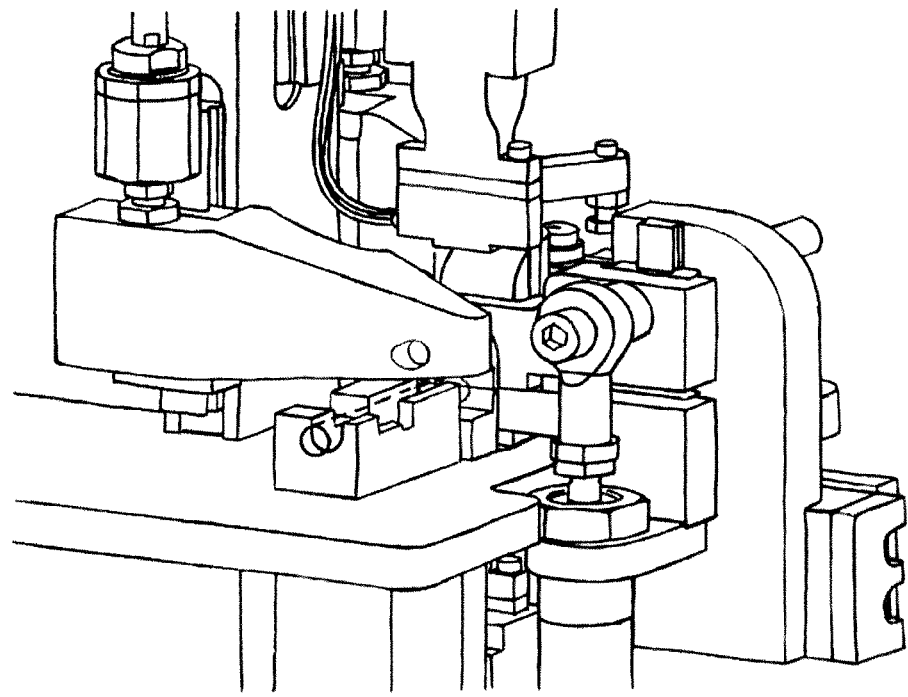
FIG. 58 illustrates opening of upper and lower welding heads, when welding stops, according to an exemplary embodiment.
Figure 59:
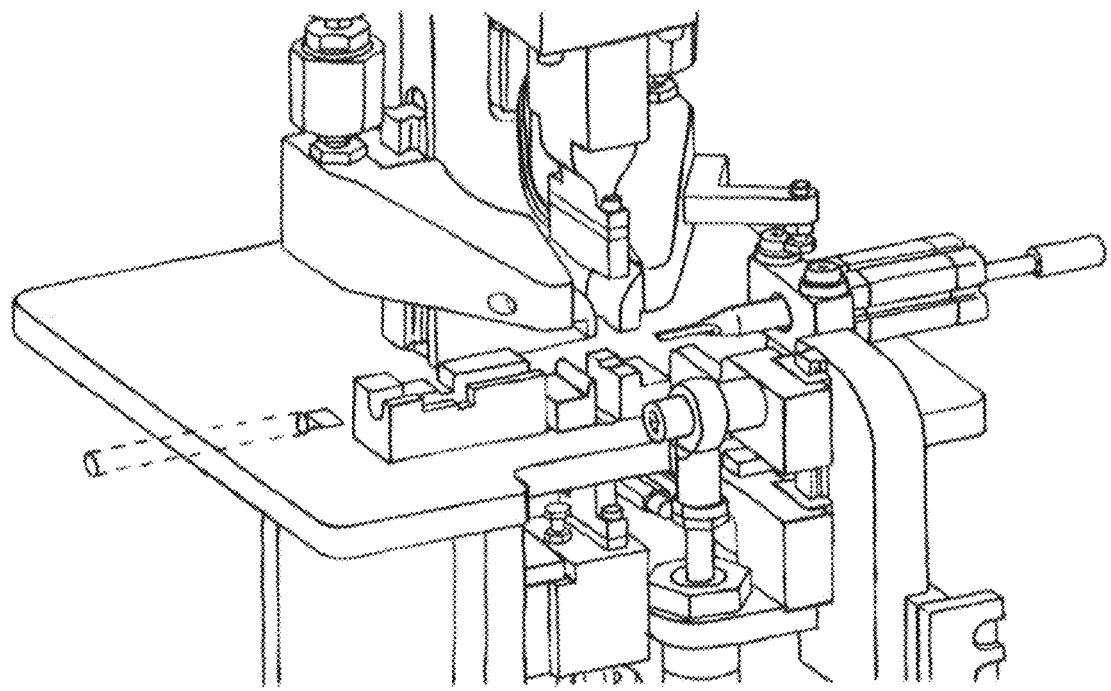
FIG. 59 illustrates opening of cooling clamps, after cooling, where the buffer with one welded side may be removed, according to an exemplary embodiment.
Figure 60:
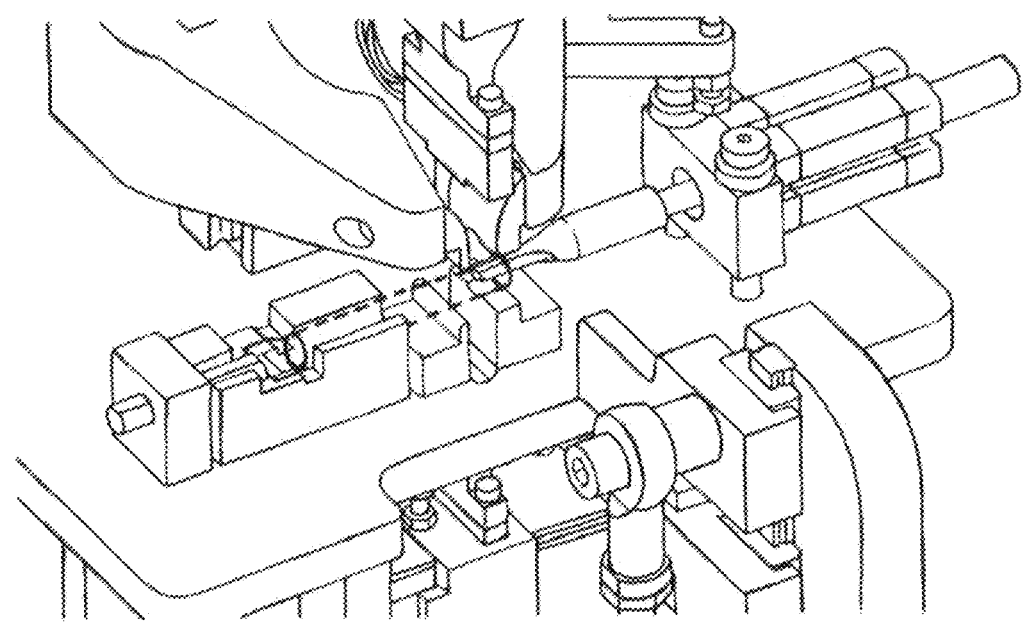
FIG. 60 illustrates where after the buffer with one side welded is placed with the opposite open side towards the needle, the open side of the buffer tube is pushed over the needle, according to an exemplary embodiment.
Figure 61:
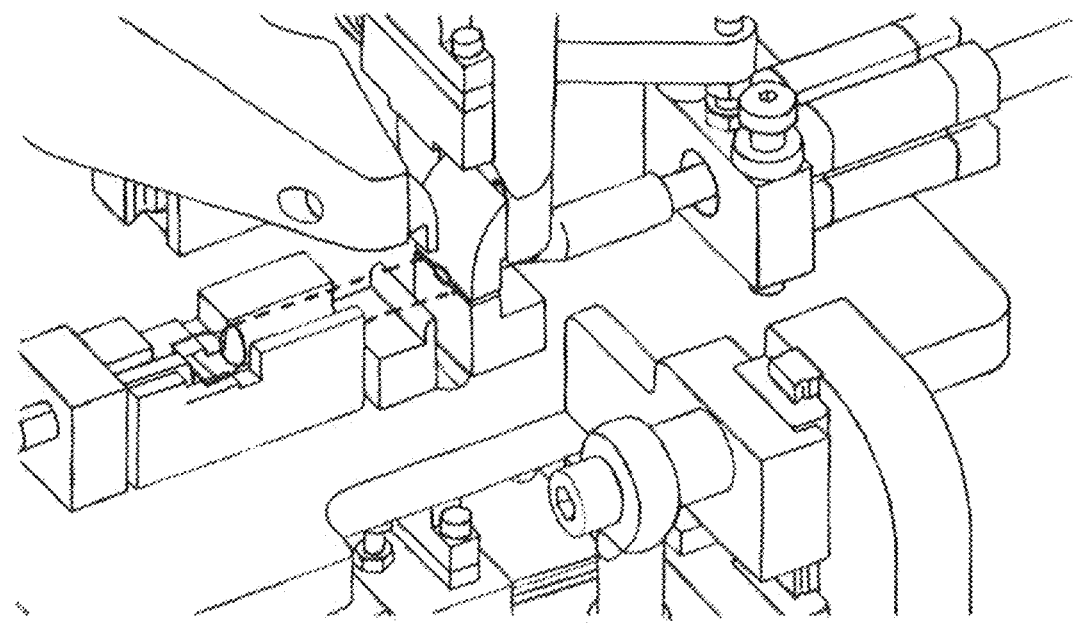
FIG. 61 illustrates where after the upper and lower clamp on the right closes, the buffer tube around the needle is sealed, and gas enters the buffer through the needle, according to an exemplary embodiment.
Figure 62:
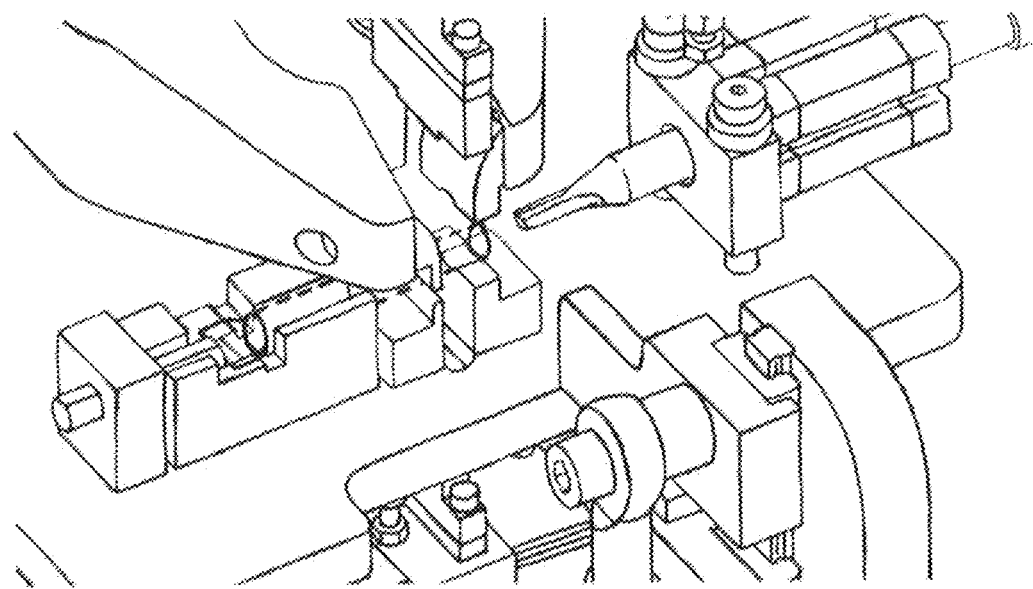
FIG. 62 illustrates where after the upper and lower clamp on the left closes, the buffer tube is at pressure when the needle retracts, and the right clamps open again, according to an exemplary embodiment.
Figure 63:
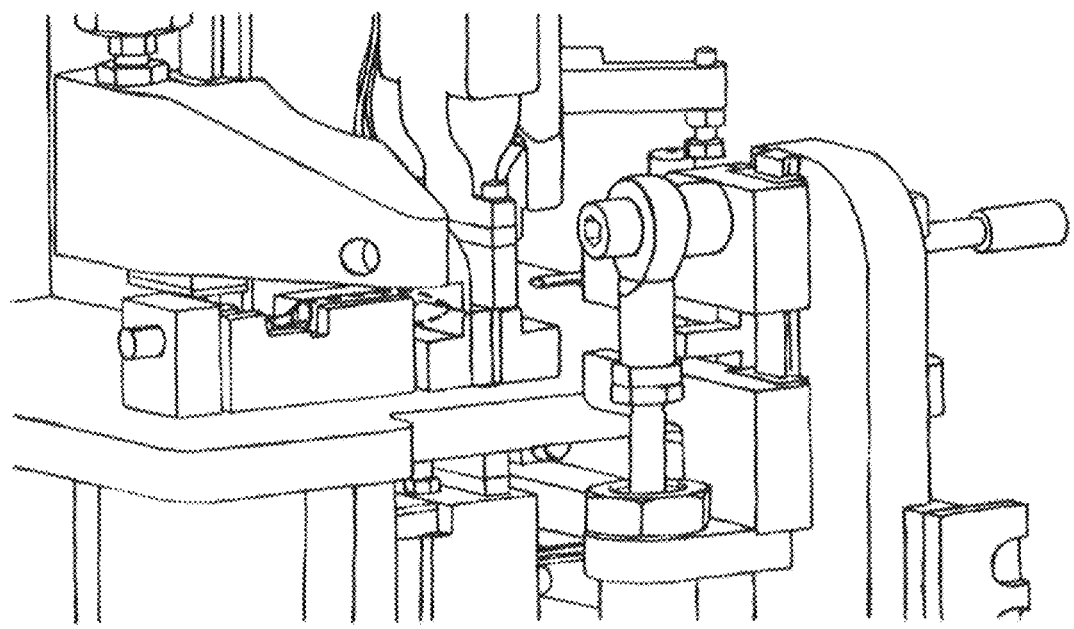
FIG. 63 illustrates where the second side is thermally welded and the upper and lower welding heads close, welding is in progress and the second weld is made, according to an exemplary embodiment.
Figure 64:
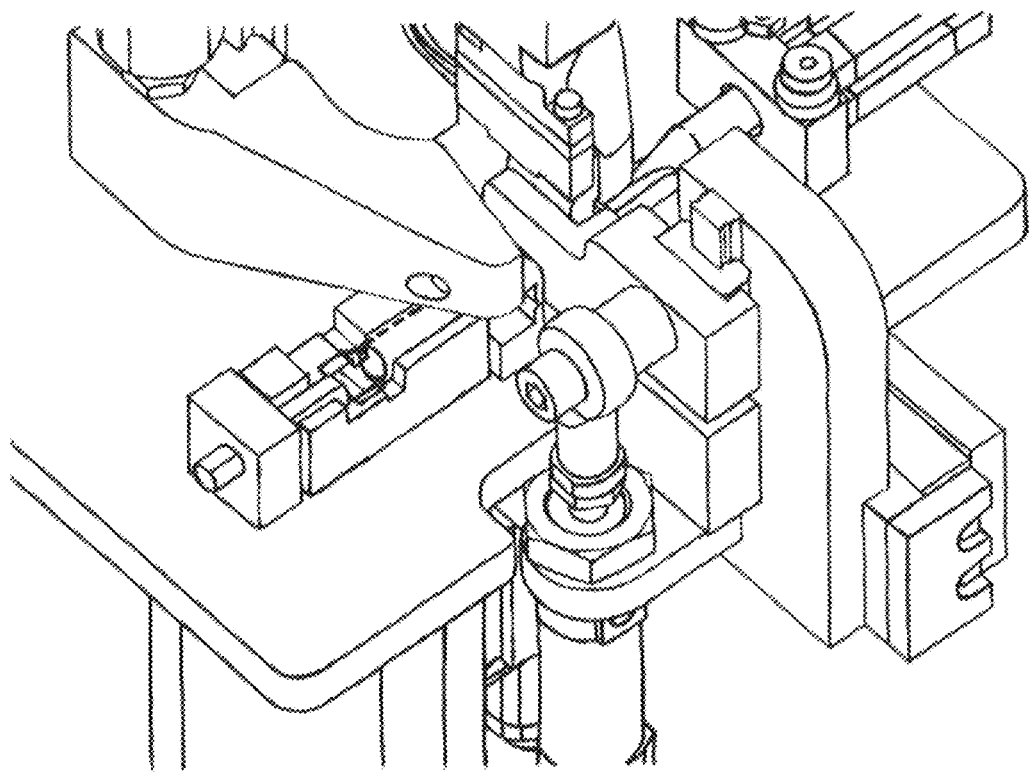
FIG. 64 illustrates where the upper and lower welding heads open, the welding stops and the cooling clamps comes in and squeezes around the weld, according to an exemplary embodiment.

FIGS. 56-65 respectively set forth exemplary steps in creating a gas buffer using the exemplary apparatus of FIG. 54, as follows:

FIG. 56 shows Step 1, enter the tube to weld the first end. FIG. 57 shows Step 2, after the upper and lower clamp left closes, the upper and lower welding heads close, welding is in progress. FIG. 58 shows Step 3, where after the upper and lower welding heads open, welding stops, and cooling clamps comes in and squeezes around the weld. FIG. 59 shows Step 4, where after cooling the tube, the cooling clamps open, and the buffer tube with one side welded can be removed. FIG. 60 shows Step 5, where after the buffer with one side welded is placed with the opposite open side towards the needle, the open side of the buffer tube is pushed over the needle. FIG. 61 shows Step 6, where after the upper and lower clamp on the right closes, the buffer tube around the needle is sealed, and gas enters the buffer through the needle. FIG. 62 depicts Step 7, where after the upper and lower clamp on the left closes, the buffer tube is at pressure when the needle retracts, and the right clamps open again. FIG. 63 shows Step 8, where the 2nd side is thermally welded and the upper and lower welding heads close, welding is in progress and the 2nd weld is made. FIG. 64 shows Step 9 where the upper and lower welding heads open, the welding stops and the cooling clamps comes in and squeezes around the weld. Finally, FIG. 65 shows Step 10, where after cooling the tube, the cooling clamps open, and the welded buffer can be removed.

Alternate Gas Buffer Fabrication

As noted, FIGS. 66A-66E and FIG. 67 respectively illustrate an exemplary alternate gas buffer manufacturing technique. With reference to FIG. 66A, one can create the gas buffer by beginning with a co-extruded tube on a reel. The pressure in the tube can be, for example, 3.5 barg. The tube can be made of, for example, polyethylene, polypropylene, polyamides, silicone, AVOH, a sandwich of layers of aluminum, polyester and polyethylene, to name a few possibilities, depending upon the gas buffer properties needed, and the types of chemical resistance needed, in various sprayer devices. The end of the tube can be pinched or welded and cut, and the sealed bag can be quickly placed into the buffer chamber, as shown in FIG. 66E.

Next, as shown at FIG. 66B, the sealed bag is a bit smaller that the buffer chamber, but the bag will expand, as shown in FIG. 66C. This will cause the material in the bag to creep until it hits the buffer chamber wall. As a result of this expansion, the pressure inside the bag is now dropped to the pressure needed, for example, approximately 2.5 barg. Finally, the buffer chamber can be capped to hold the buffer in place and otherwise seal the chamber as shown in FIG. 66D.

FIG. 67 shows yet another method for assembling a gas bag-type buffer chamber. With reference to FIG. 67, at stage 1 there can be provided a co-extruded tube inserted into a pressure chamber. The pressure in the chamber can be, for example, 3.5 barg. It is within the pressure chamber that the co-extruded tube is welded on both ends at stage 2, and then, at stage 3, transported, still under pressure, to a second pressure chamber whose internal pressure is approximately 5 barg, for example, (or some value greater than the pressure in the first chamber). Due to the higher pressure in this second pressure chamber the bag shrinks at stage 4. At stage 5, the bag is pushed from the second pressure chamber into the buffer chamber, and at stage 6 the bag expands until it hits the wall of the buffer chamber, thereby losing internal pressure and dropping from 5 barg to 3.5 barg which is the desired final pressure. At this point the buffer chamber can be capped as shown at stage 7. This results in a 3.5 barg gas buffer, for example, matching the initial pressure of the first pressure chamber.

Figures 52A, 52B:
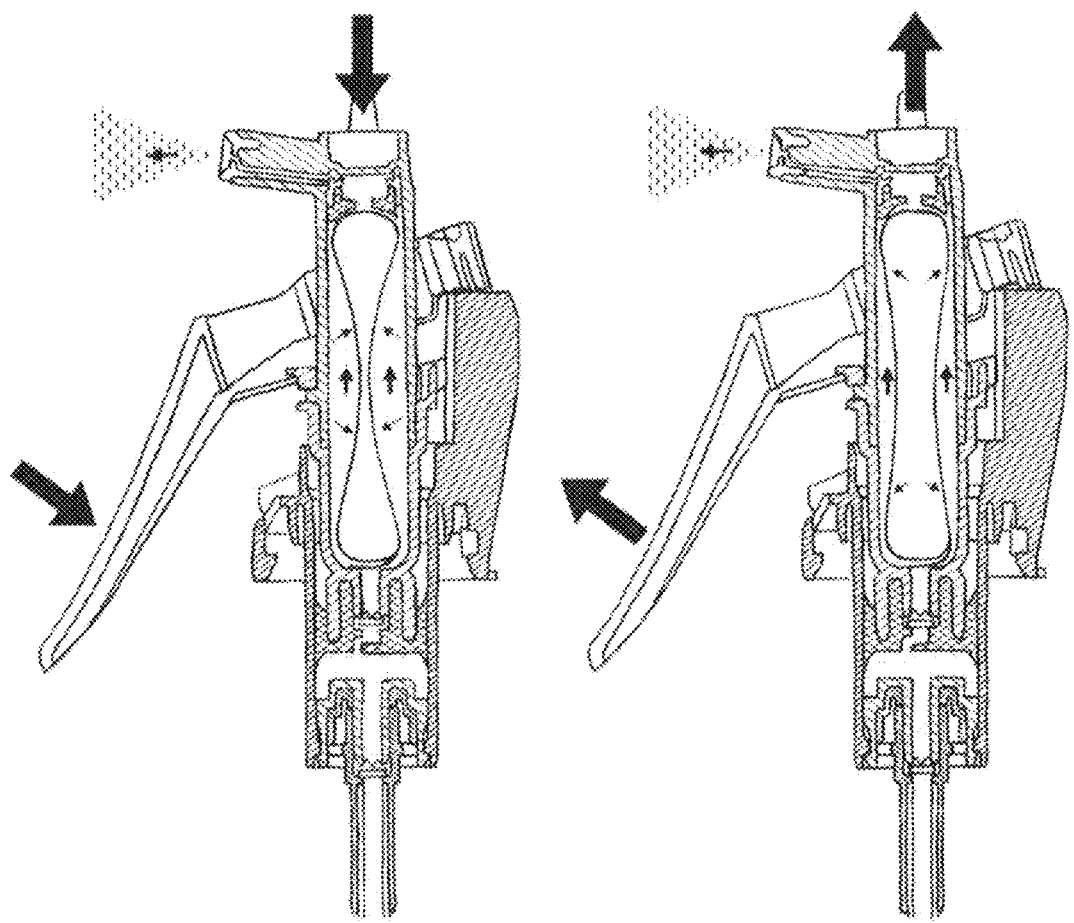
FIGS. 52A and 52B respectively illustrate an exemplary upstroke and downstroke of an exemplary sprayer head and the corresponding behavior of an internal gas buffer.

Returning now to FIGS. 52A and 52B, these show how a gas buffer can operate in practice. With reference thereto, there is a gas buffer with an exemplary 2.5 barg in its bag, as shown as the end result of the process depicted in FIGS. 66A through 66E, i.e., FIG. 66D. In FIG. 54A, liquid is pumped into the buffer, in particular in between the buffer housing and the buffer bag. The air in the bag is thus further compressed due to the pressure of the liquid, creating a higher pressure than the original 2.5 barg. With reference to FIG. 52B, when the additional liquid under pressure ceases to be pumped into the buffer (i.e., the downstroke of the piston has completed), the liquid in the buffer is now pushed out of the buffer because the buffer bag naturally expands until it once again hits the wall of the buffer housing. In this manner the energy stored in compressing the bag to continue the outflow of liquid through the sprayer head in between strokes, thus offering continuous spray.

Duo1 Pump Engine For Various Applications

In exemplary embodiments of the present invention, the DuO1 Pump engine can be used in all kind of dispensing applications, such as, for example, floormops, window washers, sprayers, and applicators. The DuO1 Pump engine can be used in a wide pressure-range of dispensing applications, from low to high pressures. The DuO1 Pump engine can be made in all kinds of types, configurations and combinations of configurations and materials, adjusted to specific needs of each application.

For example, such as multiple pumps, dimensions of the pump or pumps, length of the stroke, nozzle or multiple nozzles, position of the nozzles, direct stop, continuous, continuous-stop, low pressure, and high pressure.

Multiple Pumps In Parallel To Increase Output

Figures 68A, 68B:
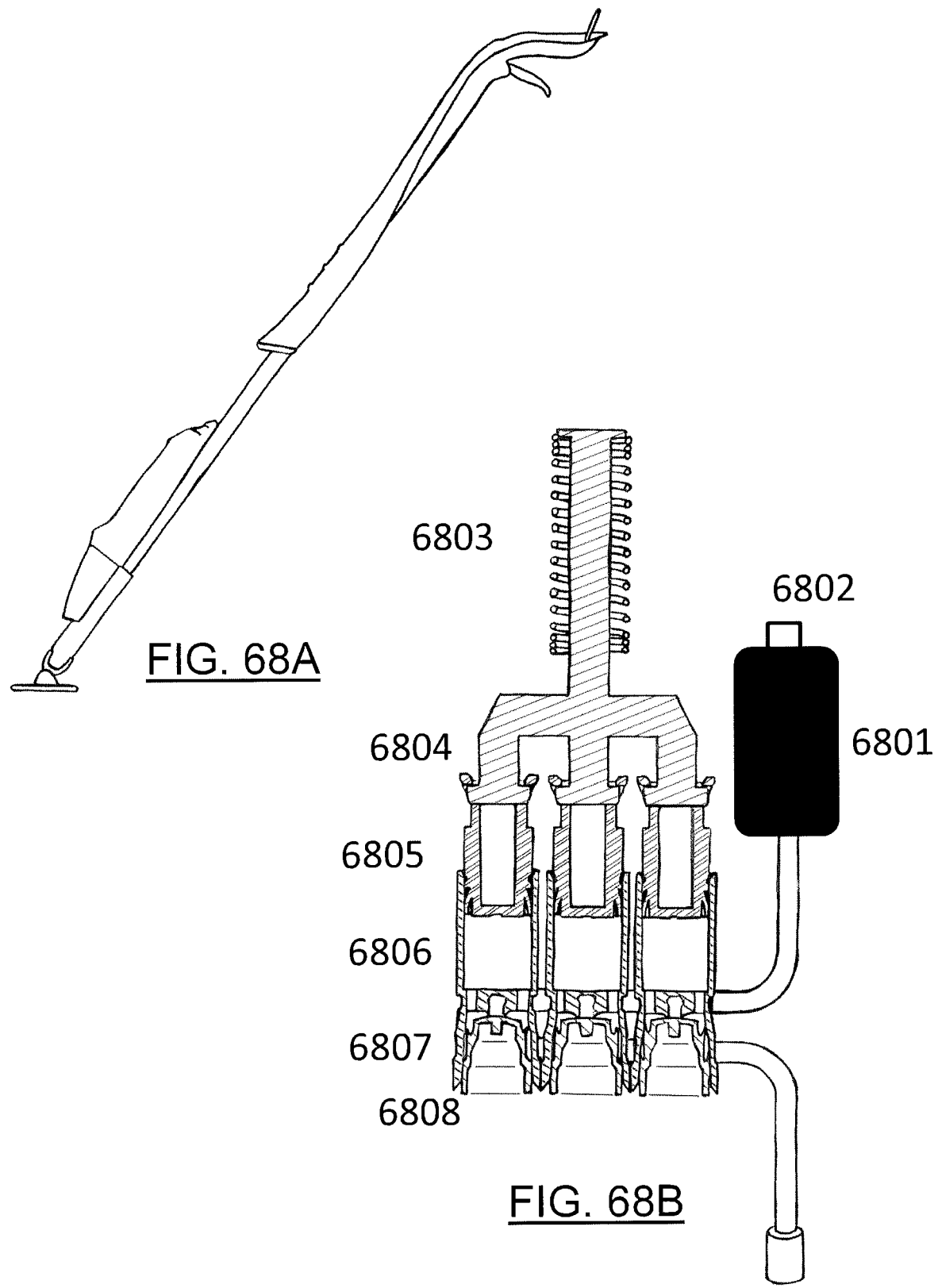
FIGS. 68A, 68B, 68C and 68D respectively show how multiple pumps can be used with a common inlet line and a common outlet or output line to increase output, according to exemplary embodiments of the present invention.
Figure 68C:
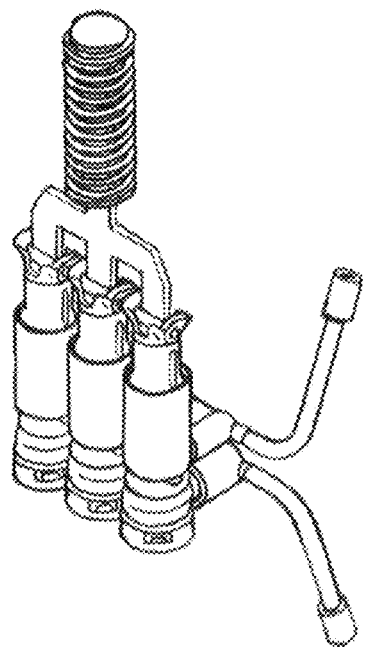
Figure 68D:
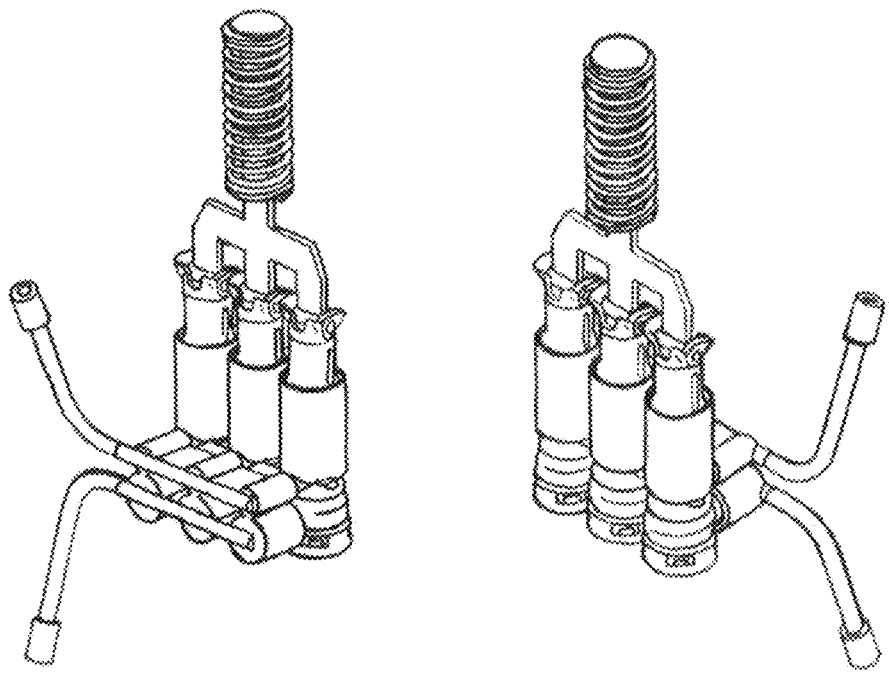

FIGS. 68A through 68D respectively show how multiple pumps can be used with common inlet line and a common outlet or output line to increase output using a DuO1 type system. This is especially useful in contexts such as a "Flairomop" device, described below, and shown in FIG. 68A. As shown in FIGS. 68B and 68D, there can be a liquid container 6801 with container venting 6802. Container venting 6802 is not needed, of course, if a Flair bottle is used, because the venting in a Flair bottle is integrated in the container/bottle, and no head space is necessary to be maintained above the liquid in the liquid container. There can also be a spring 6803, a pusher 68044, pistons 6805, piston housing 6806, non-return valve inlet piston 6807, a separate inlet valve 6807A, which is optional, a non-return valve inlet to the nozzle or buffer 6808, and a separate valve inlet to the nozzle buffer 6808A. It is noted that inlet valve 6807A, when used, is connected to the container bottle and outlet line 6808A is connected to the buffer, and from there to the nozzle. As can be seen in FIGS. 68A through 68D, one can use one, two, three, four or more pistons and piston chambers in parallel, all of which may be, for example, simultaneously actuated by pusher 6804. Although to achieve similar results one could simply increase the size of the piston chamber, using multiple chambers in parallel allows for a standard unit to be manufactured, and increase of size simply achieved by adding units.

Flairomop—Floor Cleaner Using DuO1 Sprayer Technology

Finally, a novel device for cleaning floors and the like is next described. This device utilizes the novel new generation sprayer technologies described above, where the sprayer is essentially mounted upside down so as to spray on a floor. These devices are known as a "Flairomop" or a "Flairo-Washer", for example. They operate in similar fashion to the upright buffered sprayers described above, FIGS. 69A through 69E respectively illustrate details of nozzle placement an exemplary Flairomop. As shown in FIG. 69B, the nozzles can be provided above the floor plate, or at the bottom of the floor plate, as shown in FIGS. 69C, 69D and 69E. If provided on the floor plate, for example, they can have either a single nozzle configuration as shown in FIG. 69C, a double nozzle configuration as shown in FIG. 69D, or multiple nozzles, such as is shown in FIG. 69E. A Flairomop can use a sprayer, of the various types described above, with various buffer types.

Thus, in exemplary embodiments of the present invention, a Flairomop can have three basic types: (i) small fanspray-nozzle, high pressure, useable with all buffers; (ii) small fanspray-nozzle, high pressure, useable with all buffers, direct action; and (iii) low pressure useable with all buffers.

General Features

General features of an exemplary Flairomop can include, for example, an output greater than 3cc, the ability to produce a fan spray, the ability to produce all types of spray and foam functions, the use of pre-compression with a normally closed front or outlet valve, the use of a Flair container holding between 250 and 1000cc's, no blockage of opening due to drying in of liquid, broad chemical resistance to detergents solvents, olive oil etc., a low trigger force required to actuate. Optionally, for example, the Flair bottle can also be used with a lock-out mechanism, as described above.

Flairosol Based Flairomop

Figure 70B:
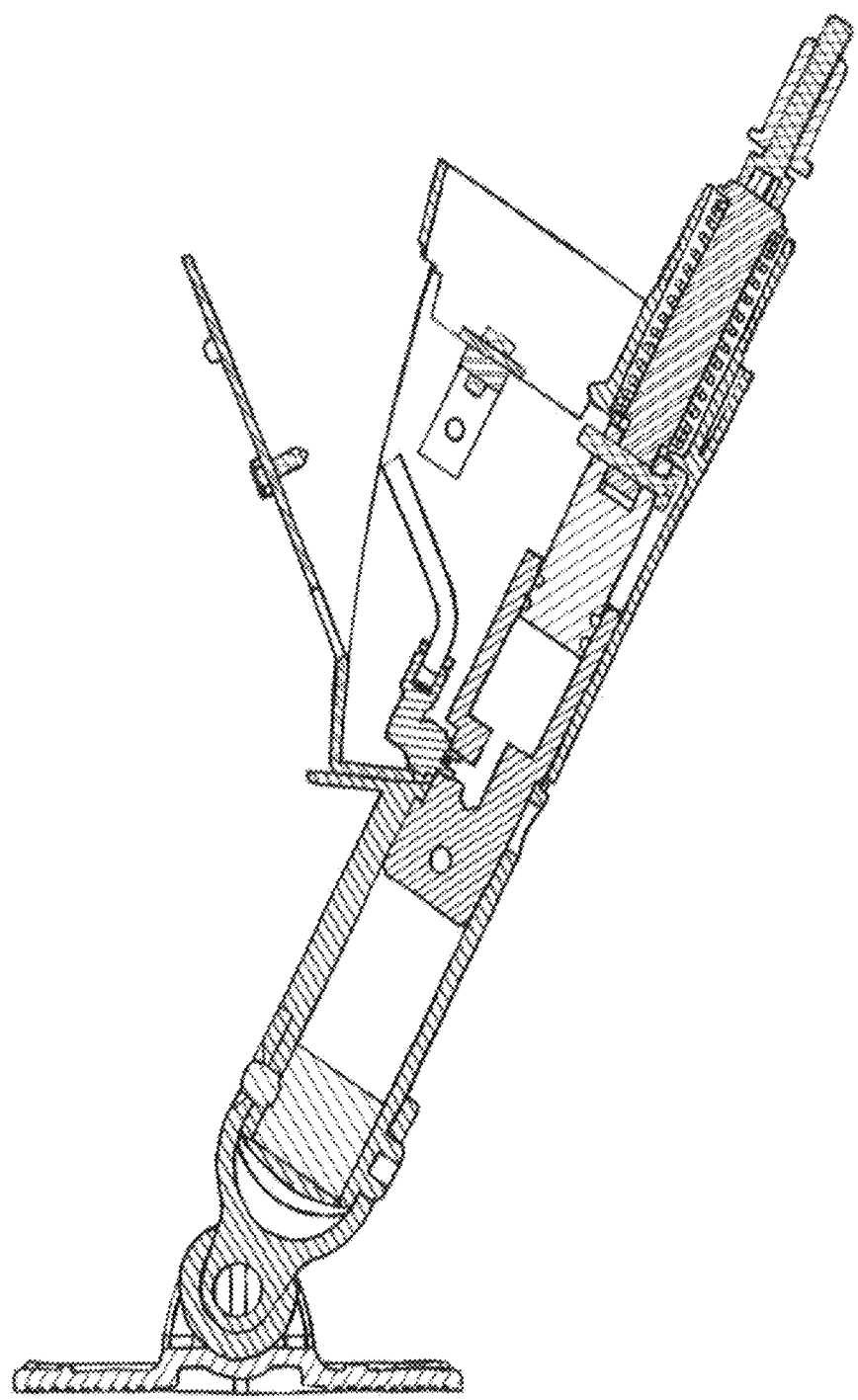
FIG. 70B presents the general properties of a Flairomop device according to exemplary embodiments of the present invention.

FIGS. 70A and 70B respectively illustrate an exemplary Flairomop using a standard Flairosol sprayer mechanism. This is essentially a spring buffered non-inline sprayer system built onto an existing Flairomop prototype. As shown in FIG. 70A, there can be a fanspray nozzle, and liquid can be pushed into the integrated buffer. After triggering, the spring will push back the buffer piston to dispense the contents of the buffer, as described above. Thus, there is a connector, a piston closure, a standard Flairosol sprayer head, a Flairosol integrated buffer and a Flair bottle. As shown in FIG. 70B, by triggering the handle at the shaft, the piston can be pushed downwards and the spring biasing the piston will push it back upwards, making it available once again for a user. In this particular example, using a 16 mm boring and a 21 mm stroke length for the piston chamber, about 4 cc of liquid can be moved per stroke. Of this, a certain amount is pushed through the nozzle, but the remaining portion goes into the integrated buffer.

High Pressure Continuous Spray Single Nozzle

Figures 71A, 71B:
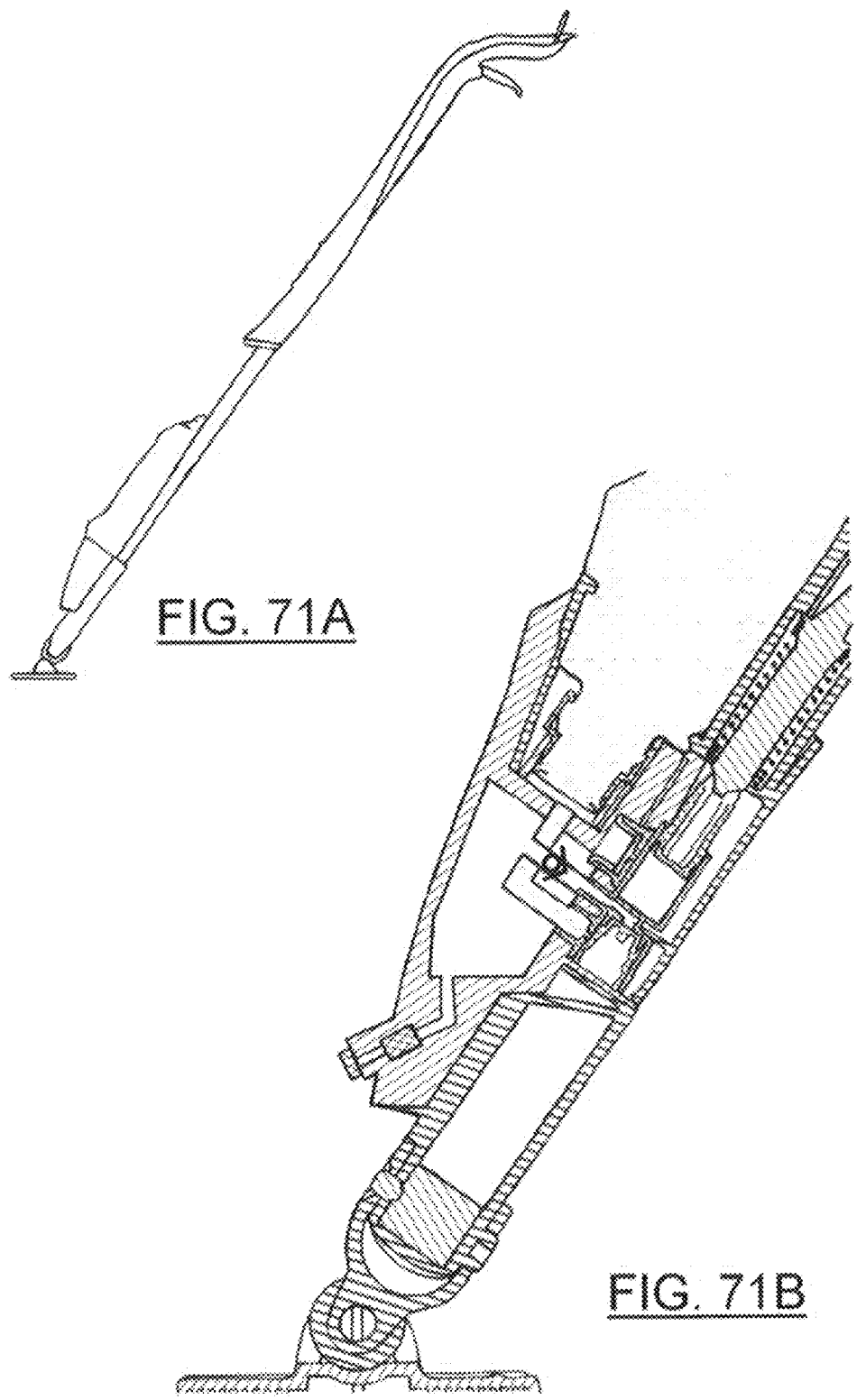
Figure 71C:
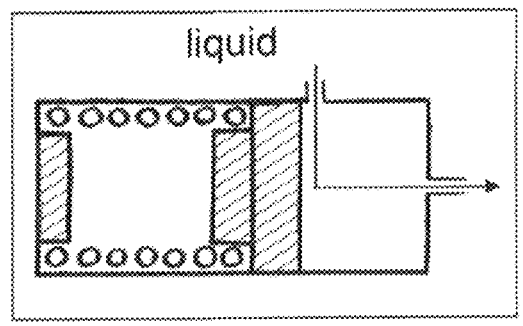
Figure 71D:
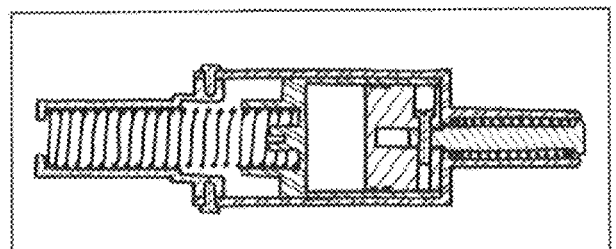
Figure 71E:
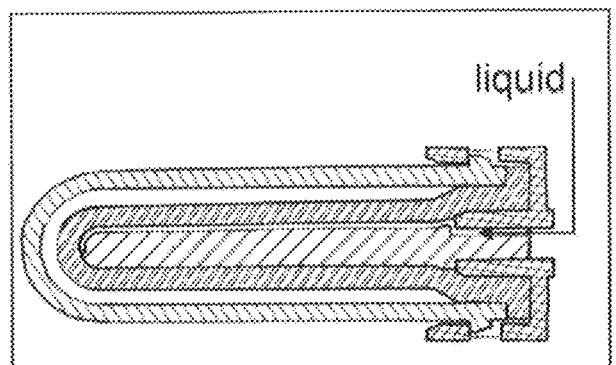
Figure 71F:
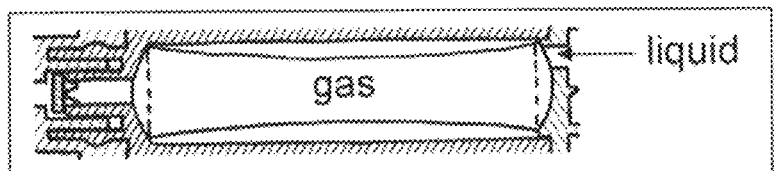

FIGS. 71A and 72A respectively show an exemplary embodiment of a Flairomop designed to produce a high pressure continuous spray. As shown in FIG. 71A, when a user triggers, the complete volume of the piston chamber will be dispensed.

Because the output of the piston chamber is bigger than that which the nozzles can handle, the remainder of the liquid from the piston chamber will be stored in the buffer for later dispensing. There is no direct stop, however, as in the case of a direct action sprayer ("direct stop" and "direct action" are used inter-changeably in this disclosure, for a sprayer that ceases spraying immediately upon a user letting go of the trigger), and dispensing will stop as the buffer is emptied and the liquid falls below the set pressure of pre-compression valve 8, which can be, for example, between 2-6 barg, such as, for example, say 2.2 barg in some embodiments.

FIG. 72A is a schematic diagram of the system of FIG. 71A. With reference thereto, there is shown a liquid container 7701, optional container venting 7702 for use with non-Flair bottles, piston 7703, piston housing 7704, and non-return inlet valve for the piston 7705, non-return inlet valve for the buffer 7706, buffer 7707, pre-compression valve 7708 and nozzle 7709. It is noted that this embodiment uses a standard separate piston, but, as noted above, a novel stretched piston could also be used.

As shown in FIG. 72A, this is a high pressure system with a liquid buffer. As the piston moves upwards, liquid is drawn from the liquid container due to the underpressure which is created. The container either needs to have air venting 2, or needs to use a Flair type bottle, as described above, which requires no venting.

Next, by a user pushing the piston downwards the liquid is forced to go to the nozzle, or multiple nozzles, as shown in FIGS. 69A through 69E above. Because of the restriction of the nozzles as far as handling volumes of liquid per unit of time, a certain portion of the liquid will go into the buffer, such as, for example, $\frac{2}{3}$ of the liquid, and generally always more than half of the liquid in the piston chamber, the exact fraction depending upon the piston chamber volume and diameter, and the restriction in the nozzle(s). The buffer will then be filled with liquid and the pressure in the buffer will increase. As the piston reaches the end of its downstroke, the liquid collected in the buffer will then be dispensed through the nozzle(s) as there is no longer any liquid being pushed out of the piston chamber. As shown in FIGS. 72B through 72E, the buffer can be any of the various types described above such as, for example, spring loaded, spring loaded in-line, elasticity material, or gas loaded. In preferred exemplary embodiments, a gas loaded buffer can be used. Additionally, gas buffers can be used that hold the liquid on the outside of a central gas filled bag, or for example, a liquid can be pumped in the interior of a surrounding gas shell, in the nature, shape wise, of the elasticity material buffer shown in FIG. 71E.

High Pressure Continuous Spray Multiple Nozzle

In a manner wholly analogous to FIGS. 71A, 71B, and 72A and 72B, FIGS. 73A and 73B and FIG. 74A respectively show an exemplary high pressure continuous spray Flairomop embodiment with two nozzles on the floor plate, as opposed to one nozzle provided on the handle, under the buffer, as shown in FIG. 71B. In all other respects it is identical to the exemplary embodiment of FIGS. 71A and 71B and 72A. The continuous spray is achieved by use of the buffer, as described above. As shown above in FIG. 1, as long as the buffer volume v2 is at least as large as the volume of liquid sent to it in each stroke v1, the buffer can then dispense such excess (shown as top of curve above upper pressure line Pmax, and then moved to fill in between pumping strokes, in far right image of FIG. 1) v1 between strokes. The number of strokes per minute necessary to maintain continuous spray is thus a function of the fraction of the liquid in the piston chamber sent to the buffer each stroke, the type of nozzle, and the opening pressure in the pre-compression outlet valve, and can be adjusted using those parameters, for various systems as desired.

As shown in FIGS. 73A and 73B, once a user has triggered, the complete volume of the piston will be dispensed. Because the output of the piston is bigger than that which the nozzle(s) can handle to dispense, the rest of the liquid will be stored in the buffer, and will be dispensed later. There is no direct stop in this embodiment. The dispensing will thus stop as the buffer empties at the set pressure of the pre-compression valve.

As shown in FIG. 74A, this is a high pressure system with liquid buffer.

By the piston movement upwards liquid is taken from the liquid container due to the under pressure which is created. The container needs an air venting or Flair (bag within a bag) bottle.

By pushing the piston downwards the liquid is forced to go to the (multiple) nozzle(s) AND due to the nozzle output restriction, into the buffer. The buffer will be filled with liquid and the pressure in the buffer will increase.

As the piston is at the end of its stroke downwards, the liquid collected in the buffer will be dispensed through the nozzle(s). With Flairosol (or other Flair type systems) venting is not necessary because the venting is integrated in the container/bottle. Venting is needed when a standard container/bottle is used.

High Pressure Direct Action

FIGS. 75A and 75B and 76A respectively illustrate an exemplary high pressure direct action Flairomop device with one nozzle. In all other respects it is identical to that shown in FIGS. 71A and 71B, and 72A and 72B, except that, being a "direct action" type, there is no non-return inlet valve for the buffer keeping liquid form escaping the buffer back to the piston chamber. Thus, when a user releases the trigger, there is a direct stop: liquid will flow back into the piston chamber, thus stopping the spray.

As shown in FIG. 75B, once a user has triggered, the complete volume of the piston will be dispensed as long as the user holds the trigger. Because the output of the piston is bigger than that which the nozzle(s) can handle to dispense, the rest of the liquid will be stored in the buffer, and will be dispensed later. There is a direct stop in this embodiment once the trigger is released. Liquid will flow back into the piston chamber (no non-return valve inlet buffer).

As shown in FIG. 76A, this is a high pressure system DIRECT ACTION with liquid buffer. By the piston movement upwards liquid is taken from the liquid container due to the under pressure which is created. The container needs an air venting or Flair (bag within a bag) bottle.

By pushing the piston downwards the liquid is forced to go to the (multiple) nozzle(s) and due to the nozzle output restriction, into the buffer. The buffer will be filled with liquid and the pressure in the buffer will increase.

As the piston is at the end of its stroke downwards, the liquid collected in the buffer will be dispensed through the nozzle(s). With Flairosol (or other Flair type systems) venting is not necessary because the venting is integrated in the container/bottle. Venting is needed when a standard container/bottle is used.

Low Pressure Flairomop

Finally, FIGS. 77A and 77B and FIG. 78A, respectively illustrate an alternate exemplary embodiment of a Flairomop, one that operates at low pressure. With reference to FIG. 78A, in this exemplary embodiment there are two nozzles 7709 on the floor plate, as described above. There is also added a restrictor 7707 to control the amount of output that can be sent through the nozzle path each stroke. The main differences between the lower pressure Flairomop of FIGS. 77A and 77B and 78A and the high pressure versions of FIGS. 71A-76A is the opening pressure of pre-compression valve 7708. Because the size of the piston 7703, as well as the piston housing 7704, are increased in this exemplary embodiment, the operating pressure must be lowered in order to reduce the necessary triggering force. This results in greater output with a lower force required for each stroke, which is useful for people, such as, for example, older persons, who wish to clean a floor or other surface and do not have the strength to really push hard many strokes per minute. Once a user has triggered, the complete volume of the piston 7703 will be dispensed. However, because the output of the piston chamber 7704 is by design larger than that which the nozzles 7709 can handle, the rest of the liquid will be stored in the buffer 7706 for later dispensing. In contrast to some of the embodiments described above, such as are shown in FIGS. 75A-76A, there is no direct stop as the trigger is released.

Thus, there is a non-return inlet valve 7705 for the buffer, which causes the buffer 7706 to dispense its contents until the pressure in the buffer 7706 drops below that of the opening pressure of pre-compression valve 7708, even after the user releases the trigger. Alternatively, a direct action embodiment of this version could also be made, which allows a user to stop the dispensing form the buffer immediately upon releasing the trigger. Although this gives greater control, it requires holding the trigger down (against the force of the spring) at all times dispensing is desired, which is often less convenient. FIG. 78A, analogous to the other schematics described above, is a schematic for the exemplary embodiment of FIGS. 77A and 77B. Thus, shown in FIG. 78A are liquid container 7701, container venting 7702, piston 7703, piston housing 7704, non-return valve inlet piston 7705, non-return valve inlet buffer 7705A, buffer 7706, restrictor 7707, pre-compression valve 7708 and nozzles 7709.

As shown in FIG. 78A, this is a low pressure system with liquid buffer.

By the piston movement upwards, liquid is taken from the liquid container due to the under pressure which is created.

The container needs an air venting or Flair bottle.

By pushing the piston downwards the liquid is forced to go to the (multiple) nozzle(s) AND due to the nozzle output restriction, into the buffer.

The buffer will thus be filled with liquid and the pressure in the buffer will increase.

As the piston is at the end of its stroke downwards, the liquid collected in the buffer will be dispensed through the nozzle(s). With Flairosol (bag in a bag technology), venting is not necessary because the venting is integrated in the container/bottle. Venting is needed when a standard container/bottle is used.

Continuous Stop Engine

FIGS. 79-85B, next described, respectively illustrate a continuous stop engine.

Following that, FIGS. 86-90B respectively illustrate an improved stopping feature.

Finally, FIGS. 91A-92C respectively illustrate a further improvement to the stopping feature.

A continuous stop engine allows for continuous spray, as described above, but then immediate cessation of spray when desired by a user. This combines the benefits of a continuous spray engine with direct action. With reference to FIG. 79, for a high/low pressure system with liquid buffer, the following operational stages may be implemented:

Continuous

When the piston moves up, liquid is taken from the container and enters the piston chamber. For this the container needs an air vent or Flair bottle. When pushing the piston downwards the liquid is forced to go to the (multiple) nozzle(s) and all liquid which cannot leave the nozzles is stored into the buffer. The buffer applies pressure to the liquid stored. When all of the liquid in the piston chamber is dispensed, the liquid stored in the buffer is dispensed through the nozzle(s), even when the piston moves up again to take in liquid from the container.

Stop

When the release valve is activated, liquid stored in the buffer flows back into the container. This action immediately stops dispensing.

The schematic of FIG. 79, due to its detail, has its own specific index numbering system, different than any other figure hereof, although there is some overlap. With reference to FIG. 79, there is shown a container 7901, which could be a Flair container, a buffer 7902, a spring 7903, a piston 7904, an inlet valve 7905, a one-way valve 7906, a pre-compression valve 7907, a release valve 7908, a container air vent 7909, a filter 7910 and a floor plate 7911.

FIG. 80B illustrates exemplary parts: a piston 7904, an inlet valve 7905, a one way valve 7906, a buffer 7902, a pre-compression valve 7907, a release valve 7908 and a release valve actuator 7908A. Index numbers for FIGS. 80A through 86 are specific to the "continuous stop engine" embodiment (first shown in FIG. 79 as a schematic), as this embodiment has its own set of elements.

FIGS. 81A-85C illustrate five steps in operation of the exemplary continuous stop engine, as follows:

FIGS. 81A and 81B

1. Take in Liquid from Container

The piston moves up all the way. Liquid from the container is taken into the piston chamber past the inlet valve (7905). The one way valve (7906) closed off the passage between the piston chamber and the buffer. The release valve (7908) is open.

FIGS. 82A and 82B

2. *Piston Moves Down

The inlet valve (7905) closes. Liquid from piston chamber is pushed past the one way valve (7906). Liquid travels via the buffer (7902) and past the pre-compression valve (7907) towards the nozzle(s). The overflow of liquid which cannot leave the nozzles is stored in the buffer. The release valve activator (7908A) can move down and the release valve (7908) is closed.

FIGS. 83A and 83B

3. Piston Moves Up

The piston moves up, but not all the way. The release valve activator (7908A) is not touched. Liquid from the container is taken into the piston chamber past the inlet valve (7905). The one way valve (7906) closes off the passage between the piston chamber and the buffer. The overflow of liquid stored in the buffer passes the outlet valve.

FIGS. 84A and 84B

4. Continuous Output

When the piston moves up and down in given area, without touching the release valve activator (7908A), a continuous output is generated.

FIGS. 85A, 85B and 85C

5. Stop

The piston moved up all the way. The release valve activator (7908A) is pushed upwards The release valve opens (7908). The liquid stored in the buffer flows back to the container and the pre-compression valve (7907) closes, and dispensing stops immediately.

FIGS. 86-90B respectively illustrate a method to improve the stopping feature, based on relocating the valves. In the 2 mm for releasing the accumulator, another valve can also be actuated. This also improves vertical assembly. As shown in FIGS. 87A, 87B and 87C, respectively, there can be a home or 0 mm position, a 2 mm position, and a 17 mm position. Once the trigger moves to the 2 mm position, there is a temporary stop, via a trigger blocking feature. If it is engaged, the trigger cannot return to the home position, as the trigger is now blocked, but the trigger is free to travel from the 2 mm to the 17 mm position repeatedly. However, once the blocking is disabled or released, the trigger can return to zero (home position) and activate the valve to redirect the flow out of the buffer, thus immediately stopping the spray. Such a system is implemented in the exemplary embodiment shown in FIGS. 87A, 87B and 87C. Thus, with reference to FIG. 87A, the pump is actuated by a handle and trigger. The push rod is connected to the pump piston. The full stroke of the trigger equals a push rod travel of 15+2 mm. When the trigger is pulled from 0 mm to 2 mm, at 2 mm a feature automatically blocks the trigger from returning to 0 mm. The return valve is now closed. However, the trigger is able to travel from 2 mm to 17 mm. Within this zone actuating will give spray performance, prolonged or continuous depending on the actuation rate of the user. When disabling the blockage of the trigger, so it can and will return to 0 mm, the return valve can be opened and the liquid within the buffer can flow back to the bottle. Dispensing thus stops immediately. FIGS. 87B and 87C respectively show the 2 mm and 17 mm positions of the trigger, according to exemplary embodiments of the present invention.

FIGS. 88A-90B respectively show how this is implemented within the device:

FIGS. 89A and 89B—Between 0 and 2 mm Position

Within this area the liquid return valve is operated.

In position '0' the spring of the piston lifts up the liquid return valve 89A opening the passage towards the bottle. By means of a tumbler the same force opening the liquid return valve, closes the outlet valve 89B. As soon as the piston is pushed in 2 mm, the spring of the return valve 89A closes of the passage to the liquid. The pre-compressed outlet valve 89B is released.

FIGS. 90A and 90B—Between 2 mm and 17 mm Position

Within this area the output is generated. Since the opening towards the bottle is closed in position 2 mm, liquid which is displaced by the piston no longer travel to the bottle but is pushed to the released outlet valve 90A. The liquid displaced pushes open the outlet valve. The overflow of liquid is stored in the buffer 90C. As long as the piston moves between position 2 mm and position 17 mm, a continuous output is created. When the piston moves beyond position 2 mm towards position '0', the outlet valve is forced to close and the liquid return valve is opened. The liquid passes to the bottle and output is stopped immediately.

A further improvement to the stopping feature is illustrated in FIGS. 91A-92C. Here, as shown in FIG. 91A, the operation of the pump was separated from the operation of the liquid return valve/pre-compression outlet valve. A cable 91A operates the valve system 91B, and a push rod activates the pump 91C. As shown in FIG. 91B, the cable is activated by a feature 91D located at the handle. The push rod 91E operating the pump is activated by pulling the trigger 91F. This can be implemented, for example, as shown in FIGS. 92A through 92C, where: (a) upon pulling the cable, the liquid return valve is forced to close, and the pre-compression outlet valve is released. Upon (b) releasing the cable, the liquid return valve opens by spring force. Liquid pressure is let off, because the liquid can return towards the bottle. The same spring force opening the liquid return valve flips the tumbler and forces the pre compression outlet valve to close.

Standard DuO1 Sprayers With Buffering

FIGS. 93A-96B respectively illustrate applying the buffering and dome valve principles described above to standard sprayers, making "DuO1 Sprayers." FIGS. 93A, 93B and 93C respectively illustrate an exemplary direct stop sprayer. As shown in FIGS. 93A through 93C, the features of the direct stop sprayer include a classic sprayer like configuration of parts where no extra part is needed for venting, the piston moves when the user pumps and there is a static nozzle. A large buffer is needed and there is a larger travel distance of the trigger compared to standard sprayers. The long trigger is needed to compensate for the higher forces required to push liquid a larger piston volume, and therefore the direct stop sprayer is larger than a standard conventional sprayer. It is noted in FIG. 93C that no umbrella valve is used in the direct stop sprayer, and thus, when a user releases the trigger, liquid can flow from the buffer back into the piston chamber. This effectively stops all flow as soon as a user releases the trigger. Thus, a direct stop sprayer allows for prolonged spraying/foaming even after the downstroke is over, as long as a user holds the trigger down, and thus holds the piston chamber closed.

FIGS. 94A and 94B respectively present details of an exemplary continuous sprayer according to exemplary embodiments of the present invention. As shown in FIGS. 94A and 94B, this sprayer also has a classic sprayer-like configuration of parts, with no extra part needed for venting. The piston moves when pumping and there is a static nozzle. The travel of the trigger is similar to other sprayers and this is visually similar to a standard sprayer. However, there is included in the buffer sprayer the umbrella valve as shown in FIG. 94B. This operates as a one-way valve between the piston chamber and the buffer, such that even when a user releases the trigger, no liquid can flow from the buffer into the piston chamber. Thus, the liquid continues to flow from the buffer out through the nozzle as long as the buffer pressure exceeds the opening pressure of the dome valve.

Other DuO1 Sprayers

FIGS. 95A and 95B respectively illustrate various features of an exemplary DuO1 dispenser with non-inline buffer according to exemplary embodiments of the present invention. This improves upon Dispensing Technologies' previous Flairosol technology, as described in U.S. patent application Ser. Nos. 13/068,267 and 13/623,860, now U.S. Pat. Nos. 8,905,271 and 9,714,133, respectively, the disclosures of each of which are hereby incorporated by reference herein (these describe what may be called "first generation" Flairosol). With reference to FIGS. 95A and 95B, which respectively present a perspective view in 95A and a cutaway cross-sectional view in 95B, there can be seen a configuration of parts of an exemplary DuO1 device. Although similar to that of the first generation Flairosol, an extra part is needed for venting. There is also a static piston where a nozzle moves up and down while spraying, and there is a larger travel distance of the trigger compared to a standard sprayer. Finally, the device is visually different from a standard sprayer.

FIGS. 96A and 96B respectively show various operational states of the DuO1 device of FIGS. 95A and 95B. With reference to FIG. 96A, when the trigger is released, liquid is sucked into the liquid chamber through the inlet valve. With reference to FIG. 96B, when the trigger is pulled, liquid is pushed past the outlet valve to the nozzle and whatever liquid cannot be handled by the nozzle (due to the restriction of the nozzle) such excess liquid is stored in the buffer, as shown. With reference to FIG. 97A, when the trigger is released by a user, the excess liquid stored in the buffer is then released to the nozzle, as shown by the white arrow in FIG. 97A. At the same time the liquid chamber (piston chamber) is filled again in preparation for a further downstroke as shown in FIG. 96B. This allows for a continuous spray.

FIG. 97B shows detail of the umbrella valve and the dome valve with reinforcing spring. To make sure that the DuO1 device always primes, the valve is mechanically opened when the piston reaches the end of the stroke; by this means air can be evacuated. So generally, the end of a stroke looks like the configuration of FIG. 97A which is right before the release by a user of the trigger, and there is some liquid remaining in the piston chamber. However, on the first stroke which primes the sprayer there is no liquid in the chamber, and the piston can move all the way up to completely close the piston chamber, thereby touching the umbrella valve which thereby pushes upwards and deforms the red dome valve, allowing the air to escape. By this means the outlet valve is forced open and the sprayer can be primed.

The above-presented description and figures are intended by way of example only and are not intended to limit the present invention in any way except as set forth in the following claims. It is particularly noted that the persons skilled in the art can readily combine the various technical aspects of the various exemplary embodiments described.

What is claimed is:

1. A buffered liquid dispensing device, comprising:
   a dispensing head, including:
   an inlet valve,
   a piston and a piston chamber,
   an actuator coupled to the piston,
   a gas buffer in fluid communication with the piston chamber, the gas buffer comprising a buffer chamber and a closed compressible gas-filled buffer bag made from a flexible material, the closed compressible buffer bag arraing in a buffer chamber;
   an outlet valve having a defined minimum opening pressure in fluid communication with at least one of (i) the buffer and (ii) the piston chamber; and
   a nozzle with a defined throughput in fluid communication with the outlet valve;
   wherein the buffer chamber has an opening in uninterrupted fluid communication with the piston chamber so as to allow fluid flow both from the piston chamber to the buffer chamber and from the buffer chamber to the piston chamber.

2. The buffered liquid dispensing device of claim 1, wherein the buffer bag is made of a plastics material.

3. The buffered liquid dispensing device claim 2, wherein the buffer bag comprises at least one layer of a plastics material selected from the group consisting of polyethylene, polypropylene, polyamide, EVOH, polyester and silicone.

4. The buffered liquid dispensing device of claim 1, wherein the buffer bag comprises a tube which is sealed by welds on opposite ends.

5. The buffered liquid dispensing device of claim 4, further comprising an inner tube arranged in the buffer bag, the inner tube having open ends and an outer diameter which is smaller than an inner diameter of the buffer bag.

6. The buffered liquid dispensing device of claim 1, wherein the buffer bag is manufactured by one or more of: extrusion, co-extrusion, folding and welding a foil, or blow molding.

7. The buffered liquid dispensing device of claim 1, wherein the gas buffer is manufactured by:
   providing a tube that is sealed on a first end;
   introducing a pressurizing gas into an open second end of the tube opposite the sealed first end;
   pressing to close the open second end of the tube; and
   welding to seal the closed second end of the tube.

8. The buffered liquid dispensing device of claim 7, wherein providing the tube sealed on a first end further includes:
   providing the tube with the first and second ends being open;
   pressing to close the first end; and
   welding to seal the first end.

9. The buffered liquid dispensing device of claim 7, wherein providing a tube further includes:
   providing a foil;
   folding the foil; and
   welding the folded foil along at least part of at least one edge of the folded foil.

10. The buffered liquid dispensing device of claim 7, wherein the tube sealed on the first end is heated before introducing the pressurizing gas into the open second end of the tube.

11. The buffered liquid dispensing device of claim 7, wherein a length of tube stock sealed on its first end is provided on a reel, the pressurizing gas is introduced into the length of the tube stock while on the reel, and the buffer bag is formed by cutting an end segment from the length of the tube and stock welding it to form a seal.

12. The buffered liquid dispensing of claim 11, wherein the manufacture of the gas further comprises:
   arranging the buffer bag in a buffer housing and allowing the buffer bag to expand to lower the gas pressure in the buffer bag to a desired value.

13. The buffered liquid dispensing device of claim 7, wherein the manufacture of the gas buffer further comprises:
   arranging the buffer bag in a buffer housing and allowing the buffer bag to expand to lower the gas pressure in the buffer bag to a desired value.

14. A bufferered liquid dispensing device of claim 1, wherein the gas buffer is manufactured by:
   providing a pressure chamber filled with pressurized gas;
   introducing a tube having at least one open end into the pressure chamber;
   filling the tube with pressurized gas;
   welding to seal the at least one open end of the tube; and
   removing the sealed and pressurized tube from the pressure chamber.

15. The buffered liquid dispensing device of claim 14, wherein both ends of the tube are open when it is introduced into the pressure chamber and wherein each open end is sealed by welding.

16. The buffered liquid dispensing device of claim 14, wherein the manufacture of the gas buffer further comprises:
   arranging the buffer bag in a buffer housing and allowing the buffer bag to expand to lower the gas pressure in the buffer bag to a desired value.

17. A buffered liquid dispensing device, comprising:

a dispensing head, including:

an inlet valve, a piston and a piston chamber, an actuator coupled to the piston, a gas buffer in fluid communication with the piston chamber, the gas buffer comprising a buffer chamber made of an inflexible material and a compressible gas-filled buffer bag made from a flexible material and arranged within the buffer chamber; the gas-filled buffer bag configured to compress within the buffer chamber when a pre-defined volume of liquid at a pre-defined pressure is present in the buffer chamber;

an outlet valve having a defined minimum opening pressure in fluid communication with at least one of (i) the buffer and (ii) the piston chamber;

and a nozzle with a defined throughput in fluid communication with the outlet valve;

wherein the buffer chamber has an opening in uninterrupted fluid communication with the piston chamber so as to allow fluid flow both from the piston chamber to the buffer chamber and from the buffer chamber to the piston chamber.

18. The buffered liquid dispensing device of claim 17, wherein the gas-filled buffer bag comprises at least one layer of a plastics material selected from the group consisting of polyethylene, polypropylene, polyamide, EVOH, polyester and silicone.

19. The buffered liquid dispensing device of claim 17, wherein the gas-filled buffer bag comprises a tube which is sealed by welds on opposite ends.

20. The buffered liquid dispensing device of claim 17, wherein the opening between the buffer chamber and the piston chamber is unobstructed.

* * * * *